United States Patent
Dobashi et al.

(10) Patent No.: US 11,609,362 B2
(45) Date of Patent: Mar. 21, 2023

(54) STACKED LENS STRUCTURE AND METHOD OF MANUFACTURING THE SAME, AND ELECTRONIC APPARATUS

(71) Applicant: SONY SEMICONDUCTOR SOLUTIONS CORPORATION, Kanagawa (JP)

(72) Inventors: Eiichiro Dobashi, Kanagawa (JP); Shunsuke Maruyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 130 days.

(21) Appl. No.: 17/042,274

(22) PCT Filed: Mar. 19, 2019

(86) PCT No.: PCT/JP2019/011340
§ 371 (c)(1),
(2) Date: Sep. 28, 2020

(87) PCT Pub. No.: WO2019/193965
PCT Pub. Date: Oct. 10, 2019

(65) Prior Publication Data
US 2021/0055458 A1 Feb. 25, 2021

(30) Foreign Application Priority Data
Apr. 5, 2018 (JP) .............. JP2018-072849

(51) Int. Cl.
  G02B 3/00 (2006.01)
  G02B 13/18 (2006.01)
  H04M 1/02 (2006.01)
(52) U.S. Cl.
  CPC ........... *G02B 3/0068* (2013.01); *G02B 13/18* (2013.01); *H04M 1/0264* (2013.01)

(58) Field of Classification Search
  CPC .... G02B 3/0068; G02B 13/18; G02B 3/0012; G02B 13/0085; H04M 1/0264; B29D 11/00307; B29D 11/00403; H04N 5/225
  See application file for complete search history.

(56) References Cited

U.S. PATENT DOCUMENTS

| | | | |
|---|---|---|---|
| 2008/0304821 A1 | 12/2008 | Jeung et al. | |
| 2012/0170923 A1* | 7/2012 | Seo | G03B 3/10 |
| | | | 29/592.1 |

(Continued)

FOREIGN PATENT DOCUMENTS

| | | |
|---|---|---|
| CN | 102547082 A | 7/2012 |
| CN | 102854550 A | 1/2013 |

(Continued)

OTHER PUBLICATIONS

International Search Report and Written Opinion of PCT Application No. PCT/JP2019/011340, dated Jun. 25, 2019, 09 pages of ISRWO.

*Primary Examiner* — Robert E. Tallman
(74) *Attorney, Agent, or Firm* — Chip Law Group

(57) ABSTRACT

The present disclosure relates to a stacked lens structure and a method of manufacturing the same, and an electronic apparatus by which it is possible to realize miniaturization of a lens module. A stacked lens structure includes plural substrates with lens stacked on one another, the substrate with lens each having a lens disposed on inside of a through-hole formed in the substrate. In regard of side surfaces at side parts corresponding to sides of a rectangle surrounding the substrate with lens in plan view as viewed in an optical axis direction, a width and a shape are the same among all the substrates with lens, whereas in regard of side surfaces at opposite angle parts corresponding to opposite angles of the rectangle, the width or shape differs between (Continued)

at least two substrates with lens. The present technology is applicable, for example, to a lens module or the like.

9 Claims, 97 Drawing Sheets

(56) References Cited

U.S. PATENT DOCUMENTS

2012/0327524 A1    12/2012  Shigemitsu et al.
2019/0004293 A1*    1/2019  Hikichi ............ H01L 27/14687
2019/0029496 A1     1/2019  Igarashi

FOREIGN PATENT DOCUMENTS

| | | |
|---|---|---|
| DE | 102011018885 A1 | 7/2012 |
| JP | 05-261065 A | 10/1993 |
| JP | 2008-168042 A | 7/2008 |
| JP | 2008-304911 A | 12/2008 |
| JP | 2009-279790 A | 12/2009 |
| JP | 2010-204443 A | 9/2010 |
| JP | 2010-204631 A | 9/2010 |
| JP | 2010-256563 A | 11/2010 |
| JP | 2011-138089 A | 7/2011 |
| JP | 2013-001091 A | 1/2013 |
| JP | 2013-007969 A | 1/2013 |
| JP | 2015-102794 A | 6/2015 |
| KR | 10-0860308 B1 | 9/2008 |
| KR | 10-2012-0076285 A | 7/2012 |
| TW | 201300863 A | 1/2013 |
| WO | 2011/055655 A1 | 5/2011 |
| WO | 2017/022188 A1 | 2/2017 |
| WO | WO-2017022189 A1 * | 2/2017 ....... B29D 11/00307 |
| WO | 2017/179144 A1 | 10/2017 |

* cited by examiner

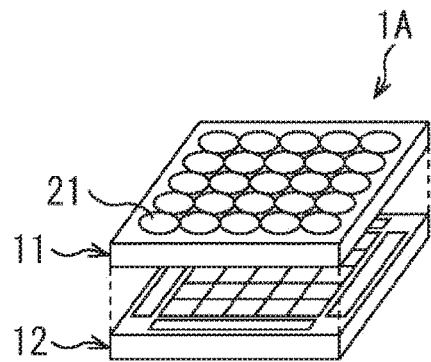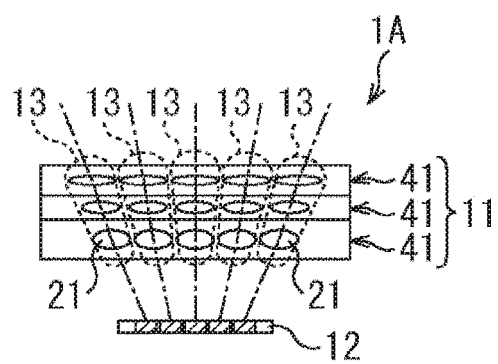
FIG. 8A  FIG. 8B
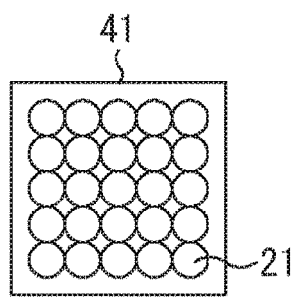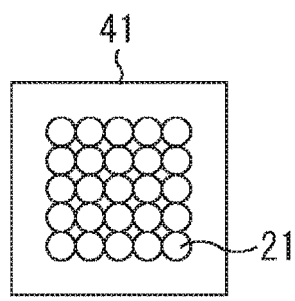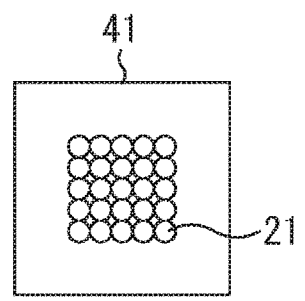
FIG. 8C  FIG. 8D  FIG. 8E
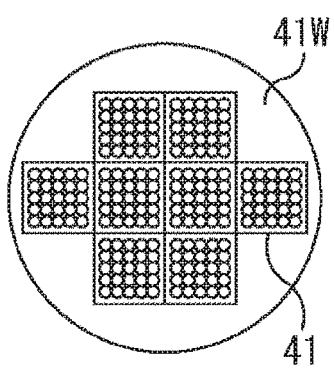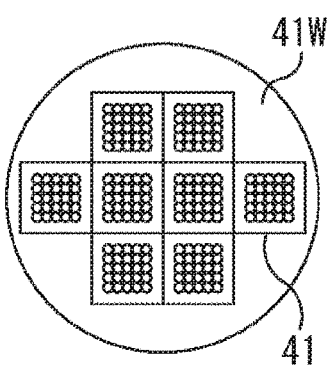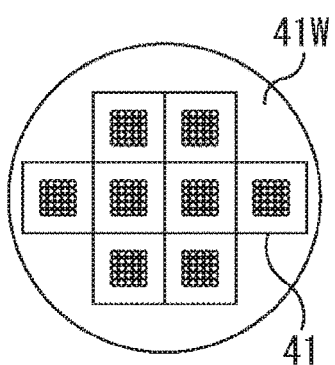
FIG. 8F  FIG. 8G  FIG. 8H

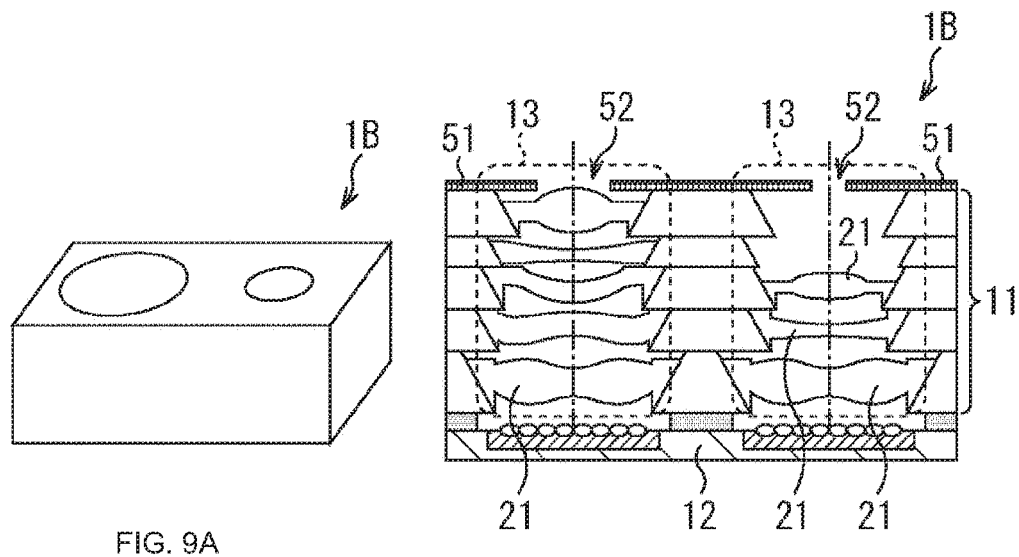
FIG. 9A
FIG. 9B
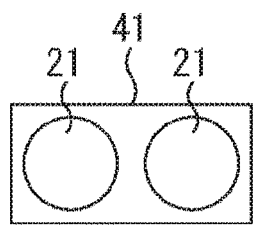
FIG. 9C
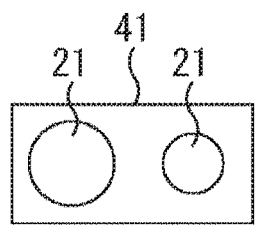
FIG. 9D
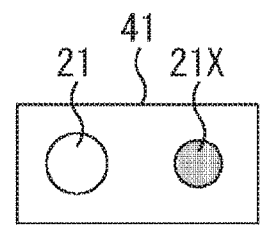
FIG. 9E
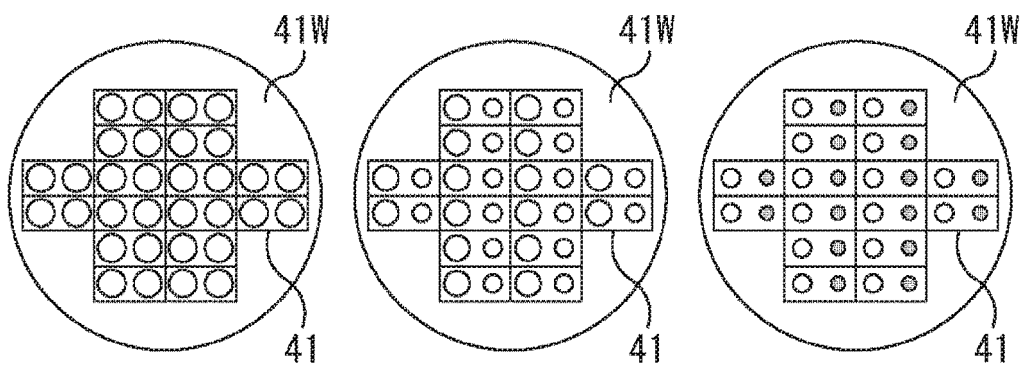
FIG. 9F
FIG. 9G
FIG. 9H

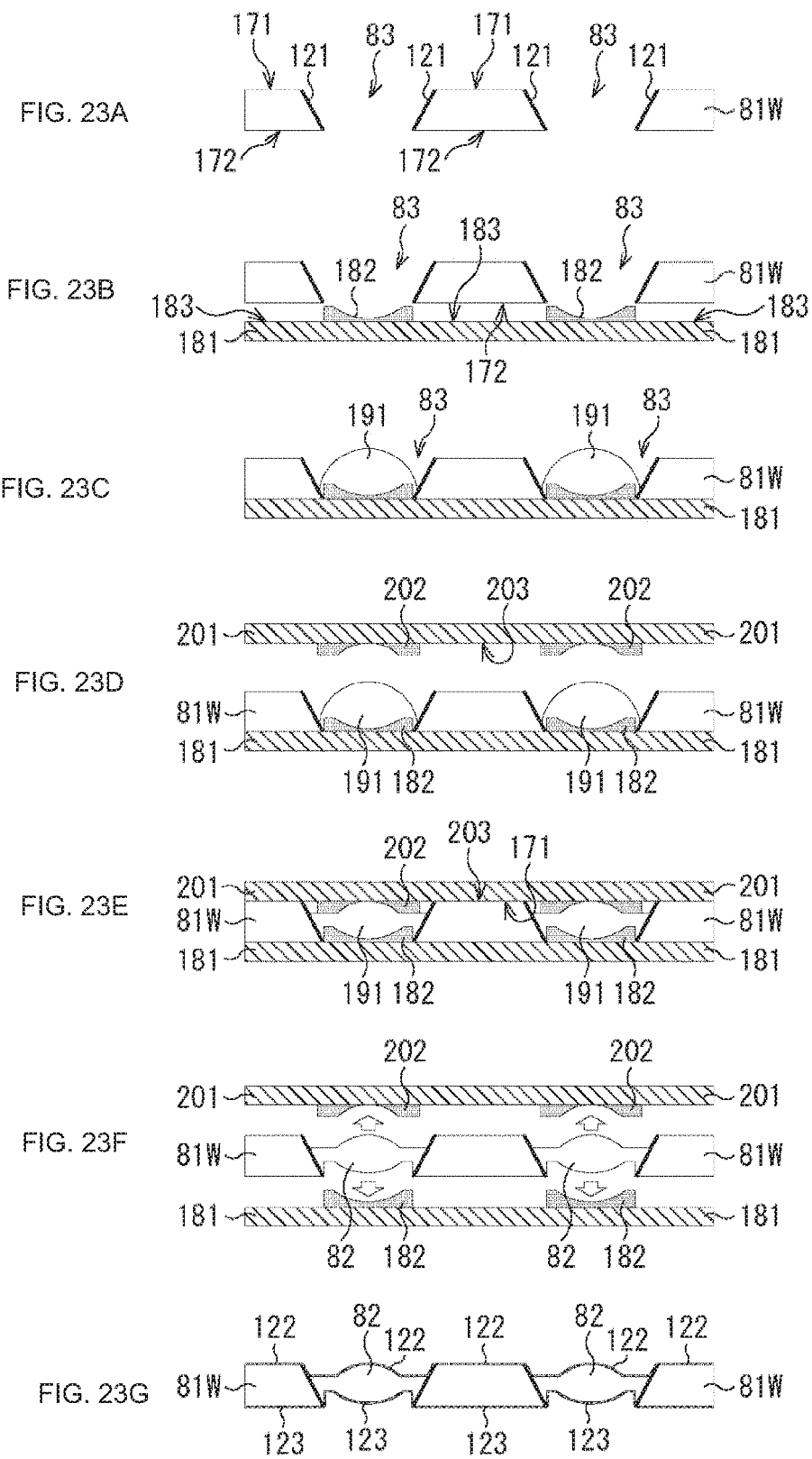

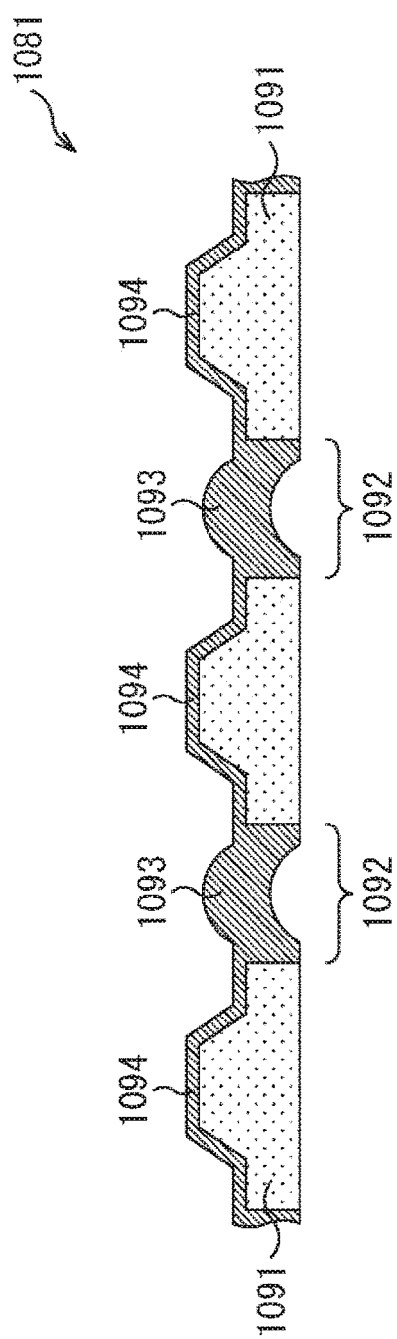
F I G . 4 1

BEFORE IRRADIATION WITH UV RAYS

DURING IRRADIATION WITH UV RAYS

AFTER IRRADIATION WITH UV RAYS

BEFORE IRRADIATION WITH UV RAYS

DURING IRRADIATION WITH UV RAYS

AFTER IRRADIATION WITH UV RAYS

BEFORE IRRADIATION WITH UV RAYS

DURING IRRADIATION WITH UV RAYS

AFTER IRRADIATION WITH UV RAYS

BEFORE IRRADIATION WITH UV RAYS

DURING IRRADIATION WITH UV RAYS

AFTER IRRADIATION WITH UV RAYS

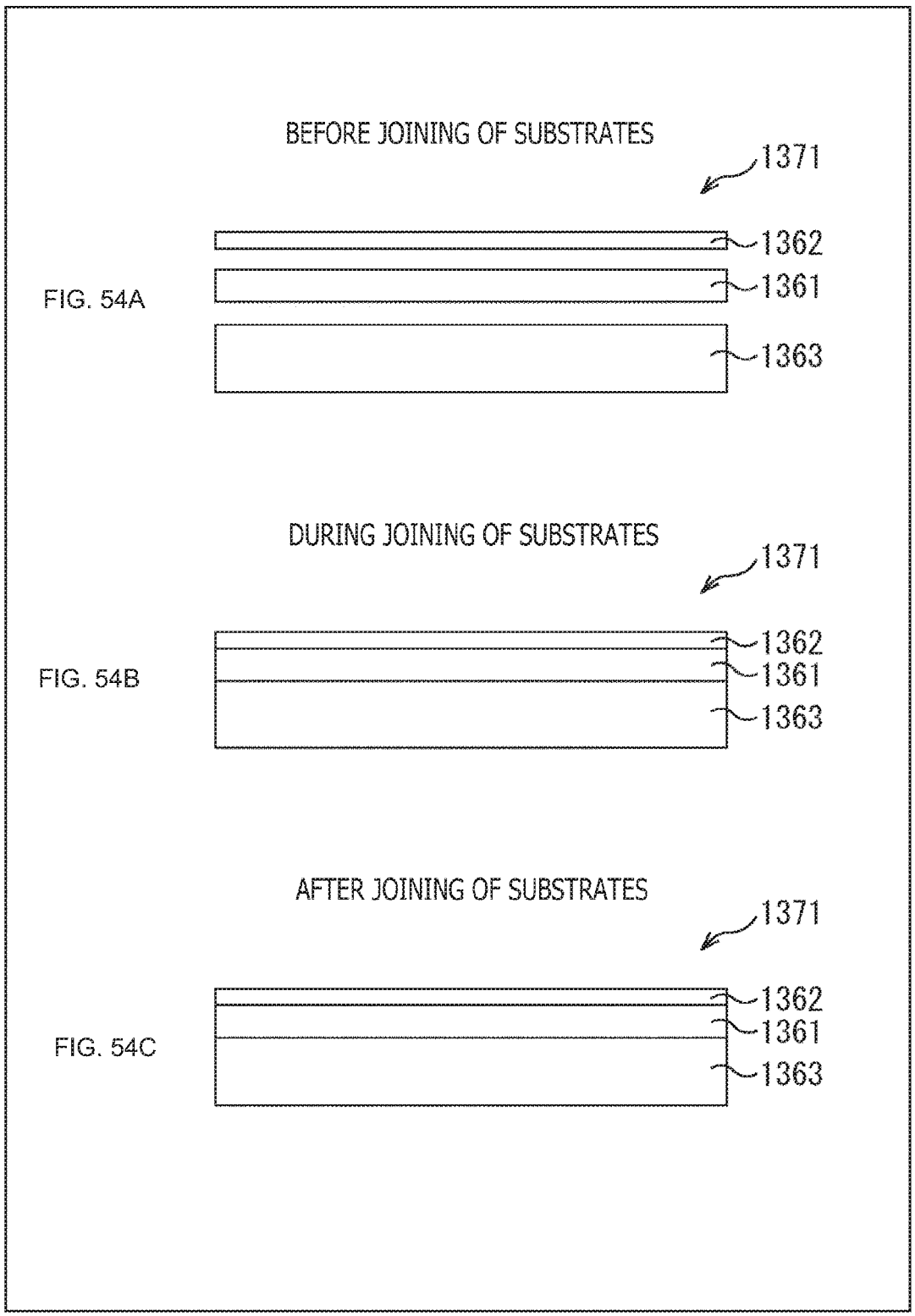

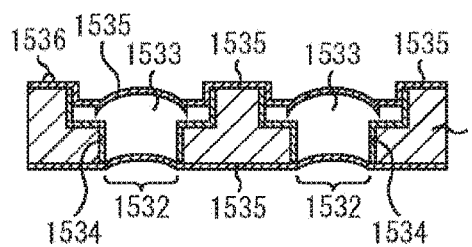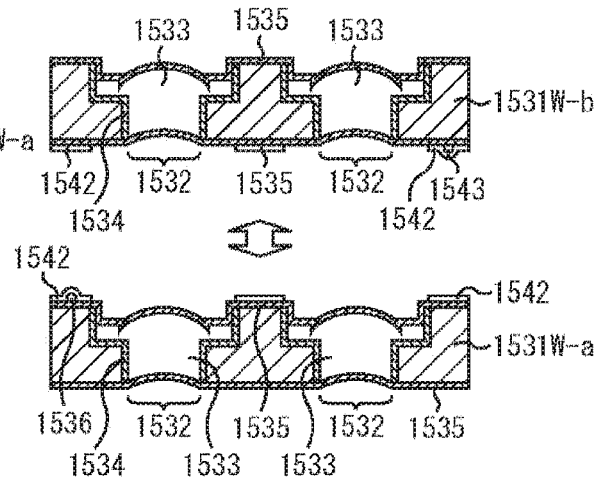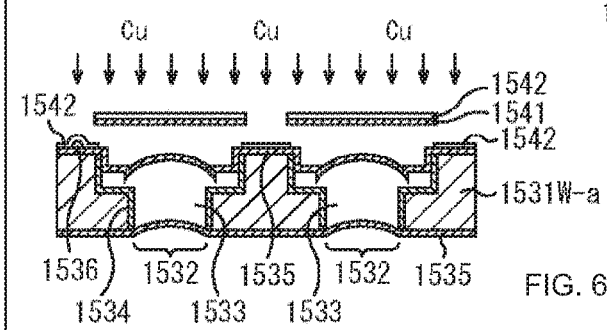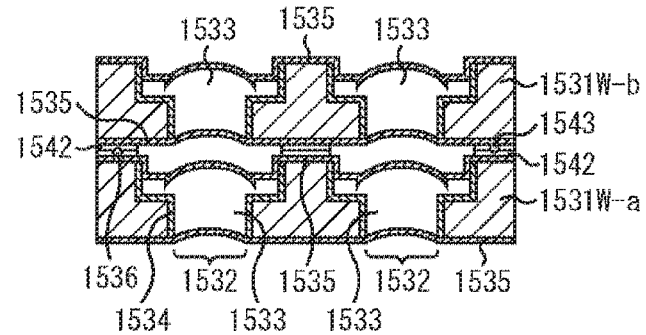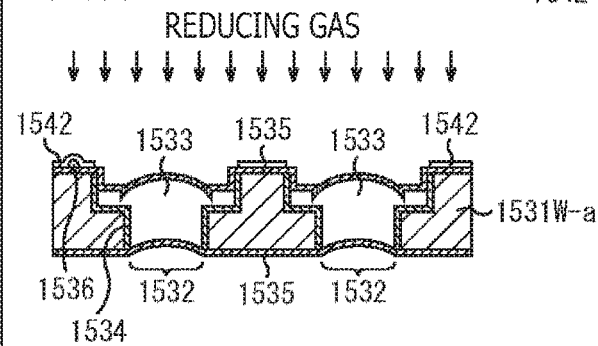

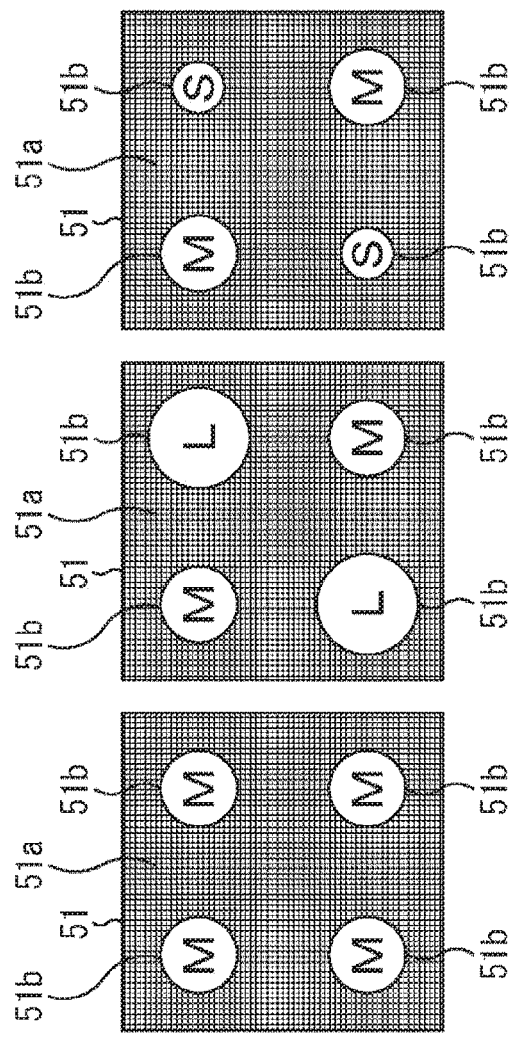
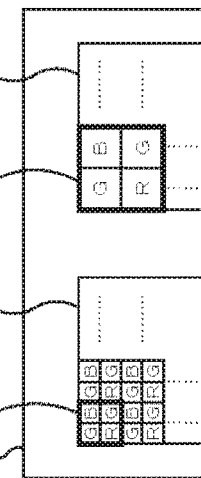

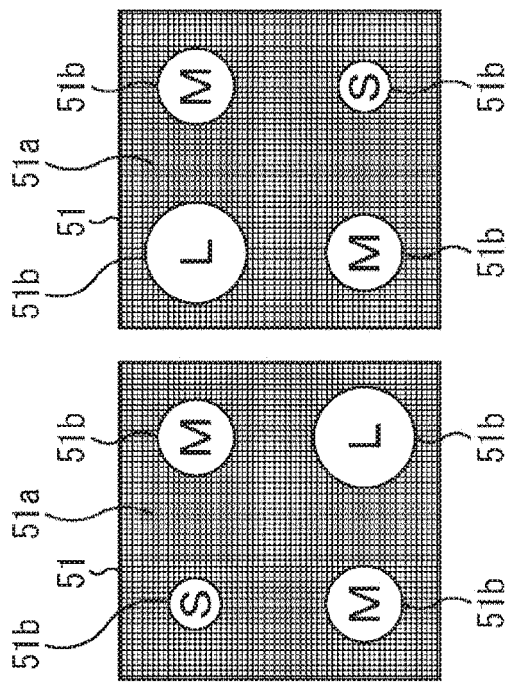
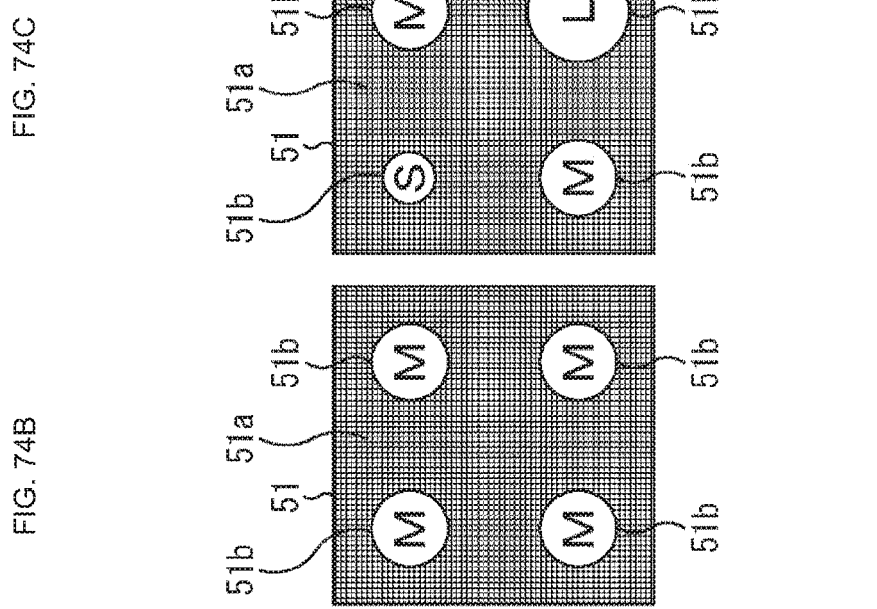
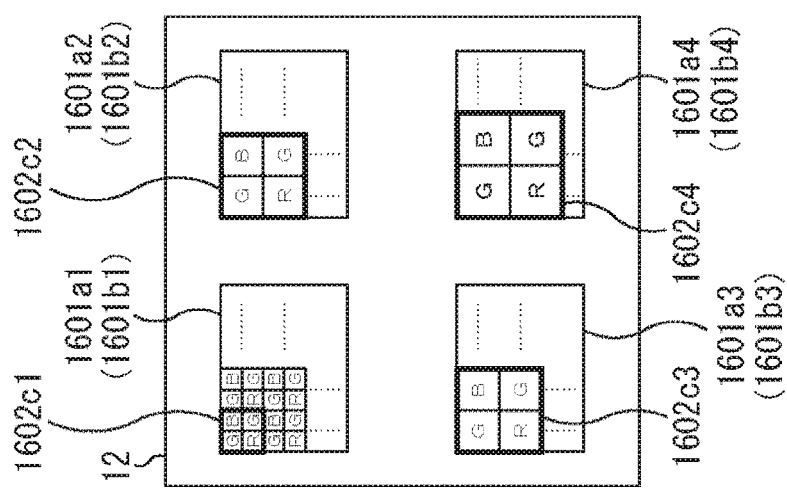

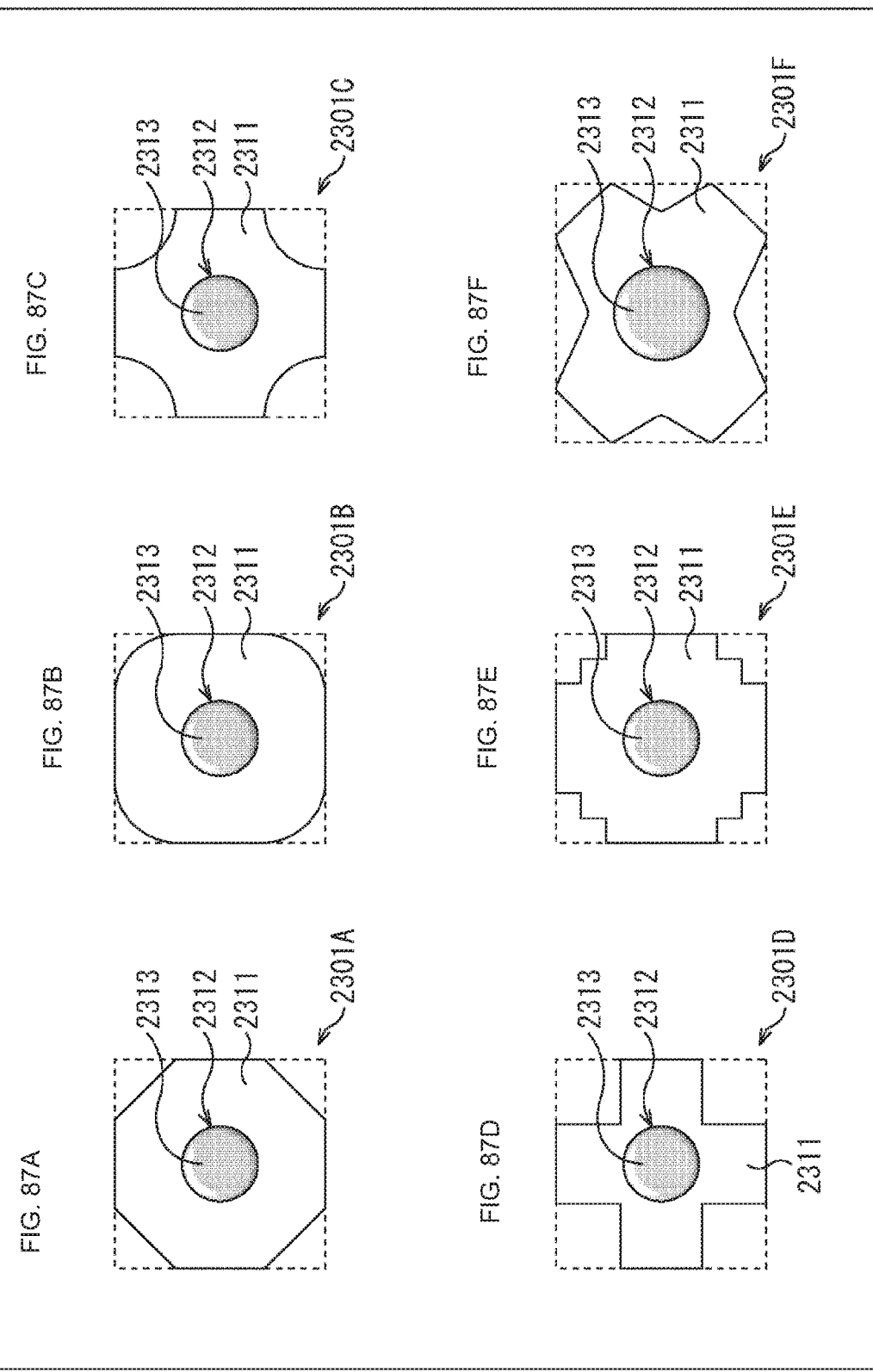

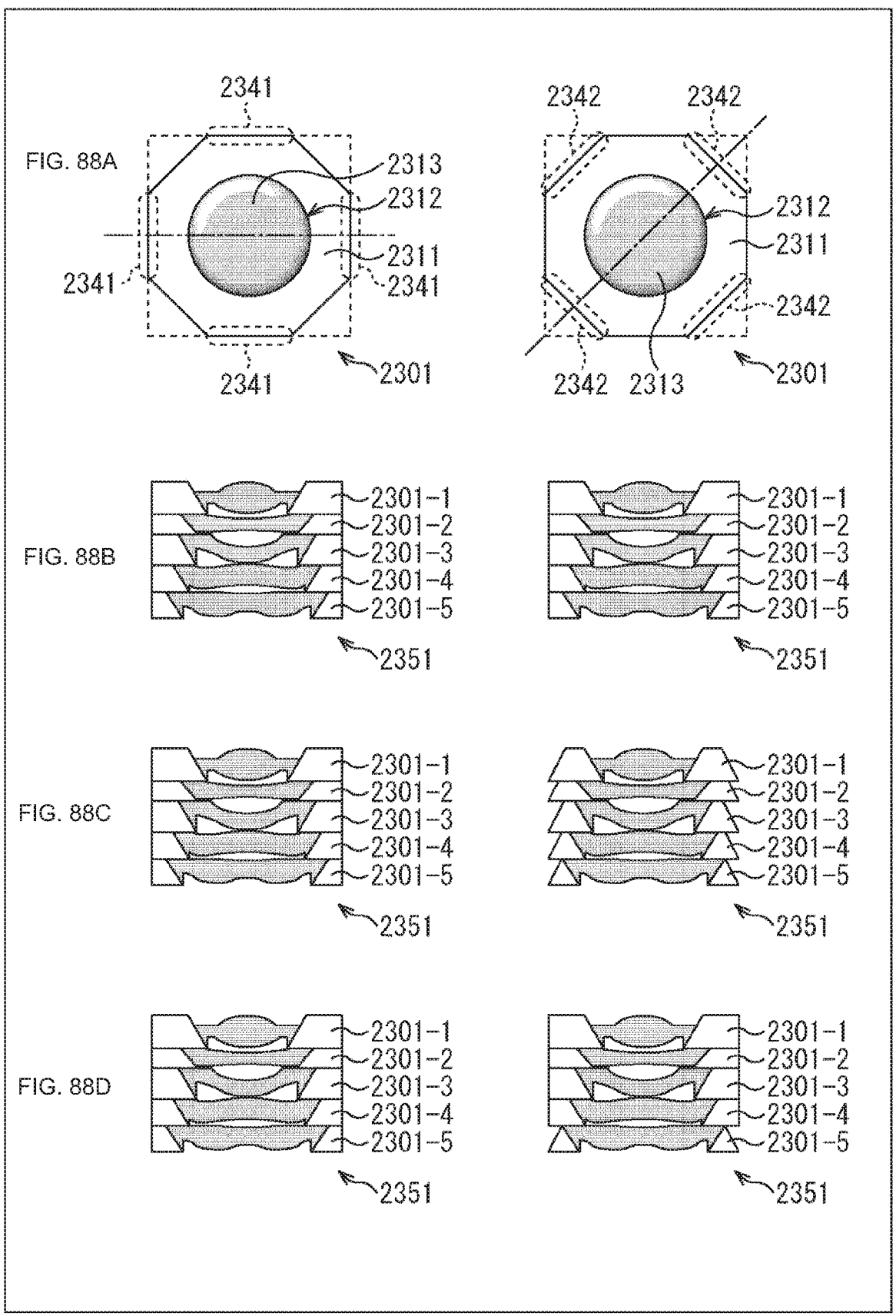

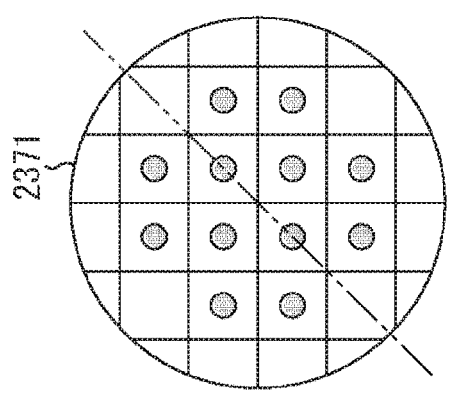
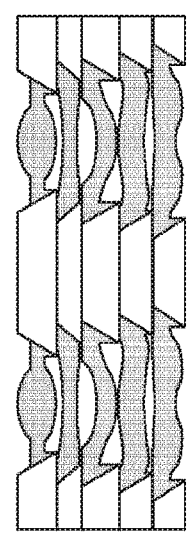
FIG. 90A
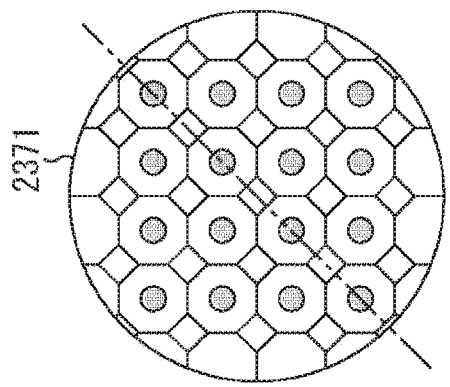
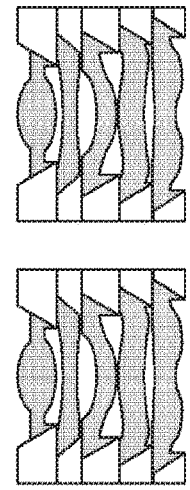
FIG. 90B

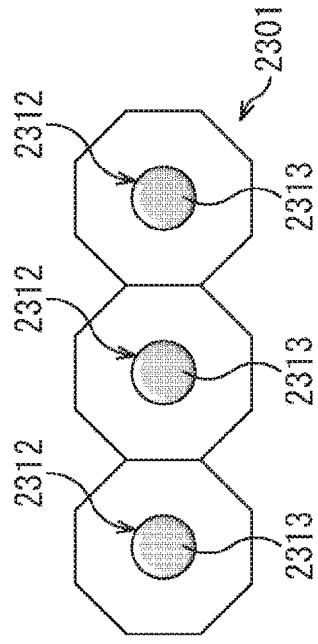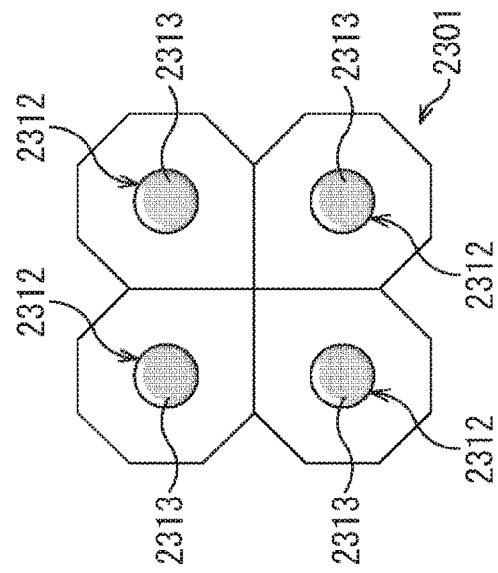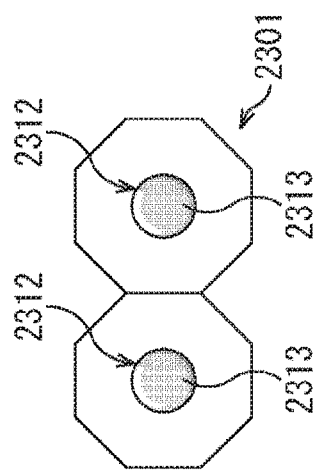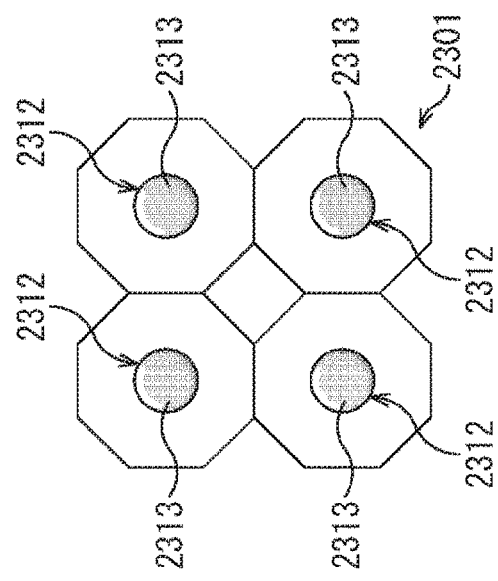

STACKED LENS STRUCTURE AND METHOD OF MANUFACTURING THE SAME, AND ELECTRONIC APPARATUS

CROSS REFERENCE TO RELATED APPLICATIONS

This application is a U.S. National Phase of International Patent Application No. PCT/JP2019/011340 filed on Mar. 19, 2019, which claims priority benefit of Japanese Patent Application No. JP 2018-072849 filed in the Japan Patent Office on Apr. 5, 2018. Each of the above-referenced applications is hereby incorporated herein by reference in its entirety.

TECHNICAL FIELD

The present disclosure relates to a stacked lens structure and a method of manufacturing the same, and an electronic apparatus, particularly to a stacked lens structure and a method of manufacturing the same, and an electronic apparatus by which a reduction in size can be realized.

BACKGROUND ART

Many of mobile terminals such as smartphones has a camera function. These cameras are small in size, and include a thin imaging element and a thin lens module. The thin lens module generally includes a wafer level lens.

As a typical method of producing a wafer level lens, a hybrid method and a casting method are widely known.

The hybrid method is a method of forming lenses by imprinting on the upper and lower sides of a glass substrate, thereby producing the wafer level lenses.

According to the hybrid method, however, the glass substrate is interposed between the lenses, so that the lens thickness is large, and the degree of freedom in shape is low.

In view of this, as a method of producing wafer level lenses only from a lens material, without using the glass substrate, the casting method has been proposed.

According to the casting method, however, variability would be generated in the accuracy in wafer plane due to shrinkage of the lens material.

In view of this, a production method in which holes are formed in a substrate and lenses are formed in the holes has been proposed (see PTL 1 and PTL 2).

In addition, when dicing cutting is conducted in the horizontal and vertical directions relative to a wafer at the time of individualizing the wafer level lenses, the lens becomes tetragonal in outer shape, and becomes large as compared to an ordinary cylindrical lens module produced by injection molding.

In view of this, a technique of contriving the dicing (see PTL 3) and a method of simultaneously removing a substrate at intersections of dicing lines after wafer stacking (see PTL 4) have been known.

In PTL 2, there has also been proposed, in regard of the wafer level lenses produced using method of forming holes in a substrate and forming lenses in the holes, a method in which slit holes are formed in parallel to the dicing line parts at the time of lens hole formation to thereby mitigate the burden of dicing.

CITATION LIST

Patent Literature

[PTL 1]
  JP 2009-279790A
[PTL 2]
  WO2017/022188
[PTL 3]
  JP 2013-007969A
[PTL 4]
  JP 2010-204443A

SUMMARY

Technical Problems

However, in individualizing the wafer level lenses by use of the aforementioned technology, when dicing cutting is performed in the horizontal and vertical directions relative to the wafer, the lens becomes tetragonal in outer shape, so that a space for placing a VCM (Voice Coil Motor) for AF (Auto Focus) is not present, as contrasted to a cylindrical lens of an ordinary camera module. Therefore, the VCM should be disposed in a space separate from the wafer level lenses, so that the lens module would become larger in size.

In addition, since the dicing leads to variability in the size of processing marks, an influence may be produced on module assembly accuracy.

Further, in the case of a configuration in which a silicon substrate is used and lenses are provided in openings in the silicon substrate, dicing produces sharp corners. The corners are susceptible to chipping because of its being sharp, and the chipping may cause generation of dust.

The present disclosure has been made in consideration of the above-mentioned circumstances. It is an object of the present disclosure to reduce the lens module in size, particularly without increasing the number of steps.

Solution to Problems

In accordance with a first aspect of the present technology, there is provided a stacked lens structure including plural substrates with lens stacked on one another, the substrate with lens each having a lens disposed on inside of a through-hole formed in the substrate, in which in regard of side surfaces at side parts corresponding to sides of a rectangle surrounding the substrate with lens in plan view as viewed in an optical axis direction, a width and a shape are the same among all the substrates with lens, whereas in regard of side surfaces at opposite angle parts corresponding to opposite angles of the rectangle, the width or shape differs between at least two substrates with lens.

In accordance with a second aspect of the present technology, there is provided a method of manufacturing a stacked lens structure, including a step of stacking plural substrates with lens on one another, the substrate with lens each having a lens disposed on inside of a through-hole formed in the substrate, in which at the time of stacking the substrates with lens, in regard of side surfaces at side parts corresponding to sides of a rectangle surrounding the substrate with lens in plan view as viewed in an optical axis direction, a width and a shape are formed to be the same among all the substrates with lens, whereas in regard of side surfaces at opposite angle parts corresponding to opposite angles of the rectangle, the width or shape is formed to be different between at least two substrates with lens.

In accordance with a third aspect of the present technology, there is provided an electronic apparatus including a stacked lens structure that includes plural substrates with lens stacked on one another, the substrate with lens each having a lens disposed on inside of a through-hole formed in the substrate, in which in regard of side surfaces at side parts corresponding to sides of a rectangle surrounding the substrate with lens in plan view as viewed in an optical axis direction, a width and a shape are the same among all the substrates with lens, whereas in regard of side surfaces at opposite angle parts corresponding to opposite angles of the rectangle, the width or shape differs between at least two substrates with lens.

In the first to third aspects of the present technology, at the time when plural substrates with lens having lenses disposed on inside of through-holes formed in the substrate are stacked, in regard of the side surfaces of at side parts corresponding to the sides of the rectangle surrounding the substrate with lens in plan view as viewed in the optical axis direction, the width and shape are formed to be the same among all the substrates with lens, and, in regard of the side surfaces at opposite angle parts corresponding to the opposite angles of the rectangle, the width or shape is formed to be different between at least two substrates with lens.

The stacked lens structure and the electronic apparatus may be independent devices, or may be modules incorporated in other devices.

Advantageous Effect of Invention

According to one aspect of the present disclosure, a lens module can be reduced in size, without increasing the number of steps.

Note that the effect described here is not necessarily limitative, and the effect may be any of those described herein.

BRIEF DESCRIPTION OF DRAWINGS

FIGS. 8A, 8B, 8C, 8D, 8E, 8F, 8G, and 8H illustrate figures for explaining a configuration of the substrate with lens.

FIGS. 9A, 9B, 9C, 9D, 9E, 9F, 9G, and 9H illustrate figures depicting a second embodiment of the camera module using the stacked lens structure to which the present technology is applied.

FIGS. 23A, 23B, 23C, 23D, 23E, 23F, and 23G illustrate figures for explaining the method of manufacturing the substrate with lens.

FIG. 41 is a sectional view of a lens array substrate as comparative structure example 3.

FIGS. 54A, 54B, and 54C illustrate diagrams schematically representing the stacked lens structure of FIGS. 53A and 53B.

FIGS. 60A, 60B, 60C, 60D, and 60E illustrate figures for explaining lamination on a wafer level in which metallic joining is used.

FIGS. 73A, 73B, 73C, and 73D illustrate figures depicting a fifth example of pixel layout in the light receiving region of the camera module.

FIGS. 74A, 74B, 74C, and 74D illustrate figures depicting a sixth example of pixel layout in the light receiving region of the camera module.

FIGS. 87A, 87B, 87C, 87D, 87E, and 87F illustrate figures depicting various shape examples of a single layer of substrate with lens.

FIGS. 88A, 88B, 88C, and 88D illustrate figures depicting various shape examples of a stacked lens structure.

FIGS. 90A and 90B illustrate figures for explaining an effect of the substrate with lens of the present disclosure.

FIGS. 91A, 91B, 91C and 91D illustrate figures depicting a configuration example of a substrate with lens having multiple lenses.

DESCRIPTION OF EMBODIMENTS

Figure 1A:
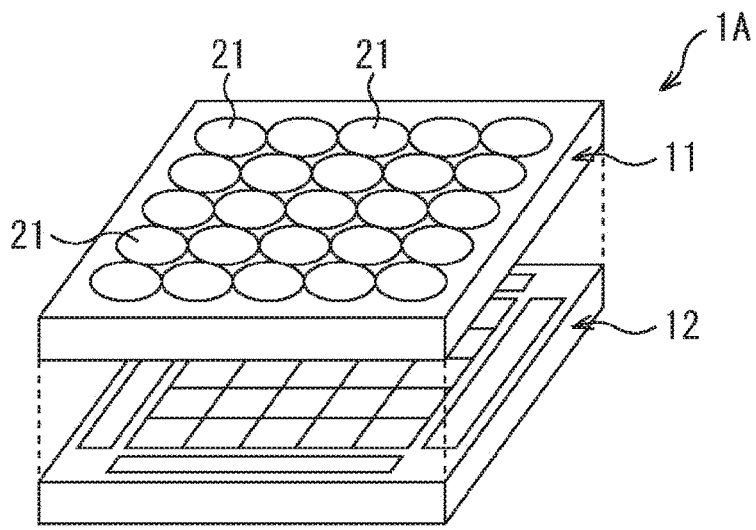
FIGS. 1A and 1B illustrate figures depicting a first embodiment of a camera module using a stacked lens structure to which the present technology is applied.

Modes for carrying out the present technology (hereinafter referred to as embodiments) will be described below. Note that the description will be made in the following order. In addition, herein and in the drawings, the components having substantially the same functions are denoted by the same reference symbols and overlapping descriptions thereof are omitted.

1. First embodiment of camera module
2. Second embodiment of camera module
3. Third embodiment of camera module
4. Fourth embodiment of camera module
5. Fifth embodiment of camera module
6. Detailed configuration of camera module of fourth embodiment
7. Sixth embodiment of camera module
8. Seventh embodiment of camera module
9. Detailed configuration of substrate with lens
10. Method of manufacturing substrate with lens
11. Direct joining between substrates with lens
12. Eighth and ninth embodiments of camera module
13. Tenth embodiment of camera module
14. Eleventh embodiment of camera module
15. Effect of present structure in comparison to other structures
16. Various modifications
17. Description of pixel layout of light receiving element and structure and use of diaphragm plate
18. Manufacture example of existing stacked lens structure
19. Method of manufacturing stacked lens structure of present disclosure
20. First modification
21. Second modification
22. Various shape examples
23. Application example to electronic apparatus
24. Use examples of imaging element
25. Application example to in-vivo information acquisition system
26. Application example to endoscopic surgery system
27. Application example to moving body <1. First Embodiment of Camera Module>

Figure 1B:
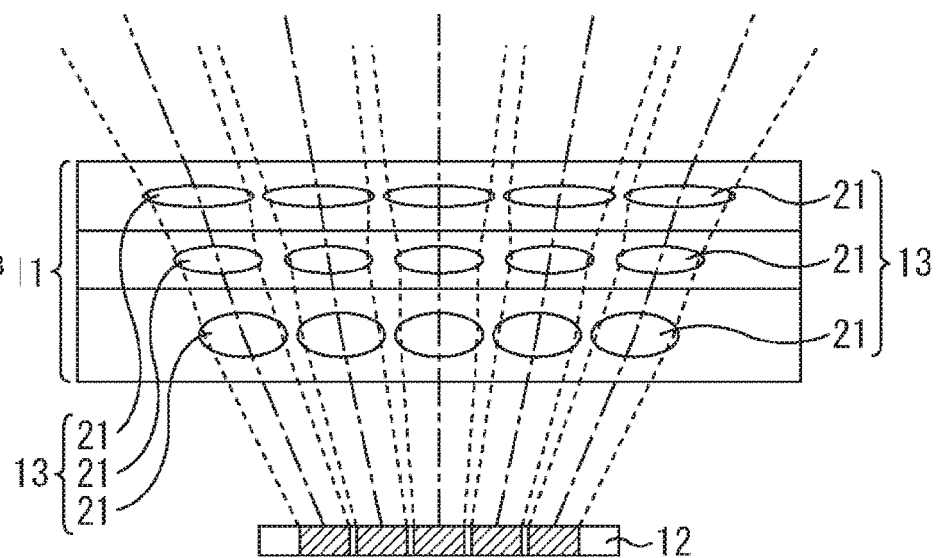

FIGS. 1A and 1B illustrate figures depicting a first embodiment of a camera module using a stacked lens structure to which the present technology is applied.

In FIGS. 1A and 1B, FIG. 1A is a schematic view depicting a configuration of a camera module 1A as a first embodiment of a camera module 1. In FIGS. 1A and 1B, FIG. 1B is a schematic sectional view of the camera module 1A.

The camera module 1A includes a stacked lens structure 11 and a light receiving element 12. The stacked lens structure 11 includes a total of 25 optical units 13, five in a column direction and five in a row direction. The optical unit 13 includes plural lenses 21 in a single optical axis direction. The camera module 1A is a multiple-lensed camera module having a multiplicity of optical units 13.

The optical axes of the multiplicity of optical units 13 possessed by the camera module 1A are disposed to be widened toward the outside of the module, as depicted in FIG. 1B, whereby wide-angle imaging can be performed.

Note that, while the stacked lens structure 11 has a structure in which only three lenses 21 are stacked in FIG. 1B, for simplification, it is natural that more lenses 21 may be stacked.

The camera module 1A of FIGS. 1A and 1B can produce one piece of wide-angle image by joining plural pieces of images picked up through the plural optical units 13. Since the plural pieces of images are joined together, a high accuracy is required as to the formation and layout of each optical unit 13 for picking up each image. In addition, since particularly the optical unit 13 on the wide angle side is small in angle of incidence of light on the lens 21, a high accuracy is required also as to the positional relation and layout of the lenses 21 in the optical unit 13.

Figure 2:
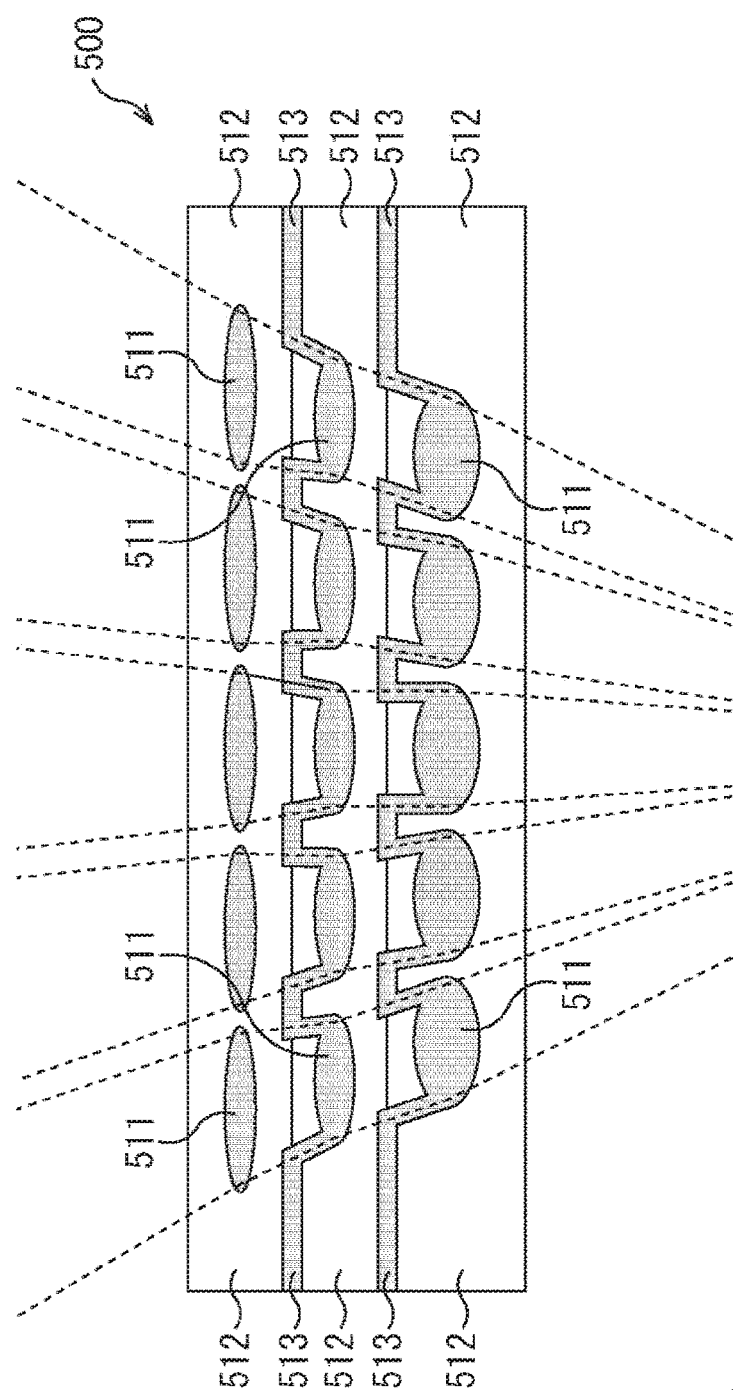
FIG. 2 is a sectional structural view of a stacked lens structure disclosed in PTL 1.

FIG. 2 is a sectional structural view of a stacked lens structure using a fixing technique by resin, which is disclosed by PTL 1.

In a stacked lens structure 500 illustrated in FIG. 2, a resin 513 is used as means for fixing substrates 512 provided with lenses 511 to each other. The resin 513 is an energy-curing resin such as a UV-curing resin.

Before adhering the substrates 512 to each other, a layer of the resin 513 is formed over the whole area of a surface of the substrate 512. Thereafter, the substrates 512 are adhered to each other, and, further, the resin 513 is cured. As a result, the adhered substrates 512 are fixed to each other.

However, when the resin 513 is cured, the resin 513 undergoes curing shrinkage. In the case of the structure depicted in FIG. 2, since the resin 513 is cured after a layer of the resin 513 is formed over the whole part of the substrate 512, displacement amount of the resin 513 would be large.

In addition, after the stacked lens structure 500 formed by adhering the substrates 512 to each other is divided into individual chips and an imaging element is combined therewith to form a camera module, also, the stacked lens structure 500 possessed by the camera module has the resin 513 present in the whole of the gap between the substrates 512 provided with the lenses 511, as illustrated in FIG. 2. Therefore, when the camera module is mounted in a housing of a camera and actually used, there is a fear of thermal expansion of the resin between the substrates of the stacked lens structure 500 due to a temperature rise by the heat generated in the apparatus.

Figure 3:
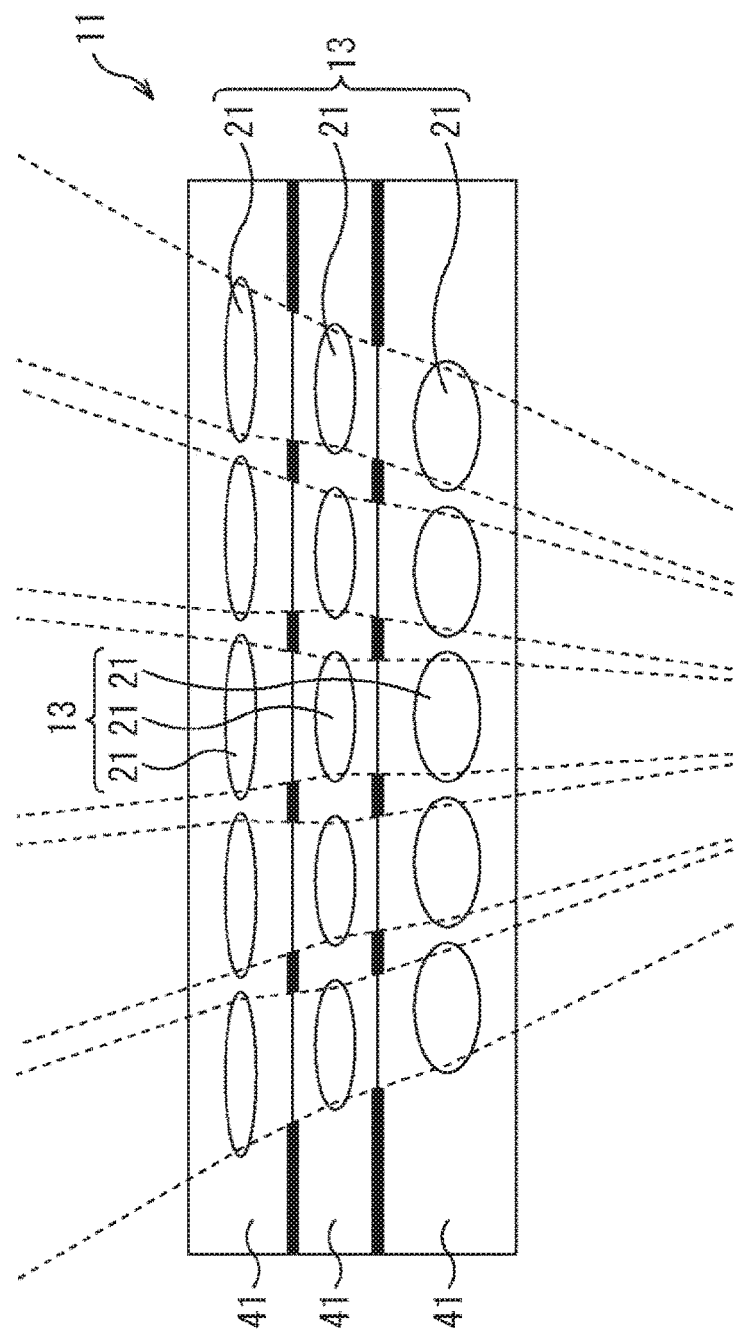
FIG. 3 is a sectional structural view of a stacked lens structure of a camera module of FIGS. 1A and 1B.

FIG. 3 is a sectional structural view depicting only the stacked lens structure 11 of the camera module 1A of FIGS. 1A and 1B.

The stacked lens structure 11 of the camera module 1A is also formed by stacking plural substrates with lens 41 provided with the lenses 21.

In the stacked lens structure 11 of the camera module 1A, as means for fixing the substrates with lens 41 provided with the lenses 21 to each other, fixing means quite different from those in the stacked lens structure 500 of FIG. 2 and other related art literature.

Figure 4:
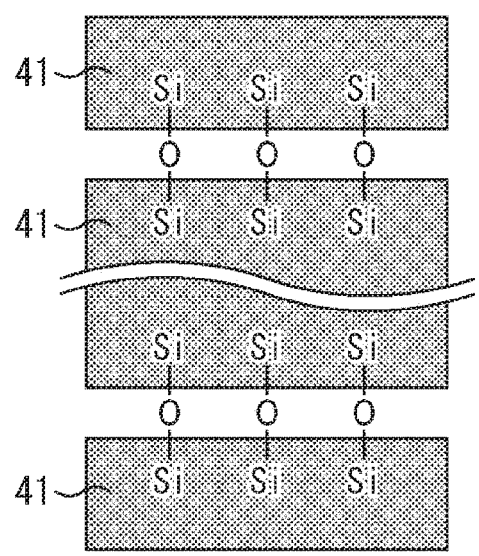
FIG. 4 is a figure for explaining direct joining of substrates with lens.

Specifically, the two substrates with lens 41 to be stacked are directly joined to each other by covalent bonding between a surface layer including an oxide or a nitride formed on the substrate surface on one side and a surface layer including an oxide or a nitride formed on the substrate surface on the other side. As a specific example, as depicted in FIG. 4, a silicon oxide film or a silicon nitride film is formed as a surface layer on the respective surfaces of the two substrates with lens 41 to be stacked, and, after binding a hydroxyl group to the surface layer, the two substrates with lens 41 are laminated, and are raised in temperature to cause dehydration condensation. As a result, a silicon-oxygen covalent bond is formed between the surface layers of the two substrates with lens 41. Consequently, the two substrates with lens 41 are directly joined to each other. Note that as a result of the condensation, elements contained in the two surface layers may directly form a covalent bond with each other.

Herein, in such a way, fixation of the two substrates with lens 41 through an organic matter layer disposed between the two substrates with lens 41, or fixation of the two substrates with lens 41 by chemical bonding between inorganic matter layers disposed respectively on the surfaces of the two substrates with lens 41, or fixation of two substrates with lens 41 by forming a bond through dehydration condensation between inorganic matter layers disposed respectively on the surfaces of the two substrates with lens 41, or fixation of the two substrates with lens 41 by forming a covalent bond through oxygen or covalent bond between elements contained in the respective inorganic matter layers between the inorganic matter layers disposed respectively on the surfaces of the two substrates with lens 41, or fixation of the two substrates with lens 41 by forming a silicon-oxygen covalent bond or a silicon-silicon covalent bond between a silicon oxide layer or a silicon nitride layer disposed respectively on the surfaces of the two substrates with lens 41, is referred to as direct joining.

In order to perform the lamination and the dehydration condensation by temperature rise, in the present embodiment, by use of a substrate used in the field of manufacture of a semiconductor device or a flat display device, the lenses are formed in a substrate state, lamination and dehydration condensation by temperature rise are conducted in a substrate state, and the joining by covalent bonding is performed in a substrate state. The configuration in which the inorganic matter layers formed on the surfaces of the two substrates with lens 41 are joined to each other by covalent bonding produces an action or effect to restrain deformation due to curing shrinkage of the resin 513 over the whole substrate or deformation due to thermal expansion of the resin 513 at the time of practical use, which is feared in the case of using the technology disclosed in PTL 1 and described referring to FIG. 2.

Figure 5:
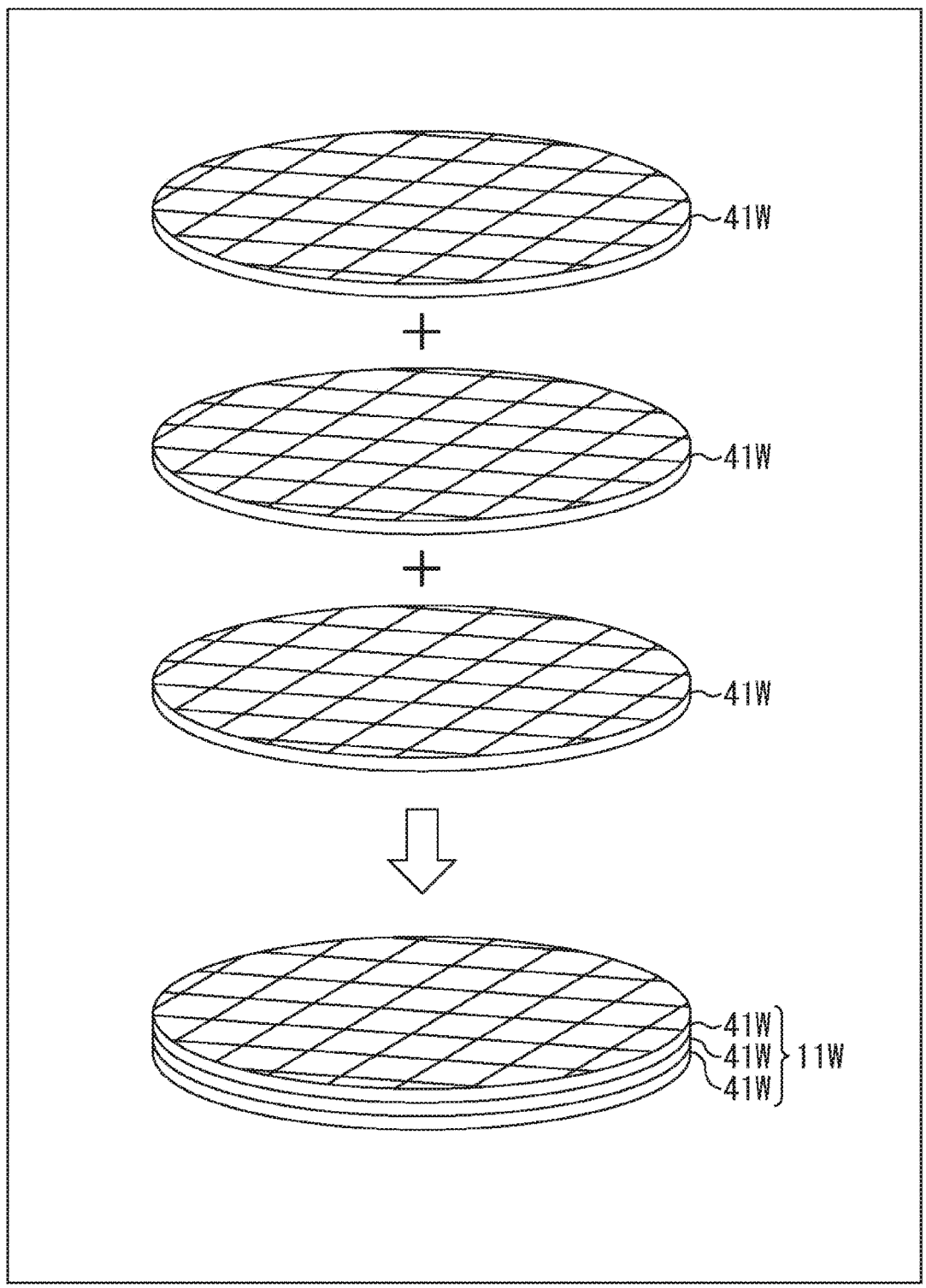
FIG. 5 is a figure depicting a step of forming the camera module of FIGS. 1A and 1B.
Figure 6:
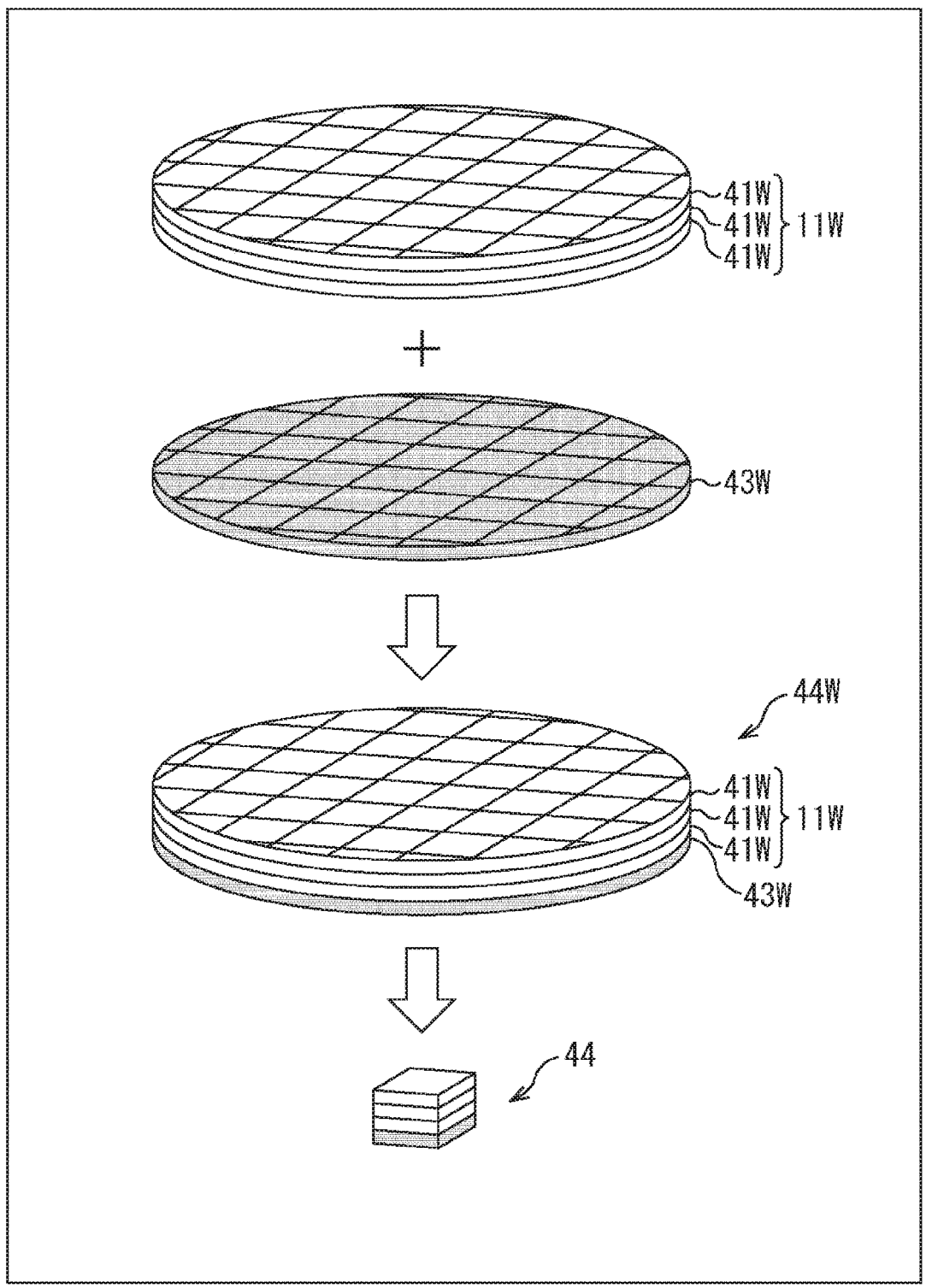
FIG. 6 is a figure depicting a step of forming the camera module of FIGS. 1A and 1B.

FIGS. 5 and 6 are figures depicting steps for forming the camera module 1A of FIGS. 1A and 1B in which the stacked lens structure 11 and the light receiving element 12 are combined.

First, as illustrated in FIG. 5, plural substrates with lens 41W formed with plural lenses 21 (not illustrated) in plane directions are prepared, and are stacked on one another. As a result, a stacked lens structure 11W in a substrate state, in which the plural substrates with lens 41W in the substrate state are stacked, is obtained.

Next, as depicted in FIG. 6, a sensor substrate 43W in a substrate state formed with plural light receiving elements 12 in plane directions is formed and prepared, separately from the stacked lens structure 11W in the substrate state illustrated in FIG. 5.

Then, the sensor substrate 43W in the substrate state and the stacked lens structure 11W in the substrate state are stacked, and external terminals are attached on the basis of each module of the laminated substrates, to obtain a camera module 44W in a substrate state.

Finally, the camera module 44W in the substrate state is individualized in module unit or chip unit. The camera module 44 thus individualized is sealed into a housing (not illustrated) prepared separately, whereby a final camera module 44 is obtained.

Note that herein and in the drawings, a part denoted by a symbol accompanied by "W," such as the substrate with lens 41W, indicates that the part is in a substrate state (wafer state), and a part denoted by a symbol not accompanied by "W," such as the substrate with lens 41, indicates that the part is in the state of being individualized in module unit or chip unit. This applies also to the sensor substrate 43W, the camera module 44W and the like.

Figure 7:
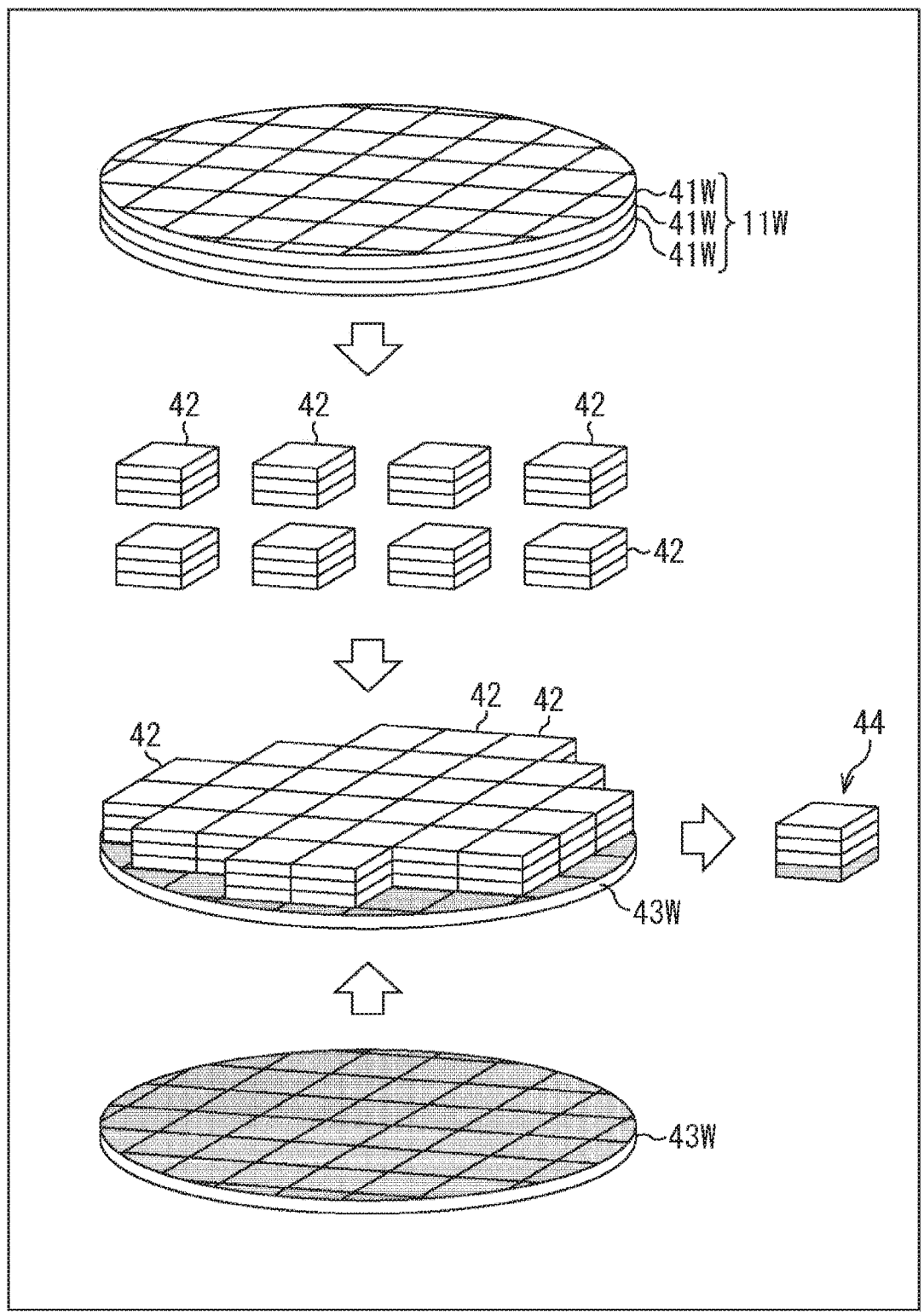
FIG. 7 is a figure depicting another step of forming the camera module of FIGS. 1A and 1B.

FIG. 7 is a figure depicting another step of forming the camera module 1A of FIGS. 1A and 1B in which the stacked lens structure 11 and the light receiving element 12 are combined.

First, like the aforementioned step, a stacked lens structure 11W in a substrate state in which plural substrates with lens 41W in a substrate state are stacked is manufactured.

Next, the stacked lens structure 11W in the substrate state is individualized.

In addition, a sensor substrate 43W in a substrate state is produced and prepared, separately from the stacked lens structure 11W in the substrate state.

Then, the individualized stacked lens structures 11 are mounted, one each, on the light receiving elements 12 of the sensor substrate 43W in the substrate state.

Finally, the sensor substrate 43W in the substrate state on which the individualized stacked lens structures 11 are mounted is individualized in module unit or chip unit. The sensor substrate 43 on which the stacked lens structure 11 is mounted and which is individualized is sealed in a separately prepared housing (not illustrated), to which external terminals are attached, whereby a final camera module 44 is obtained.

Further, as another example of steps for forming the camera module 1A of FIGS. 1A and 1B in which the stacked lens structure 11 and the light receiving element 12 are combined, the sensor substrate 43W in the substrate state depicted in FIG. 7 may be individualized, the individualized stacked lens structures 11 may be mounted respectively on the individual light receiving elements 12 obtained as a result of the individualization, to obtain individualized camera modules 44.

FIGS. 8A, 8B, 8C, 8D, 8E, 8F, 8G, and 8H illustrate figures for explaining the configuration of the substrate with lens 41 in the camera module 1A.

FIG. 8A is a schematic view depicting the configuration of the camera module 1A, like FIG. 1A.

FIG. 8B is a schematic sectional view of the camera module 1A, like FIG. 1B.

The camera module 1A is a multiple-lens camera module including a multiplicity of optical units 13 each of which is formed by combining plural lenses 21 and has a single optical axis, as depicted in FIG. 8B. The stacked lens structure 11 has a total of 25 optical units 13, five in a column direction and five in a row direction.

In the camera module 1A, optical axes of the multiplicity of optical units 13 are disposed to be widened toward outside of the module, whereby a wide angle image can be picked up. While the stacked lens structure 11 has a structure in which the substrates with lens 41 are stacked in only three layers in FIG. 8B, for simplification, it is natural that more substrates with lens 41 may be stacked.

FIGS. 8C, 8D, and 8E are figures depicting respective plan-view shapes of the three layers of substrates with lens 41 constituting the stacked lens structure 11.

FIG. 8C is a plan view of the substrate with lens 41 in the uppermost layer of the three layers, FIG. 8D is a plan view of the substrate with lens 41 in the intermediate layer, and FIG. 8D is a plan view of the substrate with lens 41 in the lowermost layer. Since the camera module 1 is a multiple-lens wide angle camera module, the diameter of the lens 21 increases and the pitch of the lenses widens in going toward the upper layers.

FIGS. 8F, 8G, and 8H are plan views of a substrate with lens 41W in a substrate state for obtaining the substrates with lens 41 depicted in FIGS. 8C, 8D, and 8E.

The substrate with lens 41W depicted in FIG. 8F represents a substrate state corresponding to the substrate with lens 41 of FIG. 8C, the substrate with lens 41W depicted in FIG. 8G represents a substrate state corresponding to the substrate with lens 41 of FIG. 8D, and the substrate with lens 41W depicted in FIG. 8H represents a substrate state corresponding to the substrate with lens 41 of FIG. 8E.

The substrates with lens 41W in the substrate state depicted in FIGS. 8F, 8G, and 8H have a configuration in which eight camera modules 1A depicted in FIG. 8A are obtained per substrate.

Between the substrates with lens 41W of FIGS. 8F, 8G, and 8H, the pitch of the lenses in the substrate with lens 41 in module unit differs for the substrate with lens 41W in the upper layer and the substrate with lens 41W in the lower layer. On the other hand, in each substrate with lens 41W, the pitch at which the substrates with lens 41 in module unit are arranged is constant from the substrate with lens 41W in the upper layer to the substrate with lens 41W in the lower layer.

<2. Second Embodiment of Camera Module>

FIGS. 9A, 9B, 9C, 9D, 9E, 9F, 9G, and 9H illustrate figures depicting a second embodiment of the camera module using the stacked lens structure to which the present technology is applied.

FIG. 9A is a schematic view depicting an external appearance of a camera module 1B as the second embodiment of the camera module 1. FIG. 9B is a schematic sectional view of the camera module 1B.

The camera module 1B includes two optical units 13. The two optical units 13 each include a diaphragm plate 51 at an uppermost layer of a stacked lens structure 11. The diaphragm plate 51 is provided with an opening 52.

While the camera module 1B includes the two optical units 13, the two optical units 13 differ in optical parameters. In other words, the camera module 1B includes two kinds of optical units 13 differing in optical performance. The two kinds of optical units 13 may be, for example, an optical unit 13 having a shorter focal distance for imaging a close-range view, and an optical unit 13 having a longer focal distance for imaging a distant view.

Since in the camera module 1B, the two optical units 13 differ in optical parameters, for example, as illustrated in FIG. 9B, the two optical units 13 are different in the number of lenses 21. In addition, in regard of the lenses 21 in the same layer in the stacked lens structures 11 possessed by the two optical units 13, any one of diameter, thickness, surface shape, volume, or distance from the adjacent lens may be different. Therefore, as for the plan-view shapes of the lenses 21 in the camera module 1B, for example, the two optical units 13 may include lenses 21 of the same diameter as depicted in FIG. 9C, or the two optical units 13 may include lenses 21 of different diameters as depicted in FIG. 9D, or one of the two optical units 13 does not have a lens 21 but has a cavity 21X as depicted in FIG. 9E.

in FIGS. 9F, 9G, and 9H are plan views of substrates with lens 41W in a substrate state for obtaining the substrates with lens 41 depicted in FIGS. 9C, 9D, and 9E.

The substrate with lens 41W depicted in FIG. 9F represents a substrate state corresponding to the substrate with lens 41 of FIG. 9C, the substrate with lens 41W depicted in FIG. 9G represents a substrate state corresponding to the substrate with lens 41 of FIG. 9D, and the substrate with lens 41W depicted in FIG. 9H represents a substrate state corresponding to the substrate with lens 41 of FIG. 9E.

The substrates with lens 41W in the substrate state depicted in FIGS. 9F, 9G, and 9H have a configuration in which sixteen camera modules 1B depicted in FIG. 9A are obtained per substrate.

As depicted in FIGS. 9F, 9G, and 9H for forming the camera modules 1B, lenses of the same shape may be formed, on the whole substrate surface of the substrate with lens 41W in the substrate state, or lenses of difference shapes may be formed, or lenses may be formed or may not be formed.

<3. Third Embodiment of Camera Module>

FIGS. 10A, 10B, 10C, 10D, 10E, and 10F illustrate figures depicting a third embodiment of the camera module using the stacked lens structure to which the present technology is applied.

Figure 10A:
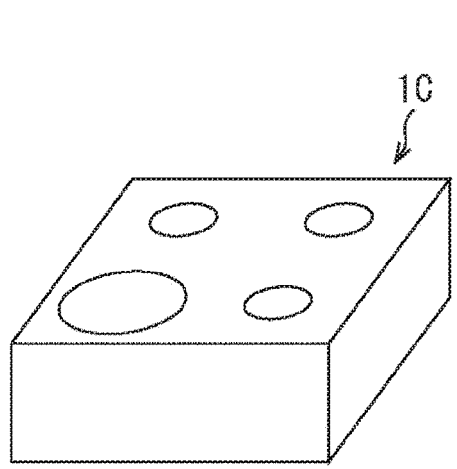
FIGS. 10A, 10B, 10C, 10D, 10E, and 10F illustrate figures depicting a third embodiment of the camera module using the stacked lens structure to which the present technology is applied.
Figure 10B:
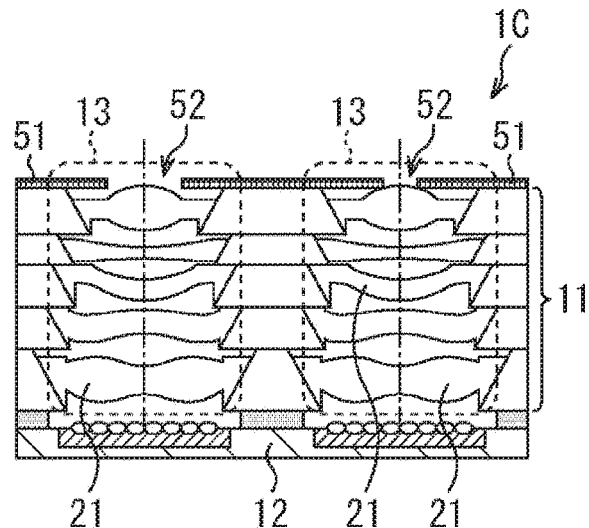

FIG. 10A is a schematic view depicting an external appearance of a camera module 1C as the third embodiment of the camera module 1. FIG. 10B is a schematic sectional view of the camera module 1C The camera module 1C includes a total of four optical units 13, two in a column direction and two in a row direction, on a light incidence surface. The four optical units 13 are the same with one another in the shape of the lenses 21.

While the four optical units 13 each include a diaphragm plate 51 at an uppermost layer of a stacked lens structure 11, the four optical units 13 are different from one another in the size of an opening 52 formed in the diaphragm plate 51. As a result, the camera module 1C may realize, for example, the following camera module 1C. Specifically, for example, in a monitoring camera for crime prevention, in a camera module 1C using a light receiving element 12 that includes light receiving pixels provided with RGB three kinds of color filters to receive RGB three kinds of light for color image monitoring in daytime and light receiving pixels not provided with RGB color filters for black-and-white image monitoring in nighttime, the size of an opening of a diaphragm may be enlarged for only the pixels for picking up a black-and-white image in nighttime when illuminance is low. Therefore, as for the plan-view shapes of the lenses 21 in a single camera module 1C, for example, the diameters of the lenses 21 possessed by the four optical units 13 are the same, as illustrated in FIG. 10C, and the sizes of the openings 52 of the diaphragm plates 51 are different for the optical units 13, as depicted in FIG. 10D.

Figure 10C:
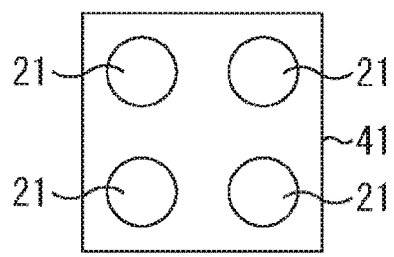
Figure 10D:
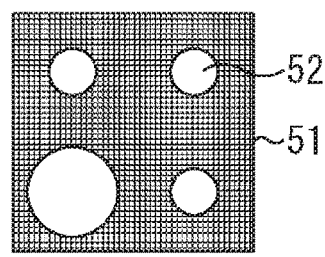
Figure 10E:
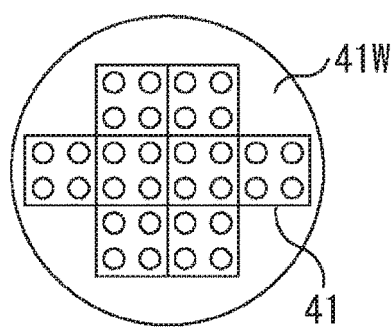
Figure 10F:
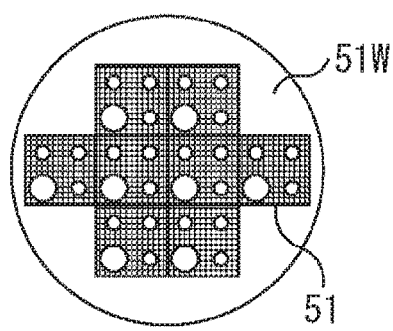

FIG. 10E is a plan view of a substrate with lens 41W in A substrate state for obtaining the substrate with lens 41 depicted in FIG. 10C. FIG. 10F is a plan view of a diaphragm plate 51W in a substrate state for obtaining the diaphragm plate 51 depicted in FIG. 10D.

The substrate with lens 41W in the substrate state of FIG. 10E and the diaphragm plate 51W in the substrate state of FIG. 10F have such a configuration that eight camera modules 1C depicted in FIG. 10A are obtained per substrate.

As illustrated in FIG. 10F, in the diaphragm plate 51W in the substrate state, for forming the camera module 1C, different sizes of the openings 52 can be set for the optical units 13 possessed by the camera module 1C.

<4. Fourth Embodiment of Camera Module>

FIGS. 11A, 11B, 11C, and 11D illustrate figures depicting a fourth embodiment of the camera module using the stacked lens structure to which the present technology is applied.

Figure 11A:
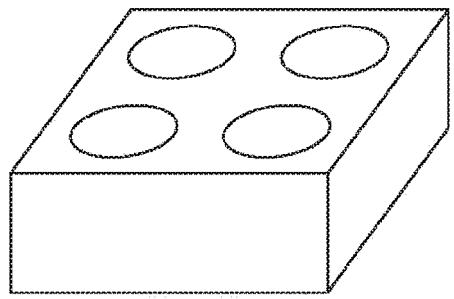
FIGS. 11A, 11B, 11C, and 11D illustrate figures depicting a fourth embodiment of the camera module using the stacked lens structure to which the present technology is applied.
Figure 11B:
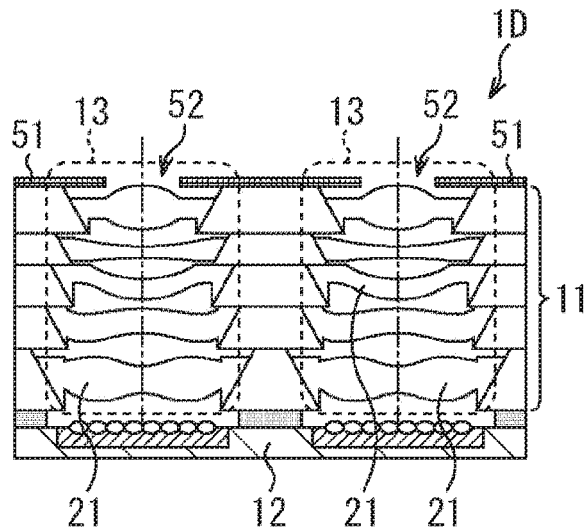

FIG. 11A is a schematic view depicting an external appearance of a camera module 1D as the fourth embodiment of the camera module 1. FIG. 11B is a schematic sectional view of the camera module 1D.

Like the camera module 1C, the camera module 1D includes a total of four optical units 13, two in a column direction and two in a row direction, on a light incidence surface. The four optical units 13 are the same with one another, in the shape of a lens 21 and the size of an opening 52 in a diaphragm plate 51.

In the camera module 1D, the optical axes of the optical units 13 arranged in two in a column direction and in two in a row direction on the light incidence surface extend in the same direction. Dash and dot lines depicted in FIG. 11B represent the respective optical axes of the optical units 13. The camera module 1D of such a structure is suitable for picking up an image of higher resolution, than in the case of imaging by a single optical unit 13, by utilizing a super-resolution technique.

In the camera module 1D, in regard of the column direction and the row direction, images are picked up by plural light receiving elements 12 arranged at different positions while having optical axes directed in the same direction, or images are picked up by light receiving pixels in different regions in a single light receiving element 12, whereby plural images which are not necessarily the same can be obtained, notwithstanding the optical axes are directed in the same direction. By combining place-dependent image data possessed by the plural images which are not the same, an image of high resolution can be obtained. Therefore, it is desirable that the plan-view shapes of the lenses 21 in a single camera module 1D are the same for the four optical units 13, as depicted in FIG. 11C.

Figure 11C:
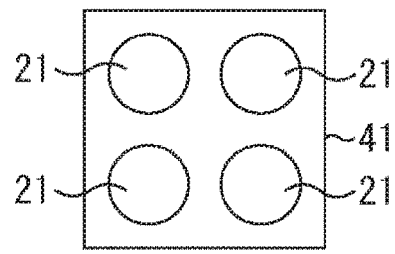
Figure 11D:
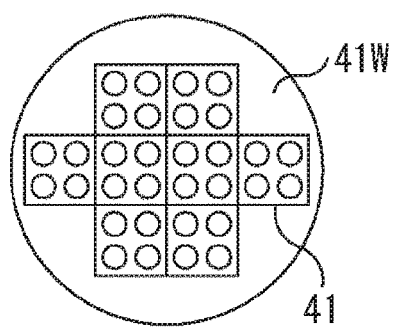

FIG. 11D is a plan view of a substrate with lens 41W in a substrate state for obtaining the substrate with lens 41 depicted in FIG. 11C. The substrate with lens 41W in the substrate state has a configuration in which eight camera modules 1D depicted in FIG. 11A are obtained per substrate.

As illustrated in FIG. 11D, in the substrate with lens 41W in the substrate state, for forming the camera module 1D, the camera module 1D includes plural lenses 21, and lenses of a lens group for a single module are disposed in plurality at a fixed pitch on a substrate.

<5. Fifth Embodiment of Camera Module>

FIGS. 12A, 12B, 12C, and 12D illustrate figures depicting a fifth embodiment of the camera module using the stacked lens structure to which the present technology is applied.

Figures 12A, 12B:
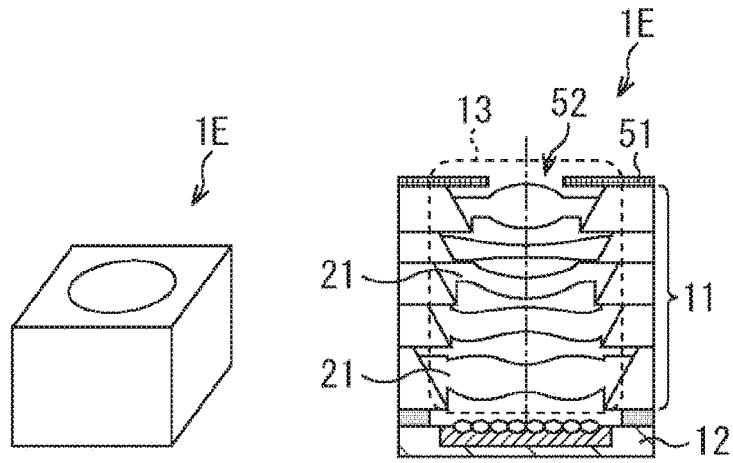
FIGS. 12A, 12B, 12C, and 12D illustrate figures depicting a fifth embodiment of the camera module using the stacked lens structure to which the present technology is applied.

FIG. 12A is a schematic view depicting an external appearance of a camera module 1E as a fifth embodiment of the camera module 1. FIG. 12B is a schematic sectional view of the camera module 1E.

The camera module 1E is a single-lens camera module that includes one optical unit 13 having a single optical axis in the camera module 1E.

Figure 12C:
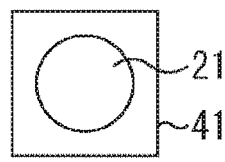

FIG. 12C is a plan view of a substrate with lens 41 depicting a plan-view shape of a lens 21 in the camera module 1E. The camera module 1E includes one optical unit 13.

Figure 12D:
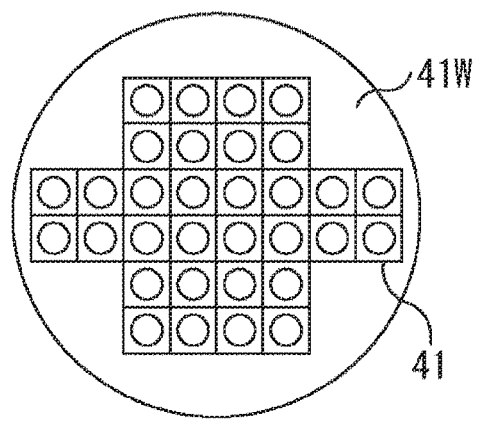

FIG. 12D is a plan view of a substrate with lens 41W in a substrate state for obtaining the substrate with lens 41 depicted in FIG. 12C. The substrate with lens 41W in the substrate state has a configuration in which 32 camera modules 1E depicted in FIG. 12A are obtained per substrate.

As illustrated in FIG. 12D, in the substrate with lens 41W in the substrate state, lenses 21 for the camera module 1E are disposed in plurality at a fixed pitch on a substrate.

<6. Detailed Configuration of Camera Module of Fourth Embodiment>

Next, referring to FIG. 13, detailed configuration of the camera module 1D according to the fourth embodiment depicted in FIGS. 11A, 11B, 11C, and 11D will be described.

Figure 13:
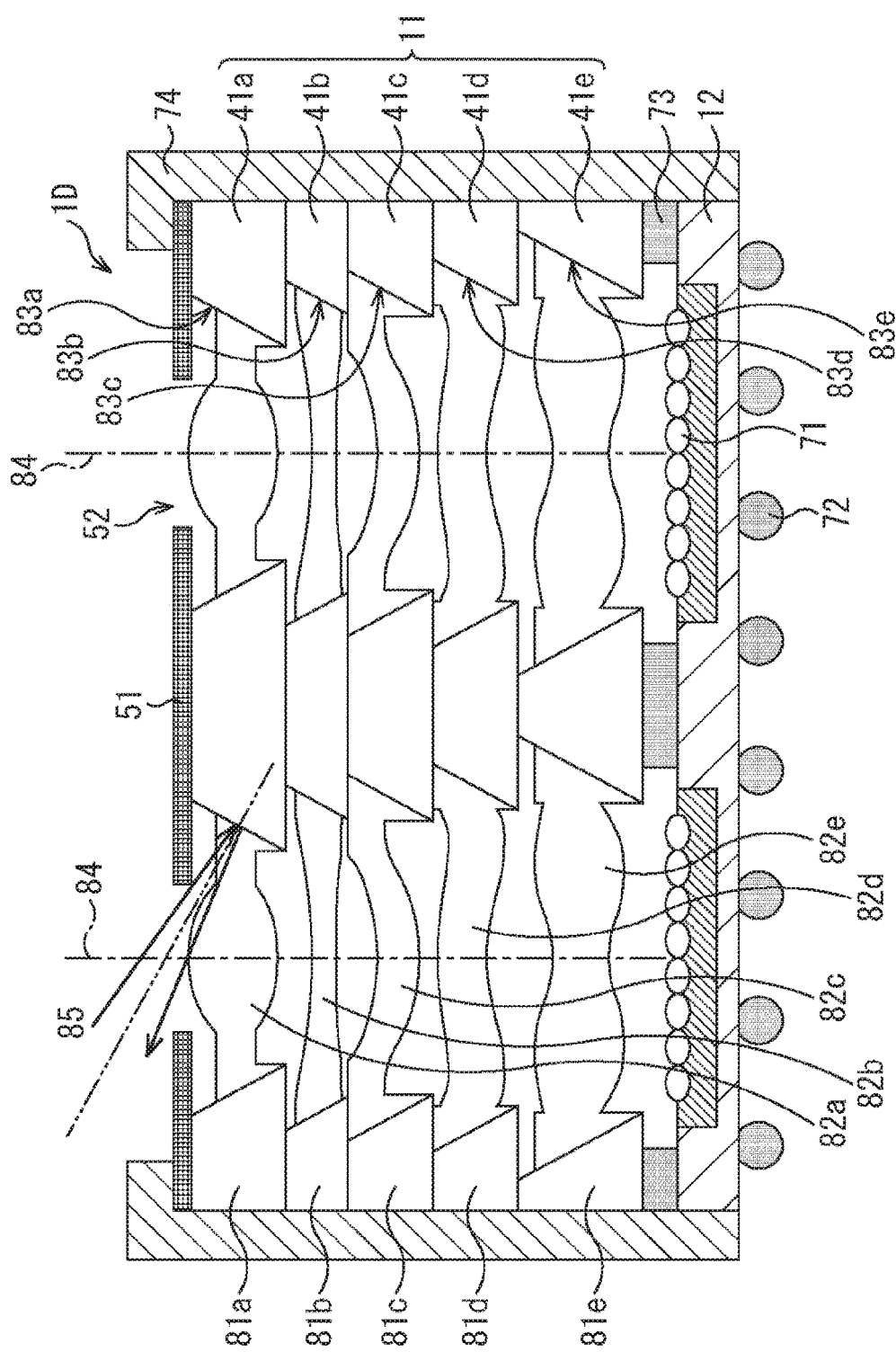
FIG. 13 is a figure for explaining detailed configuration of the camera module according to the fourth embodiment.

FIG. 13 is a sectional view of the camera module 1D depicted in FIG. 11B.

The camera module 1D includes a stacked lens structure 11 in which plural substrates with lens 41a to 41e are stacked and a light receiving element 12. The stacked lens structure 11 includes plural optical units 13. Dash and dot lines 84 represent optical axes of the respective optical units 13. The light receiving element 12 is disposed on a lower side of the stacked lens structure 11. In the camera module 1D, light incident on the camera module 1D from above is transmitted through the stacked lens structure 11, and is received by the light receiving element 12 disposed on the lower side of the stacked lens structure 11.

The stacked lens structure 11 includes the five substrates with lens 41a to 41e stacked on one another. In the case where the five substrates with lens 41a to 41e are not particularly distinguished, they will be referred to simply as substrates with lens 41 in the following description.

The sectional shapes of through-holes 83 in the substrates with lens 41 constituting the stacked lens structure 11 are what is generally called a downwardly narrowing shape in which the opening width decreases toward the lower side (the side on which the light receiving element 12 is disposed).

A diaphragm plate 51 is disposed on an upper side of the stacked lens structure 11. The diaphragm plate 51 includes, for example, a layer including a light-absorbing or light-shielding material. The diaphragm plate 51 is provided with openings 52.

The light receiving element 12 includes, for example, a front illumination type or back illumination type CMOS (Complementary Metal Oxide Semiconductor) image sensor. On-chip lenses 71 are formed on an upper-side surface of the light receiving element 12 on the stacked lens structure 11 side, and external terminals 72 for inputting/outputting signals are formed on a lower-side surface of the light receiving element 12.

The stacked lens structure 11, the light receiving element 12, the diaphragm plate 51 and the like are accommodated in a lens barrel 74.

A structural material 73 is disposed on the upper side of the light receiving element 12. The stacked lens structure 11 and the light receiving element 12 are fixed through the structural material 73. The structural material 73 is, for example, an epoxy resin.

In the present embodiment, the stacked lens structure 11 includes stacked five substrates with lens 41a to 41e, but the number of the substrates with lens 41 is not particularly limited so long as the number is two or more.

Each of the substrates with lens 41 constituting the stacked lens structure 11 has a configuration in which a lens resin section 82 is added to a support substrate 81. The support substrate 81 has a through-hole 83, and the lens resin section 82 is formed inside the through-hole 83. The lens resin section 82 includes the aforementioned lens 21, and represents an integrated part of a material constituting the lens 21, together with a part extending to the support substrate 81 to support the lens 21.

Note that in the case of distinguishing the support substrates 81, the lens resin sections 82, or the through-holes 83 of the respective substrates with lens 41a to 41e from one another, they are referred to as support substrates 81a to 81e, lens resin sections 82a to 82e, or through-holes 83a to 83e, correspondingly to the substrates with lens 41a to 41e, in the following description, as illustrated in FIG. 13.

<Detailed Configuration of Lens Resin Section>

Next, the shape of the lens resin sections 82 will be described below, taking the lens resin section 82a of the substrate with lens 41a as an example.

Figure 14:
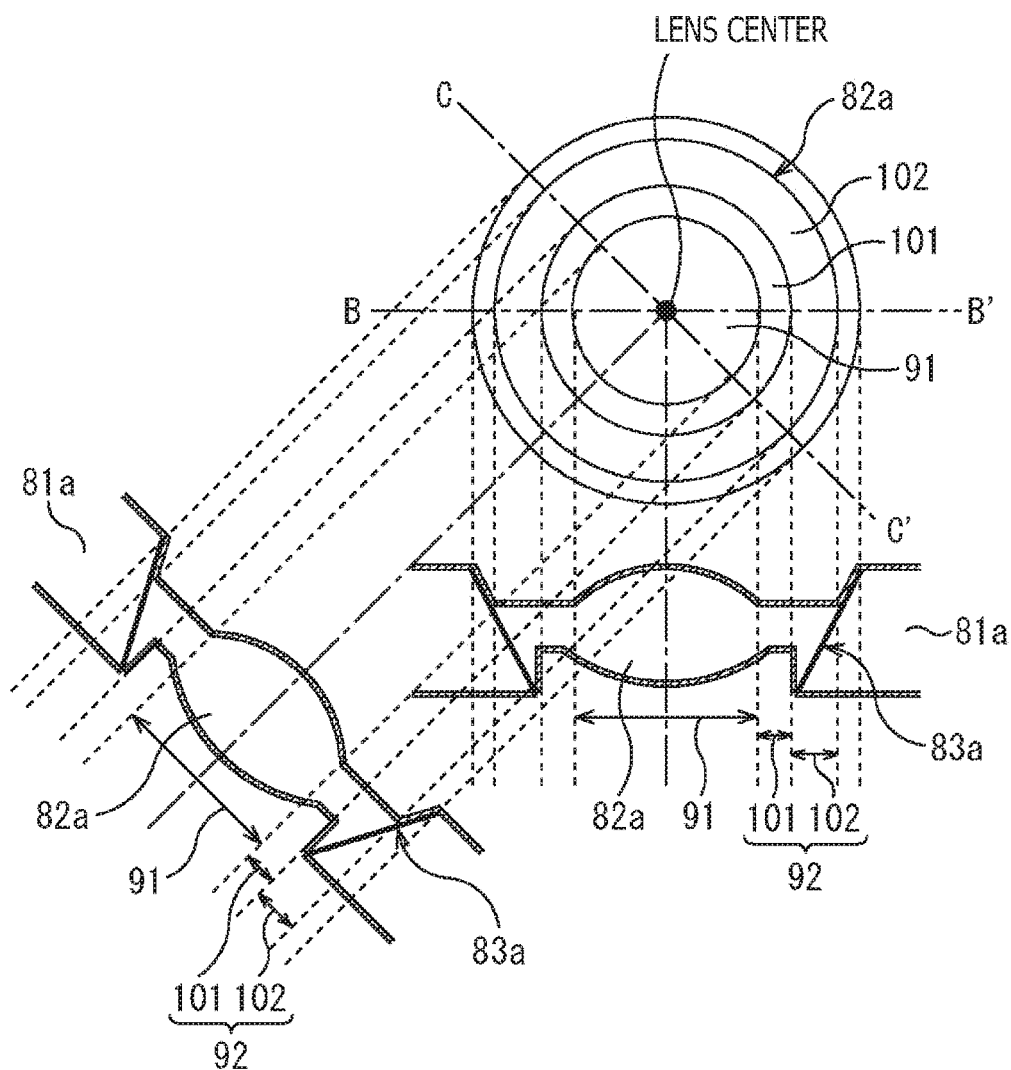
FIG. 14 depicts a plan view and a sectional view of a support substrate and a lens resin section.

FIG. 14 illustrates a plan view and sectional views of the support substrate 81a and the lens resin section 82a constituting the substrate with lens 41a.

The sectional views of the support substrate 81a and the lens resin section 82a depicted in FIG. 14 are sectional views taken along line B-B' and line C-C' of the plan view.

The lens resin section 82a is a part integrally formed from the material constituting the lens 21, and includes a lens section 91 and a support section 92. In the above description, the lens 21 corresponds to the whole part of the lens section 91 or the lens resin section 82a.

The lens section 91 is a part having the performance as a lens, or "a part for refracting light and concentrating or dispersing the light," or "a part including a curved surface such as a convex surface, a concave surface, or a spherical surface, or a part where plural polygons for use in a lens utilizing a Fresnel lens or a diffraction grating are disposed continuously."

The support section 92 is a part extending from the lens section 91 to the support substrate 81a to support the lens section 91. The support section 92 includes an arm section 101 and a leg section 102, and is located at an outer periphery of the lens section 91.

The arm section 101 is a part disposed on outside of the lens section 91 in contact with the lens section 91, and extending from the lens section 91 toward the outer side in a fixed film thickness. The leg section 102 is that part of the support section 92 which is other than the arm section 101, and a part including a part in contact with a side wall of the through-hole 83a. The leg section 102 is preferably greater than the arm section 101 in resin film thickness.

The plan-view shape of the through-hole 83a formed in the support substrate 81a is a circle, and the sectional shape thereof is naturally the same independently of the direction of the diameter. The shape of the lens resin section 82a which is a shape determined by the shapes of an upper mold and a lower mold at the time of forming the lens is also formed such that the sectional shape is the same independently of the direction of the diameter.

Figure 15:
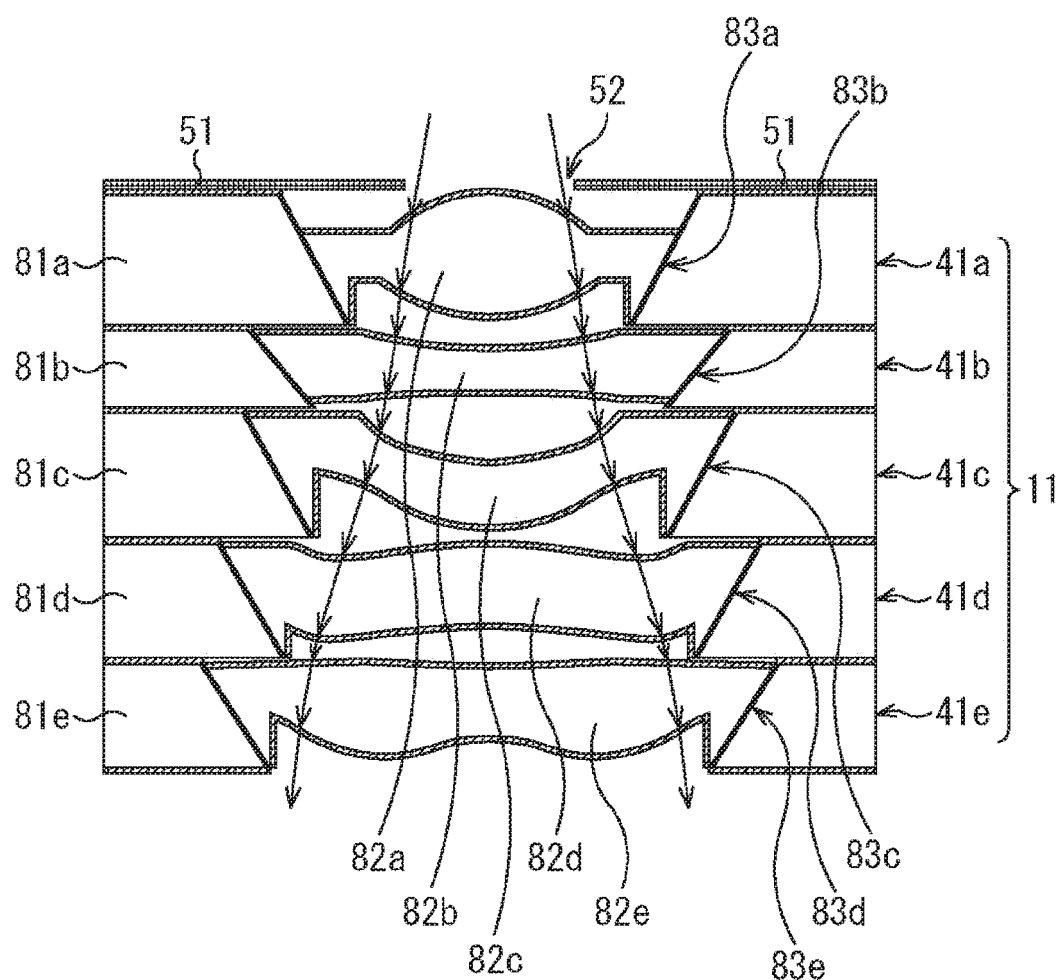
FIG. 15 is a sectional view depicting a stacked lens structure and a diaphragm plate.

FIG. 15 is a sectional view depicting the stacked lens structure 11 and the diaphragm plate 51 as a part of the camera module 1D of FIG. 13.

In the camera module 1D, light incident on the module is narrowed down by the diaphragm plate 51, is then widened in the inside of the stacked lens structure 11, and is incident on the light receiving element 12 (not illustrated in FIG. 15) disposed on the lower side of the stacked lens structure 11. In other words, when the stacked lens structure 11 as a whole is generally viewed, the light incident on the module goes from the opening 52a of the diaphragm plate 51 toward the lower side while substantially spreading gradually. Therefore, as an example of the size of the lens resin sections 82 possessed by the stacked lens structure 11, the lens resin section 82a possessed by the substrate with lens 41a disposed directly beneath the diaphragm plate 51 is the smallest, and the lens resin section 82e possessed by the substrate with lens 41e disposed at the lowermost layer of the stacked lens structure 11 is the largest, in the stacked lens structure 11 of FIG. 15.

In the case where the thickness of the lens resin section 82 of the substrate with lens 41 is constant, it is more difficult to form a larger lens than to form a smaller lens. The reason lies in that the lens is liable to be deformed by a load exerted on the lens at the time of manufacturing the lens, or that a large lens size makes it difficult to keep strength of the lens. Therefore, it is preferable that a larger-sized lens is set greater in thickness than a smaller-sized lens. For this reason, in the stacked lens structure 11 of FIG. 15, the thickness of the lens resin section 82 is the largest in the lens resin section 82e possessed by the substrate with lens 41e disposed in the lowermost layer.

For enhancing the degree of freedom in lens design, the stacked lens structure 11 of FIG. 15 further has at least one of the following characteristics.

(1) The thickness of the support substrate 81 differs between at least the plural substrates with lens 41 constituting the stacked lens structure 11. For example, the thickness of the support substrate 81 is greater in the substrate with lens 41 in a lower layer.

(2) The opening width of the through-hole 83 possessed by the substrate with lens 41 differs between at least the plural substrates with lens 41 constituting the stacked lens structure 11. For instance, the opening width of the through-hole 83 is larger in the substrate with lens 41 in a lower layer.

(3) The diameter of the lens section 91 possessed by the substrate with lens 41 differs between at least the plural substrates with lens 41 constituting the stacked lens structure 11. For example, the diameter of the lens section 91 is greater in the lens section 91 of the substrate with lens 41 in a lower layer.

(4) The thickness of the lens section 91 possessed by the substrate with lens 41 differs between at least the plural substrates with lens 41 constituting the stacked lens structure 11. For instance, the thickness of the lens section 91 is larger in the lens section 91 of the substrate with lens 41 in a lower layer.

(5) The distance between the lenses possessed by the substrate with lens 41 differs between at least the plural substrates with lens 41 constituting the stacked lens structure 11.

(6) The volume of the lens resin section 82 possessed by the substrate with lens 41 differs between at least the plural substrates with lens 41 constituting the stacked lens structure 11. For example, the volume of the lens resin section 82 is larger in the lens resin section 82 of the substrate with lens 41 in a lower layer.

(7) The material of the lens resin section 82 possessed by the substrate with lens 41 differs between at least the plural substrates with lens 41 constituting the stacked lens structure 11.

In general, the incident light incident on a camera module include normal incident light and non-normal incident light together. Much of the non-normal incident light impinges on the diaphragm plate 51, where it is absorbed or is reflected to the outside of the camera module 1D. The non-normal incident light that is not narrowed down by the diaphragm plate 51 would impinge on a side wall of the through-hole 83, depending on the incidence angle, and may be reflected there.

The direction in which the non-normal incident light goes is determined by the incidence angle of the non-normal incident light 85 and the angle of the side wall of the through-hole 83, which are depicted in FIG. 13. In the case where the opening width of the through-holes 83 is in what is generally called a divergent shape, becoming larger from the incidence side toward the light receiving element 12 side, when the non-normal incident light 85 at a specific incidence angle which is not narrowed down by the diaphragm plate 51 would impinge on the side walls of the through-holes 83, it may be reflected toward the light receiving element 12, possibly becoming stray light or noise light.

However, in the stacked lens structure 11 depicted in FIG. 13, as illustrated in FIG. 15, the through-hole 83 is in what is generally called a downwardly narrowing shape in which the opening width decreases toward the lower side (the side where the light receiving element 12 is disposed). In the case of this shape, the non-normal incident light 85 impinging on the side walls of the through-holes 83 is reflected not toward the lower side, i.e., toward the light receiving element 12 side, but toward the upper side, i.e., toward the incidence side. As a result, an action or effect to restrain generation of stray light or noise light is obtained.

The through-hole 83 of the substrate with lens 41 preferably has a light-absorbing material disposed at a side wall thereof, for reducing the quantity of light that impinges on the side wall and is reflected.

As an example, in the case where light (for example, visible light) of a wavelength to be received when the camera module 1D is used as a camera is first light, and light (for example, UV light) different in wavelength from the first light is second light, a material obtained by dispersing carbon particles as an absorbing material for the first light (visible light) in a resin curable by the second light (UV light) may be applied or sprayed onto the surface of the support substrate 81, then only the resin at side wall parts of the through-holes 83 may be cured by irradiation with the second light (UV light), and the resin in other regions may be removed, to form a layer of the material having an absorbing property for the first light (visible light) on the side walls of the through-holes 83.

The stacked lens structure 11 depicted in FIG. 15 is an example of a structure in which the diaphragm plate 51 is disposed on top of the plural substrates with lens 41 stacked on one another. The diaphragm plate 51 may not be disposed on top of the plural substrates with lens 41 stacked but may be disposed by inserting it between intermediate ones of the substrates with lens 41.

As a further example, instead of providing the plate-shaped diaphragm plate 51 separately from the substrate with lens 41, a layer of a material having a light-absorbing property may be formed on the surface of the substrate with lens 41 to cause the layer to function as a diaphragm. For example, a material obtained by dispersing carbon particles as an absorbing material for the first light (visible light) in a resin curable by the second light (UV light) may be applied or sprayed onto the surface of the substrate with lens 41, the resin in the other regions than the regions where light is to be transmitted when a diaphragm is made to function may be irradiated with the second light (UV light), whereby the resin is cured and left, whereas the resin in the regions where curing is not caused, i.e., the regions where light is to be transmitted when the diaphragm is made to function may be removed, whereby the diaphragm may be formed on the surface of the substrate with lens 41.

Note that the substrate with lens 41 on the surface of which to form the diaphragm may be the substrate with lens 41 disposed in an uppermost layer of the stacked lens structure 11, or may be the substrate with lens 41 serving as an inner layer of the stacked lens structure 11.

The stacked lens structure 11 depicted in FIG. 15 has a structure in which the substrates with lens 41 are stacked.

As another embodiment, the stacked lens structure 11 may include plural substrates with lens 41 and at least one support substrate 81 which does not have the lens resin sections 82. In this structure, the support substrate 81 which does not have the lens resin sections 82 may be disposed as a lowermost layer or an uppermost layer of the stacked lens structure 11, or may be disposed as an inner layer in the stacked lens structure 11. This structure produces an action or effect such that the distance between the plural lenses possessed by the stacked lens structure 11 and the distance between the lens resin section 82 in the lowermost layer of the stacked lens structure 11 and the light receiving element 12 disposed on the lower side of the stacked lens structure 11 can be set optionally.

Alternatively, this structure produces an action or effect to suitably set the opening width of the support substrate 81 not provided with the lens resin sections 82, and to dispose a light-absorbing material in other regions than the openings, thereby causing the material as a diaphragm plate.

<7. Sixth Embodiment of Camera Module>

Figure 16:
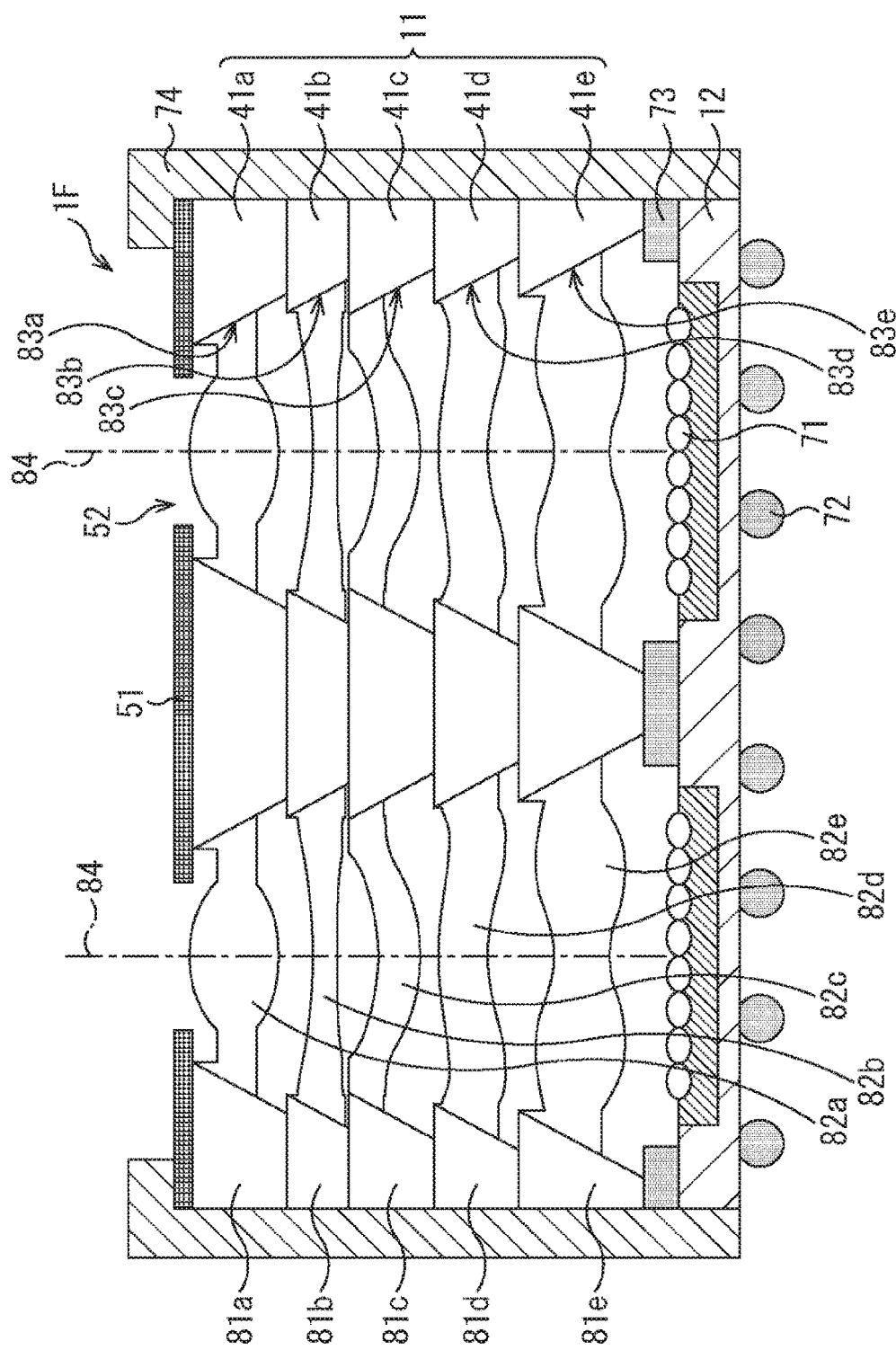
FIG. 16 is a figure depicting a sixth embodiment of the camera module using the stacked lens structure to which the present technology is applied.

FIG. 16 is a figure depicting a sixth embodiment of the camera module using the stacked lens structure to which the present technology is applied.

In FIG. 16, the parts corresponding to those in the fourth embodiment depicted in FIG. 13 are denoted by the same symbols as used above, and description will be made below while paying attention to the parts different from those of the camera module 1D of FIG. 13.

In the camera module 1F depicted in FIG. 16, also, as in the camera module 1D illustrated in FIG. 13, the incident light is narrowed down by the diaphragm plate 51, is then widens in the inside of the stacked lens structure 11, and is incident on the light receiving element 12 disposed on the lower side of the stacked lens structure 11. In other words, when the stacked lens structure 11 as a whole is generally viewed, light goes from the openings 52 of the diaphragm plate 51 toward the lower side while widening in a divergent manner.

The camera module 1F of FIG. 16 differs from the camera module 1D depicted in FIG. 13, in that the sectional shape of the through-holes 83 of each of the substrates with lens 41 constituting the stacked lens structure 11 is what is generally called a divergent shape, in which the opening width gradually increases in going toward the lower side (the side where the light receiving element 12 is disposed).

The stacked lens structure 11 of the camera module 1F is a structure in which the incident light goes from the openings 52 of the diaphragm plate 51 toward the lower side while widening in a divergent manner. Therefore, the shape in which the opening width of the through-holes 83 widens in a divergent manner in going toward the lower side ensures that, for example, the support substrates 81 are not liable to serve as obstacles in the optical path, as compared to the shape in which the opening width of the through-holes 83 narrows gradually in going toward the lower side. As a result, an action such that the degree of freedom in lens design is high is produced.

In addition, in the case where the opening width of the through-holes 83 is in a downwardly narrowing shape, the sectional area in substrate plane directions of the lens resin section 82 inclusive of the support section 92 is at a specific size for transmitting the light incident on the lens 21, at the lower surface of the lens resin section 82, and the sectional area gradually increases in going from the lower surface toward the upper surface of the lens resin section 82.

On the other hand, in the case where the opening width of the through-holes 83 is in a downwardly widening divergent shape, the sectional area at the lower surface of the lens resin section 82 is roughly the same as in the case of the downwardly narrowing shape, but the sectional area gradually decreases from the lower surface toward the upper surface of the lens resin section 82.

As a result, the structure in which the opening width of the through-holes 83 gradually increases in going toward the lower side produces an action or effect such that the size of the lens resin section 82 inclusive of the support section 92 can be suppressed to be small. In addition, as a result of this, an action or effect such that the aforementioned difficulty in lens formation in the case where the lens is large can be reduced is produced.

<8. Seventh Embodiment of Camera Module>

Figure 17:
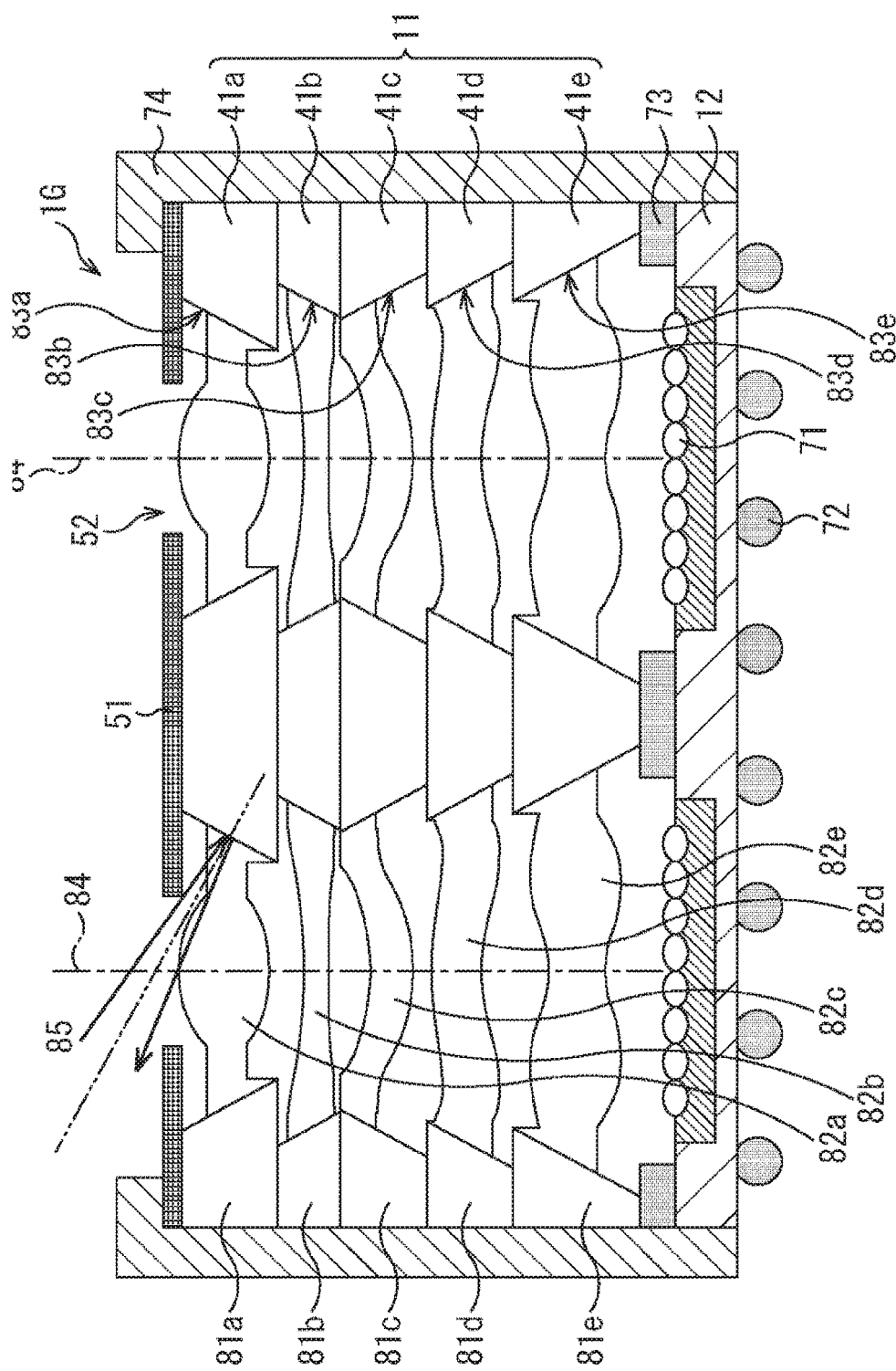
FIG. 17 is a figure depicting a seventh embodiment of the camera module using the stacked lens structure to which the present technology is applied.

FIG. 17 is a figure depicting a seventh embodiment of the camera module using the stacked lens structure to which the present technology is applied.

In FIG. 17, also, the parts corresponding to those in FIG. 13 are denoted by the same symbols as used above, and description will be made while paying attention to the parts different from those of the camera module 1D depicted in FIG. 13.

A camera module 1G of FIG. 17 is different from the camera module 1D depicted in FIG. 13, in the shapes of the lens resin sections 82 and the through-holes 83 of each of the substrates with lens 41 constituting the stacked lens structure 11.

The stacked lens structure 11 of the camera module 1G includes both substrates with lens 41 in which the shape of the through-holes 83 is what is generally called a downwardly narrowing shape with the opening width gradually decreasing in going toward the lower side (the side where the light receiving element 12 is disposed) and substrates with lens 41 in which the shape of the through-holes 83 is what is generally called a divergently widening shape with the opening width gradually increasing in going toward the lower side.

The substrates with lens 41 in which the through-holes 83 are in what is generally called the downwardly narrowing shape with the opening width gradually decreasing in going toward the lower side produce an action or effect such that the non-normal incident light 85 impinging on side walls of the through-holes 83 is reflected toward the upper side, i.e., what is generally called the incidence side, whereby generation of stray light or noise light is restrained.

In view of this, in the stacked lens structure 11 of FIG. 17, of the plural substrates with lens 41 constituting the stacked lens structure 11, particularly plural substrates with lens 41 on the upper side (incidence side) are configured by using substrates with lens 41 in which the through-holes 83 are in what is generally called the downwardly narrowing shape with the opening width gradually decreasing in going toward the lower side.

The substrates with lens 41 in which the through-holes 83 are in what is generally called the divergent widening shape with the opening width gradually increasing in going toward the lower side ensure that the support substrates 81 possessed by the substrates with lens 41 are not liable to become obstacles in the optical path, whereby an action or effect is produced such that the degree of freedom in lens design is increased, or the size of the lens resin sections 82 inclusive of the support sections 92 possessed by the substrate with lens 41 is suppressed to be small.

In the stacked lens structure 11 of FIG. 17, light goes in a divergently widening manner from the diaphragm toward the lower side. Therefore, of the plural substrates with lens 41 constituting the stacked lens structure 11, some substrates with lens 41 disposed on the lower side have the lens resin sections 82 which are large in size. When the through-holes 83 in the divergently widening shape are used in such large lens resin sections 82, an action of suppressing the size of the lens resin sections 82 appears to be large.

In view of this, in the stacked lens structure 11 of FIG. 17, of the plural substrates with lens 41 constituting the stacked lens structure 11, particularly plural substrates with lens 41 on the lower side are configured using substrates with lens 41 in which the through-holes 83 are in what is generally called the divergently widening shape with the opening width gradually increasing in going toward the lower side.

<9. Detailed Configuration of Substrate with Lens>

Next, detailed configuration of the substrate with lens 41 will be described below.

Figure 18A:
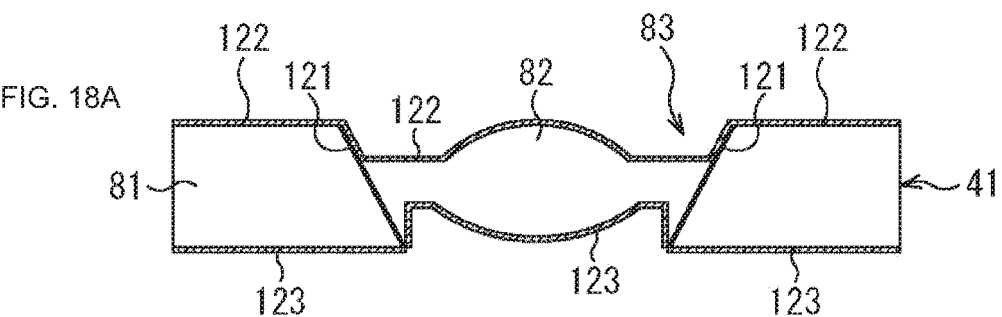
FIGS. 18A, 18B, and 18C illustrate sectional views depicting detailed configuration of the substrate with lens.
Figure 18B:
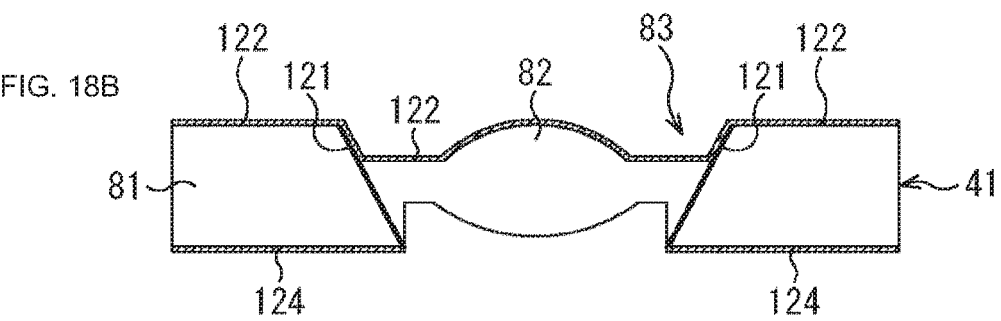
Figure 18C:
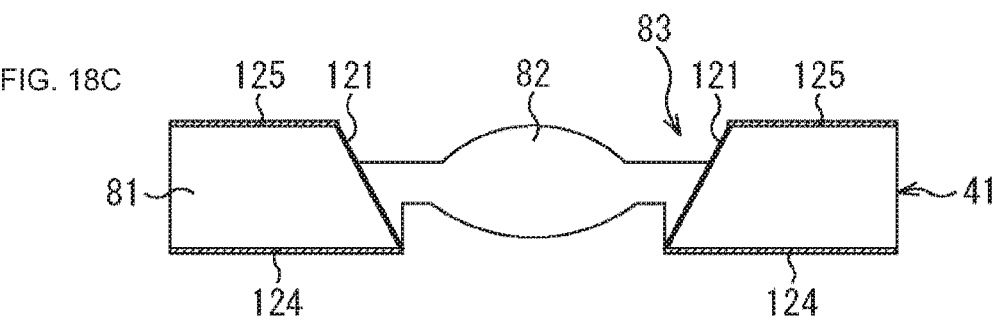

FIGS. 18A, 18B, and 18C illustrate sectional views depicting detailed configuration of the substrate with lens 41.

Note that the substrate with lens 41a in the uppermost layer, of the five substrates with lens 41a to 41e is illustrated in FIGS. 18A, 18B, and 18C, the other substrates with lens 41 are also configured similarly.

As the configuration of the substrate with lens 41, any one configuration of FIGS. 18A, 18B, and 18C may be adopted.

The substrate with lens 41 depicted in FIG. 18A is formed with the lens resin section 82 such as to close the through-hole 83 as viewed from above, in relation to the through-hole 83 provided in the support substrate 81. As has been described referring to FIG. 14, the lens resin section 82 includes the lens section 91 (not illustrated) in a central part and the support section 92 (not illustrated) in the peripheral part.

On side walls defining the through-hole 83 of the substrate with lens 41, a film 121 having a light-absorbing property or a light-shielding property is formed for preventing ghost or flare arising from light reflection. These films 121 are referred to as light-shielding films 121 for convenience' sake.

On upper-side surfaces of the support substrate 81 and the lens resin section 82, an upper-side surface layer 122 including an oxide or a nitride or other insulating material is formed. On lower-side surfaces of the support substrate 81 and the lens resin section 82, a lower-side surface layer 123 including an oxide or a nitride or other insulating material is formed.

The upper-side surface layer 122, as an example, is configured as an antireflection film in which low refraction films and high refraction films are alternately stacked in multiple layers. The antireflection film may be configured, for example, by alternately stacking low refraction films and high refraction films in a total of four layers. The low refraction film may include, for example, an oxide film of $SiOx$ ($1 \leq x \leq 2$), SiOC, SiOF or the like, whereas the high refraction film may include, for example, a metal oxide film of TiO, TaO, Nb2O5 or the like.

Note that the configuration of the upper-side surface layer 122 is only required to be designed, for example, such that a desired reflection preventing performance can be obtained by use of optical simulation, in which the material, film thickness, the number of films stacked and the like of the low refraction films and the high refraction films are not particularly limited. In the present embodiment, the uppermost layer of the upper-side surface layer 122 is a low refraction film, having a film thickness of, for example, 20 to 1,000 nm, a density of, for example, 2.2 to 2.5 g/cm$^3$, a flatness degree of, for example on the order of 1 nm or below in terms of root mean square roughness Rq (RMS). Besides, while the details will be described later, the upper-side surface layer 122 serves also as a joint film when being the substrate with lens 41 is joined to other substrate with lens 41.

The upper-side surface layer 122, as an example, may be an antireflection film in which low refraction films and high refraction films are alternately stacked in multiple layer, and may particularly be an antireflection film of an inorganic matter. The upper-side surface layer 122, as another example, may be a monolayer film including an oxide or a nitride or other insulating material, and may especially be a film of an inorganic matter.

Also the lower-side surface layer 123, as an example, may be an antireflection film in which low refraction films and high refraction films are alternately stacked in multiple layers, and may particularly be an antireflection film of an inorganic matter. The lower-side surface layer 123, as another example, may be a monolayer film including an oxide, a nitride, or other insulating material, and may especially be a film of an inorganic matter.

In regard of the substrates with lens 41 in FIGS. 18B and 18C, only parts different from those in the substrates with lens 41 depicted in FIG. 18A will be described.

In the substrate with lens 41 depicted in FIG. 18B, a film formed on the lower-side surfaces of the support substrate 81 and the lens resin section 82 is different from that in the substrate with lens 41 depicted in FIG. 18A.

In the substrate with lens 41 of FIG. 18B, while a lower-side surface layer 124 including an oxide or a nitride or other insulating material is formed on the lower-side surface of the support substrate 81, the lower-side surface layer 124 is not formed on the lower-side surface of the lens resin section 82. The lower-side surface layer 124 may include the same material or a different material, as compared to the upper-side surface layer 122.

Such a structure can be formed, for example, by a production method in which before formation of the lens resin section 82, the lower-side surface layer 124 is preliminarily formed on the lower-side surface of the support substrate 81, and thereafter the lens resin section 82 is formed.

Alternatively, such a structure can be formed by forming a mask on the lens resin section 82, after formation of the lens resin section 82, and, in a state in which the mask is not formed on the support substrate 81, depositing a film constituting the lower-side surface layer 124 on the lower-side surface of the support substrate 81 by PVD, for example.

In the substrate with lens 41 of FIG. 18C, while an upper-side surface layer 125 including an oxide or a nitride or other insulating material is formed on the upper-side surface of the support substrate 81, the upper-side surface layer 125 is not formed on the upper-side surface of the lens resin section 82.

Similarly, in the lower-side surface of the substrate with lens 41, a lower-side surface layer 124 including an oxide or a nitride or other insulating material is formed on the lower-side surface of the support substrate 81, the lower-side surface layer 124 is not formed on the lower-side surface of the lens resin section 82.

Such a structure can be formed, for example, by a production method in which, before formation of the lens resin section 82, the upper-side surface layer 125 and the lower-side surface layer 124 are preliminarily formed on the support substrate 81, and thereafter the lens resin section 82 is formed. Alternatively, such a structure can be formed by forming a mask on the lens resin section 82 after formation of the lens resin section 82, and, in a state in which the mask is not formed on the support substrate 81, depositing films constituting the upper-side surface layer 125 and the lower-side surface layer 124 on the surfaces of the support substrate 81 by PVD, for example. The lower-side surface layer 124 and the upper-side surface layer 125 may include the same material or different materials.

The substrate with lens 41 may be configured in the manner as follows.

<10. Method of Manufacturing Substrate with Lens>

Next, referring to FIGS. 19A, 19B, 20A, 20B, 20C, 21A, 21B, 21C, 21D, 21E, 21F, 22A, 22B, 23A, 23B, 23C, 23D, 23E, 23F, 23G, 24, 25, 26, 27A, 27B, 27C, 27D, 27E, 27F, 28, and 29, a method of manufacturing the substrate with lens 41 will be described below.

Figure 19A:
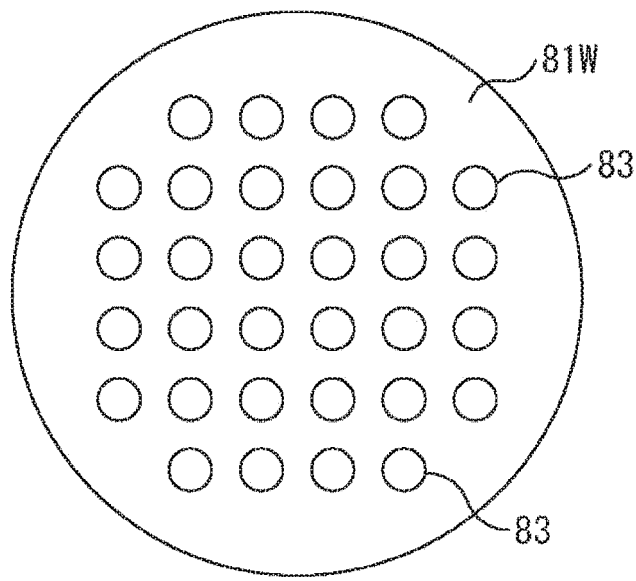
FIGS. 19A and 19B illustrate figures for explaining a method of manufacturing the substrate with lens.

First, a support substrate 81W in a substrate state which is formed with plural through-holes 83 is prepared. As the support substrate 81W, for example, a silicon substrate used for ordinary semiconductor device may be used. The shape of the support substrate 81W is, for example, a circle as depicted in FIG. 19A, the diameter being, for example, 200 mm or 300 mm. The support substrate 81W may not be a silicon substrate but may be, for example, a glass substrate, a resin substrate, or a metallic substrate.

Figure 19B:
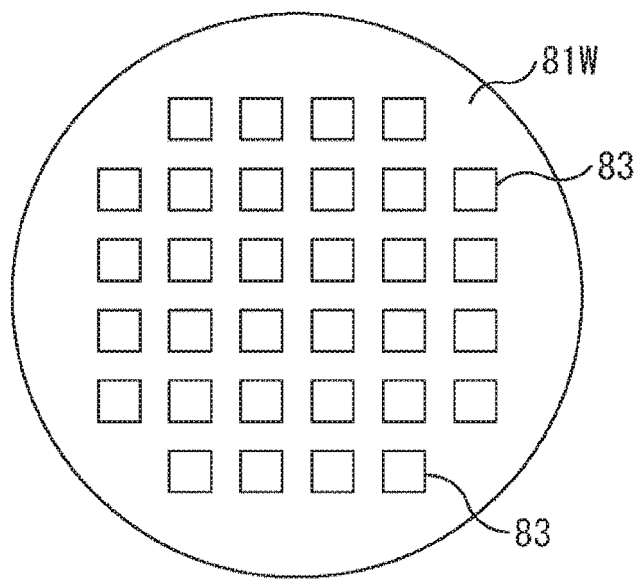

In addition, while the plan-view shape of the through-holes 83 is a circle as depicted in FIG. 19A in the present embodiment, the plan-view shape of the through-holes 83 may be a polygon such as, for example, a tetragon as viewed in FIG. 19B.

The opening width of the through-holes 83 may be, for example, approximately 100 μm to approximately 20 mm. In this case, for example, approximately 100 to approximately 5,000,000 through-holes may be disposed in the support substrate 81W.

Herein, the size of the through-holes 83 in a plane direction of the substrate with lens 41 is referred to as opening width. The opening width means the length of one side in the case where the plan-view shape of the through-holes 83 is a tetragon, and means the diameter in the case where the plan-view shape of the through-holes 83 is a circle, unless otherwise specified.

Figure 20A:
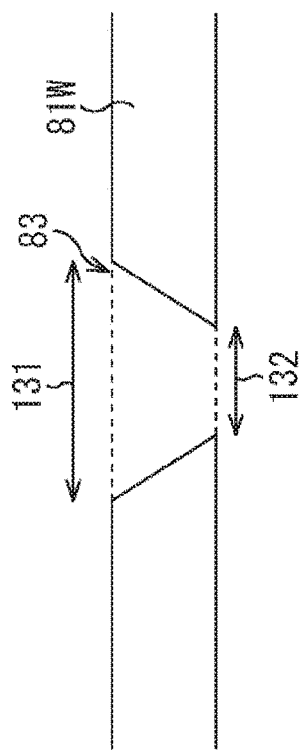
FIGS. 20A, 20B, and 20C illustrate figures for explaining the method of manufacturing the substrate with lens.
Figure 20B:
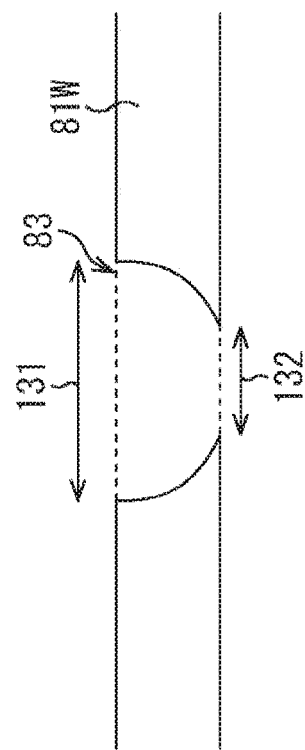
Figure 20C:
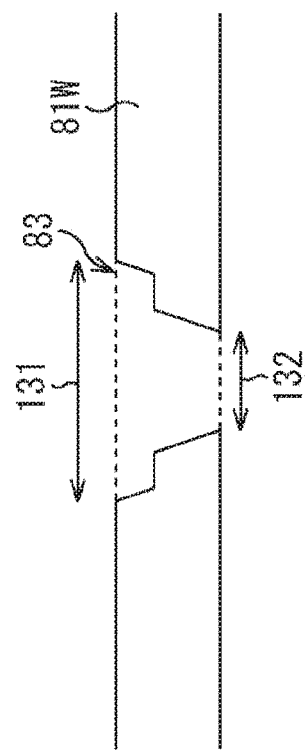

The through-hole 83 has such a shape that, as illustrated in FIGS. 20A, 20B, and 20C a second opening width 132 at a second surface opposite to a first surface of the support substrate 81W is smaller than a first opening width 131 at the first surface of the support substrate 81W.

As an example of the three-dimensional shape of the through-hole 83 in which the second opening width 132 is smaller than the first opening width 131, the through-hole 83 may have a truncated conical shape depicted in FIG. 20A, or may be a truncated polygonal pyramidal shape. The sectional shape of a side wall of the through-hole 83 may be a straight line as depicted in FIG. 20A, or may be a curved line as depicted in FIG. 20B. Alternatively, a step may be present there, as depicted in FIG. 20C.

The through-hole 83 having such a shape that the second opening width 132 is smaller than the first opening width 131 is formed by supplying a resin into the through-hole 83 and pressing the resin from each of the first and second surfaces toward the opposite direction by mold members to form the lens resin section 82. In this case, the resin to be the lens resin section 82 receives forces from the opposed two mold members, and is pressed against the side wall of the through-hole 83. As a result, an action of enhancing the adhesion strength between the resin to be the lens resin section 82 and the support substrate can be produced.

Note that a further embodiment of the through-hole 83, a shape such that the first opening width 131 and the second opening width 132 are equal, i.e., a shape in which the sectional shape of the side wall of the through-hole 83 is vertical, may be adopted.

<Method of Forming Through-Holes by Use of Wet Etching>

The through-holes 83 of the support substrate 81W can be formed by etching the support substrate 81W by wet etching. Specifically, before etching the support substrate 81W, an etching mask for preventing non-opening regions of the support substrate 81W from being etched is formed on a surface of the support substrate 81W. As the material for the etching mask, there may be used, for example, an insulating film such as a silicon oxide film and a silicon nitride film. The etching mask is formed by forming a layer of the etching mask material on the surface of the support substrate 81W, and opening a pattern of the plan-view shape of the through-holes 83 in the layer. After the etching mask is formed, the support substrate 81W is etched, whereby the through-holes 83 are formed in the support substrate 81W.

In the case where, for example, a single crystal silicon with a substrate plane orientation of (100) is used as the support substrate 81W, formation of the through-holes 83 may be conducted by crystal anisotropic wet etching using an alkaline solution of KOH or the like.

When the support substrate 81W which is a single crystal silicon with a substrate plane orientation of (100) is subjected to crystal anisotropic wet etching using an alkaline solution of KOH or the like, the etching proceeds such that a (111) plane appears at the opening side wall. As a result, whether the plan-view shape of the openings of the etching mask is circular or tetragonal, through-holes 83 of which the plan-view shape is tetragonal, and in which the opening width of the through-holes 83 is such that the second opening width 132 is smaller than the first opening width 131, and in which the three-dimensional shape of the through-holes 83 is a truncated pyramidal shape or a similar shape are obtained. The angle of the side wall of the through-hole 83 in a truncated pyramidal shape against the substrate plane is approximately 55°.

As another example of embodiment, the etching for forming the through-holes may be conducted by wet etching using a liquid chemical capable of etching silicon into any shape without being restricted by crystal orientation, as disclosed in WO2011/010739 and the like. Examples of the liquid chemical include a liquid chemical obtained by adding at least one of polyoxyethylene alkyl phenyl ether, polyoxyalkylene alkyl ether, or polyethylene glycol as surfactant to an aqueous TMAH (tetramethyl ammonium hydroxide) solution, and a liquid chemical obtained by adding isopropyl alcohol to an aqueous KOH solution.

When the support substrate 81W which is a single crystal silicon with a substrate plane orientation of (100) is subjected to etching for forming the through-holes 83 by use of either of the above-mentioned liquid chemicals, in the case where the plan-view shape of the openings in the etching mask is circular, through-holes 83 of which the plan-view shape is a circle, in which the second opening width 132 is smaller than the first opening width 131, and in which the three-dimensional shape of the through-holes 83 is a truncated conical shape or a similar shape, are obtained.

In the case where the plan-view shape of the openings in the etching mask is tetragonal, through-holes 83 of which the plan-view shape is a tetragon, in which the opening width is such that the second opening width 132 is smaller than the first opening width 131, and in which the three-dimensional shape of the though-holes is a truncated pyramidal shape or a similar shape, are obtained. The angle of the side wall of the through-hole 83 in the truncated conical shape or the truncated pyramidal shape against the substrate plane is approximately 45°.

<Method of Forming Through-Holes by Use of Dry Etching>

In addition, the etching for forming the through-holes 83 may be conducted not by the aforementioned wet etching but by dry etching.

Referring to FIGS. 21A, 21B, 21C, 21D, 21E, and 21F a method of forming the through-holes 83 by use of dry etching will be described.

Figure 21A:
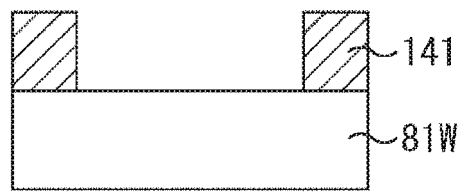
FIGS. 21A, 21B, 21C, 21D, 21E, and 21F illustrate figures for explaining the method of manufacturing the substrate with lens.

As depicted in FIG. 21A, an etching mask 141 is formed on a surface on one side of the support substrate 81W. The etching mask 141 has a mask pattern in which the parts where to form the through-holes 83 are opened.

Figure 21B:
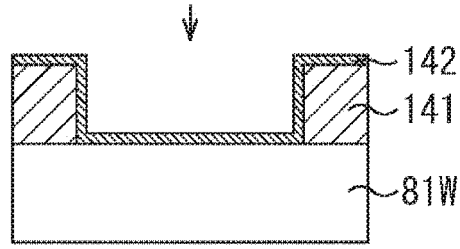
Figure 21C:
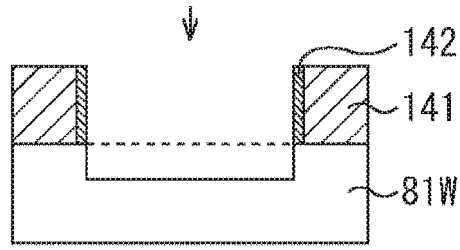

Next, as illustrated in FIG. 21B, a protective film 142 for protecting the side walls of the etching mask 141 is formed, after which as depicted in FIG. 21C, the support substrate 81W is etched in a predetermined depth by dry etching. While the protective film 142 on the surface of the support substrate 81W and the surface of the etching mask 141 is removed by the dry etching step, the protective film 142 on the side surfaces of the etching mask 141 is left, whereby the side surfaces of the etching mask 141 is protected. After the etching, as depicted in FIG. 21D, the protective film 142 on the side walls is removed, and the etching mask 141 is retracted in directions for enlarging the pattern size of the opening patterns.

Figure 21D:
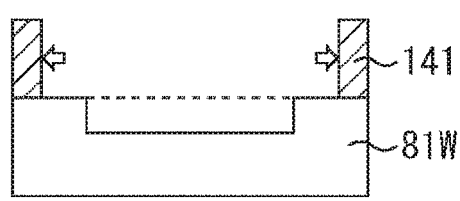
Figure 21E:
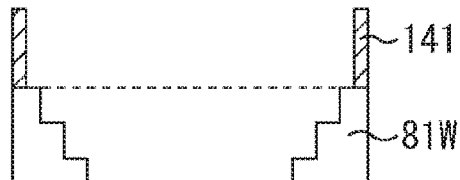

Then, again, the protective film forming step, the dry etching step, and the etching mask retraction step in FIGS. 21B, 21C, and 21D are repeated multiple times. As a result, as depicted in FIG. 21E, the support substrate 81W is etched to have a stairways shape (rugged shape) having periodical steps.

Figure 21F:
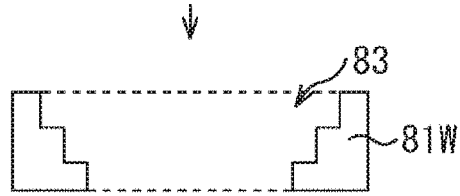

Finally, the etching mask 141 is removed, whereon the support substrate 81W is formed with the through-holes 83 having side surfaces in a stepped shape, as depicted in FIG. 21F. The width (the width of one step) in a plane direction of the stepped shape of the through-holes 83 is, for example, approximately 400 nm to approximately 1 μm.

In the case where the through-holes 83 are formed by use of dry etching in this way, the protective film forming step, the dry etching step, and the etching mask retraction step are carried out repeatedly.

Since the side walls of the through-holes 83 have the periodically stepped shape (rugged shape), reflection of incident light can be restrained. In addition, in the case where the side walls of the through-holes 83 have rugged shapes of a random size, voids may be generated in an adhesion layer between the lenses formed in the through-holes 83 and the side walls, and adhesion between the lenses and the through-holes 83 may be lowered due to the voids.

According to the aforementioned forming method, however, the side walls of the through-holes 83 have the periodically stepped shape, so that adhesion is enhanced, and variations in optical characteristics due to lens misregistration can be restrained.

An example of the materials used for the steps may be single crystal silicon for the support substrate 81W, a photoresist for the etching mask 141, a fluorocarbon polymer formed by use of a gas plasma of C4F8 or CHF3 or the like for the protective film 142, plasma etching using an F-containing gas such as SF6/O2 or C4F8/SF6 for the etching treatment, and plasma etching using O2 such as O2 gas and CF4/O2 for the mask retraction step.

Alternatively, a combination of single crystal silicon for the support substrate 81W, SiO2 for the etching mask 141, a plasma containing C12 for etching, an oxide film obtained by oxidizing an etching object material by use of an O2 plasma for the protective film 142, plasma etching using a gas containing C12 for the etching treatment, and plasma etching using an F-containing gas such as CF4/O2 for the plasma etching mask retraction step may be adopted.

As above-mentioned, plural through-holes 83 can be simultaneously formed in the support substrate 81W by wet etching or dry etching. In this case, as depicted in FIG. 22A, the support substrate 81W may be formed with through-grooves 151 in regions where the through-holes 83 are not formed.

Figure 22A:
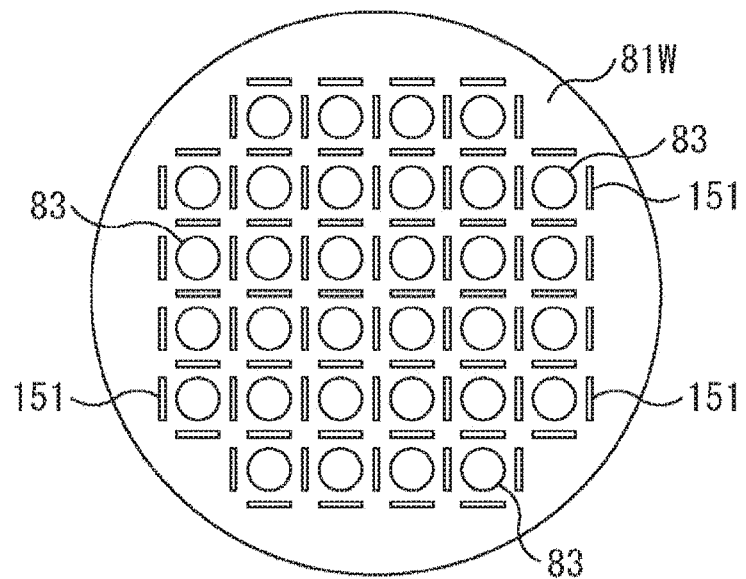
FIGS. 22A and 22B illustrate figures for explaining the method of manufacturing the substrate with lens.

FIG. 22A is a plan view of the support substrate 81W formed with the through-grooves 151 in addition to the through-holes 83.

For example, as depicted in FIG. 22A, the through-grooves 151 are disposed only at part of the spaces between the through-holes 83 in the row direction and the column direction, while avoiding the plural through-holes 83 disposed in a matrix pattern.

In addition, the through-grooves 151 of the support substrates 81W may be disposed at the same positions for the substrates with lens 41 constituting the stacked lens structure 11. In this case, in a state in which the plural support substrates 81W are stacked as the stacked lens structure 11, the through-grooves 151 of the plural support substrates 81W are in the structure in which they penetrate the plural support substrates 81W, as depicted in the sectional view of FIG. 22B.

The through-grooves 151 of the support substrates 81W as part of the substrates with lens 41, in the case where, for example, stress for deforming the substrates with lens 41 is exerted from the outside of the substrates with lens 41, may produce an action or effect to mitigate the deformation of the substrates with lens 41 due to the stress.

Alternatively, in the case where, for example, stress for deforming the substrates with lens 41 is generated from the inside of the substrates with lens 41, the through-grooves 151 may produce an action or effect to mitigate the deformation of the substrates with lens 41 due to the stress.

<Method of Manufacturing Substrate with Lens>

Next, referring to FIGS. 23A, 23B, 23C, 23D, 23E, 23F, and 23G a method of manufacturing a substrate with lens 41W in a substrate state will be described below.

First, as depicted in FIG. 23A, a support substrate 81W formed with plural through-holes 83 is prepared. A light-shielding film 121 is formed on side walls of the through-holes 83. While only two through-holes 83 are illustrated in FIGS. 23A, 23B, 23C, 23D, 23E, 23F, and 23G for want of space, a multiplicity of through-holes 83 are in practice formed in plane directions of the support substrate 81W as depicted in FIGS. 19A and 19B. In addition, an alignment mark (not illustrated) for alignment is formed in a region near the outer periphery of the support substrate 81W.

A front-side flat section 171 on the upper side of the support substrate 81W and a back-side flat section 172 on the lower side are flat surfaces formed to be flat to such an extent that plasma joining to be performed in a later step is possible. The thickness of the support substrate 81W plays the role as a spacer for determining the distance between lenses when the substrate with lens 41 is finally individualized and stacked on other substrate with lens 41.

It is preferable to use as the support substrate 81W a low thermal expansion coefficient substrate having a thermal expansion coefficient of equal to or less than 10 ppm/° C.

Next, as illustrated in FIG. 23B, the support substrate 81W is disposed on a lower mold 181 in which plural concave-shaped optical transfer surfaces 182 are disposed at regular intervals. More in detail, the back-side flat section 172 of the support substrate 81W and a flat surface 183 of the lower mold 181 are stacked on each other such that the concave-shaped optical transfer surfaces 182 are located inside the through-holes 83 of the support substrate 81W. The optical transfer surfaces 182 of the lower mold 181 are formed in one-to-one correspondence with the through-holes 83 of the support substrate 81W, and the positions of the support substrate 81W and the lower mold 181 in plane directions are adjusted such that the centers of the optical transfer surfaces 182 and the through-holes 83 corresponding to each other coincide with each other in the optical axis direction. The lower mold 181 includes a rigid mold material, for example, a metal, silicon, quartz, or glass.

Next, as depicted in FIG. 23C, an energy-curing resin 191 is made to fill (is dropped into) the inside of the lower mold 181 and the through-holes 83 of the support substrate 81W stacked on each other. The lens resin sections 82 are formed by use of the energy-curing resin 191. Therefore, it is preferable that the energy-curing resin 191 is preliminarily subjected to a defoaming treatment such as not to contain foams. The defoaming treatment is preferably a vacuum defoaming treatment or a defoaming treatment by a centrifugal force. In addition, the vacuum defoaming treatment is preferably conducted after the filling. By the defoaming treatment, molding of the lens resin sections 82 can be performed without engulfing foams.

Next, as illustrated in FIG. 23D, an upper mold 201 is disposed on the lower mold 181 and the support substrate 81W stacked on each other. The upper mold 201 is provided with plural concave-shaped optical transfer surfaces 202 disposed at regular intervals, like when the lower mold 181 is disposed, the upper mold 201 is disposed after accurately positioned such that the centers of the through-holes 83 and the centers of the optical transfer surfaces 202 coincide with each other in an optical axis direction.

In regard of the height direction which is the vertical direction on the paper surface, the position of the upper mold 201 is fixed such that the distance between the upper mold 201 and the lower mold 181 becomes a predetermined distance, by a controlling apparatus for controlling the spacing between the upper mold 201 and the lower mold 181. In this instance, spaces defined between the optical transfer surfaces 202 of the upper mold 201 and the optical transfer surfaces 182 of the lower mold 181 coincide with the thickness of the lens resin sections 82 (lenses 21) calculated by optical design.

Alternatively, as depicted in FIG. 23E, like when the lower mold 181 is disposed, a flat surface 203 of the upper mold 201 and the front-side flat section 171 of the support substrate 81W may be stacked on each other. In this case, the distance between the upper mold 201 and the lower mold 181 becomes equal to the thickness of the support substrate 81W, and accurate alignment in the plane directions and the height direction can be achieved.

When a control such that the spacing between the upper mold 201 and the lower mold 181 becomes a predetermined distance is performed, in the step of FIG. 23C described above, the filling amount of the energy-curing resin 191 dropped into the inside of the through-holes 83 of the support substrate 81W is an amount controlled such as not to flow over from the spaces surrounded by the through-holes 83 of the support substrate 81W and the upper mold 201 and the lower mold 181 located respectively on the upper and lower sides thereof. As a result, the material of the energy-curing resin 191 can be prevented from being wasted, and manufacturing cost can be reduced.

Subsequently, in a state depicted in FIG. 23E, a curing treatment of the energy-curing resin 191 is conducted. The energy-curing resin 191 is cured, for example, by applying heat or UV rays to the energy-curing resin 191 and leaving the energy-curing resin 191 to stand for a predetermined time. During the curing, the upper mold 201 may be pressed downward, or alignment may be conducted, whereby deformation of the energy-curing resin 191 due to shrinkage can be minimized.

A thermoplastic resin may be used in place of the energy-curing resin 191. In that case, in a state depicted in FIG. 23E, the upper mold 201 and the lower mold 181 are raised in temperature, whereby the energy-curing resin 191 is molded into a lens shape, and, by cooling, the resin is cured.

Next, as illustrated in FIG. 23F, the controlling apparatus for controlling the positions of the upper mold 201 and the lower mold 181 move the upper mold 201 upward and the lower mold 181 downward, to release the upper mold 201 and the lower mold 181 from the support substrate 81W. When the upper mold 201 and the lower mold 181 are released from the support substrate 81W, the lens resin sections 82 inclusive of the lenses 21 are formed inside the through-holes 83 of the support substrate 81W.

Note that the surfaces of the upper mold 201 and the lower mold 181 which contact the support substrate 81W may be coated with a fluorine-based or silicon-based mold release agent. As a result, the support substrate 81W can be easily released from the upper mold 201 and the lower mold 181. In addition, as a method for easily releasing the molds from the contact surfaces with the support substrate 81W, various coatings with fluorine-containing DLC (Diamond Like Carbon) or the like may be conducted.

Next, as depicted in FIG. 23G, an upper-side surface layer 122 is formed on front surfaces of the support substrate 81W and the lens resin section 82, and a lower-side surface layer 123 is formed on back surfaces of the support substrate 81W and the lens resin sections 82. Before or after the formation of the upper-side surface layer 122 and the lower-side surface layer 123, CMP (Chemical Mechanical Polishing) or the like may be conducted as required, whereby the front-side flat section 171 and the back-side flat section 172 of the support substrate 81W may be planarized.

By pressure molding (imprinting) the energy-curing resin 191 to the through-holes 83 formed in the support substrate 81W by use of the upper mold 201 and the lower mold 181, it is possible to form the lens resin sections 82 and to manufacture the substrate with lens 41.

The shapes of the optical transfer surfaces 182 and the optical transfer surfaces 202 are not limited to the aforementioned concave shape, and are determined, as required, according to the shapes of the lens resin sections 82. As illustrated in FIG. 15, the lens shape of the substrates with lens 41a to 41e may take various shapes deduced by optical system design, and may be, for example, a biconvex shape, a biconcave shape, a planoconvex shape, a planoconcave shape, a convex meniscus shape, a concave meniscus shape, or, further, a higher order non-spherical shape or the like.

Besides, the shapes of the optical transfer surfaces 182 and the optical transfer surfaces 202 may be such a shape that the lens shape after formation becomes a moth-eye shape.

According to the aforementioned manufacturing method, variations in the distance between the lens resin sections 82 in a plane direction due to curing shrinkage of the energy-curing resin 191 is interrupted by the intervention of the support substrate 81W, and, therefore, the accuracy between lens intervals can be controlled with high accuracy. In addition, there is an effect to reinforce the energy-curing resin 191 low in strength by the support substrate 81W high in strength. As a result, there is an effect such that a lens array substrate in which plural lenses high in handleability are disposed can be provided and that warping of the lens array substrate can be restrained.

<Example in Which Through-Hole Shape is Polygon>

As illustrated in FIG. 19B, the plan-view shape of the through-holes 83 may be a polygon such as, for example, tetragon.

Figure 24:
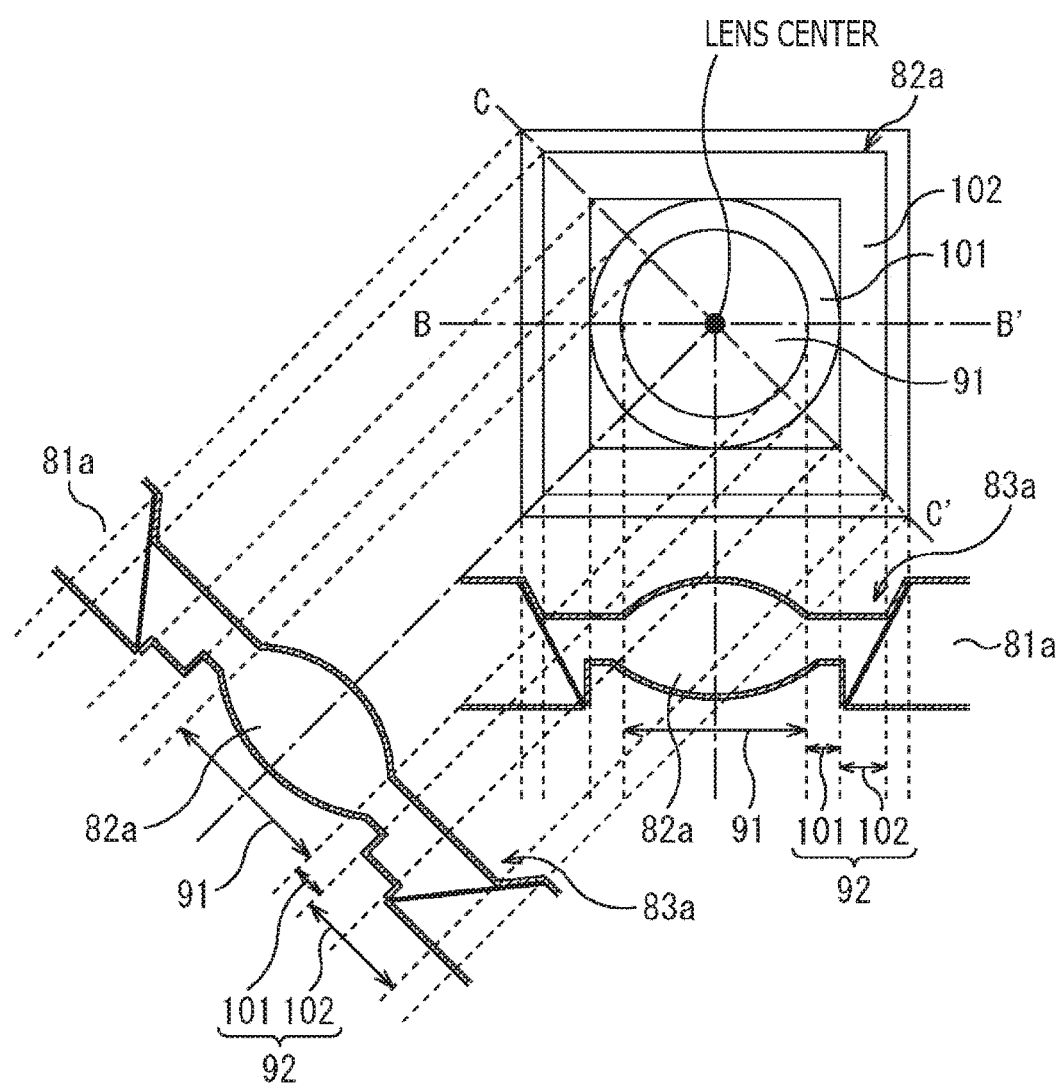
FIG. 24 is a figure for explaining the method of manufacturing the substrate with lens.

FIG. 24 illustrates a plan view and sectional views of a support substrate 81a of a substrate with lens 41a and a lens resin section 82a, in the case where the plan-view shape of the through-holes 83 is a tetragon.

The sectional views of the substrate with lens 41a in FIG. 24 are sectional views taken respectively along line B-B' and line C-C' of the plan view.

As is seen from comparison of the sectional view taken along line B-B' and the sectional view taken along line C-C', in the case where the through-holes 83a are tetragonal, the distance from the center of the through-hole 83a to an upper portion outer edge of the through-hole 83a and the distance from the center of the through-hole 83 to a lower portion outer edge of the through-hole 83a are different between a side direction and a diagonal direction of the through-hole 83a being tetragonal, and are larger in the diagonal direction. Therefore, in the case where the plan-view shape of the through-holes 83a is a tetragon, when the lens section 91 is made to be circular, the distance from the outer periphery of the lens section 91 to a side wall of the through-hole 83a, or the length of the support section 92, should be different between the side direction and the diagonal direction of the tetragon.

In view of this, the lens resin section 82a depicted in FIG. 24 has the following structure.

(1) The length of an arm section 101 disposed at the outer periphery of the lens section 91 is the same in a side direction and in a diagonal direction of the tetragon.

(2) The length of a leg section 102 disposed on the outside of the arm section 101 and extending to a side wall of the through-hole 83a is such that the length of the leg section 102 in the diagonal direction of the tetragon is longer than the length of the leg section 102 in the side direction.

As depicted in FIG. 24, the leg section 102 is not in direct contact with the lens section 91, whereas the arm section 101 is in direct contact with the lens section 91.

In the lens resin section 82a of FIG. 24, the length and thickness of the arm section 101 in direct contact with the lens section 91 are constant over the whole part of the outer periphery of the lens section 91, whereby an action or effect to support the whole part of the lens section 91 evenly by a fixed force may be produced.

Further, with the whole part of the lens section 91 supported evenly by a fixed force, in the case where, for example, stress is exerted over the whole part of the outer periphery of the through-hole 83a from the support substrate 81a surrounding the through-hole 83a, the stress is evenly transmitted to the whole part of the lens section 91, whereby an action or effect to restrain the stress from being unevenly transmitted to only a specific part of the lens section 91 may be produced.

Figure 25:
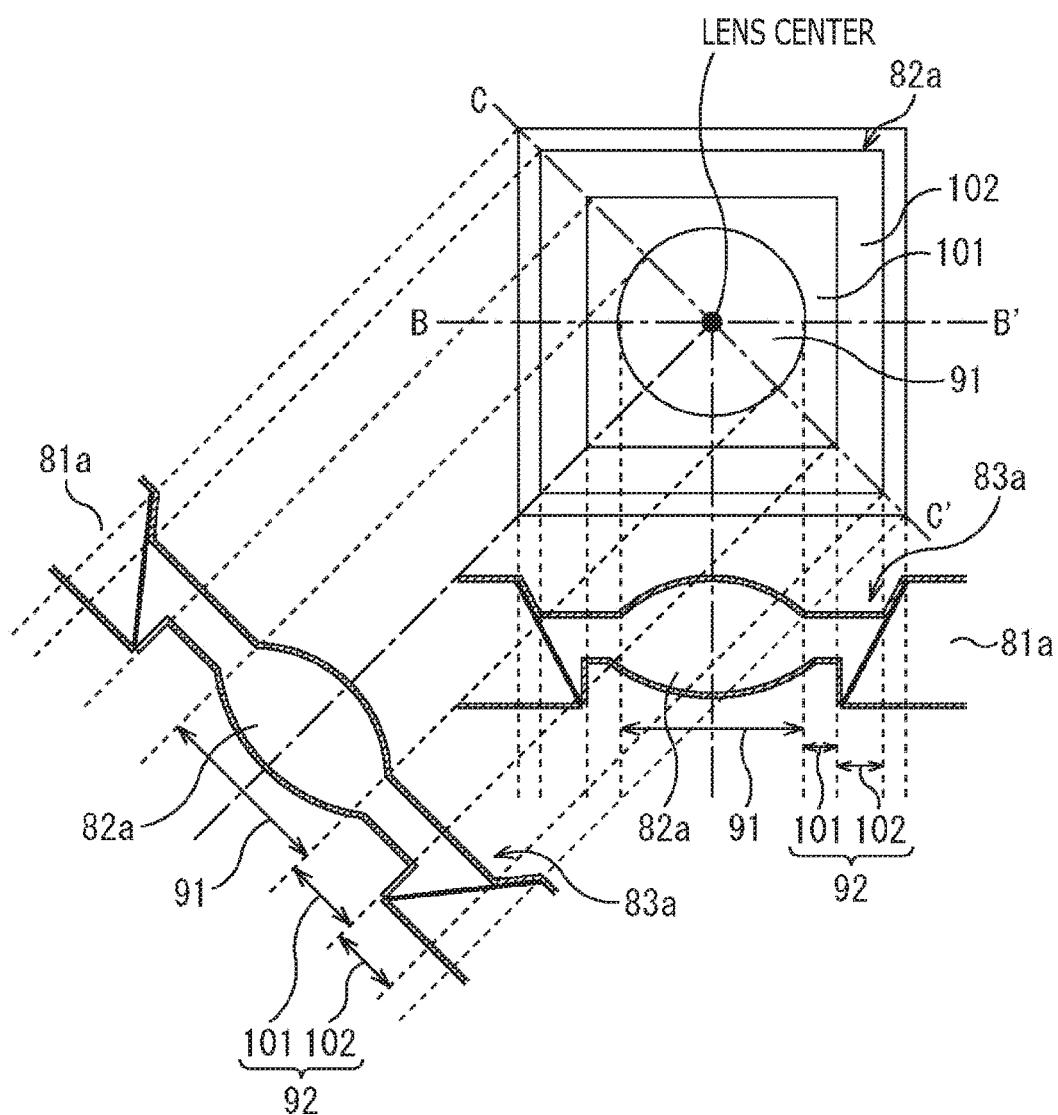
FIG. 25 is a figure for explaining the method of manufacturing the substrate with lens.

FIG. 25 illustrates a plan view and sectional views of the support substrate 81a and the lens resin section 82a of the substrate with lens 41a, depicting another example of the through-hole 83a of which the plan-view shape is tetragonal.

The sectional views of the substrate with lens 41a in FIG. 25 are sectional views taken respectively along line B-B' and line C-C' of the plan view.

Figure 22B:
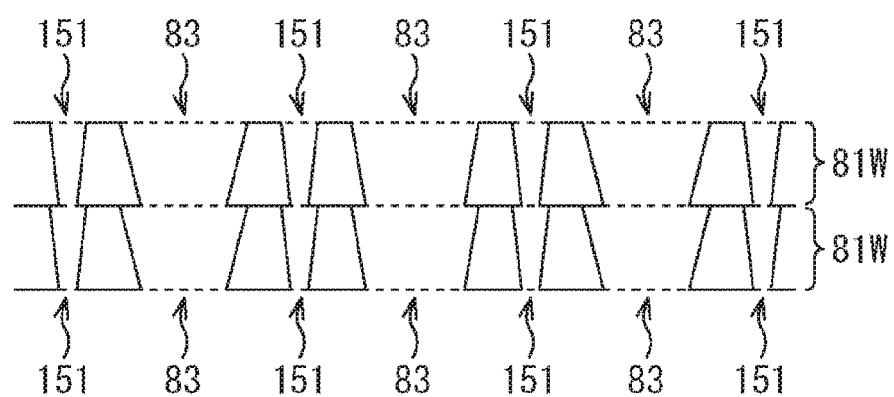

In FIG. 25 also, as in FIGS. 22A and 22B, the distance from the center of the through-hole 83a to an upper portion outer edge of the through-hole 83a and the distance from the center of the through-hole 83a to a lower portion outer edge of the through-hole 83a are different between a side direction and a diagonal direction of the through-hole 83a being tetragonal, and are greater in the diagonal direction. Therefore, in the case where the plan-view shape of the through-hole 83a is tetragonal, when the lens section 91 is made to be circular, the distance from the outer periphery of the lens section 91 to a side wall of the through-hole 83a, or the length of the support section 92, should be different between the side direction and the diagonal direction of the tetragon.

In view of this, the lens resin section 82a depicted in FIG. 25 has the following structure.

(1) The length of the leg section 102 disposed at an outer periphery of the lens section 91 is constant along the four sides of the tetragon of the through-hole 83a.

(2) For realizing the structure of (1) above, the length of the arm section 101 is such that the length of the arm section in the diagonal direction of the tetragon is longer than the length of the arm section in the side direction.

As illustrated in FIG. 25, the leg section 102 is greater than the arm section 101 in film thickness of resin. Therefore, the leg section 102 is greater than the arm section 101 also in the volume per unit area in plane directions of the substrate with lens 41a.

In the example of FIG. 25, the volume of the leg section 102 is reduced as much as possible and is made to be constant along the four sides of the tetragon of the through-hole 83a, whereby in the case where, for example, deformation such as swelling of resin is generated, an action or effect to restrain a volume change due to the deformation as much as possible and to prevent the volume change from occurring unevenly over the whole part of the outer periphery of the lens section 91 may be produced.

Figure 26:
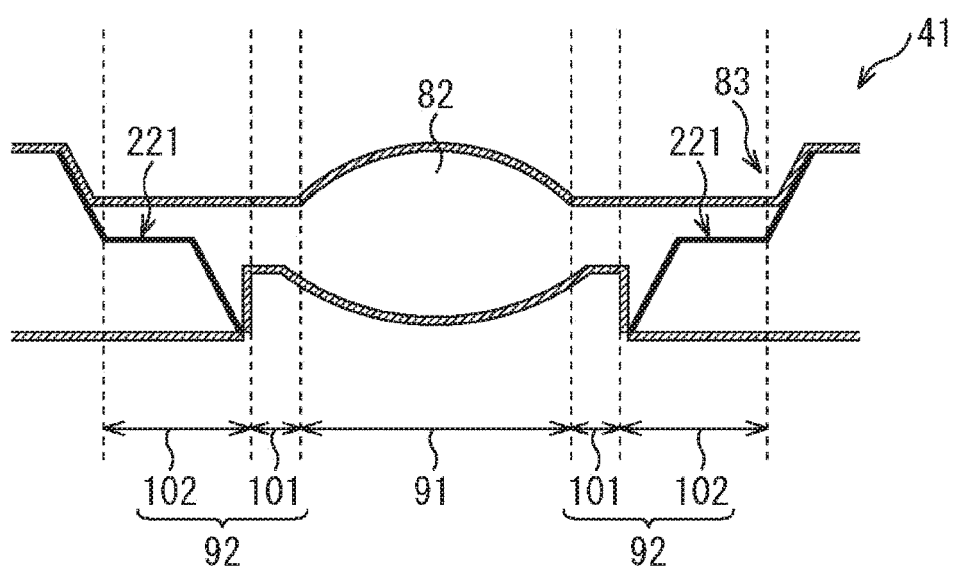
FIG. 26 is a figure for explaining the method of manufacturing the substrate with lens.

FIG. 26 is a sectional view depicting another embodiment of the lens resin section 82 and the through-hole 83 of the substrate with lens 41.

The lens resin section 82 and the through-hole 83 depicted in FIG. 26 have the following structures.

(1) A side wall of the through-hole 83 has a stepped shape including a stepped section 221.

(2) The leg section 102 of the support section 92 of the lens resin section 82 not only is disposed on an upper side of a side wall of the through-hole 83 but also extends in a plane direction of the substrate with lens 41 on the stepped section 221 possessed by the through-hole 83.

Referring to FIGS. 27A, 27B, 27C, 27D, 27E, and 27F a method of forming the through-hole 83 having the stepped shape depicted in FIG. 26 will be described.

Figure 27:
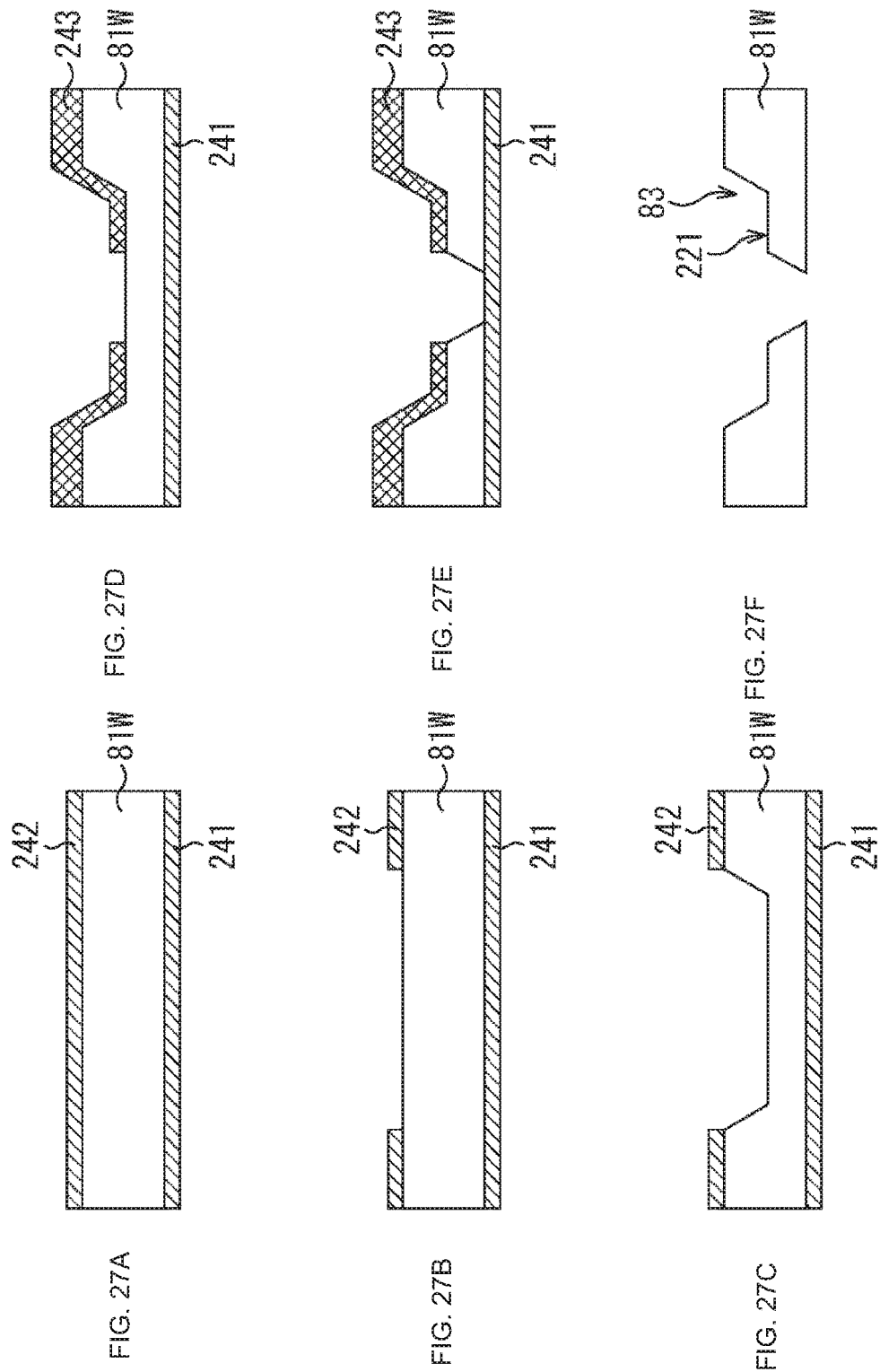
FIGS. 27A, 27B, 27C, 27D, 27E, and 27F illustrate figures for explaining the method of manufacturing the substrate with lens.

First, as illustrated in FIG. 27A, an etching stop film 241 having resistance to wet etching at the time of opening the through-hole is formed on a surface on one side of the support substrate 81W. The etching stop film 241 may be, for example, a silicon nitride film.

Next, a hard mask 242 having resistance to wet etching at the time of opening the through-hole is formed on a surface on another side of the support substrate 81W. The hard mask 242 also may be, for example, a silicon nitride film.

Subsequently, as depicted in FIG. 27B, a predetermined region of the hard mask 242 is opened for first-time etching. In the first-time etching, a part to be an upper step of the stepped section 221 of the through-hole 83 is etched. Therefore, the opening in the hard mask 242 for the first-time etching is a region corresponding to an opening in the upper-side substrate surface of the substrate with lens 41 depicted in FIG. 26.

Next, as illustrated in FIG. 27C, by wet etching, the support substrate 81W is etched by a predetermined depth, according to the opening of the hard mask 242.

Subsequently, as depicted in FIG. 27D, a hard mask 243 is again formed on the surface of the support substrate 81W after etching, and the hard mask 243 is opened correspondingly to a part to be the lower side of the stepped section 221 of the through-hole 83. As the hard mask 243 at the second time also, for example, a silicon nitride film may be adopted.

Next, as illustrated in FIG. 27E, by wet etching, the support substrate 81W is etched such as to reach the etching stop film 241, according to the opening of the hard mask 243.

Finally, as depicted in FIG. 27F, the hard mask 243 on the upper-side surface of the support substrate 81W and the etching stop film 241 on the lower-side surface are removed.

As above-mentioned, the etching of the support substrate 81W for forming the through-hole by wet etching is conducted dividedly at two times, whereby the through-hole 83 in the stepped shape depicted in FIG. 26 is obtained.

Figure 28:
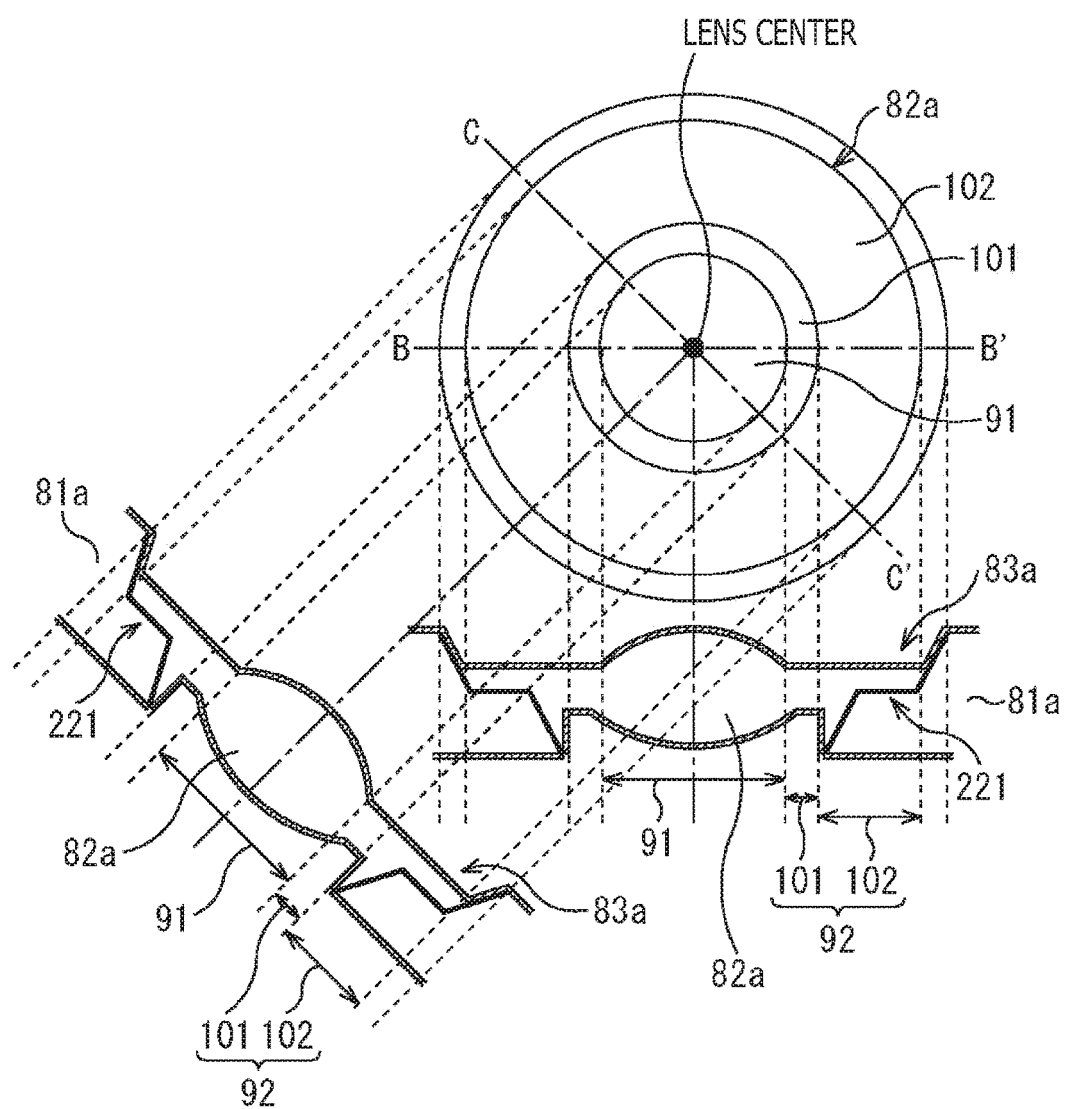
FIG. 28 is a figure for explaining the method of manufacturing the substrate with lens.

FIG. 28 illustrates a plan view and sectional views of the support substrate 81a and the lens resin section 82a of the substrate with lens 41a, in the case where the through-hole 83a has the stepped section 221 and the plan-view shape of the through-hole 83a is circular.

The sectional views of the substrate with lens 41a in FIG. 28 are sectional views taken respectively along line B-B' and line C-C' of the plan view.

In the case where the plan-view shape of the through-hole 83a is a circle, the sectional shape of the through-hole 83a naturally is the same independently of the direction of the diameter. In addition to this, the sectional shapes of the outer edge of the lens resin section 82a, the arm section 101, and the leg section 102 are also the same independently of the direction of the diameter.

The through-hole 83a having the stepped shape of FIG. 28 produces an action or effect such that the area of contact of the leg section 102 of the support section 92 of the lens resin section 82 with the side wall of the through-hole 83a can be enlarged, as compared to the through-hole 83a of FIG. 14 which does not include a stepped section 221 in the through-hole 83a. In addition, as a result, an action or effect to increase the adhesion strength between the lens resin section 82 and the side wall of the through-hole 83a, in other words, the adhesion strength between the lens resin section 82a and the support substrate 81W, is produced.

Figure 29:
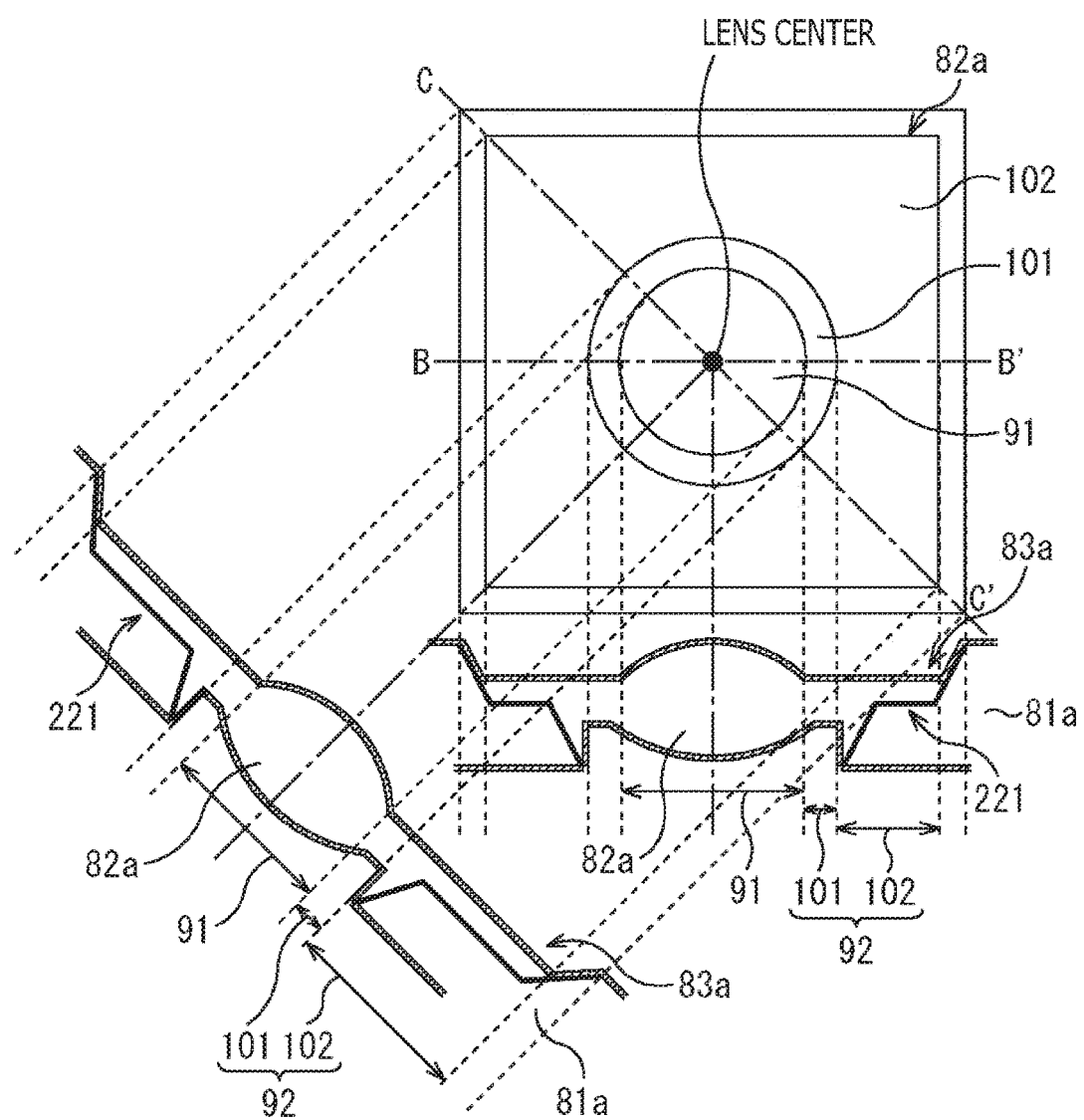
FIG. 29 is a figure for explaining the method of manufacturing the substrate with lens.

FIG. 29 illustrates a plan view and sectional views of the support substrate 81a and the lens resin section 82a of the substrate with lens 41a, in the case where the through-hole 83 includes a stepped section 221 and the plan-view shape of the through-hole 83a is a tetragon.

The sectional views of the substrate with lens 41a in FIG. 29 are sectional views taken respectively along line B-B' and line C-C' of the plan view.

The lens resin section 82 and the through-hole 83 depicted in FIG. 29 have the following structures.

(1) The length of the arm section 101 disposed at the outer periphery of the lens section 91 is the same in a side direction and a diagonal direction of the tetragon.

(2) The length of the leg section 102 disposed on the outside of the arm section 101 and extending to a side wall of the through-hole 83a is such that the length of the leg section 102 in the diagonal direction of the tetragon is longer than the length of the leg section 102 in the side direction.

As illustrated in FIG. 29, the leg section 102 is not in direct contact with the lens section 91, whereas the arm section 101 is in direct contact with the lens section 91.

In the lens resin section 82a of FIG. 29, as in the lens resin section 82a depicted in FIG. 24, the length and thickness of the arm section 101 in direct contact with the lens section 91 are constant over the whole part of the outer periphery of the lens section 91, whereby an action or effect to evenly support the whole part of the lens section 91 by a fixed force may be produced.

Further, with the whole part of the lens section 91 evenly supported by a fixed force, in the case where, for example, stress is exerted over the whole part of the outer periphery of the through-hole 83a from the support substrate 81a surrounding the through-hole 83a, the stress is evenly transmitted to the whole part of the lens section 91, whereby an action or effect to restrain the stress from being unevenly transmitted to only a specific part of the lens section 91 may be produced.

Further, the structure of the through-hole 83a of FIG. 29 produces an action or effect such that the area of contact of the leg section 102 of the support section 92 of the lens resin section 82a with the side wall of the through-hole 83a can be enlarged, as compared to the through-hole 83a of FIG. 24 or the like which does not include a stepped section 221 in the through-hole 83a. As a result, an action or effect to increase the adhesion strength between the lens resin section 82a and the side wall part of the through-hole 83a, in other words, the adhesion strength between the lens resin section 82a and the support substrate 81a is produced.

<11. Direct Joining Between Substrates with Lens>

Next, direct joining between the substrates with lens 41W in a substrate state in which plural substrates with lens 41 are formed will be described below.

Figure 30A:
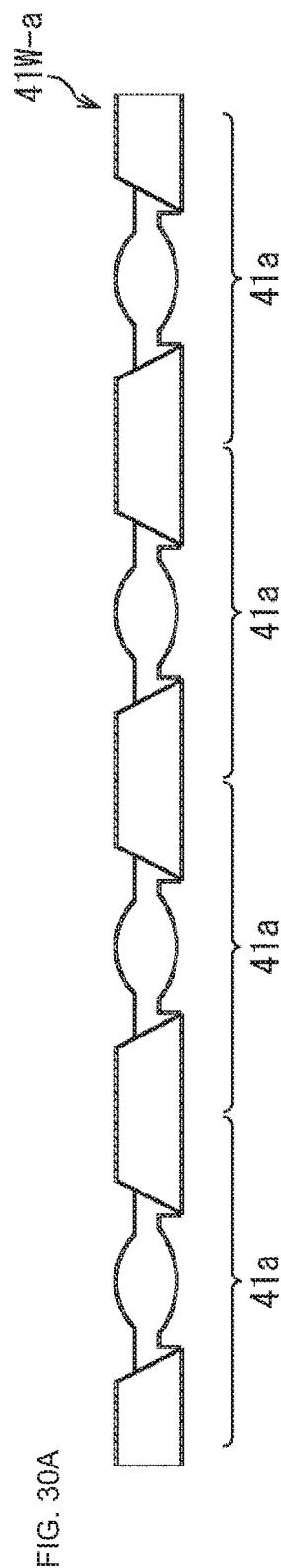
FIGS. 30A and 30B illustrate figures for explaining joining together of substrates with lens in a substrate state.
Figure 30B:
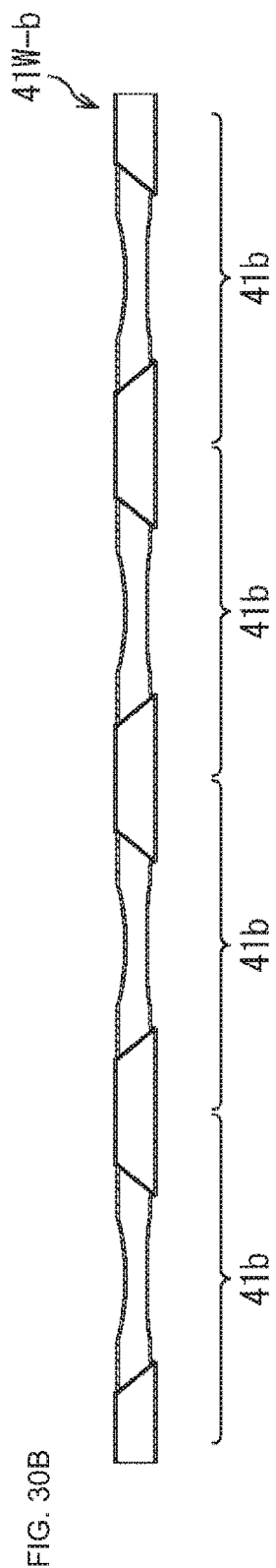

In the following description, as illustrated in FIGS. 30A and 30B, the substrate with lens 41W in the substrate state in which plural substrates with lens 41a are formed will be referred to as substrate with lens 41W-a, and the substrate with lens 41W in the substrate state in which plural substrates with lens 41b are formed will be referred to as substrate with lens 41W-b. The same applies also to other substrates with lens 41c to 41e.

Figure 31A:
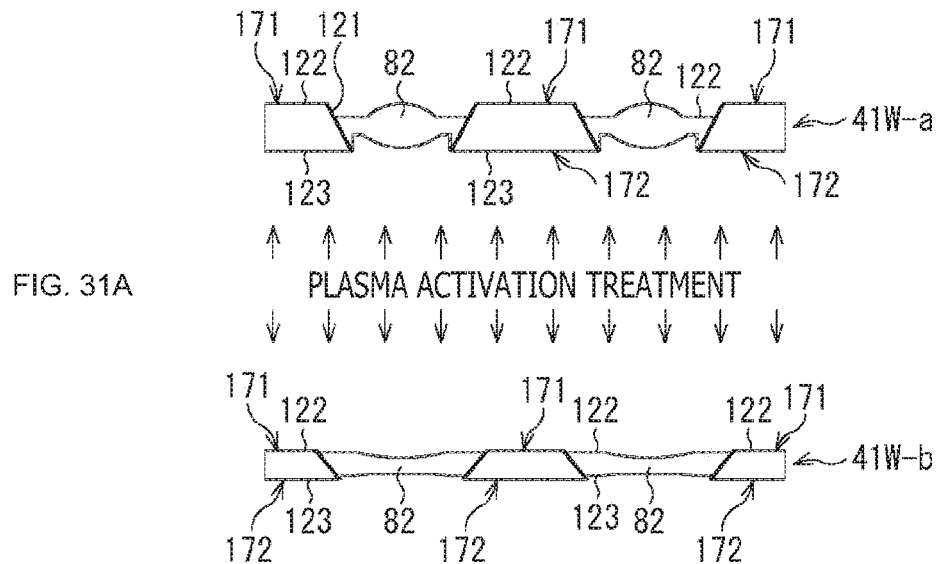
FIGS. 31A and 31B illustrate figures for explaining joining together of substrate with lens in a substrate state.
Figure 31B:
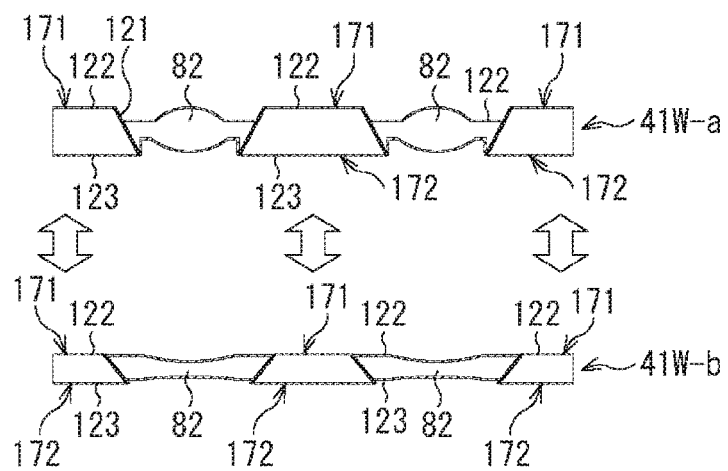

Referring to FIGS. 31A and 31B, direct joining between the substrate with lens 41W-a in the substrate state and the substrate with lens 41W-b in the substrate state will be described.

Note that in FIGS. 31A and 31B, the part of the substrate with lens 41W-b corresponding to each part of the substrate with lens 41W-a will be denoted by the same symbol as for the part of the substrate with lens 41W-a and will be described.

An upper-side surface layer 122 or 125 is formed on the upper-side surfaces of the substrate with lens 41W-a and the substrate with lens 41W-b. A lower-side surface layer 123 or 124 is formed on the lower-side surfaces of the substrate with lens 41W-a and the substrate with lens 41W-b. Then, as illustrated in FIG. 31A, the whole part of the lower-side surface inclusive of the back-side flat section 172 of the substrate with lens 41W-a and the whole part of the upper-side surface inclusive of the front-side flat section 171 of the substrate with lens 41W-b, to be surfaces to be joined of the substrates with lens 41W-a and 41W-b, are subjected to a plasma activation treatment. A gas to be used for the plasma activation treatment may be any gas that is capable of a plasma treatment, such as O2, N2, He, Ar, and H2. It is to be noted, however, that as the gas to be used for the plasma activation treatment, the same gas as the constituent element of the upper-side surface layer 122 and the lower-side surface layer 123 is preferably used, since it is thereby possible to restrain alteration of the film itself of the upper-side surface layer 122 and the lower-side surface layer 123.

Then, as depicted in FIG. 31B, the back-side flat section 172 of the substrate with lens 41W-a and the front-side flat section 171 of the substrate with lens 41W-b which are in an activated surface state are adhered to each other.

By the adhering treatment between the substrates with lens, hydrogen bond is generated between hydrogen of the OH groups at the surface of the lower-side surface layer 123 or 124 of the substrate with lens 41W-a and hydrogen of the OH groups at the surface of the upper-side surface layer 122 or 125 of the substrate with lens 41W-b. As a result, the substrate with lens 41W-a and the substrate with lens 41W-b are fixed. This adhering treatment between the substrates with lens may be carried out under the atmospheric pressure condition.

The substrate with lens 41W-a and the substrate with lens 41W-b subjected to the adhering treatment are subjected to an annealing treatment. As a result, dehydration condensation occurs from the state in which the OH groups are bonded by hydrogen bond, and a covalent bond through oxygen is formed between the lower-side surface layer 123 or 124 of the substrate with lens 41W-a and the upper-side surface layer 122 or 125 of the substrate with lens 41W-b. Alternatively, an element contained in the lower-side surface layer 123 or 124 of the substrate with lens 41W-a and an element contained in the upper-side surface layer 122 or 125 of the substrate with lens 41W-b are put into covalent bond. By these bonds, the two substrates with lens are firmly fixed. That the covalent bond is formed between the lower-side surface layer 123 or 124 of the substrate with lens 41W disposed on the upper side and the upper-side surface layer 122 or 125 of the substrate with lens 41W disposed on the lower side and the two substrates with lens 41W are thereby fixed is referred to herein as direct joining. The method of fixing plural substrates with lens over the whole substrate surface by a resin that is disclosed in PTL 1 has a fear of curing shrinkage or thermal expansion of the resin and the resultant deformation of the lenses. On the other hand, the direct joining of the present technology does not use a resin at the time of fixing plural substrates with lens 41W, and, therefore, produces an action or effect such that the plural substrates with lens 41W can be fixed without causing curing shrinkage or thermal expansion of a resin.

The annealing treatment may also be carried out under the atmospheric pressure condition. The annealing treatment, which involves dehydration condensation, may be carried out at a temperature of equal to or more than 100° C., or equal to or more than 150° C., or equal to or more than 200° C. On the other hand, from the viewpoint of protecting the energy-curing resin 191 for forming the lens resin sections 82 from heat and restraining degassing from the energy-curing resin 191, the annealing treatment may be conducted at a temperature of equal to or less than 400° C., or equal to or less than 350° C., or equal to or less than 300° C.

In a case where the adhering treatment between the substrates with lens 41W or the direct joining treatment between the substrates with lens 41W is conducted under a condition other than the atmospheric pressure condition, when the substrate with lens 41W-a and the substrate with lens 41W-b joined are returned into the atmospheric pressure environment, a pressure difference would be generated between the space between the lens resin section 82 and the lens resin section 82 joined to each other and the outside of the lens resin sections 82. Due to the pressure difference, there is a fear that a pressure may be exerted on the lens resin sections 82 and the lens resin sections 82 may be deformed.

To conduct both the adhering treatment between the substrates with lens 41W and the direct joining treatment between the substrates with lens under the atmospheric pressure condition produces an action or effect such that the deformation of the lens resin sections 82 which is feared in the case where the joining is conducted under a condition other than the atmospheric pressure condition can be avoided.

With the substrates subjected to the plasma activation treatment being directly joined, in other words, with the substrates being plasma joined, it is possible to restrain fluidity or thermal expansion, for example, as in the case of using a resin as an adhesive, and, therefore, it is possible to enhance the positional accuracy at the time of joining the substrate with lens 41W-a and the substrate with lens 41W-b.

As aforementioned, the upper-side surface layer 122 or the lower-side surface layer 123 is formed on the back-side flat section 172 of the substrate with lens 41W-a and the front-side flat section 171 of the substrate with lens 41W-b. The upper-side surface layer 122 and the lower-side surface layer 123 are in such a state that dangling bonds are liable to be formed, due to the plasma activation treatment conducted precedingly. In other words, the lower-side surface layer 123 formed on the back-side flat section 172 of the substrate with lens 41W-a and the upper-side surface layer 122 formed on the front-side flat section 171 of the substrate with lens 41W-b have also a role of increasing the adhesion strength.

In addition, in the case where the upper-side surface layer 122 or the lower-side surface layer 123 includes an oxide film, it is not influenced by the change in film property due to the plasma (O2), and, therefore, there is an effect to restrain corrosion of the lens resin section 82 due to the plasma.

The substrate with lens 41W-a in the substrate state in which plural substrates with lens 41a are formed and the substrate with lens 41W—in the substrate state in which plural substrates with lens 41b are formed, as above-mentioned, are directly joined to each other upon being subjected to a surface activation treatment by plasma, in other words, are joined to each other by plasma joining.

FIGS. 32A, 32B, 32C, 32D, 32E, and 32F depict a first stacking method of stacking five substrates with lens 41a to 41e corresponding to the stacked lens structure 11 of FIG. 13 in a substrate state, by use of the method of joining the substrates with lens 41W in the substrate state described referring to FIGS. 31A and 31B.

Figure 32A:
FIGS. 32A, 32B, 32C, 32D, 32E, and 32F illustrate figures for explaining a first stacking method of stacking five substrates with lens in a substrate state.

First, as illustrated in FIG. 32A, a substrate with lens 41W-e in a substrate state located in the lowermost layer in the stacked lens structure 11 is prepared.

Figure 32B:
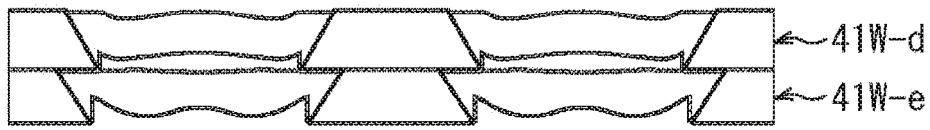

Next, as depicted in FIG. 32B, a substrate with lens 41W-d in a substrate state located in the second layer from the lower side of the stacked lens structure 11 is joined onto the substrate with lens 41W-e in the substrate state.

Figure 32C:
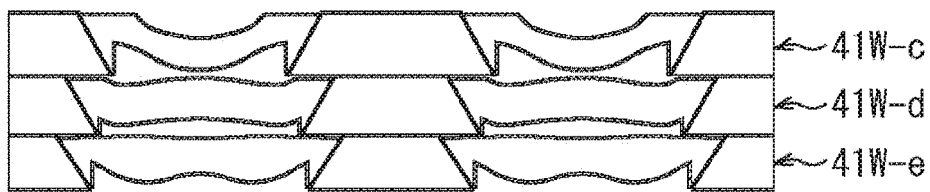

Subsequently, as illustrated in FIG. 32C, a substrate with lens 41W-c in a substrate state located in the third layer from the lower side of the stacked lens structure 11 is joined onto the substrate with lens 41W-d in the substrate state.

Figure 32D:
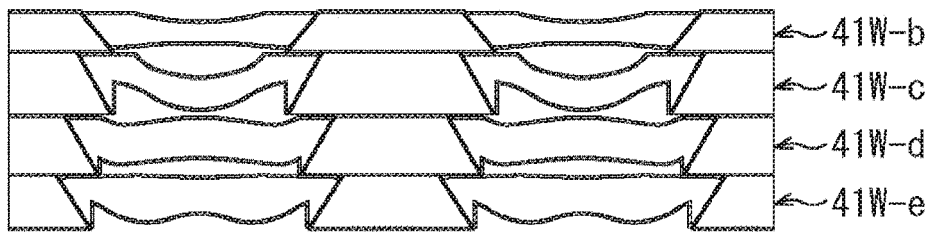

Next, as depicted in FIG. 32D, a substrate with lens 41W-b in a substrate state located in the fourth layer from the lower side of the stacked lens structure 11 is joined onto the substrate with lens 41W-c in the substrate state.

Figure 32E:
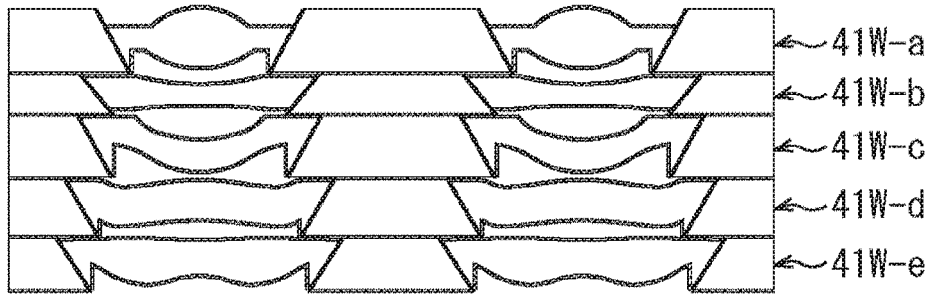

Subsequently, as illustrated in FIG. 32E, a substrate with lens 41W-a in a substrate state located in the fifth layer from the lower side of the stacked lens structure 11 is joined onto the substrate with lens 41W-b in the substrate state.

Figure 32F:
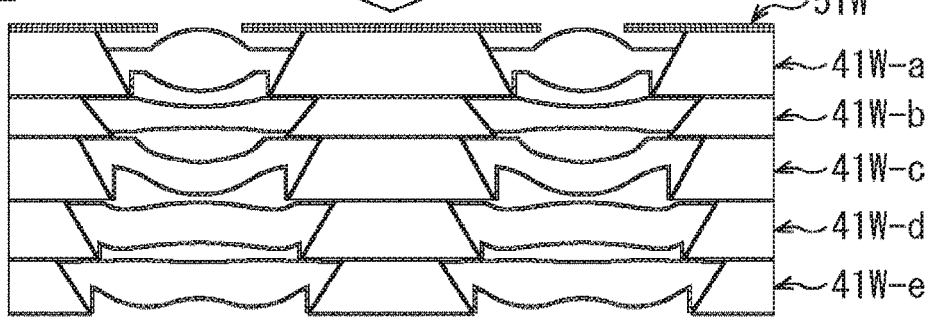

Finally, as depicted in FIG. 32F, a diaphragm plate 51W located in an upper layer of the substrate with lens 41a in the stacked lens structure 11 is joined onto the substrate with lens 41W-a in the substrate state.

In the above-mentioned way, the five substrates with lens 41W-a to 41W-e in the substrate state are sequentially stacked one by one from the substrate with lens 41W in the lower layer in the stacked lens structure 11 to the substrate with lens 41W in the upper layer, whereby a stacked lens structure 11W in a substrate state is obtained.

FIGS. 33A, 33B, 33C, 33D, 33E, and 33F depict a second stacking method of stacking the five substrates with lens 41a to 41e corresponding to the stacked lens structure 11 of FIG. 13, by use of the method of joining the substrates with lens 41W in the substrate state described referring to FIGS. 31A and 31B.

Figure 33A:
FIGS. 33A, 33B, 33C, 33D, 33E, and 33F illustrate figures for explaining a second stacking method of stacking five substrates with lens in a substrate state.

First, as illustrated in FIG. 33A, a diaphragm plate 51W located in an upper layer of a substrate with lens 41a in the stacked lens structure 11 is prepared.

Figure 33B:
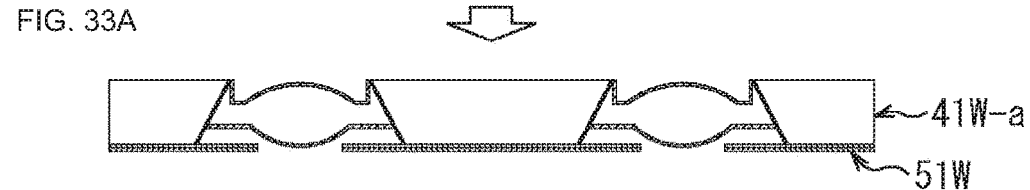

Next, as depicted in FIG. 33B, a substrate with lens 41W-a in a substrate state located in the uppermost layer in the stacked lens structure 11 is joined onto the diaphragm plate 51W after being inverted upside down.

Figure 33C:
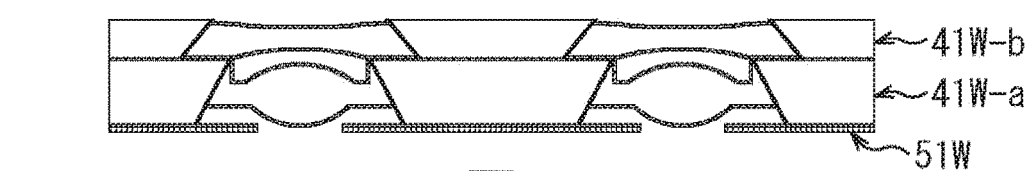

Subsequently, as illustrated in FIG. 33C, a substrate with lens 41W-b in a substrate state located in the second layer from the upper side is joined onto the substrate with lens 41W-a in the substrate state after being inverted upside down.

Figure 33D:
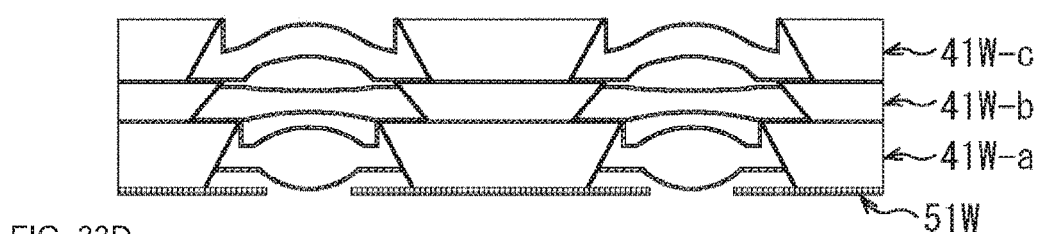

Next, as depicted in FIG. 33D, a substrate with lens 41W-c in a substrate state located in the third layer from the upper side in the stacked lens structure 11 is joined onto the substrate with lens 41W-b in the substrate state after being inverted upside down.

Figure 33E:
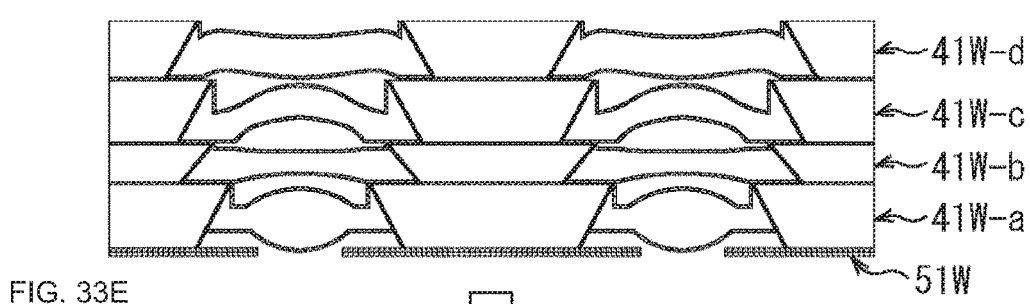

Subsequently, as illustrated in FIG. 33E, a substrate with lens 41W-d in a substrate state located in the fourth layer from the upper side in the stacked lens structure 11 is joined onto the substrate with lens 41W-c in the substrate state after being inverted upside down.

Figure 33F:
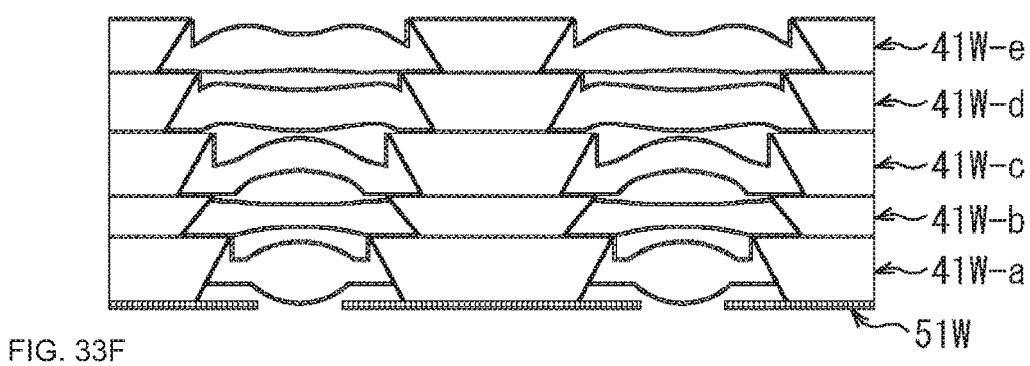

Finally, as depicted in FIG. 33F, a substrate with lens 41W-e in a substrate state located in the fifth layer from the upper side in the stacked lens structure 11 is joined onto the substrate with lens 41W-d in the substrate state after being inverted upside down.

In the above-mentioned manner, the five substrates with lens 41W-a to 41W-e in the substrate state are sequentially stacked one by one from the substrate with lens 41W in the upper layer in the stacked lens structure 11 to the substrate with lens 41W in the lower layer, whereby a stacked lens structure 11W in a substrate state is obtained.

The five substrates with lens 41W-a to 41W-e in the substrate state stacked by the stacking method described referring to FIGS. 32A, 32B, 32C, 32D, 32E, and 32F or FIGS. 33A, 33B, 33C, 33D, 33E, and 33F are individualized in module unit or chip unit by use of a blade or laser or the like, to be stacked lens structures 11 in which the five substrates with lens 41a to 41e are stacked.

<12. Eighth and Ninth Embodiments of Camera Module>

Figure 34:
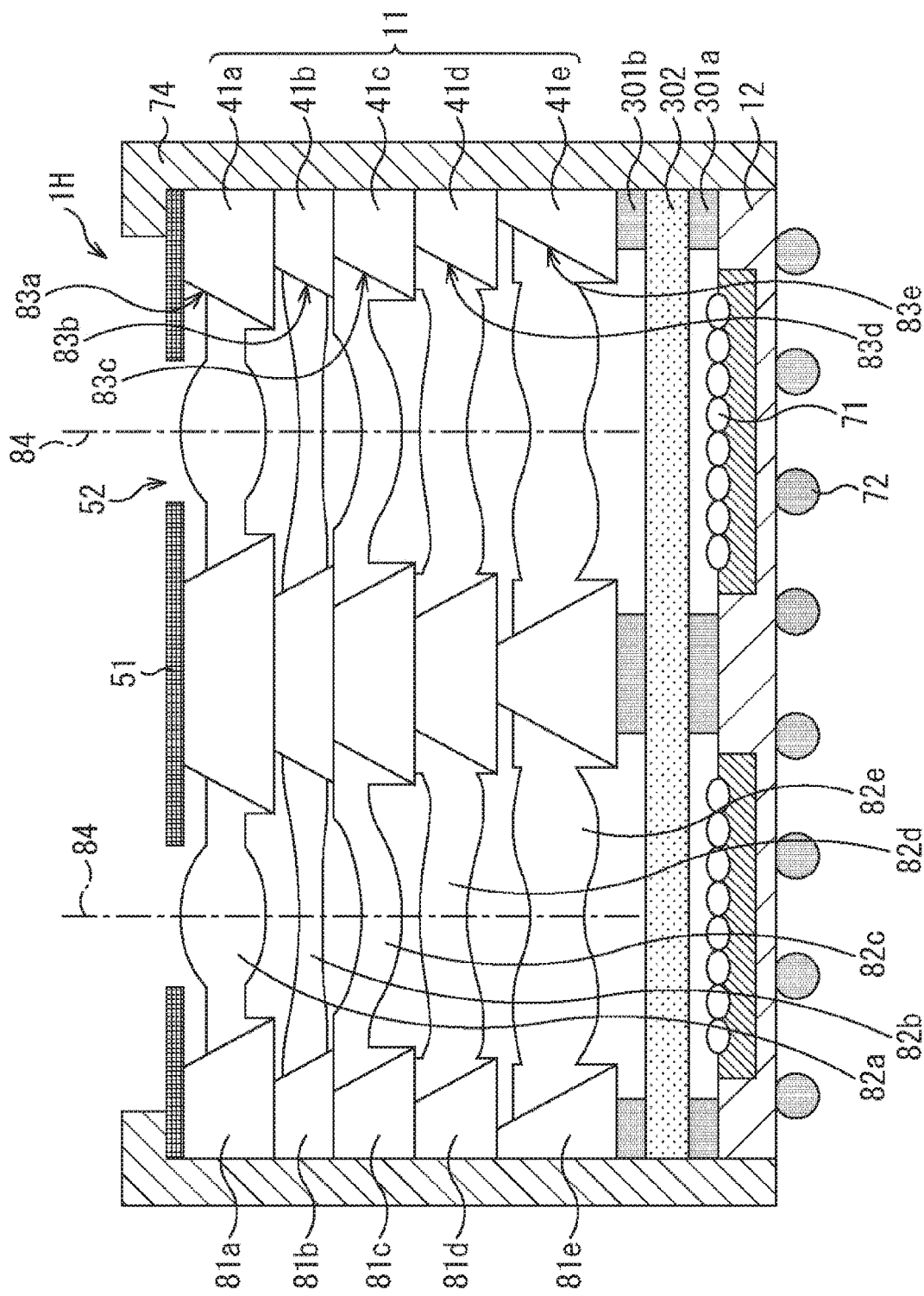
FIG. 34 is a figure depicting an eighth embodiment of the camera module using the stacked lens structure to which the present technology is applied.

FIG. 34 is a figure depicting an eighth embodiment of the camera module using the stacked lens structure to which the present technology is applied.

Figure 35:
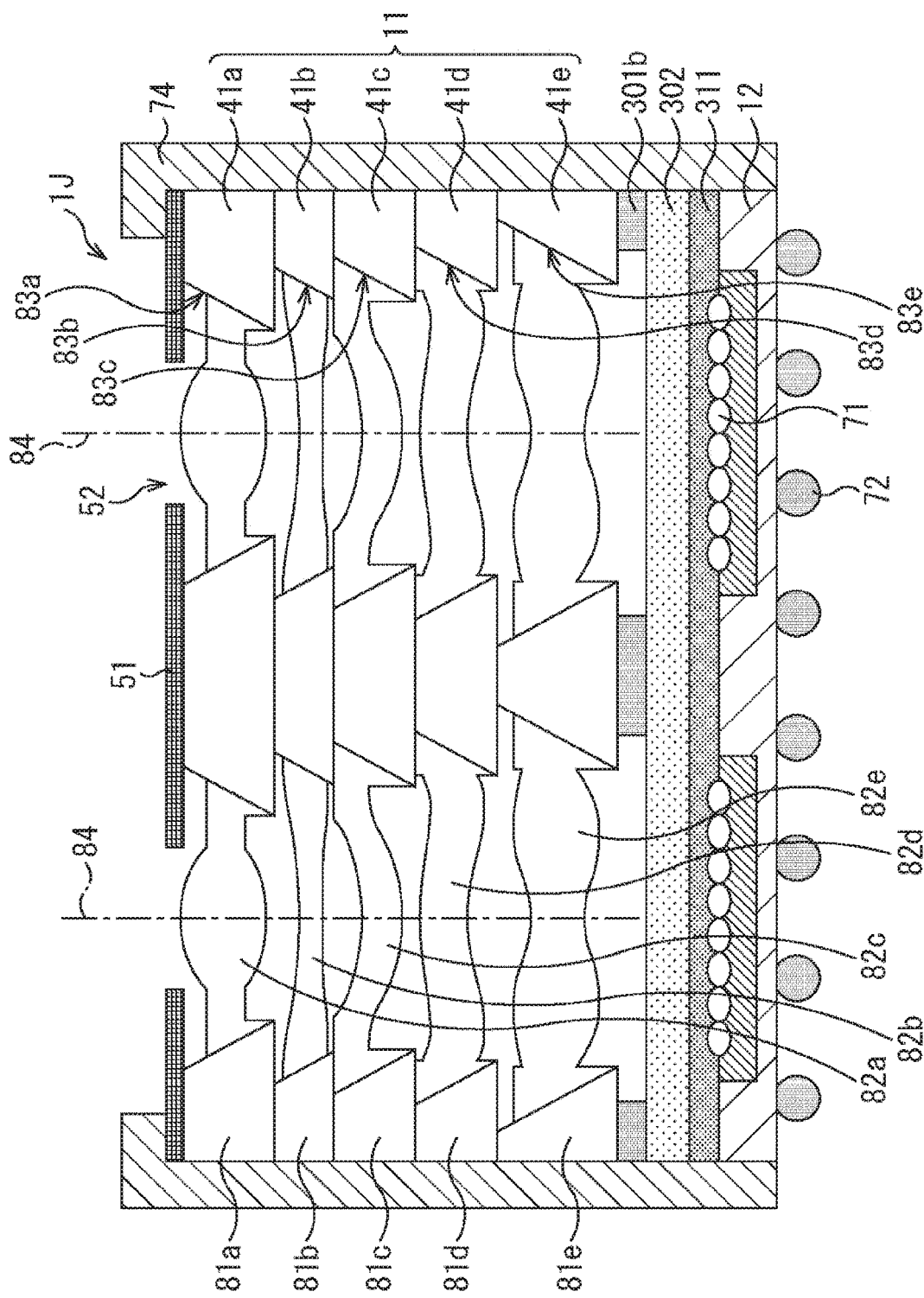
FIG. 35 is a figure depicting a ninth embodiment of the camera module using the stacked lens structure to which the present technology is applied.

FIG. 35 is a figure depicting a ninth embodiment of the camera module using the stacked lens structure to which the present technology is applied.

In the description referring to FIGS. 34 and 35, only the parts different from those of the camera module E depicted in FIG. 13 will be described.

In a camera module 1H of FIG. 34 and a camera module 1J of FIG. 35, the part of the structural material 73 in the camera module E depicted in FIG. 13 is replaced by a different structure.

In the camera module 1H of FIG. 34, the part of the structural material 73 in the camera module 1J is replaced by a structural materials 301a and 301b and a light-transmitting substrate 302.

Specifically, the structural material 301a is disposed at a part on the upper side of the light receiving element 12. Through the structural material 301a, the light receiving element 12 and the light-transmitting substrate 302 are fixed. The structural material 301a is, for example, an epoxy resin.

The structural material 301b is disposed on the upper side of the light-transmitting substrate 302. Through the structural material 301b, the light-transmitting substrate 302 and the stacked lens structure 11 are fixed. The structural material 301b is, for example, an epoxy resin.

On the other hand, in the camera module 1J of FIG. 35, the part of the structural material 301a of the camera module 1H of FIG. 34 is replaced by a light-transmitting resin layer 311.

The resin layer 311 is disposed over the whole surface on the upper side of the light receiving element 12. Through the resin layer 311, the light receiving element 12 and the light-transmitting substrate 302 are fixed. In the case where stress is exerted on the light-transmitting substrate 302 from above the light-transmitting substrate 302, the resin layer 311 disposed over the whole surface on the upper side of the light receiving element 12 produces an action or effect to prevent the stress from being concentratedly applied to a partial region of the light receiving element 12 and to receive the stress by dispersing the stress to the whole surface of the light receiving element 12.

The structural material 301b is disposed on the upper side of the light-transmitting substrate 302. Through the structural material 301b, the light-transmitting substrate 302 and the stacked lens structure 11 are fixed.

The camera module 1H of FIG. 34 and the camera module 1J of FIG. 35 include the light-transmitting substrate 302 on the upper side of the light receiving element 12. The light-transmitting substrate 302 produces an action or effect of, for example, restraining the light receiving element 12 from being damaged during the manufacture of the camera module 1H or 1J.

<13. Tenth Embodiment of Camera Module>

Figure 36:
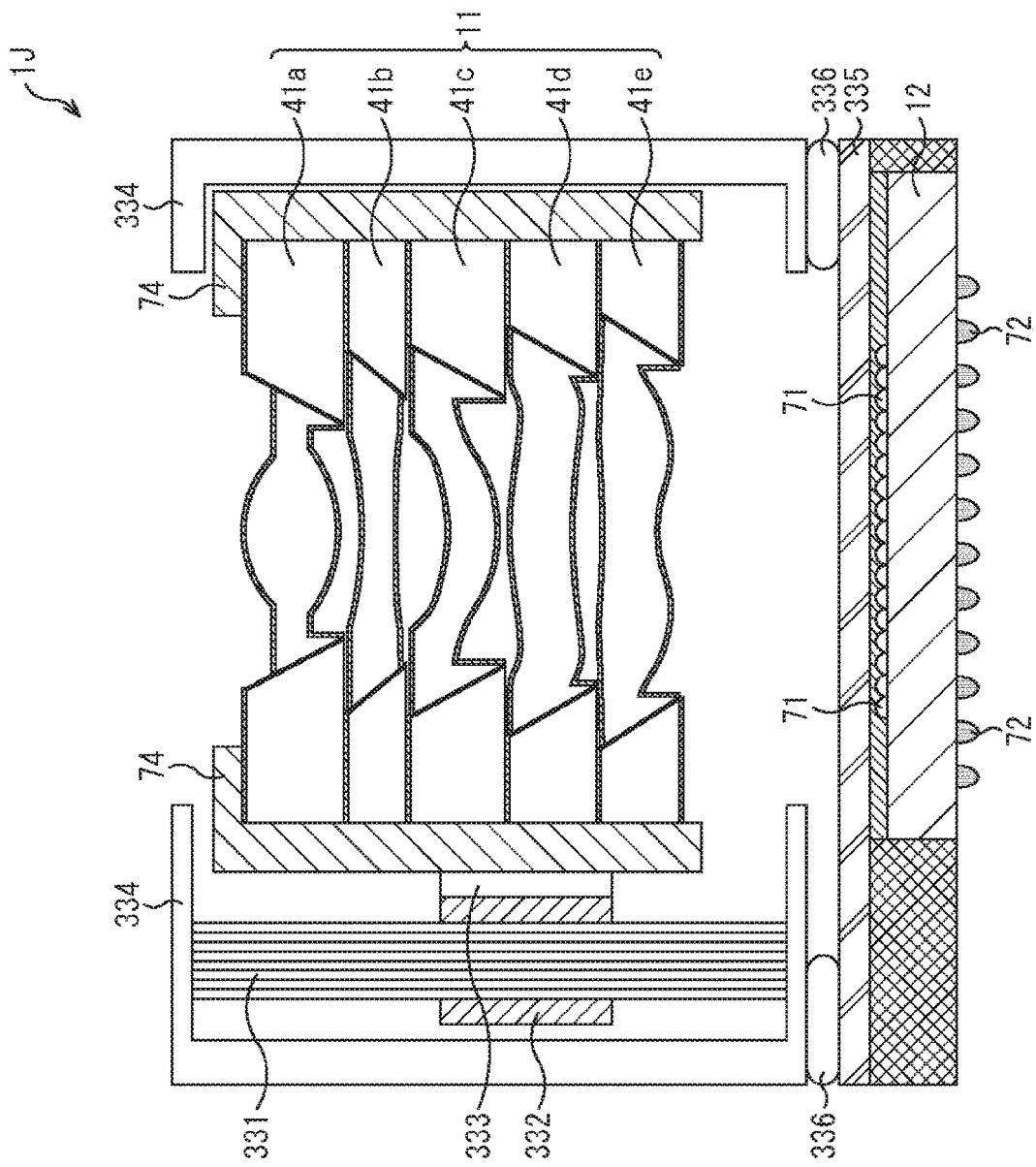
FIG. 36 is a figure depicting a tenth embodiment of the camera module using the stacked lens structure to which the present technology is applied.

FIG. 36 is a figure depicting a tenth embodiment of the camera module using the stacked lens structure to which the present technology is applied.

In a camera module 1J depicted in FIG. 36, the stacked lens structure 11 is accommodated in a lens barrel 74. The lens barrel 74 fixed by a moving member 332 moving along a shaft 331, and a fixing member 333. With the lens barrel 74 moved in an axial direction of the shaft 331 by a driving motor not illustrated, the distance from the stacked lens structure 11 to an imaging surface of the light receiving element 12 is adjusted.

The lens barrel 74, the shaft 331, the moving member 332, and the fixing member 333 are accommodated in a housing 334. A protective substrate 335 is disposed at an upper portion of the light receiving element 12, and the protective substrate 335 and the housing 334 are connected by an adhesive 336.

A mechanism for moving the stacked lens structure 11 produces an action or effect to enable an autofocusing operation when a camera using the camera module 1J picks up an image.

<14. Eleventh Embodiment of Camera Module>

Figure 37:
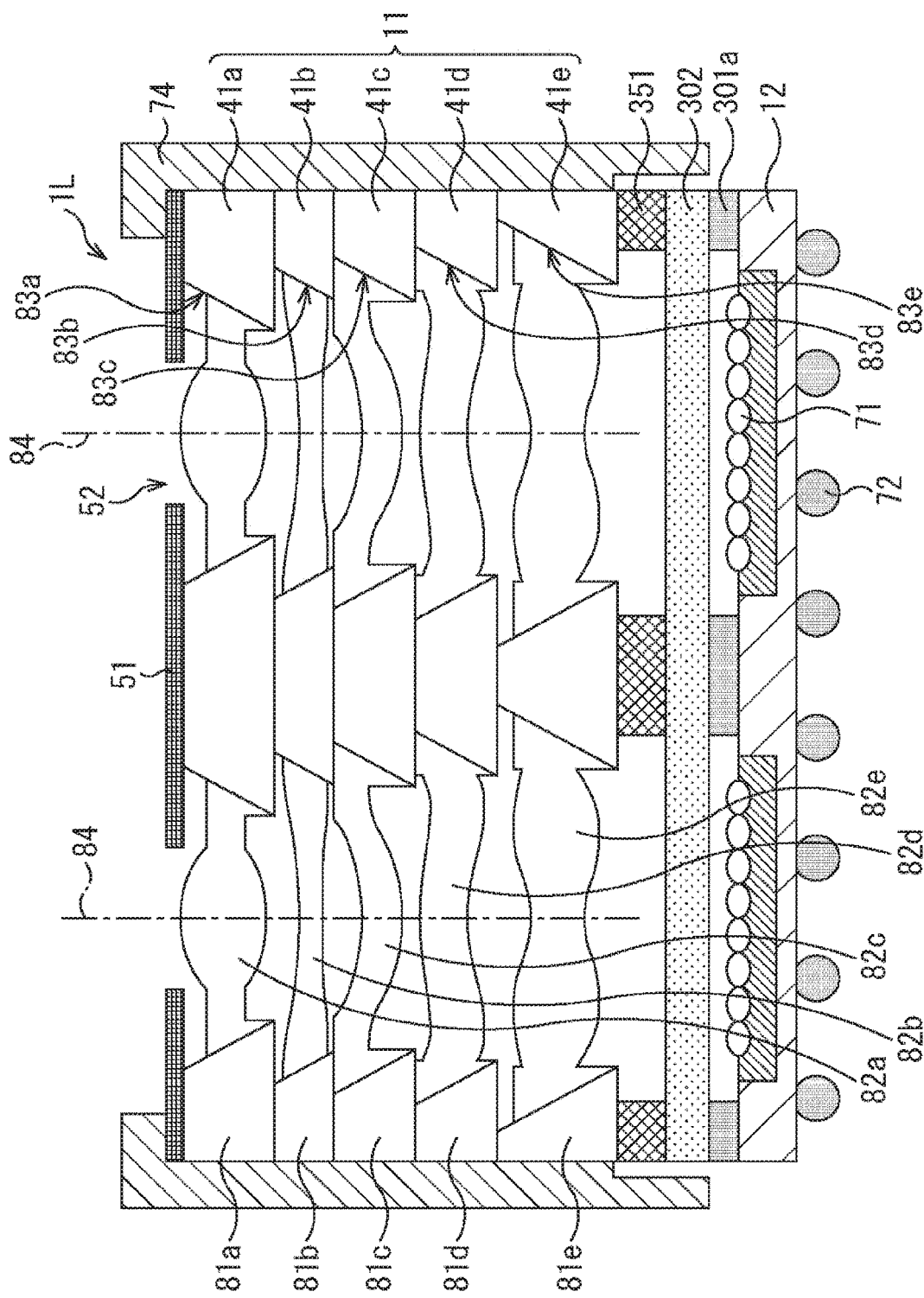
FIG. 37 is a figure depicting an eleventh embodiment of the camera module using the stacked lens structure to which the present technology is applied.

FIG. 37 is a figure depicting an eleventh embodiment of the camera module using the stacked lens structure to which the present technology is applied.

A camera module 1L of FIG. 37 is a camera module in which a focus adjusting mechanism using a piezoelectric element is added.

Specifically, in the camera module 1L, as in the camera module 1H of FIG. 34, a structural material 301a is disposed at a part on the upper side of a light receiving element 12. Through the structural material 301a, the light receiving element 12 and a light-transmitting substrate 302 are fixed. The structural material 301a is, for example, an epoxy resin.

A piezoelectric element 351 is disposed on the upper side of the light-transmitting substrate 302. Through the piezoelectric element 351, the light-transmitting substrate 302 and a stacked lens structure 11 are fixed.

In the camera module 1L, with a voltage impressed on and non-impressed on the piezoelectric element 351 disposed on the lower side of the stacked lens structure 11, the stacked lens structure 11 can be moved in the vertical direction. The means for moving the stacked lens structure 11 is not limited to the piezoelectric element 351, and other device the shape of which is varied by impressing and non-impressing of a voltage thereon may be used. For example, a MEMS device may be used.

The mechanism for moving the stacked lens structure 11 produces an action or effect to enable an autofocusing operation when a camera using the camera module 1L picks up an image.

<15. Effect of Present Structure in Comparison to Other Structures>

The stacked lens structure 11 is a structure (hereinafter referred to as present structure) in which the substrates with lens 41 are fixed by direct joining to one another. An action and effect of the present structure will be described in comparison to other structures of the substrates with lens formed with the lenses.

Comparative Structure Example 1

Figure 38:
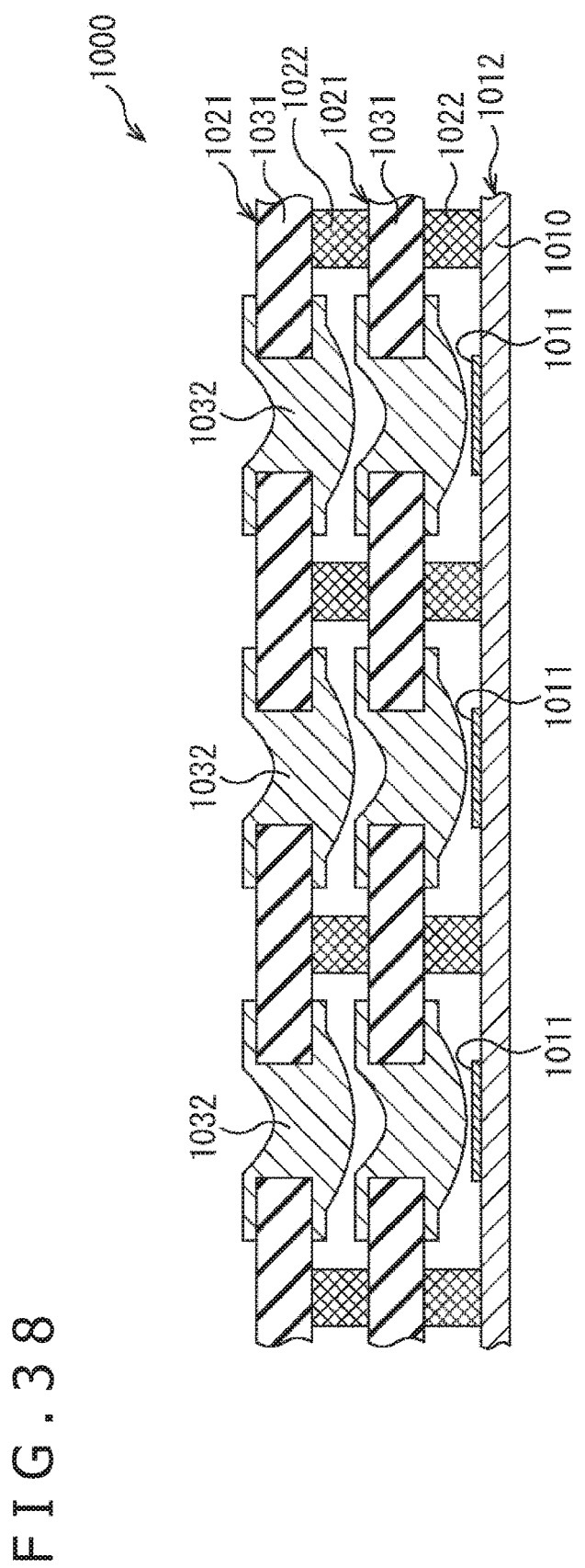
FIG. 38 is a sectional view of a wafer level stacked structure as comparative structure example 1.

FIG. 38 depicts a first substrate structure (hereinafter referred to as Comparative Structure Example 1) for comparison with the present structure, and is a sectional view of a wafer level stacked structure disclosed as FIG. 14B in JP 2011-138089A (hereinafter referred to Comparative Literature 1).

A wafer level stacked structure 1000 depicted in FIG. 38 has a structure in which plural image sensors 1011 are arranged on a wafer substrate 1010 to form a sensor array substrate 1012, and two lens array substrates 1021 are stacked over the sensor array substrate 1012 with columnar spacers 1022 therebetween. Each lens array substrate 1021 includes a substrate with lens 1031, and lenses 1032 formed in plural through-holes formed in the substrate with lens 1031.

Comparative Structure Example 2

Figure 39:
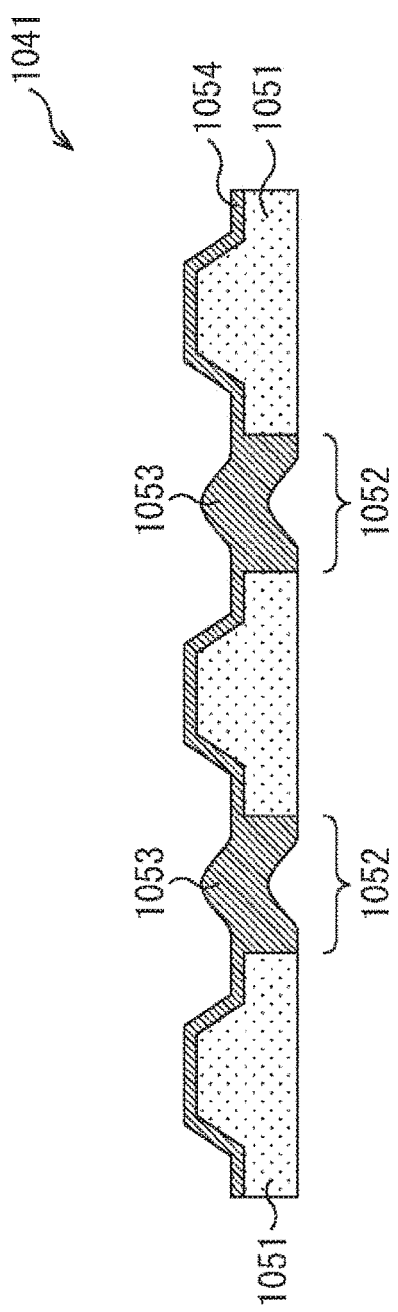
FIG. 39 is a sectional view of a lens array substrate as comparative structure example 2.

FIG. 39 depicts a second substrate structure (hereinafter referred to as Comparative Structure Example 2) for comparison with the present structure, and is a sectional view of a lens array substrate disclosed as FIG. 5A in JP 2009-279790A (hereinafter referred to Comparative Literature 2).

In a lens array substrate 1041 depicted in FIG. 39, lenses 1053 are provided individually in plural through-holes 1052 provided in a plate-shaped substrate 1051. Each lens 1053 includes a resin (energy-curing resin) 1054, and the resin 1054 is formed also on an upper surface of the substrate 1051.

Figure 40A:
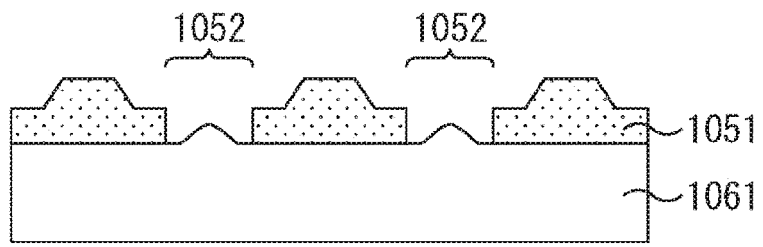
FIGS. 40A, 40B, and 40C illustrate figures for explaining a method of manufacturing the lens array substrate of FIG. 39.
Figure 40B:
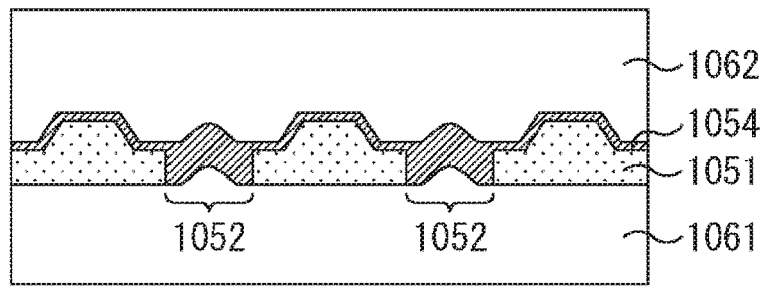
Figure 40C:
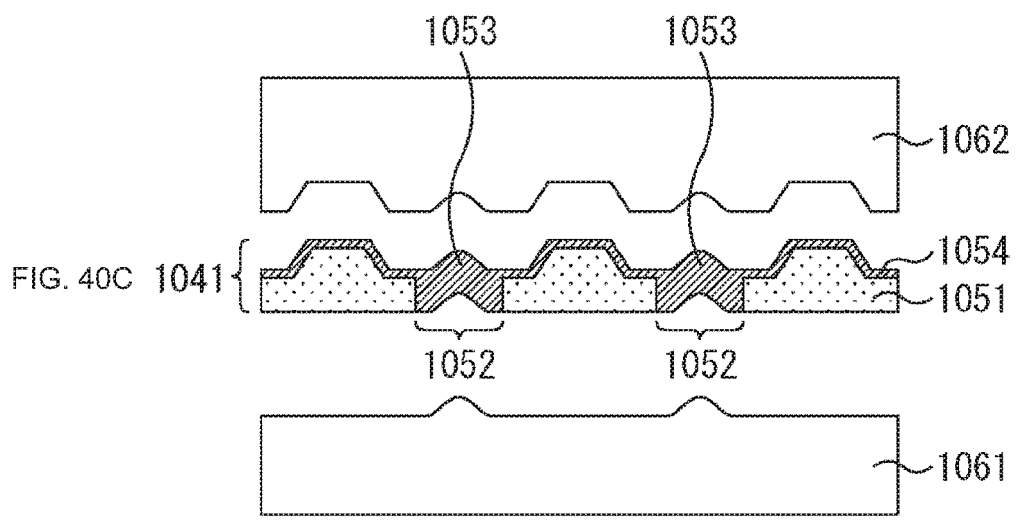

Referring to FIGS. 40A, 40B, and 40C, a method of manufacturing the lens array substrate 1041 of FIG. 39 will be described briefly.

FIG. 40A depicts a state in which the substrate 1051 formed with plural through-holes 1052 is placed on a lower mold 1061. The lower mold 1061 is a mold for pressing the resin 1054 from the lower side toward the upper side in a later step.

FIG. 40B depicts a state in which after the resin 1054 is applied to the inside of the plural through-holes 1052 and an upper surface of the substrate 1051, an upper mold 1062 is disposed on the substrate 1051, and pressure molding is being conducted by use of the upper mold 1062 and the lower mold 1061. The upper mold 1062 is a mold for pressing the resin 1054 from the upper side toward the lower side. Curing of the resin 1054 is performed in the state depicted in FIG. 40B.

FIG. 40C depicts a state in which after the resin 1054 is cured, the upper mold 1062 and the lower mold 1061 have been released, and the lens array substrate 1041 has been completed.

The lens array substrate 1041 is characterized in that (1) the resin 1054 formed at the positions of the through-holes 1052 of the substrate 1051 becomes lenses 1053, the lenses 1053 being formed in plurality in the substrate 1051, and (2) a thin layer of the resin 1054 is formed over the whole part of an upper-side surface of the substrate 1051 located between the plural lenses 1053.

In the case of forming the structural body in which the plural lens array substrates 1041 are stacked, the thin layer of the resin 1054 formed over the whole part of the upper-side surface of the substrate 1051 produces an action or effect as an adhesive for adhering the substrates to one another.

In addition, in the case of forming the structural body in which the plural lens array substrates 1041 are stacked, the area of adhesion between the substrates can be enlarged, and the substrates can be adhered with a strong force, as compared to the wafer level stacked structure 1000 of FIG. 38 depicted as Comparative Structure Example 1.

<Action Produced by Resin in Comparative Structure Example 2>

In Comparative Literature 2 disclosing the lens array substrate 1041 of FIG. 39 which is Comparative Structure Example 2, the following is disclosed as an action of the resin 1054 to be lenses 1053.

In Comparative Structure Example 2, an energy-curing resin is used as the resin 1054. As an example of the energy-curing resin, a light-curing resin is used. In the case where a light-curing resin is used as the energy-curing resin, when the resin 1054 is irradiated with UV light, the resin 1054 is cured. By the curing, the resin 1054 undergoes curing shrinkage.

However, according to the structure of the lens array substrate 1041 of FIG. 39, the presence of the substrate 1051 between the plural lenses 1053 ensures that even when curing shrinkage of the resin 1054 occurs, variation in the distance between the lenses 1053 due to the curing shrinkage of the resin 1054 can be cut off. As a result, warping of the lens array substrate 1041 in which the plural lenses 1053 are disposed can be restrained.

Comparative Structure Example 3

FIG. 41 depicts a third substrate structure (hereinafter referred to as Comparative Structure Example 3) for comparison with the present structure, and is a sectional view of the lens array substrate disclosed as FIG. 1 in JP 2010-256563A (hereinafter referred to as Comparative Literature 3).

In a lens array substrate 1081 depicted in FIG. 41, lenses 1093 are provided individually in plural through-holes 1092 provided in a plate-shaped substrate 1091. Each lens 1093 includes a resin (energy-curing resin) 1094, and the resin 1094 is formed also on an upper surface of the substrate 1091 not provided with the through-holes 1092.

Figure 42A:
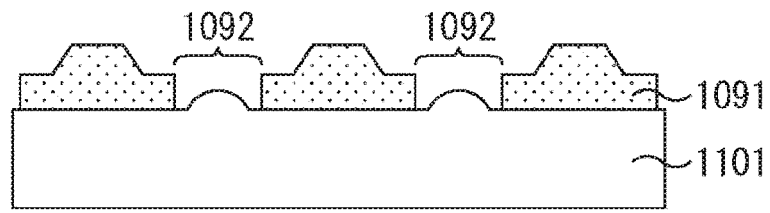
FIGS. 42A, 42B, and 42C illustrate figures for explaining a method of manufacturing the lens array substrate of FIG. 41.
Figure 42B:
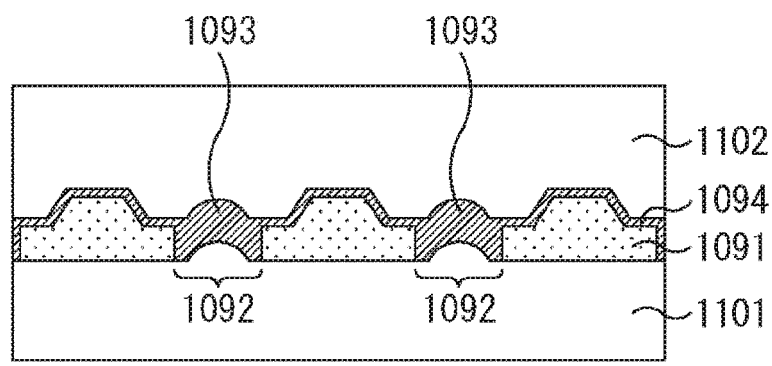
Figure 42C:
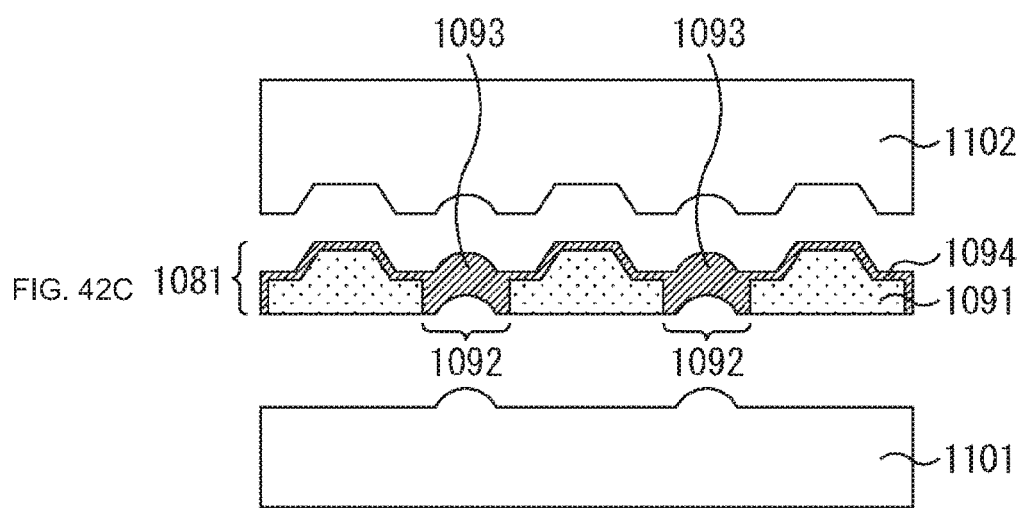

Referring to FIGS. 42A, 42B, and 42C, a method of manufacturing the lens array substrate 1081 of FIG. 41 will be described.

FIG. 42A depicts a state in which the substrate 1091 formed with the plural through-holes 1092 is placed on a lower mold 1101. The lower mold 1101 is a mold for pressing the resin 1094 from the lower side toward the upper side in a later step.

FIG. 42B depicts a state in which after the resin 1094 is applied to the inside of the plural through-holes 1092 and an upper surface of the substrate 1091, an upper mold 1102 is placed on the substrate 1091, and pressure molding is being conducted by use of the upper mold 1102 and the lower mold 1101. The upper mold 1102 is a mold for pressing the resin 1094 from the upper side toward the lower side. Curing of the resin 1094 is conducted in a state depicted in FIG. 42B.

FIG. 42C depicts a state in which after the resin 1094 is cured, the upper mold 1102 and the lower mold 1101 have been released, and the lens array substrate 1081 has been completed.

The lens array substrate 1081 is characterized in that (1) the resin 1094 formed at the positions of the through-holes 1092 of the substrate 1091 becomes lenses 1093, the lenses 1093 being formed in plurality in the substrate 1091, and (2) a thin layer of the resin 1094 is formed over the whole part of the upper-side surface of the substrate 1091 located between the plural lenses 1093.

<Action Produced by Resin in Comparative Structure Example 3>

In Comparative Literature 3 disclosing the lens array substrate 1081 of FIG. 41 which is Comparative Structure Example 3, the following is disclosed as an action of the resin 1094 to be the lenses 1093.

In Comparative Structure Example 3, an energy-curing resin is used as the resin 1094. As an example of the energy-curing resin, a light-curing resin is used. In the case where a light-curing resin is used as the energy-curing resin, when the resin 1094 is irradiated with UV light, the resin 1094 is cured. By the curing, the resin 1094 undergoes curing shrinkage.

However, according to the structure of the lens array substrate 1081 of FIG. 41, the presence of the substrate 1091 between the plural lenses 1093 ensures that even when curing shrinkage of the resin 1094 occurs, variation in the distance between the lenses 1093 due to the curing shrinkage of the resin 1094 can be cut off. As a result, warping of the lens array substrate 1081 in which the plural lenses 1093 are disposed can be restrained.

As above-mentioned, in Comparative Literature 2 and Comparative Literature 3, it is disclosed that curing shrinkage occurs when the light-curing resin is cured. Note that that curing shrinkage occurs when the light-curing resin is cured is disclosed not only in Comparative Literature 2 and Comparative Literature 3 but also in, for example, JP 2013-1091A and the like.

In addition, the problem in which the curing shrinkage of the resin occurs when the resin is molded in the shape of lenses and the resin after molding is cured is not limited to the light-curing resin. For example, also in the thermosetting resin which is a kind of an energy-curing resin like the light-curing resin, the curing shrinkage at the time of curing is the problem. This is disclosed also in, for example, Comparative Literature 1, Comparative Literature 3, JP 2010-204631A and the like.

Comparative Structure Example 4

Figure 43:
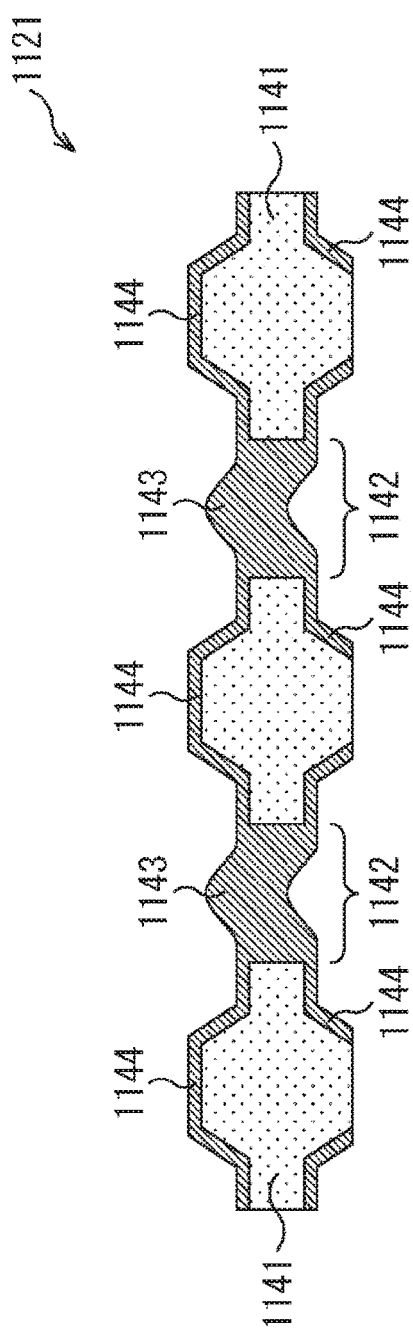
FIG. 43 is a sectional view of a lens array substrate as comparative structure example 4.

FIG. 43 depicts a fourth substrate structure (hereinafter referred to as Comparative Structure Example 4) for comparison with the present structure, and is a sectional view of the lens array substrate disclosed as FIG. 6 in Comparative Literature 2 mentioned above.

A lens array substrate 1121 of FIG. 43 differs from the lens array substrate 1041 depicted in FIG. 39 in that the shape of the substrate 1141 other than the parts of the through-holes 1042 is a shape of projecting not only to the upper side but also to the lower side and that the resin 1144 is formed also on a part of the lower-side surface of the substrate 1141. The other configurations of the lens array substrate 1121 are similar to those of the lens array substrate 1041 depicted in FIG. 39.

Figure 44:
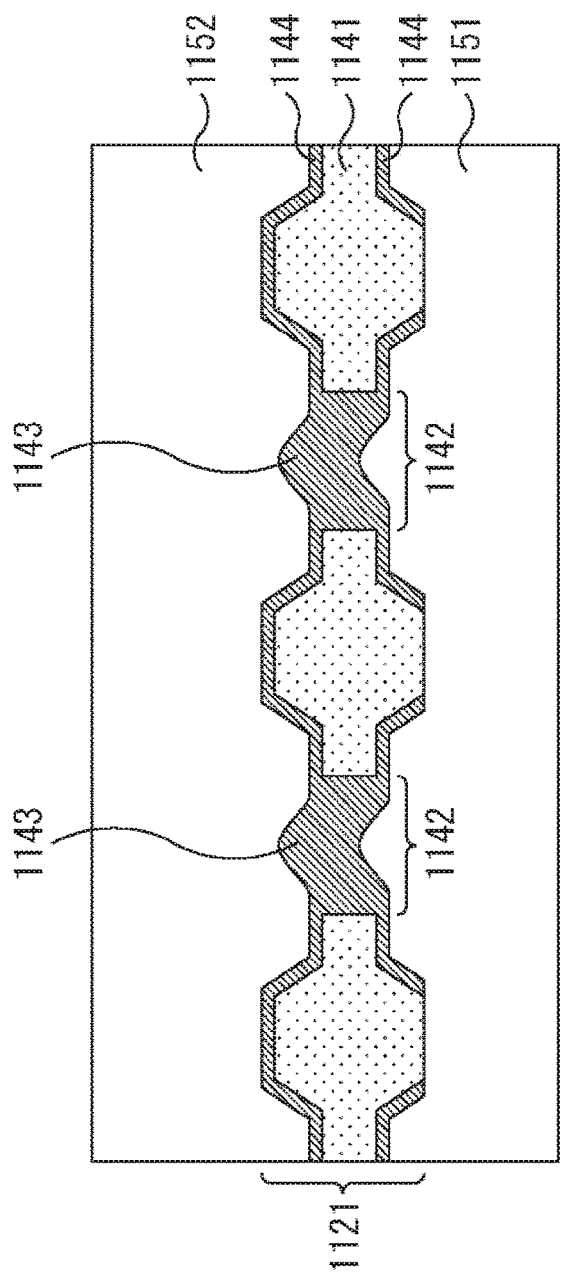
FIG. 44 is a figure for explaining a method of manufacturing the lens array substrate of FIG. 43.

FIG. 44 is a figure for explaining a method of manufacturing the lens array substrate 1121 of FIG. 43, and is a figure corresponding to FIG. 40B.

FIG. 44 depicts a state in which after the resin 1144 is applied to the inside of the plural through-holes 1142 and an upper surface of the substrate 1141, pressure molding is being conducted by use of an upper mold 1152 and a lower mold 1151. The resin 1144 is injected also into the space between a lower surface of the substrate 1141 and the lower mold 1151. Curing of the resin 1144 is conducted in a state depicted in FIG. 44.

The lens array substrate 1121 is characterized in that (1) the resin 1144 formed at the positions of the through-holes 1142 of the substrate 1141 becomes the lenses 1143, the lenses 1143 being formed in plurality in the substrate 1141, and (2) not only a thin layer of the resin 1144 is formed over the whole part of the upper-side surface of the substrate 1141 located between the plural lenses 1143 but also a thin layer of the resin 1144 is formed also on a part of the lower-side surface of the substrate 1141.

<Action Produced by Resin in Comparative Structure Example 4>

In Comparative Literature 2 disclosing the lens array substrate 1121 of FIG. 43 which is Comparative Structure Example 4, the following is disclosed as an action of the resin 1144 to be the lenses 1143.

In the lens array substrate 1121 of FIG. 43 which is Comparative Structure Example 4, also, a light-curing resin as an example of an energy-curing resin is used as the resin 1144. When the resin 1144 is irradiated with UV light, the resin 1144 is cured. By the curing, the resin 1144 undergoes curing shrinkage, as in Comparative Structure Examples 2 and 3.

However, in the lens array substrate 1121 of Comparative Structure Example 4, a thin layer of the resin 1144 is formed not only over the whole part of the upper-side surface of the substrate 1141 located between the plural lenses 1143 but also in a fixed region of the lower-side surface of the substrate 1141.

With the structure in which the resin 1144 is thus formed on both the upper-side surface and the lower-side surface of the substrate 1141, the directions of warping of the whole body of the lens array substrate 1121 can cancel each other.

On the other hand, in the lens array substrate 1041 depicted in FIG. 39 as Comparative Structure Example 2, a thin layer of the resin 1054 is formed over the whole part of the upper-side surface of the substrate 1051 located between the plural lenses 1053, but a thin layer of the resin 1054 is not at all formed on the lower-side surface of the substrate 1051.

Therefore, in the lens array substrate 1121 of FIG. 43, a lens array substrate with a reduce warp amount can be provided, as compared to the lens array substrate 1041 of FIG. 39.

Comparative Structure Example 5

Figure 45:
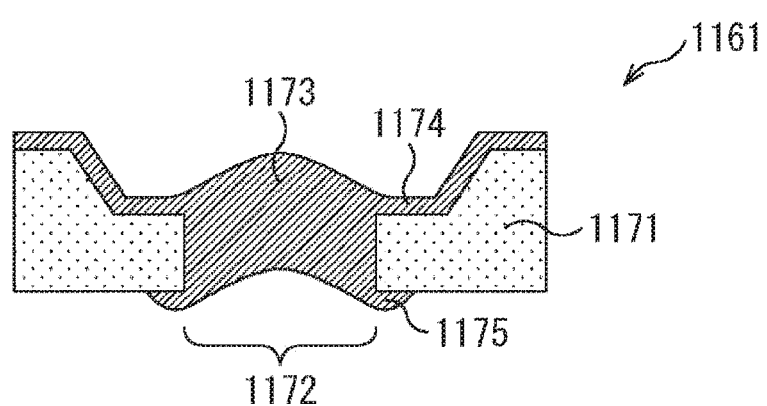
FIG. 45 is a sectional view of a lens array substrate as comparative structure example 5.

FIG. 45 depicts a fifth substrate structure (hereinafter referred to as Comparative Structure Example 5) for comparison with the present structure, and is a sectional view of the lens array substrate disclosed as FIGS. 9A, 9B, 9C, 9D, 9E, 9F, 9G, and 9H in Comparative Literature 2 mentioned above.

A lens array substrate 1161 of FIG. 45 differs from the lens array substrate 1041 depicted in FIG. 39 in that a resin protrusion region 1175 is present on the substrate back surface in the vicinity of each through-hole 1172 formed in the substrate 1171. The other configurations of the lens array substrate 1161 are similar to those of the lens array substrate 1041 depicted in FIG. 39.

Note that the lens array substrate 1161 of FIG. 45 is depicted in a state after being individualized.

The lens array substrate 1161 is characterized in that (1) the resin 1174 formed at the positions of the through-holes 1172 in the substrate 1171 becomes lenses 1173, the lenses 1173 being formed in plurality in the substrate 1171, and (2) not only a thin layer of the resin 1174 is formed over the whole part of the upper-side surface of the substrate 1171 located between the plural lenses 1173 but also a thin layer of the resin 1174 is formed also on a part of the lower-side surface of the substrate 1171.

<Action Produced by Resin in Comparative Structure Example 5>

In Comparative Literature 2 disclosing the lens array substrate 1161 of FIG. 45 which is Comparative Structure Example 5, the following is disclosed as an action of the resin 1174 to be the lenses 1173.

In the lens array substrate 1161 of FIG. 45 which is Comparative Structure Example 5, also, a light-curing resin as an example of an energy-curing resin is used as the resin 1174. When the resin 1174 is irradiated with UV light, the resin 1174 is cured. By the curing, the resin 1174 undergoes curing shrinkage, as in Comparative Structure Examples 2 and 3.

However, in the lens array substrate 1171 of Comparative Structure Example 5, a thin layer of the resin 1174 (resin protrusion region 1175) is formed not only over the whole part of the upper-side surface of the substrate 1171 located between the plural lenses 1173 but also in a fixed region of the lower-side surface of the substrate 1171. As a result, the directions of warping of the whole body of the lens array substrate 1171 can cancel each other, and a lens array substrate with a reduce warp amount can be provided.

<Comparison of Actions Produced by Resins in Comparative Structure Examples 2 to 5>

The actions produced by the resins in Comparative Structure Examples 2 to 5 are summarized as follows.

(1) In the case where the layer of the resin is disposed over the whole part of the upper surface of the lens array substrate as in Comparative Structure Examples 2 and 3, warping would be generated in the substrate in which the plural lenses are disposed.

Figure 46A:
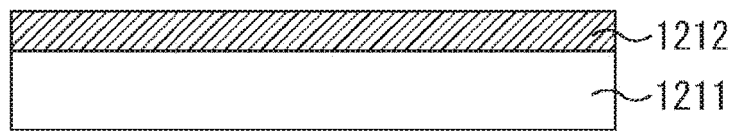
FIGS. 46A, 46B, and 46C illustrate figures for explaining an action produced by a resin to be a lens.
Figure 46B:
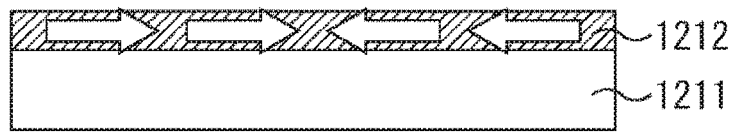
Figure 46C:
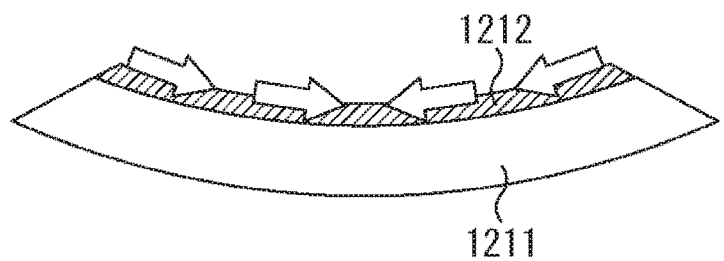

FIGS. 46A, 46B, and 46C illustrate figures schematically representing a structure in which the layer of the resin is disposed over the whole part of the upper surface of the lens array substrate as in Comparative Structure Examples 2 and 3, and for explaining an action produced by the resin to be lenses.

In a layer of a light-curing resin 1212 disposed on the upper surface of the lens array substrate 1211 (illustration of the lenses and the through-holes is omitted) as depicted in FIGS. 46A and 46B, curing shrinkage is generated by irradiation with UV light for curing. As a result, in the layer of the light-curing resin 1212, a force in the shrinking direction due to the light-curing resin 1212 is generated.

On the other hand, the lens array substrate 1211 itself neither shrinks nor expands even when irradiated with UV light. In other words, a force due to the substrate is not generated in the lens array substrate 1211 itself. As a result, the lens array substrate 1211 would be warped in a shape convex to the lower side as depicted in FIG. 46C.

(2) However, in the case where the layer of the resin is disposed on both the upper surface and the lower surface of the lens array substrate as in Comparative Structure Examples 4 and 5, the directions of warping of the lens array substrate cancel each other, so that the warp amount of the lens array substrate can be reduced more than in Comparative Structure Examples 2 and 3.

Figure 47A:
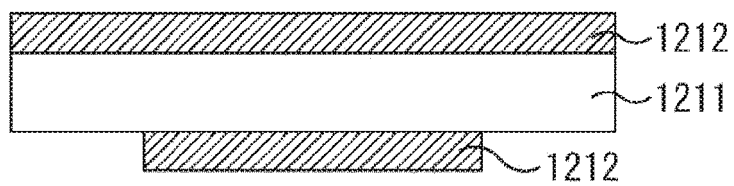
FIGS. 47A, 47B, and 47C illustrate figures for explaining an action produced by the resin to be the lens.
Figure 47B:
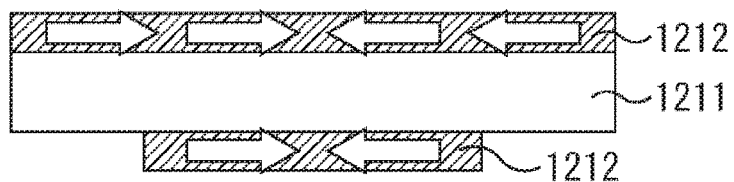
Figure 47C:
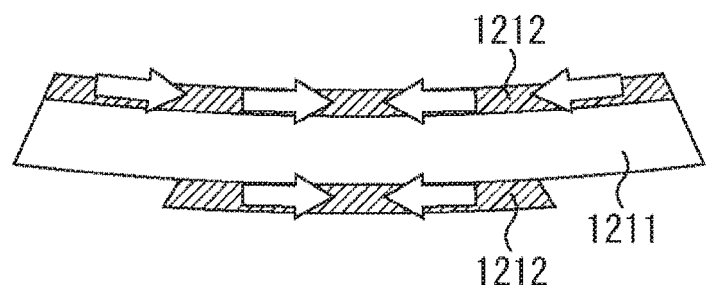

FIGS. 47A, 47B, and 47C illustrate figures schematically representing a structure in which the layer of the resin is disposed on both the upper surface and the lower surface of the lens array substrate as in Comparative Structure Examples 4 and 5, and for explaining an action produced by the resin to be lenses.

As depicted in FIGS. 47A and 47B, in the layer of the light-curing resin 1212 disposed on the upper surface of the lens array substrate 1211, curing shrinkage occurs due to irradiation with UV light for curing. As a result, in the layer of the light-curing resin 1212 disposed on the upper surface of the lens array substrate 1211, a force in a shrinking direction due to the light-curing resin 1212 is generated. Therefore, on the upper surface side of the lens array substrate 1211, a force for warping the lens array substrate 1211 into a shape convex to the lower side acts.

On the other hand, the lens array substrate 1211 itself neither shrinks nor expands even when irradiated with UV light. In other words, a force due to the substrate is not generated in the lens array substrate 1211 itself.

On the other hand, in the layer of the light-curing resin 1212 disposed on the lower surface of the lens array substrate 1211, curing shrinkage occurs due to irradiation with UV light for curing. As a result, in the layer of the light-curing resin 1212 disposed on the lower surface of the lens array substrate 1211, a force in a shrinking direction due to the light-curing resin 1212 is generated. Therefore, on the lower surface side of the lens array substrate 1211, a force for warping the lens array substrate 1211 into a shape convex to the upper side acts.

The force for warping the lens array substrate 1211 into a shape convex to the lower side, on the upper surface side of the lens array substrate 1211, and the force for warping the lens array substrate 1211 into a shape convex to the upper side, on the lower surface side of the lens array substrate 1211, act in such a manner as to cancel each other.

As a result, as depicted in FIG. 47C, the warp amounts of the lens array substrate 1211 in Comparative structure Examples 4 and 5 are reduced as compared to those in Comparative Structure Examples 2 and 3 depicted in FIG. 46C.

In this way, the force for warping the lens array substrate and the warp amount of the lens array substrate are influenced by the correlation between (1) the direction and magnitude of the force acting on the lens array substrate at the upper surface of the lens array substrate, and (2) the direction and magnitude of the force acting on the lens array substrate at the lower surface of the lens array substrate.

Comparative Structure Example 6

Figure 48A:
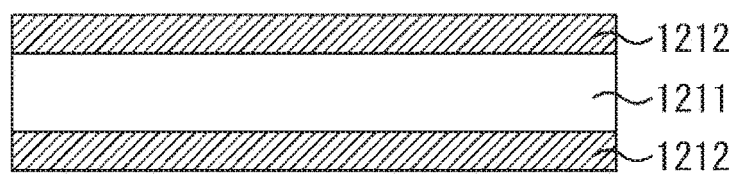
FIGS. 48A, 48B, and 48C illustrate diagrams schematically representing a lens array substrate as comparative structure example 6.

In view of this, for example, as illustrated in FIG. 48A, a lens array substrate structure may be contemplated in which the layer and area of the light-curing resin 1212 disposed on the upper surface of the lens array substrate 1211 and the layer and area of the light-curing resin 1212 disposed on the lower surface of the lens array substrate 1211 are the same. This lens array substrate structure will be referred to as a sixth substrate structure (hereinafter referred to as Comparative Structure Example 6) for comparison with the present structure.

In Comparative Structure Example 6, in the layer of the light-curing resin 1212 disposed on the upper surface of the lens array substrate 1211, a force in a shrinking direction due to the light-curing resin 1212 is generated. In the lens array substrate 1211 itself, a force due to the substrate is not generated. Therefore, on the upper surface side of the lens array substrate 1211, a force for warping the lens array substrate 1211 into a shape convex to the lower side acts.

On the other hand, in the layer of the light-curing resin 1212 disposed on the lower surface of the lens array substrate 1211, a force in a shrinking direction due to the light-curing resin 1212 is generated. In the lens array substrate 1211 itself, a force due to the substrate is not generated. Therefore, on the lower surface side of the lens array substrate 1211, a force for warping the lens array substrate 1211 into a shape convex to the upper side acts.

The two forces for warping the lens array substrate 1211 act in such directions as to cancel each other more assuredly than in the structure depicted in FIG. 47A. As a result, the force for warping the lens array substrate 1211 and the warp amount of the lens array substrate 1211 are reduced more than in Comparative Structure Examples 4 and 5.

Comparative Structure Example 7

Incidentally, in practice, the shapes of the substrates with lens constituting the stacked lens structure incorporated in the camera module are not all the same. More specifically, the plural substrates with lens constituting the stacked lens structure may be different, for example, in thickness of the substrate with lens or size of the through-holes, or may be different in the thickness, shape, volume or the like of the lenses formed in the through-holes. Furthermore, the film thicknesses of the light-curing resin formed on the upper surface and the lower surface of the substrate with lens and the like may be different for the substrates with lens.

Figure 48B:
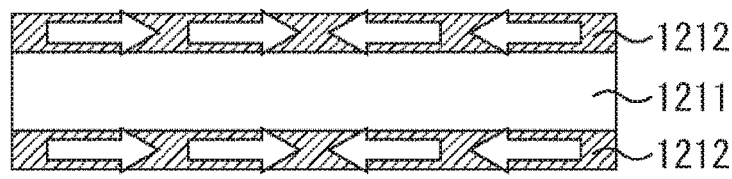
Figure 48C:
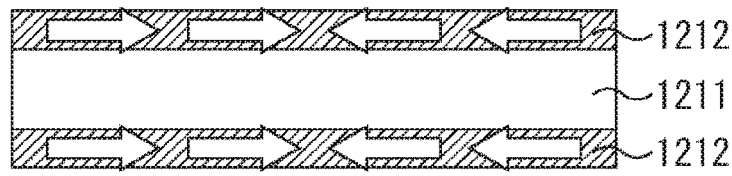
Figure 49:
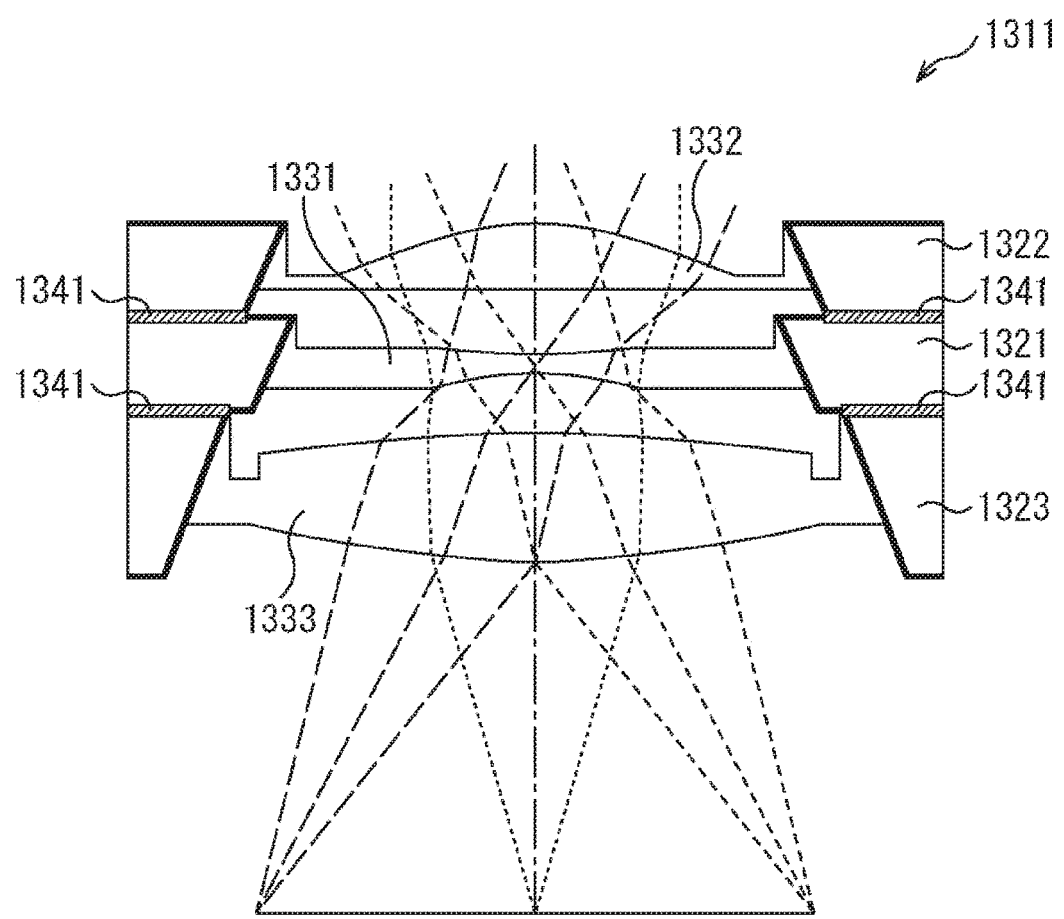
FIG. 49 is a sectional view of a stacked lens structure as comparative structure example 7.

FIG. 49 is a sectional view of a stacked lens structure including three substrates with lens stacked on one another, as a seventh substrate structure (hereinafter referred to as Comparative Structure Example 7). In this stacked lens structure, as in Comparative Structure Example 6 depicted in FIGS. 48A, 48B, and 48C, the layers and areas of the light-curing resin disposed on the upper surface and the lower surface of each substrate with lens are the same.

A stacked lens structure 1311 depicted in FIG. 49 includes three substrates with lens 1321 to 1323.

In the following, of the three substrates with lens 1321 to 1323, the substrate with lens 1321 in the center will be referred to as a first substrate with lens 1321, the substrate with lens 1322 in the uppermost layer will be referred to as a second substrate with lens 1322, and the substrate with lens 1323 in the lowermost layer will be referred to as a third substrate with lens 1323.

The second substrate with lens 1322 disposed in the uppermost layer and the third substrate with lens 1323 disposed in the lowermost layer differ from each other in the thickness of the substrate and the thickness of the lenses.

More specifically, the thickness of the lenses is greater in the third substrate with lens 1323 than in the second substrate with lens 1322, and, attendant on this, the thickness of the substrate is also greater in the third substrate with lens 1323 than in the second substrate with lens 1322.

The resin 1341 is formed over the whole area of a contact surface between the first substrate with lens 1321 and the second substrate with lens 1322 and a contact surface between the first substrate with lens 1321 and the third substrate with lens 1323.

The sectional shape of the through-holes in the three substrates with lens 1321 to 1323 is what is generally called a divergent widening shape in which the section is wider at the substrate lower surface than at the substrate upper surface.

Referring to FIGS. 50A, 50B, 50C, and 50D, actions produced by the three substrates with lens 1321 to 1323 having different shapes will be described.

Figure 50A:
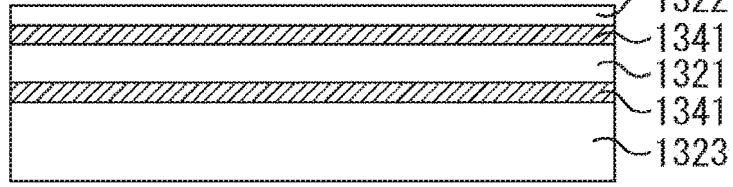
FIGS. 50A, 50B, 50C, and 50D illustrate figures for explaining an action produced by the stacked lens structure of FIG. 49.
Figure 50B:
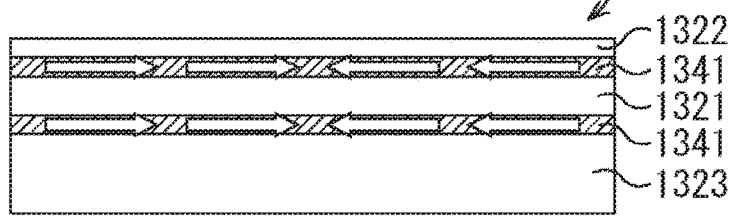
Figure 50C:
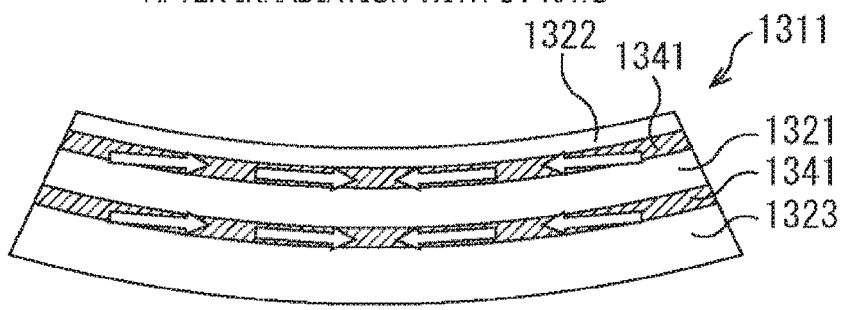

FIGS. 50A, 50B, and 50C, are figures schematically representing the stacked lens structure 1311 depicted in FIG. 49.

In the case where the second substrate with lens 1322 and the third substrate with lens 1323 having different substrate thicknesses are disposed on the upper surface and the lower surface of the first substrate with lens 1321 as in the stacked lens structure 1311, the force for warping the stacked lens structure 1311 and the warp amount of the stacked lens structure 1311 vary depending on at which positions in the thickness direction of the stacked lens structure 1311 the layers of the resin 1341 present over the whole area of the contact surfaces of the three substrates with lens 1321 to 1323 exist.

If the layers of the resin 1341 present over the whole area of the contact surfaces of the three substrates with lens 1321 to 1323 are not disposed in symmetry about the center line of the stacked lens structure 1311, i.e., a line running in the substrate plane direction while passing a midpoint in the thickness direction of the stacked lens structure 1311, the forces generated due to curing shrinkage of the resin 1341 disposed on the upper surface and the lower surface of the first substrate with lens 1321 cannot be allowed to cancel each other completely as depicted in FIG. 48C. As a result, the stacked lens structure 1311 would be warped in either direction.

For example, in the case where the two layers of the resin 1341 on the upper surface and the lower surface of the first substrate with lens 1321 are disposed with a deviation toward the upper side from the center line in the thickness direction of the stacked lens structure, curing shrinkage of the two layers of the resin 1341 would cause the stacked lens structure 1311 to be warped into a shape convex to the lower side, as depicted in FIG. 50C.

Further, in the case where the sectional shape of the through-holes of the substrate having a smaller thickness, of the second substrate with lens 1322 and the third substrate with lens 1323, is a shape enlarged in going toward the first substrate with lens 1321, the fear of defect or breakage of lens is increased.

Figure 50D:
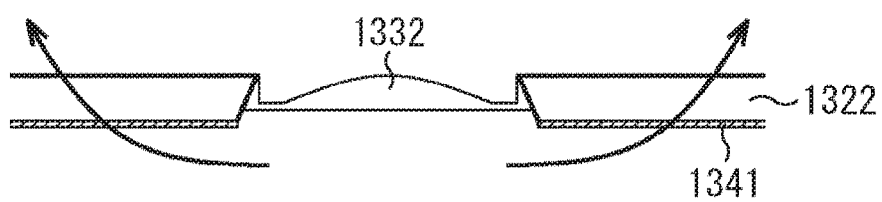

In the example depicted in FIG. 49, the sectional shape of the through-holes in the second substrate with lens 1322 having a smaller thickness, of the second substrate with lens 1322 and the third substrate with lens 1323, is a divergent widening shape enlarged in going toward the first substrate with lens 1321. In such a shape, upon curing shrinkage of the two layers of the resin 1341 on the upper surface and the lower surface of the first substrate with lens 1321, a force for warping the stacked lens structure 1311 into a shape convex to the lower side is exerted on the stacked lens structure 1311 as depicted in FIG. 50C, and this force acts as a force for separating the lens and the substrate from each other in the second substrate with lens 1322 as depicted in FIG. 50D. By this action, the fear of defect or breakage of the lens 1332 of the second substrate with lens 1322 is increased.

Next, a case where the resin undergoes thermal expansion will be considered below.

Comparative Structure Example 8

Figure 51:
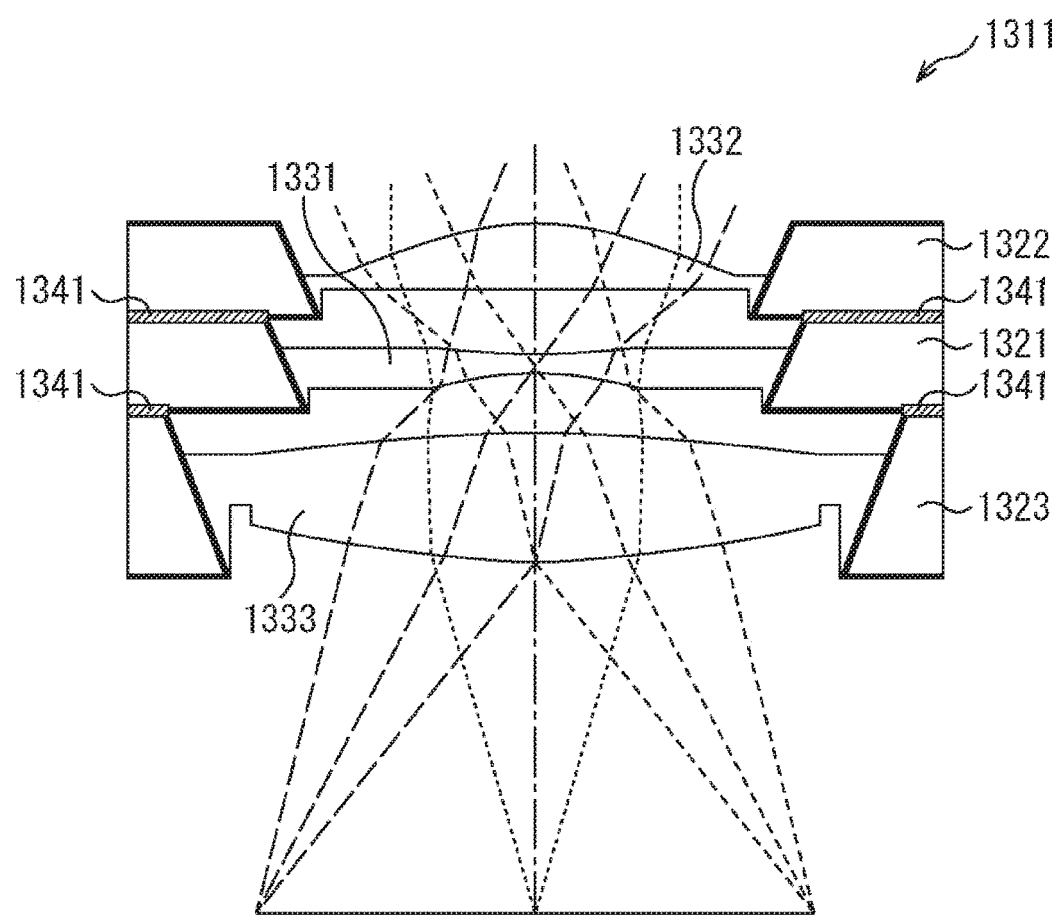
FIG. 51 is a sectional view of a stacked lens structure as comparative structure example 8.

FIG. 51 is a sectional view of a stacked lens structure including three substrates with lens stacked on each other as an eighth substrate structure (hereinafter referred to as Comparative Structure Example 8). In this stacked lens structure, as in Comparative Structure Example 6 depicted in FIGS. 48A, 48B, and 48C the layers and areas of the light-curing resin disposed on the upper surface and the lower surface of each substrate with lens are same.

Comparative Structure Example 8 of FIG. 51 differs from Comparative Structure Example 7 of FIG. 49 only in that the sectional shape of the through-holes in three substrates with lens 1321 to 1323 is what is generally called a downwardly narrowing shape in which the section is narrower at the substrate lower surface than at the substrate upper surface. 48

Figure 52A:
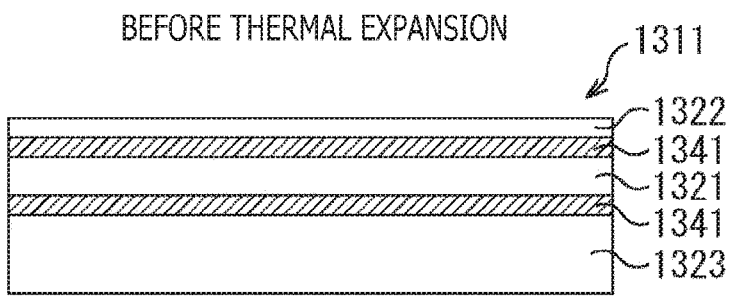
FIGS. 52A, 52B, 52C, and 52D illustrate figures for explaining an action produced by the stacked lens structure of FIG. 51.
Figure 52B:
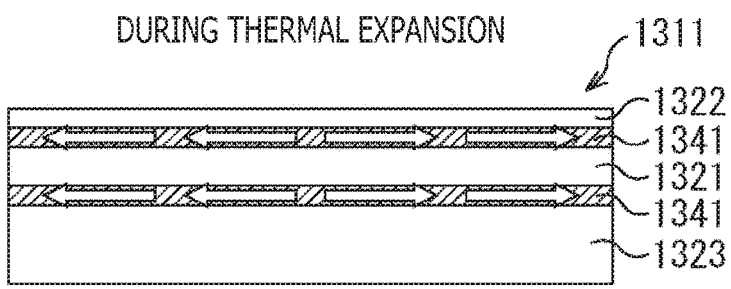
Figure 52C:
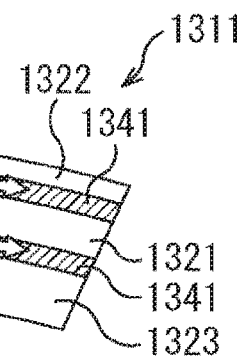

FIGS. 52A, 52B, and 52C, are figures schematically representing the stacked lens structure 1311 depicted in FIG. 51.

In practical use of the camera module by the user, the temperature inside the housing of the camera rises due to an increased in power consumption attendant on the operation, and the temperature of the camera module also rises. By this temperature rise, in the stacked lens structure 1311 of FIG. 51, the resin 1341 disposed on the upper surface and the lower surface of the first substrate with lens 1321 is thermally expanded.

Even where the areas and thicknesses of the resin 1341 disposed on the upper surface and the lower surface of the first substrate with lens 1321 are the same as depicted in FIG. 48A, if the layers of the resin 1341 present over the whole area of the contact surfaces of the three substrates with lens 1321 to 1323 are not disposed in symmetry about the center line of the stacked lens structure 1311, i.e., a line running in a substrate plane direction while passing the midpoint in the thickness direction of the stacked lens structure 1311, the actions of the forces generated by thermal expansion of the resin 1341 disposed on the upper surface and the lower surface of the first substrate with lens 1321 cannot be allowed to cancel each other as depicted in FIG. 48C. As a result, the stacked lens structure 1311 would be warped in either direction.

For example, in the case where the two layers of the resin 1341 on the upper surface and the lower surface of the first substrate with lens 1321 are disposed with a deviation to the upper side from the center line in the thickness direction of the stacked lens structure 1311, thermal expansion of the two layers of the resin 1341 would warp the stacked lens structure into a shape convex to the upper side as depicted in FIG. 52C.

Figure 52D:
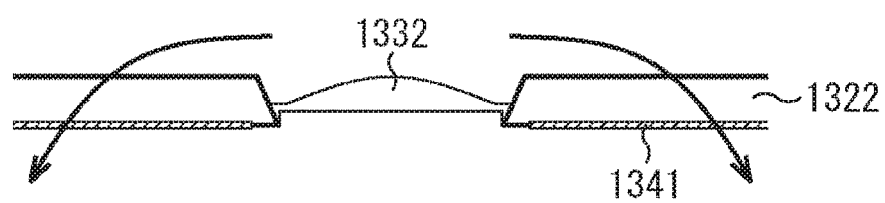

Further, in the example depicted in FIG. 51, the sectional shape of the through-holes of the second substrate with lens 1322 having a smaller thickness of the second substrate with lens 1322 and the third substrate with lens 1323 is a downwardly narrowing shape of becoming smaller in size in going toward the first substrate with lens 1321. In such a shape, when the two layers of the resin 1341 on the upper surface and the lower surface of the first substrate with lens 1321 are thermally expanded, a force for warping the stacked lens structure 1311 into a shape convex to the upper side is exerted on the stacked lens structure 1311, and this force acts as a force for separating the lens and the substrate in the second substrate with lens 1322, as depicted in FIG. 52D. By this action, the fear of defect or breakage of the lens 1332 in the second substrate with lens 1322 is increased.

<Present Structure>

Figure 53A:
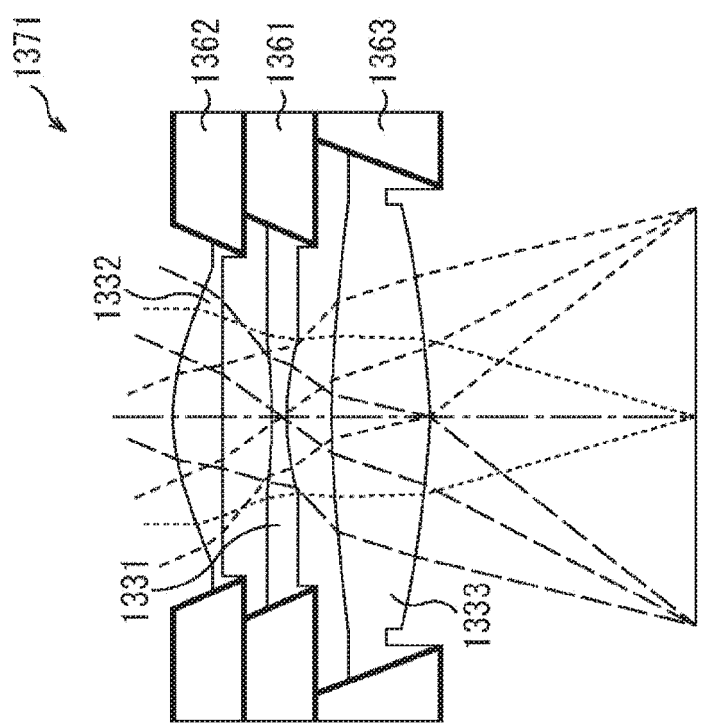
FIGS. 53A and 53B illustrate sectional views of a stacked lens structure adopting the present structure.
Figure 53B:
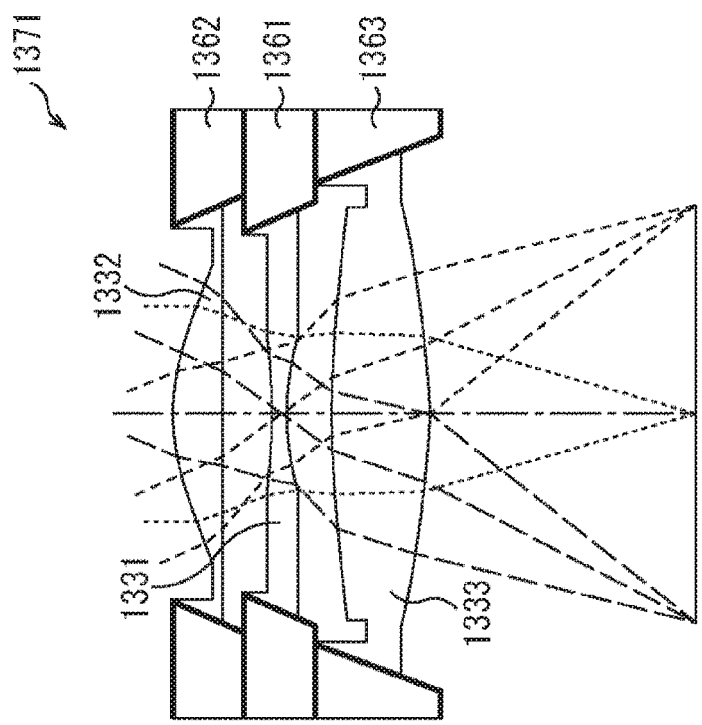

FIGS. 53A and 53B illustrate figures depicting a stacked lens structure 1371 including three substrates with lens 1361 to 1363 adopting the present structure.

FIG. 53A depicts a structure corresponding to the stacked lens structure 1311 of FIG. 49, and depicts a structure of in which the sectional shape of the through-holes is what is generally called a divergent widening shape. On the other hand, FIG. 53B depicts a structure corresponding to the stacked lens structure 1311 of FIG. 51, and depicts a structure in which the sectional shape of the through-holes is what is generally called a downwardly narrowing shape.

FIGS. 54A, 54, and 54C illustrate figures schematically depicting the stacked lens structure 1371 of FIGS. 53A and 53B, for explaining an action produced by the present structure.

The stacked lens structure 1371 is a structure in which a second substrate with lens 1362 is disposed on the upper side of a first substrate with lens 1361 located in a center, and a third substrate with lens 1363 is disposed on the lower side of the first substrate with lens 1361.

The second substrate with lens 1362 disposed in an uppermost layer and the third substrate with lens 1363 disposed in a lowermost layer differ in the thickness of the substrate and the thickness of the lenses. More specifically, the thickness of the lenses is larger in the third substrate with lens 1363 than in the second substrate with lens 1362, and, attendant on this, the thickness of the substrate is also greater in the third substrate with lens 1363 than in the second substrate with lens 1362.

In the stacked lens structure 1371 of the present structure, direct joining between the substrates is used as means for fixing the substrates with lens. In other words, the substrates with lens to be fixed are subjected to a plasma activation treatment, and the two substrates with lens are plasma joined. In other words, a silicon oxide film is formed on the respective front surfaces of the two substrates with lens to be stacked, and, after bonding a hydroxyl group thereto, the two substrates with lens are adhered to each other, and temperature is raised to cause dehydration condensation. In this way, the two substrates with lens are directly joined to each other through silicon-oxygen covalent bond.

Therefore, in the stacked lens structure 1371 of the present structure, adhesion by a resin is not used as the means for fixing the substrates with lens. For this reason, neither a resin for lens formation nor a resin for adhesion of the substrates is used between the substrate with lens and the substrate with lens. In addition, since the resin is not disposed on the upper surface or the lower surface of the substrate with lens, thermal expansion or curing shrinkage of the resin does not occur on the upper surface or the lower surface of the substrate with lens.

Therefore, in the stacked lens structure 1371, even when the second substrate with lens 1362 and the third substrate with lens 1363 differing in the thickness of the lenses and the thickness of the substrate are disposed in an upper layer and a lower layer of the first substrate with lens 1351, the warping of the substrates due to curing shrinkage and warping of the substrates due to thermal expansion, like those in Comparative Structure Examples 1 to 8 mentioned above, are not generated.

In other words, the present structure in which the substrates with lens are directly joined to each other produces an action or effect such that warping of the substrates can be largely restrained, as compared to Comparative Structure Examples 1 to 8 mentioned above, even in the case where the substrates with lens differing in the thickness of the lenses and the thickness of the substrate are disposed on the upper side and the lower side.

<16. Various Modifications>

Other modifications of the aforementioned embodiments will be described below.

<16.1 Cover Glass with Optical Diaphragm>

A cover glass may be provided at an upper portion of the stacked lens structure 11 for protecting the surfaces of the lenses 21 of the stacked lens structure 11. In this case, the cover glass may be provided with the function of an optical diaphragm.

Figure 55:
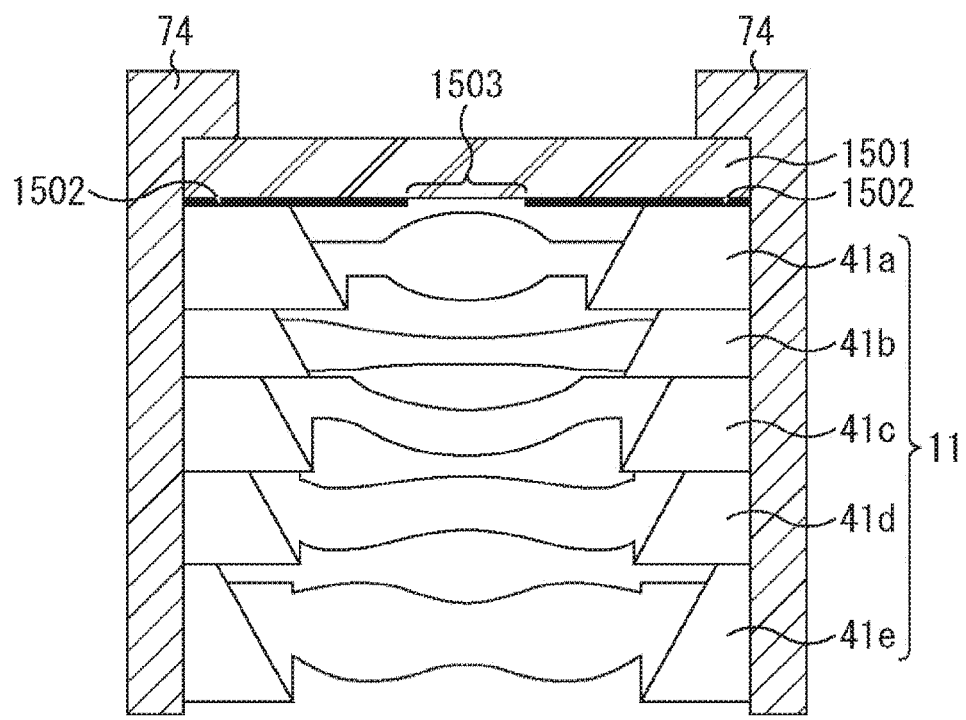
FIG. 55 is a figure depicting a first configuration example in which a diaphragm is added to a cover glass.

FIG. 55 is a figure depicting a first configuration in which the over glass has the function of an optical diaphragm.

In the first configuration example in which the cover glass has the function of an optical diaphragm depicted in FIG. 55, a cover glass 1501 is further stacked at an upper portion of the stacked lens structure 11. A lens barrel 74 is disposed on the outside of the stacked lens structure 11 and the cover glass 1501.

A light-shielding film 1502 is formed on a surface on the substrate with lens 41a side of the cover glass 1501 (in the figure, the lower surface of the cover glass 1501). Here, a predetermined range from the lens center (optical center) of each of the substrates with lens 41a to 41e is an opening 1503 where the light-shielding film 1502 is not formed, and the opening 1503 functions as an optical diaphragm. As a result, the diaphragm plate 51 configured, for example, in the camera module 1D of FIG. 13 or the like is omitted.

Figure 56A:
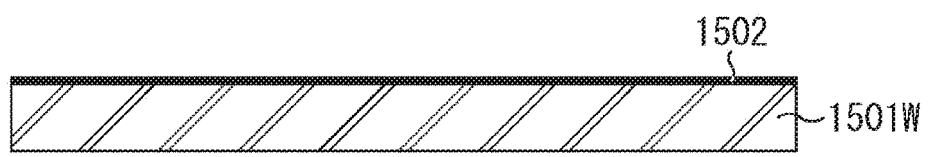
FIGS. 56A and 56B illustrate figures for explaining a method of manufacturing the cover glass of FIG. 55.
Figure 56B:
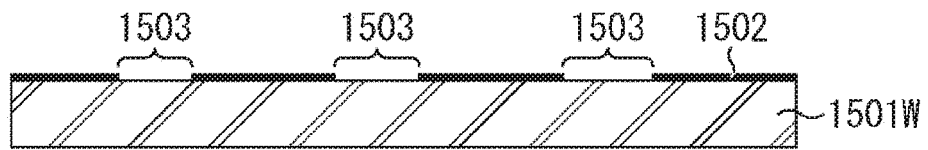

FIGS. 56A and 56B illustrate figures for explaining a method of manufacturing the cover glass 1501 formed with the light-shielding film 1502.

First, as depicted in FIG. 56A, for example, the whole part of a surface on one side of a cover glass (glass substrate) 1501W in a wafer or panel shape is spin coated with a light-absorbing material, to form the light-shielding film 1502. As the light-absorbing material to be the light-shielding film 1502, there is used, for example, a light-absorbing resin containing added thereto a carbon black pigment or a titanium black pigment.

Next, predetermined regions of the light-shielding film 1502 are removed by a lithography technique or an etching treatment, whereby plural openings 1503 are formed at a predetermined interval as depicted in FIG. 56B. The layout of the openings 1503 is in one-to-one correspondence with the layout of the through-holes 83 in the support substrate 81W of FIGS. 23A, 23B, 23C, 223D, 23E, 23F, and 23G. Note that as another example of the method of forming the openings 1503 of the light-shielding film 1502, a method may be adopted in which a light-absorbing material to be the light-shielding film 1502 is jetted to regions exclusive of the openings 1503 by ink jet.

The cover glass 1501W in a substrate state manufactured in this way and the plural substrates with lens 41W in a substrate state are adhered to one another, and the resultant laminate is individualized by dicing or the like conducted by use of a blade or laser or the like. As a result, the stacked lens structure 11 on which the cover glass 1501 having the function of a diaphragm is stacked depicted in FIG. 55 is completed.

By forming the cover glass 1501 as a step of a semiconductor process in such a way, generation of contaminant defect which is feared in the case of forming the cover glass in another assembling step can be restrained.

According to the first configuration example depicted in FIG. 55, the optical diaphragm is formed by coating, therefore, the light-shielding film 1502 can be formed in a small film thickness on the order of 1 μm, and it is possible to restrain deterioration of optical performance (light reduction in a peripheral area) due to shielding of incidence light by the diaphragm mechanism having a predetermined thickness.

Note that, while the individualization of the cover glass 1501W has been conducted after the plural substrates with lens 41W are joined to one another in the aforementioned example, the individualization may be performed before the joining. In other words, the joining between the cover glass 1501 provided with the light-shielding film 1502 and the five substrates with lens 41a to 41e may be conducted at a wafer level or may be performed at a chip level.

The surface of the light-shielding film 1502 may be roughened. In this case, the surface reflection on the surface of the cover glass 1501 formed with the light-shielding film 1502 can be reduced, and the surface area of the light-shielding film 1502 can be increased, so that joint strength between the cover glass 1501 and the substrate with lens 41 can be enhanced.

Examples of the method of roughening the surface of the light-shielding film 1502 include a method of applying a light-absorbing material to be the light-shielding film 1502 and thereafter roughening the surface by etching or the like, a method of roughening the surface of the cover glass 1501 before coating with the light-absorbing material and thereafter coating the roughened surface with the light-absorbing material, a method of forming a film from an aggregating light-absorbing material so that ruggedness is generated in the surface after the film formation, and a method of forming a film from a light-absorbing material containing a solid component so that ruggedness is generated in the surface after the film formation.

In addition, an antireflection film may be formed between the light-shielding film 1502 and the cover glass 1501.

With the cover glass 1501 functioning also as a support substrate for a diaphragm, the size of the camera module 1 can be reduced.

Figure 57:
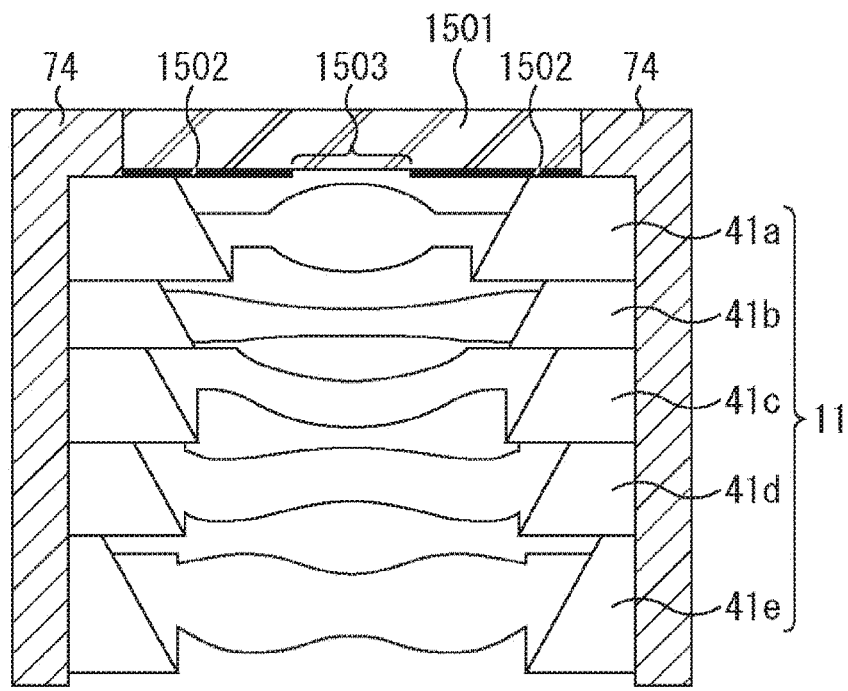
FIG. 57 is a figure depicting a second configuration example in which a diaphragm is added to a cover glass.

FIG. 57 is a figure depicting a second configuration in which the cover glass has the function of an optical diaphragm.

In the second configuration example in which the cover glass has the function of an optical diaphragm depicted in FIG. 57, the cover glass 1501 is disposed at the position of the opening of the lens barrel 74. The other configurations are the same as those in the first configuration example depicted in FIG. 55.

Figure 58:
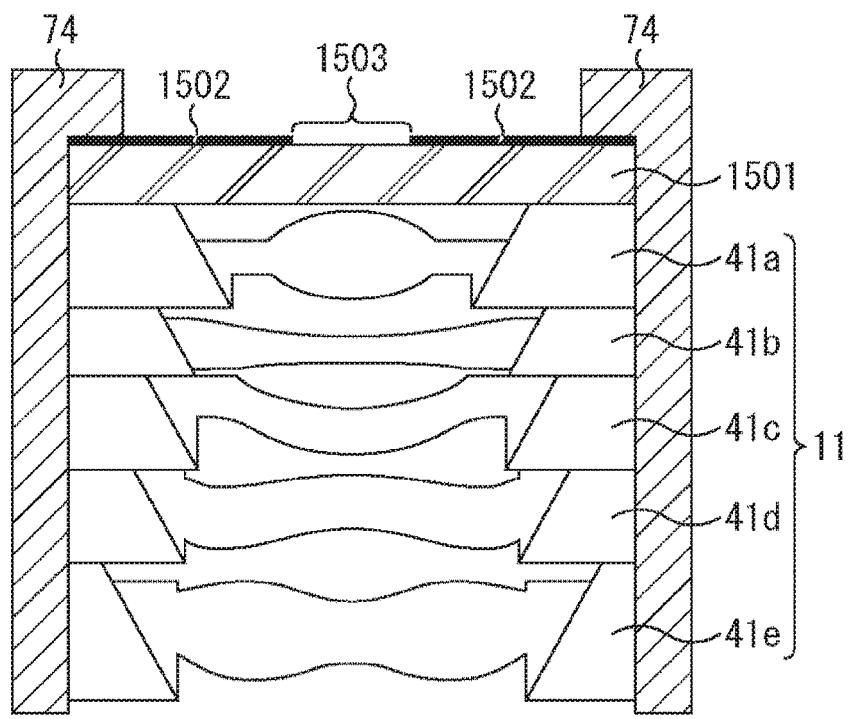
FIG. 58 is a figure depicting a third configuration example in which a diaphragm is added to a cover glass.

FIG. 58 is a figure depicting a third configuration in which the cover glass has the function of an optical diaphragm.

In the third configuration example in which the cover glass has the function of an optical diaphragm depicted in FIG. 58, the light-shielding film 1502 is formed on the upper surface of the cover glass 1501, in other words, on the side opposite to the substrate with lens 41a. The other configurations are the same as those in the first configuration example depicted in FIG. 55.

Note that in the configuration in which the cover glass 1501 is disposed at the opening of the lens barrel 74 depicted in FIG. 57, also, the light-shielding film 1502 may be formed on the upper surface of the cover glass 1501.

<16.2 Formation of Diaphragm by Through-Hole>

Next, an example in which the opening itself of the through-hole 83 of the substrate with lens 41 is made to be a diaphragm mechanism, in place of the diaphragm using the diaphragm plate 51 or the cover glass 1501 mentioned above, will be described below.

Figure 59A:
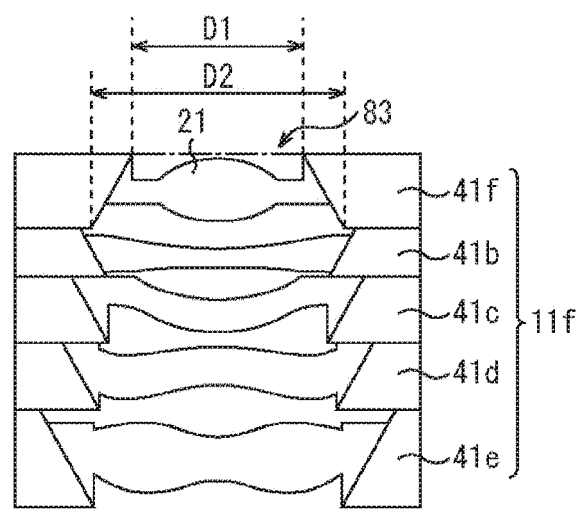
FIGS. 59A, 59B, and 59C illustrate figures depicting a configuration example in which an opening itself of a through-hole is used as a diaphragm mechanism.

FIG. 59A is a figure depicting a first configuration example in which the opening itself of the through-hole 83 is made to be a diaphragm mechanism.

Note that in the description of FIGS. 59A, 59B, and 59C only the parts different from those in the stacked lens structure 11 depicted in FIG. 58 will be described, and descriptions of the same parts will be omitted as required. Besides, in FIGS. 59A, 59B, and 59C, to avoid complication of the figure, only reference symbols necessary for explanation are depicted.

A stacked lens structure 11f depicted in FIG. 59A is a configuration in which the substrate with lens 41a located nearest to the light incidence side and farthest from the light receiving element 12, of the five substrates with lens 41a to 41e constituting the stacked lens structure 11 depicted in FIG. 58, is replaced by a substrate with lens 41f.

Figure 59B:
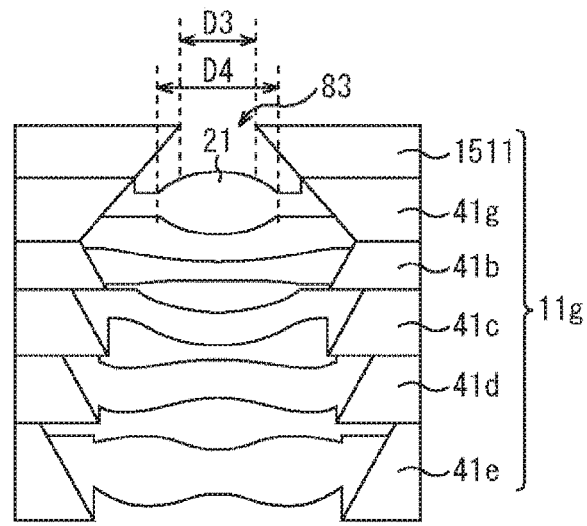
Figure 59C:
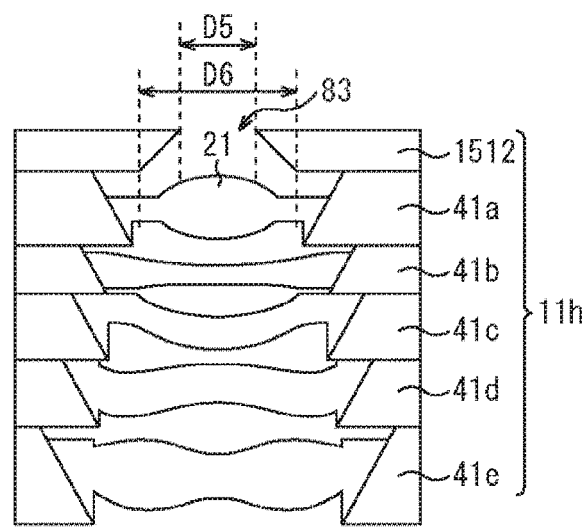

From comparison of the substrate with lens 41f with the substrate with lens 41a of FIG. 58, it is seen that in the substrate with lens 41a of FIG. 58, the hole diameter at the upper surface is larger than the hole diameter at the lower surface, whereas in the substrate with lens 41f of FIGS. 59A, 59B, and 59C, the hole diameter D1 at the upper surface is smaller than the hole diameter D2 at the upper surface. In other words, the sectional shape of the through-hole 83 in the substrate with lens 41f is what is generally called a divergent widening shape.

The height position of an outermost surface of the lens 21 formed in the through-hole 83 of the substrate with lens 41f is lower than the position of the uppermost surface of the substrate with lens 41f indicated by alternate long and short dash line in FIG. 59A.

In the stacked lens structure 11f, the hole diameter on the light incidence side of the through-hole 83 of the substrate with lens 41f in the uppermost layer, of the plural substrates with lens 41, is the smallest, whereby the part where the hole diameter of the through-hole 83 is the smallest (the part of the hole diameter D1) functions as an optical diaphragm that restricts the rays of incident light.

FIG. 59B is a figure depicting a second configuration example in which the opening itself of the through-hole 83 is a diaphragm mechanism.

A stacked lens structure 11g depicted in FIG. 59B has a configuration in which the substrate with lens 41a in the uppermost layer, of the five substrates with lens 41a to 41e constituting the stacked lens structure 11 depicted in FIG. 58, is replaced by a substrate with lens 41g. A substrate 1511 is further stacked on the substrate with lens 41g.

The hole diameter of the through-hole 83 of the substrate with lens 41g is also a divergent widening shape which is smaller on the light incidence side, as in the substrate with lens 41f depicted in FIG. 59A. The substrate 1511 is a substrate which has a through-hole 83 but does not hold a lens 21. The sectional shapes of the through-holes 83 in the substrate with lens 41g and the substrate 1511 are both what is generally called a divergent widening shape.

With the substrate 1511 stacked on the substrate with lens 41g, the plan-view region where incident light is incident is further narrowed than in the substrate with lens 41f of FIG. 59A. The hole diameter D3 at the upper surface of the substrate 1511 is smaller than the diameter D4 at a curved part of the lens 21 (lens section 91). As a result, the part where the hole diameter of the through-hole 83 is the smallest of the substrate 1511 (the part of the hole diameter D3) functions as an optical diaphragm that restricts the rays of incident light.

That the position of the optical diaphragm is located at a position as farther as possible from the lens 21 at the uppermost surface of the stacked lens structure 11g is preferable for making it possible to space the outgoing pupil position and restrain shading.

As depicted in FIG. 59B, with the substrate 1511 disposed further on the five substrates with lens 41b to 41e and 41g, the position of the optical diaphragm can be set at a position largely spaced in the direction opposite to the light incidence direction from the lens 21 of the substrate with lens 41g, i.e., the lens 21 at the uppermost surface of the stacked lens structure 11g.

FIG. 59C is a figure depicting a third configuration example in which the opening itself of the through-hole 83 is a diaphragm mechanism.

A stacked lens structure 11h depicted in FIG. 59C has a configuration in which a substrate 1512 is further stacked on the substrate with lens 41a of the five substrates with lens 41a to 41e constituting the stacked lens structure 11 depicted in FIG. 58.

The substrate 1512 is a substrate which has a through-hole 83 but does not have a lens 21. The through-hole 83 of the substrate 1512 has what is generally called a divergent widening shape in which the hole diameter is different at the uppermost surface and the lowermost surface of the substrate 1512, and the hole diameter D5 at the upper surface is smaller than the hole diameter D5 at the lower surface. In addition, the hole diameter D5 at the uppermost surface of the substrate 1512 is configured to be smaller than the diameter at a curved portion of the lens (lens section 91). As a result, the part where the hole diameter is the smallest of the through-hole 83 (the part of the hole diameter D5) functions as an optical diaphragm that restricts the rays of incident light. Note that as another example of the shape of the substrate 1512, the through-hole 83 may have what is generally called a downwardly narrowing shape in which the hole diameter D5 at the upper surface is larger than the hole diameter D5 at the lower surface.

Note that the examples of FIGS. 59A, 59B, and 59C are an example in which the hole diameter of the through-hole 83 of the substrate with lens 41f at the uppermost surface (at the position spaced most from the light receiving element 12), of the plural substrates with lens 41 constituting the stacked lens structure 11, is configured as an optical diaphragm, or an example in which the hole diameter of the through-hole 83 of the substrate 1511 or 1512 disposed in the uppermost layer is configured as an optical diaphragm.

However, the hole diameter of through-hole 83 of any one of the substrates with lens 41b to 41e other than that at the uppermost surface, of the plural substrates with lens 41 constituting the stacked lens structure 11, may be configured as that in the substrate with lens 41f or the substrate 1511 or 1512 mentioned above and may be made to function as an optical diaphragm.

It is to be noted, however, that from the viewpoint of restraining shading, it is preferable that as depicted in FIGS. 59A, 59B, and 59C the substrate with lens 41 having the function of an optical diaphragm is disposed in the uppermost layer, or as more on the upper side as possible (at the position the farthest from the light receiving element 12).

In this way, a predetermined one substrate with lens 41 of the plural substrates with lens 41 constituting the stacked lens structure 11, or the substrate 1511 or 1512 not holding the lens 21, has also the function of an optical diaphragm, whereby the stacked lens structure 11 and the camera module 1 can be reduced in size.

With the optical diaphragm integrated with the substrate with lens 41 holding the lens 21, the positional accuracy of the lens curved surface nearest to the diaphragm and influencing imaging performance and the optical diaphragm is enhanced, and imaging performance can be enhanced.

<16.3 Wafer Level Joining by Metallic Joining>

While the substrates with lens 41W formed with lenses 21 in the through-holes 83 have been adhered to one another by plasma joining in the aforementioned embodiments, the substrates with lens 41W may be adhered to one another by metallic joining.

FIGS. 60A, 60B, 60C, 60D, and 60E illustrate figures for explaining adhesion at a wafer level by use of metallic joining.

First, as depicted in FIG. 60A, substrates with lens 1531W-a in a substrate state formed with lenses 1533 individually in through-holes 1532 formed in plurality are prepared, and antireflection film 1535 is formed on the upper-side surfaces and the lower-side surfaces of the substrates with lens 1531W-a.

The substrate with lens 1531W corresponds to the substrate with lens 41W in the substrate state mentioned above. In addition, the antireflection film 1535 corresponds to the upper-side surface layer 122 and the lower-side surface layer 123 mentioned above.

Here, a state in which a foreign matter 1536 is mixed into a part of the antireflection film 1535 formed on the upper-side surface of the substrate with lens 1531W-a is supposed. The upper-side surface of the substrate with lens 1531W-a is a surface to be joined to the substrate with lens 1531W-b in a step of FIG. 60D described later.

Next, as depicted in FIG. 60B, a metallic film 1542 is formed on the upper-side surface of the substrate with lens 1531W-a which becomes a joint surface for joining to the substrate with lens 1531W-b. In this instance, the parts of the through-holes 1532 where lenses 1533 are formed are masked by a metal mask 1541 such that the metallic film 1542 is not formed there.

As the material of the metallic film 1542, there can be used, for example, Cu which is often used as metallic joint. As a film forming method for the metallic film 1542, there can be used a vapor deposition method and PVD methods such as a sputtering method and an ion plating method by which a metallic film can be formed at low temperature.

Note that as the material of the metallic film 1542, other than Cu there may be used Ni, Co, Mn, Al, Sn, In, Ag, Zn and the like and alloy materials of two or more of these. In addition, other materials than the mentioned as examples may be used insofar as they are metallic materials susceptible to plastic deformation.

As the film forming method for the metallic film 1542, other than formation by the PVD method and the metal mask, there may be used, for example, an ink jet method using metallic nanoparticles such as silver particles.

Next, as depicted in FIG. 60C, as a pretreatment before joining, an oxide film formed on the surface of the metallic film 1542 when opened to the atmospheric air is removed by use of formic acid or a reducing gas such as hydrogen gas and hydrogen radicals, whereby the surface of the metallic film 1542 is cleaned.

As a method for cleaning the surface of the metallic film 1542, other than the reducing gas, Ar ions in a plasma may be incident on the metallic surface, to physically remove the oxide film by a sputtering action.

By steps similar to steps of FIGS. 60A, 60B, and 60C mentioned above, the substrate with lens 1531W-b which is another substrate with lens 1531W in the substrate state to be joined is prepared.

Then, as depicted in FIG. 60D, the substrates with lens are disposed such that a joint surface of the substrate with lens 1531W-b and a joint surface of the substrate with lens 1531W-a face each other, and, after alignment is conducted, an appropriate pressure is exerted thereon, whereby the metallic film 1542 of the substrate with lens 1531W-a and the metallic film 1542 of the substrate with lens 1531W-b are joined to each other by metallic joining.

Here, it is assumed that, for example, a foreign matter 1543 is mixed also into the lower-side surface of the substrate with lens 1531W-b to be a joint surface for the substrate with lens 1531W-b. However, even if the foreign matter 1536 and the foreign matter 1543 are present, since a metallic material susceptible to plastic deformation is used as the metallic film 1542, the metallic film 1542 is deformed, and the substrate with lens 1531W-a and the substrate with lens 1531W-b are joined to each other.

Finally, as depicted in FIG. 60E, a heat treatment is applied, whereby joining between metallic atoms and crystallization are promoted, and the joint strength is enhanced. Note that this heat treatment may be omitted.

In this way, the substrates with lens 1531W formed with the lenses 1533 in the plural through-holes 1532 can be adhered to each other by use of metallic joining.

Note that for obtaining the joining between the substrate with lens 1531W-a and the metallic film 1542, a film to be a close contact layer may be formed between the substrate with lens 1531W-a and the metallic film 1542. In this case, the close contact layer is formed on the upper side (outer side) of the antireflection film 1535, in other words, between the antireflection film 1535 and the metallic film 1542. As the close contact layer, there may be used, for example, Ti, Ta, W or the like. Alternatively, nitrides or oxides of Ti, Ta, W and the like or a stacked structure of a nitride and an oxide may also be used. The same applies also to joining between the substrate with lens 1531W-b and the metallic film 1542.

In addition, the material of the metallic film 1542 formed on the substrate with lens 1531W-a and the material of the metallic film 1542 formed on the substrate with lens 1531W-b may be different metallic materials.

With the substrates with lens 1531W in the substrate state adhered to each other by use of joining of metals having low Young's modulus and susceptible to plastic deformation, a contact surface can be obtained by deformation by pressing, even in the case where the foreign matter is present at the joint surface.

In the case where the plural substrates with lens 1531W adhered to one another by use of metallic joining are individualized into stacked lens structures 11 and the stacked lens structure 11 is incorporated in the aforementioned camera module 1, a stacked lens structure 11 and a camera module 1 high in reliability can be produced, since the metallic film 1542 is excellent in sealing property and can prevent light or moisture from entering from lateral sides.

<16.4 Substrate with Lens Using High-Concentration Doped Substrate>

Figure 61A:
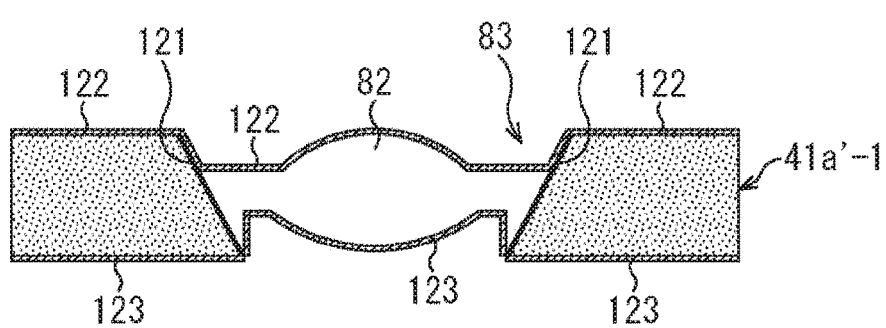
FIGS. 61A and 61B illustrate figures depicting an example of a substrate with lens in which a high concentration doped substrate is used.
Figure 61B:
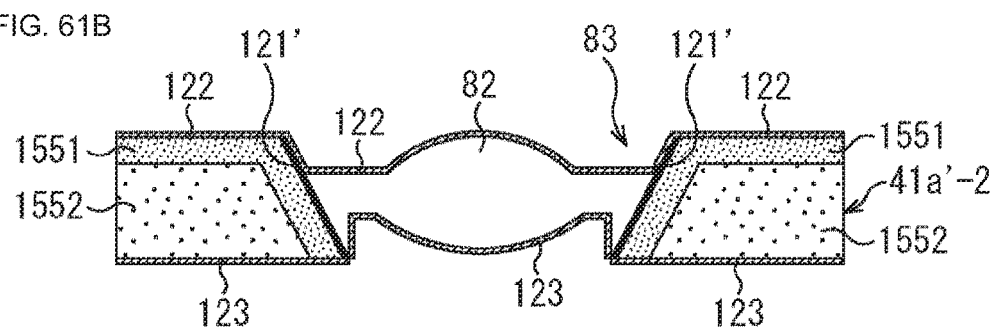

FIGS. 61A and 61B illustrate sectional views of substrates with lens 41$a'$-1 and 41$a'$-2 which are modifications of the aforementioned substrate with lens 41$a$.

In the description of the substrates with lens 41$a'$-1 and 41$a'$-2 of FIGS. 61A and 61B, descriptions of the same parts as those in the aforementioned substrate with lens 41$a$ will be omitted, and only different parts will be described.

The substrate with lens 41$a'$-1 depicted in FIG. 61A is a high-concentration doped substrate in which B (boron) is diffused (ion implanted) into a silicon substrate in a high concentration. The impurity concentration of the substrate with lens 41$a'$-1 is, for example, on the order of $1 \times 10^{19}$ cm-3, and the substrate with lens 41$a'$-1 can efficiently absorb light in a wide range of wavelength.

The other configurations of the substrate with lens 41$a'$-1 are similar to those of the aforementioned substrate with lens 41$a$.

On the other hand, in the substrate with lens 41$a'$-2 depicted in FIG. 61B, the region of the silicon substrate is divided into two regions differing in impurity concentration, i.e., a first region 1551 and a second region 1552.

The first region 1551 is formed in a predetermined depth (for example, on the order of 3 µm) from the substrate surface on the side of incidence of light. The impurity concentration of the first region 1551 is, for example, a high concentration on the order of $1 \times 10^{16}$ cm-3. The impurity concentration of the second region 1552 is, for example, on the order of $1 \times 10^{10}$ cm-3, which is lower than the first concentration. The ion diffused (ion implanted) in the first /region 1551 and the second region 1552 is, for example, B (boron), as in the substrate with lens 41a'-1.

The impurity concentration of the first region 1551 on the light incidence side of the substrate with lens 41a'-2 is on the order of $1\times10^{16}$ cm-3, which is lower than that (for example, $1\times10^{19}$ cm-3) of the substrate with lens 41a'-1. In the substrate with lens 41a'-2, the film thickness of a light-shielding film 121' formed at a side wall of the through-hole 83 is larger than the light-shielding film 121 of the substrate with lens 41a'-1 of FIG. 61A. For example, where the film thickness of the light-shielding film 121 of the substrate with lens 41a'-1 is 2 µm, the film thickness of the light-shielding film 121' of the substrate with lens 41a'-2 is 5 µm.

The other configurations of the substrate with lens 41a'-2 are similar to those of the aforementioned substrate with lens 41a.

By thus adopting high-concentration doped substrates as the substrates with lens 41a'-1 and 41a'-2, light reaching the substrates by being transmitted through the light-shielding film 121 and the upper-side surface layer 122 can be absorbed by the substrates themselves, and, therefore, reflection light can be restrained. Since it is sufficient that the doping amounts enable absorption of the light reaching the substrates, the doping amounts can be set as required according to the amount of light reaching the substrates, and the film thicknesses of the light-shielding film 121 and the upper-side surface layer 122.

In addition, since the silicon substrate handleable easy are used as the substrates with lens 41a'-1 and 41a'-2, handling is easy. Since the light reaching the substrates by being transmitted through the light-shielding film 121 and the upper-side surface layer 122 can be absorbed by the substrates themselves, the thicknesses of the light-shielding film 121, the upper-side surface layer 122 and the stacked substrates themselves can be reduced, so that realization of thinner films and simplification of structure are possible.

Note that the ion with which the silicon substrates of the substrates with lens 41a'-1 and 41a'-2 are doped is not limited to B (boron), and may be, for example, phosphorus (P), arsenic (As), or antimony (Sb). Further, any element that is capable of taking a band structure such as to increase light absorption amount may be used.

In addition, the other substrates with lens 41b to 41e constituting the stacked lens structure 11 may have configurations similar to those of the substrates with lens 41a'-1 and 41a'-2.

<Manufacturing Method>

Referring to FIGS. 62A, 62B, 62C, and 62D a method of manufacturing the substrate with lens 41a'-1 depicted in FIG. 61A will be described.

Figure 62A:
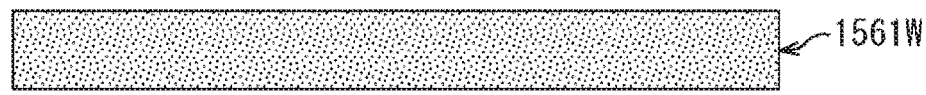
FIGS. 62A, 62B, 62C, and 62D illustrate figures for explaining a method of manufacturing the substrate with lens of FIG. 61A.

First, as depicted in FIG. 62A, a high-concentration doped substrate 1561W in a substrate state in which B (boron) has been diffused (ion implanted) in a high concentration is prepared. The impurity concentration of the high-concentration doped substrate 1561W is, for example, on the order of $1\times10^{19}$ cm-3.

Figure 62B:
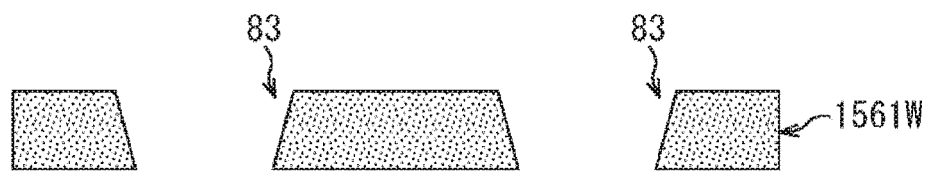

Next, as depicted in FIG. 62B, through-holes 83 are formed at predetermined positions of the high-concentration doped substrate 1561W by etching. While only two through-holes 83 are depicted in FIGS. 62A, 62B, 62C, and 62D for want of space, in practice a multiplicity of through-holes 83 are formed in plane directions of the high-concentration doped substrate 1561W.

Figure 62C:
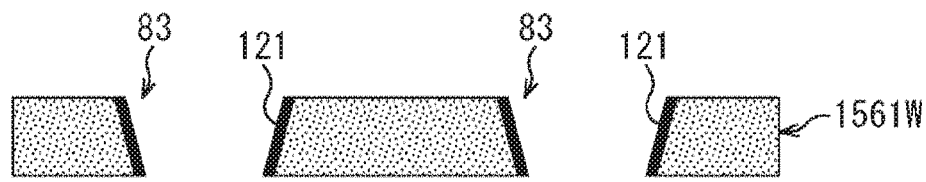

Subsequently, as depicted in FIG. 62C, a black resist material is applied to side walls of the through-holes 83 by spray coating, to form light-shielding films 121.

Figure 62D:
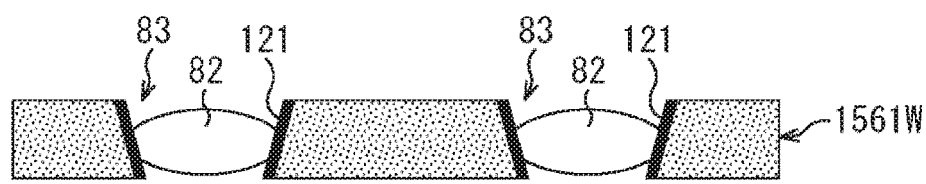

Then, as depicted in FIG. 62D, lens resin sections 82 including lenses 21 are formed inside the through-holes 83 by pressure molding using the upper mold 201 and the lower mold 181 described referring to FIGS. 23A, 23B, 23C, 23D, 23E, 23F, and 23G.

Thereafter, though illustration is omitted, an upper-side surface layer 122 is formed on the upper-side surfaces of the high-concentration doped substrate 1561W and the lens resin sections 82, a lower-side surface layer 123 is formed on the lower-side surfaces of the high-concentration doped substrate 1561W and the lens resin sections 82, and the resultant body is individualized. As a result, the substrates with lens 41a'-1 depicted in FIG. 61A are completed.

Next, referring to FIGS. 63A, 63B, 63C, 63D, 63E, and 63F, a method of manufacturing the substrate with lens 41a'-2 depicted in FIG. 61B will be described below.

Figure 63A:
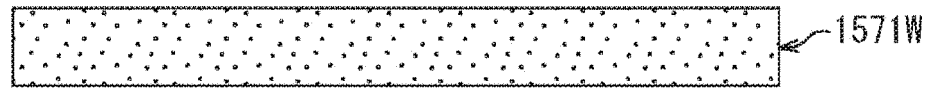
FIGS. 63A, 63B, 63C, 63D, 63E, and 63F illustrate figures for explaining a method of manufacturing the substrate with lens of FIG. 61A.

First, as depicted in FIG. 63A, a doped substrate 1571W in a substrate state in which B (boron) has been diffused (ion implanted) in a predetermined concentration is prepared. The impurity concentration of the doped substrate 1571W is, for example, on the order of $1\times10^{10}$ cm-3.

Figure 63B:
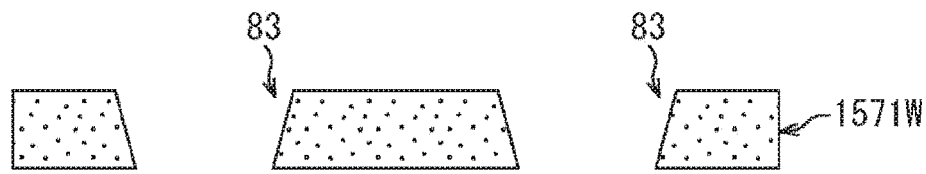

Next, as depicted in FIG. 63B, through-holes 83 are formed at predetermined positions of the doped substrate 1571W by etching. While only two through-holes 83 are depicted in FIGS. 63A, 63B, 63C, 63D, 63E, and 63F for want of space, in practice a multiplicity of through-holes 83 are formed in plane directions of the doped substrate 1571W.

Figure 63C:
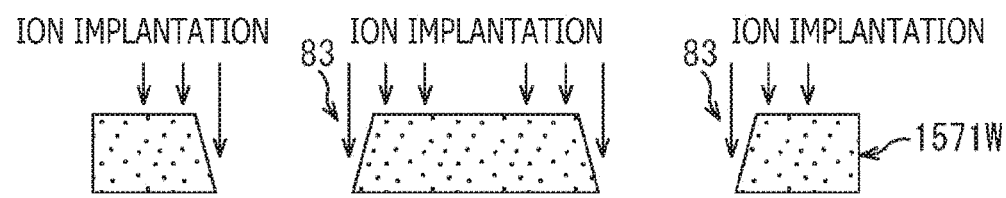
Figure 63D:
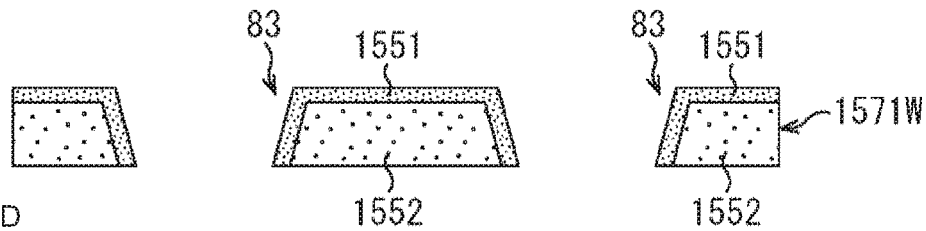

Subsequently, as depicted in FIG. 63C, B (boron) is ion implanted from the substrate surface on the light incidence side of the doped substrate 1571W to a predetermined depth (for example, on the order of 3 µm), followed by a heat treatment at 900° C. As a result, as depicted in FIG. 63D, a first region 1551 where the impurity concentration is a high concentration and a second region 1552 lower than the first region 1551 in impurity concentration are formed.

Figure 63E:
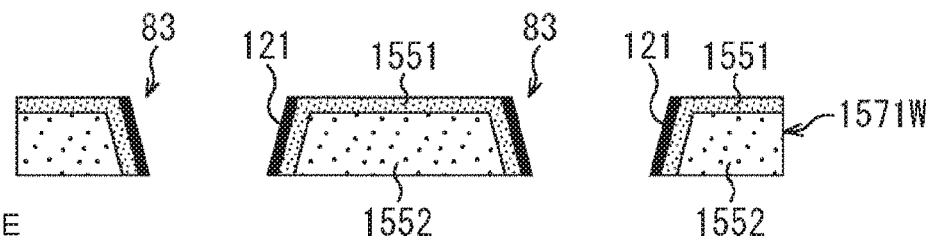

Then, as depicted in FIG. 63E, a black resist material is applied to side walls of the through-holes 83 by spray coating, to form light-shielding films 121.

Figure 63F:
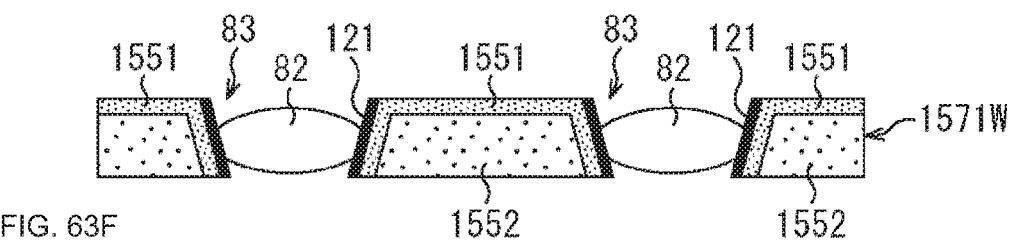

In addition, as depicted in FIG. 63F, lens resin sections 82 including lenses 21 are formed inside the through-holes 83 by pressure molding using the upper mold 201 and the lower mold 181 described referring to FIGS. 23A, 23B, 23C, 23D, 23E, 23F, and 23G.

Thereafter, though illustration is omitted, an upper-side surface layer 122 is formed on upper-side surfaces of the doped substrate 1571W and the lens resin sections 82, a lower-side surface layer 123 is formed on lower-side surfaces of the doped substrate 1571W and the lens resin sections 82, and the resultant body is individualized. As a result, the substrates with lens 41a'-2 depicted in FIG. 61B are completed.

Each of the substrates with lens 41a to 41e constituting the stacked lens structure 11 depicted in FIGS. 1A and 1B can be made to be the high-concentration doped substrate as depicted in FIGS. 61A and 61B. As a result, the light absorption amount of the substrate itself can be enhanced.

<17. Description of Pixel Layout of Light Receiving Element and Structure and Use of Diaphragm Plate>

Next, the pixel layout of the light receiving element 12 possessed by the camera module 1 depicted in FIGS. 10A, 10B, 10C, 10E, 10F, 11A, 11B, 11C, and 11D and the configuration of the diaphragm plate 51 will be further described.

FIGS. 64A, 64B, 64C, and 64D illustrate figures representing examples of plan-view shape of the diaphragm plate 51 possessed by the camera module 1 depicted in FIGS. 10A, 10B, 10C, 10D, 10E, and 10F, 11A, 11B, 11C, and 11D.

The diaphragm plate 51 includes a shielding region 51a for preventing incidence of light by absorbing or reflecting light, and opening regions 51b permitting transmission of light therethrough.

In the four optical units 13 possessed by the camera module 1 depicted in FIGS. 10A, 10B, 10C, 10D, 10E, and 10F, 11A, 11B, 11C, and 11D, the opening diameters of the opening regions 51b of the diaphragm plate 51 may all be the same or may be different, as depicted in FIGS. 64A, 64B, 64C, and 64D. In the figures in FIGS. 64A, 64B, 64C, and 64D, "L," "M," and "S" indicate the opening diameter of the opening region 51b is "large," "medium," and "small."

Figure 64A:
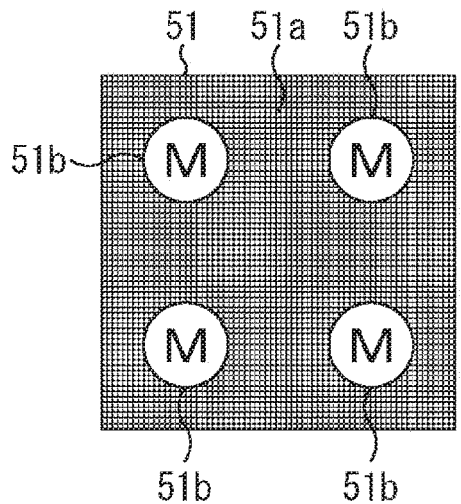
FIGS. 64A, 64B, 64C, and 64D illustrate figures representing an example of plan-view shape of a diaphragm plate possessed by a camera module.

In the diaphragm plate 51 illustrated in FIG. 64A, the opening diameters of the four opening regions 51b are the same.

Figure 64B:
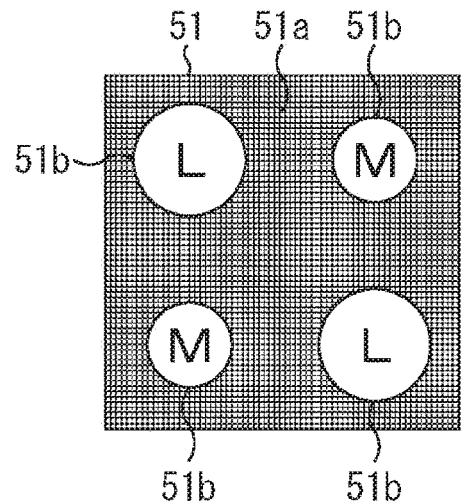

In the diaphragm plate 51 depicted in FIG. 64B, the two opening regions 51b are "medium" in size of opening diameter, that is, they are standard diaphragm openings. For example, as illustrated in FIG. 13, the diaphragm plate 51 may somewhat overlap with the lens 21 of the substrate with lens 41, in other words, the opening region 51b of the diaphragm plate 51 may be slightly smaller than the diameter of the lens 21. The remaining two opening regions 51b of the diaphragm plate 51 depicted in FIG. 64B are "large" in size of the opening diameter, in other words, larger in opening diameter than the aforementioned opening regions which are "medium" in size of opening diameter. The large opening regions 51b produce an action to permit a larger amount of light to be incident on the light receiving element 12 possessed by the camera module 1, in the case where, for example, the illuminance of the subject is low.

Figure 64C:
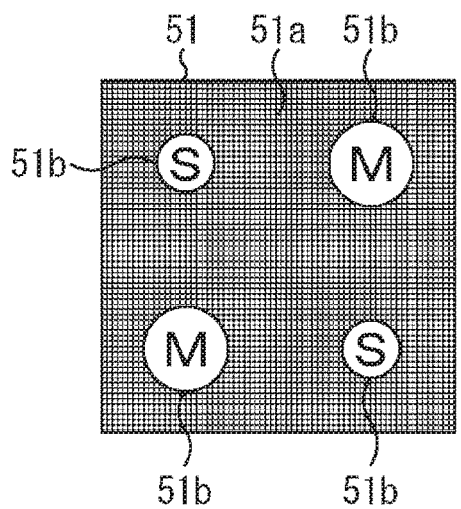

In the diaphragm plate 51 illustrated in FIG. 64C, the two opening regions 51b are "medium" in size of opening diameter, that is, they are standard diaphragm openings. The remaining two opening regions 51b of the diaphragm plate 51 depicted in FIG. 64C are "small" in size of the opening diameter, in other words, smaller in opening diameter than the aforementioned opening regions which are "medium" in size of opening diameter. The small opening regions 51b produce an action to reduce the amount of light incident on the light receiving element 12, in the case where, for example, the illuminance of the subject is high such that when the light from there is permitted to be incident on the light receiving element 12 possessed by the camera module 1 by passing through the opening regions 51b being "medium" in size of opening diameter, an electric charge generated in a photoelectric conversion section possessed by the light receiving element 12 would exceed a saturation charge amount.

Figure 64D:
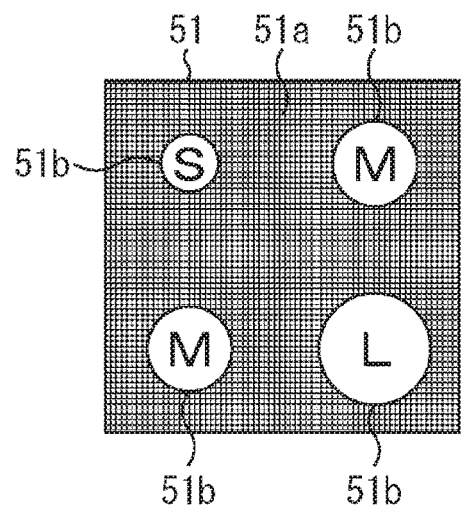

In the diaphragm plate 51 depicted in FIG. 64D, the two opening regions 51b are "medium" in size of opening diameter, that is, they are standard diaphragm openings. Of the remaining two opening regions 51b of the diaphragm plate 51 depicted in FIG. 64D, one is "large" in size of opening diameter, and one is "small." These opening regions 51b produce actions similar to those of the opening regions 51b being "large" and "small" in size of opening diameter which have been depicted in FIG. 64B and FIG. 64C.

Figure 65:
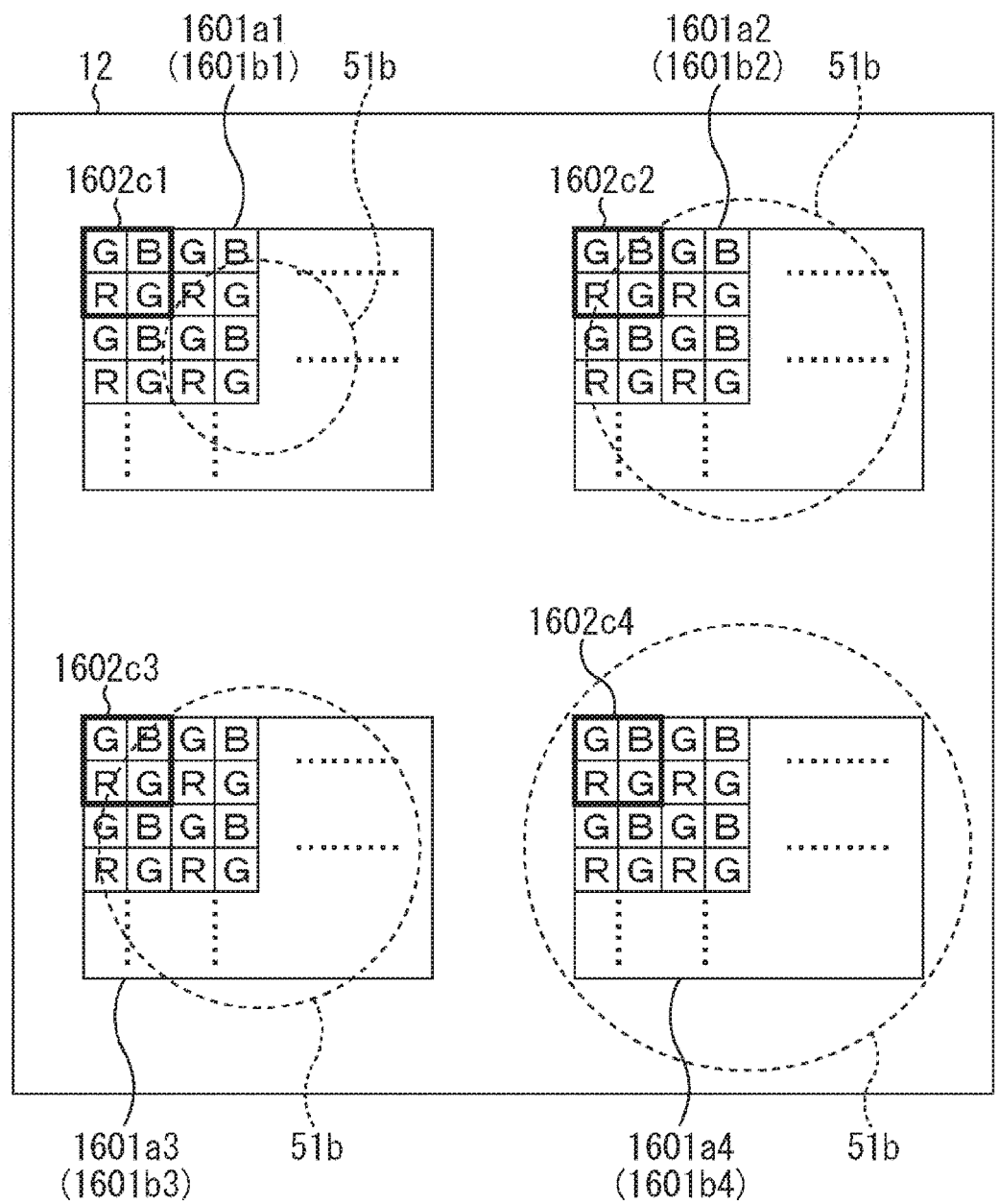
FIG. 65 is a figure for explaining a configuration of a light receiving region of a camera module.

FIG. 65 illustrates figures depicting the configuration of the light receiving regions of the camera module 1 depicted in FIGS. 10A, 10B, 10C, 10D, 10E, 10F, 11A, 11B, 11C, and 11D.

The camera module 1 includes four optical units 13 (not illustrated), as depicted in FIG. 65. Light incident on these four optical units 13 is received individually by light receiving means corresponding to the respective optical units 13. Therefore, the camera module 1 depicted in FIGS. 10A, 10B, 10C, 10D, 10E, 10F, 11A 11B, 11C, and 11D has the light receiving element 12 including four light receiving regions 1601a1 to 1601a4.

Note that as another embodiment concerning the light receiving means, the light receiving element 12 may include one light receiving region 1601a that receives light incident on one optical unit 13 possessed by the camera module 1, and the camera module 1 may include such light receiving elements 12 in the number of the optical units 13 possessed by the camera module 1, for example, in the number of four in the case of the camera module 1 illustrated in FIGS. 10A, 10B, 10C, 10D, 10E, 10F, 11A, 11B, 11C, and 11D.

Light receiving regions 1601a1 to 1601a4 include pixel arrays 1601b1 to 1601b4 in which pixels for receiving light are arranged in an array.

Note that in FIG. 65, for simplification, circuits for driving the pixels possessed by the pixel arrays and circuits for reading out the pixels are omitted, and the light receiving regions 1601a1 to 1601a4 and the pixel arrays 1601b1 to 1601b4 are represented in the same size.

The pixel arrays 1601b1 to 1601b4 possessed by the light receiving regions 1601a1 to 1601a4 include pixel repeating units 1602c1 to 1602c4 including plural pixels, and these repeating units 1602c1 to 1602c4 are arranged in pluralities in both a column direction and a row direction in an array, whereby the pixel arrays 1601b1 to 1601b4 are configured.

The optical units 13 are disposed individually on the four light receiving regions 1601a1 to 1601a4 possessed by the light receiving element 12. The four optical units 13 include a diaphragm plate 51 as a part thereof. In FIG. 65, as an example of opening diameter of the four opening regions 51b of the diaphragm plate 51, the opening region 51b of the diaphragm plate 51 depicted in FIG. 64D is indicated by broken line.

In the field of image signal process, a super-resolution technique is known as a technique for obtaining a high-resolution image by adaptation to an original image. One example thereof is disclosed, for example, JP 2015-102794A.

The camera modules 1 depicted in FIGS. 10A, 10B, 10C, 10D, 10E, 10F. 11A, 11B, 11C, and 11D may take structures illustrated in FIGS. 13, 16, 17, 34, 35, 37, and 55 as a sectional structure.

These camera modules 1 have a configuration in which the optical axes possessed by the optical units 13 disposed in twos in a column direction and a row direction on the surface of the camera module 1 serving as a light incidence surface extend in the same direction. As a result, notwithstanding the optical axes are directed in the same direction, by use of different light receiving regions, plural images which are not necessarily the same can be obtained.

Such a camera module 1 is suitable for obtaining an image higher in resolution than one image obtained from one optical unit 13, based on the plural original images obtained and utilizing a super-resolution technique therewith.

FIGS. 66 to 69 depict configuration examples of pixels in the light receiving regions of the camera modules 1 depicted in FIGS. 10A, 10B, 10C, 10D, 10E, 10F. 11A, 11B, 11C, and 11D.

Note that in FIGS. 66 to 69, the pixel of G represents a pixel that receives light of a green wavelength, the pixel of R represents a pixel that receives light of a red wavelength, and the pixel of B represents a pixel that receives light of a blue wavelength. The pixel of C represents a pixel that receives light in a whole wavelength region of visible light.

Figure 66:
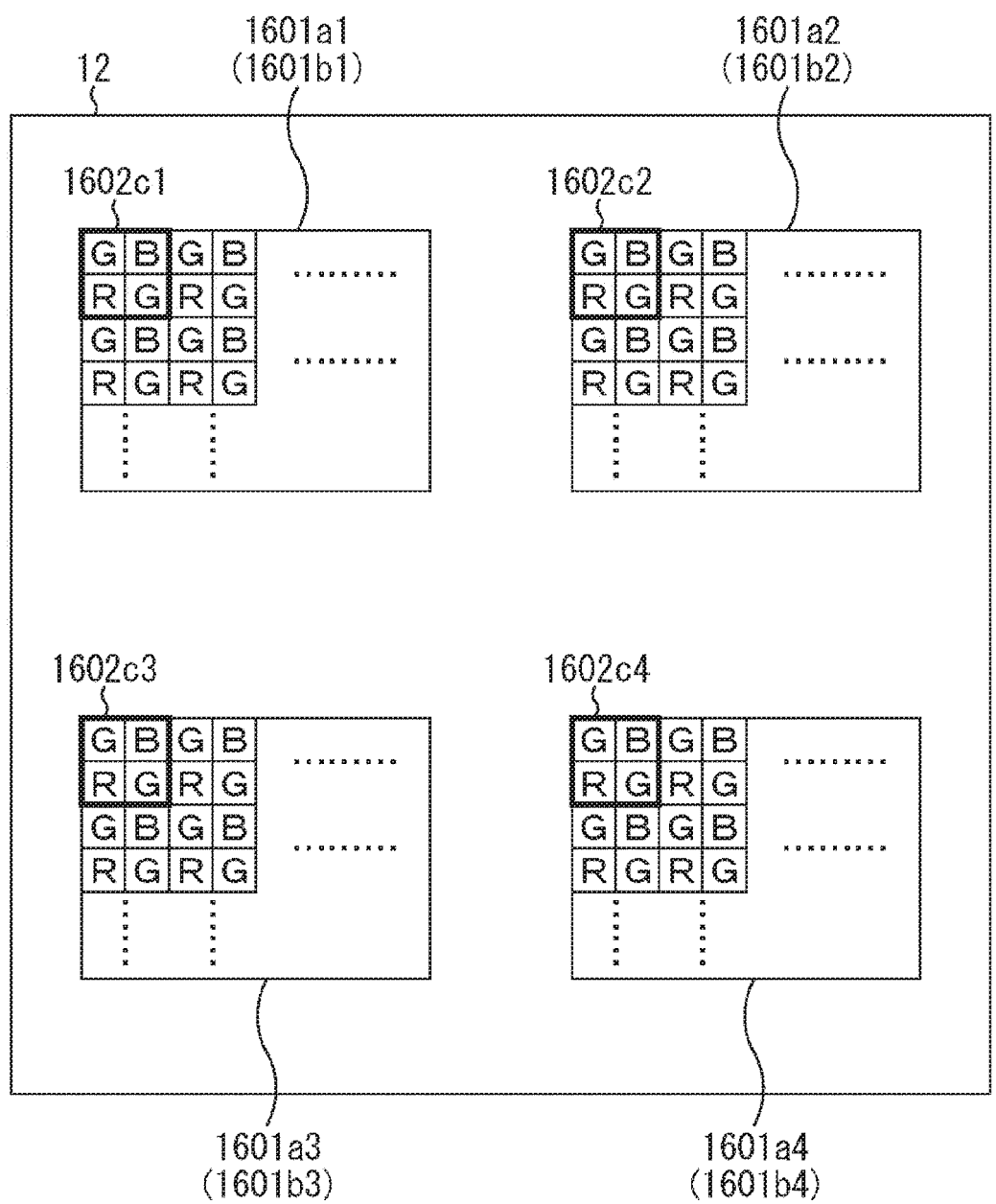
FIG. 66 is a figure depicting a first example of pixel layout in the light receiving region of the camera module.

FIG. 66 depicts a first example of pixel array of the four pixel arrays 1601b1 to 1601b4 possessed by the light receiving element 12 of the camera module 1.

In the four pixel arrays 1601b1 to 1601b4, respectively, repeating units 1602c1 to 1602c4 are repeatedly arrayed in a row direction and a column direction. Each of the repeating units 1602c1 to 1602c4 of FIG. 66 includes R, G, B, and G pixels.

The pixel array of FIG. 66 has an action to be suitable for spectrally dispersing the incident light from a subject irradiated with visible light into red (R), green (G), and blue (B) to obtain an image including three colors of RGB.

Figure 67:
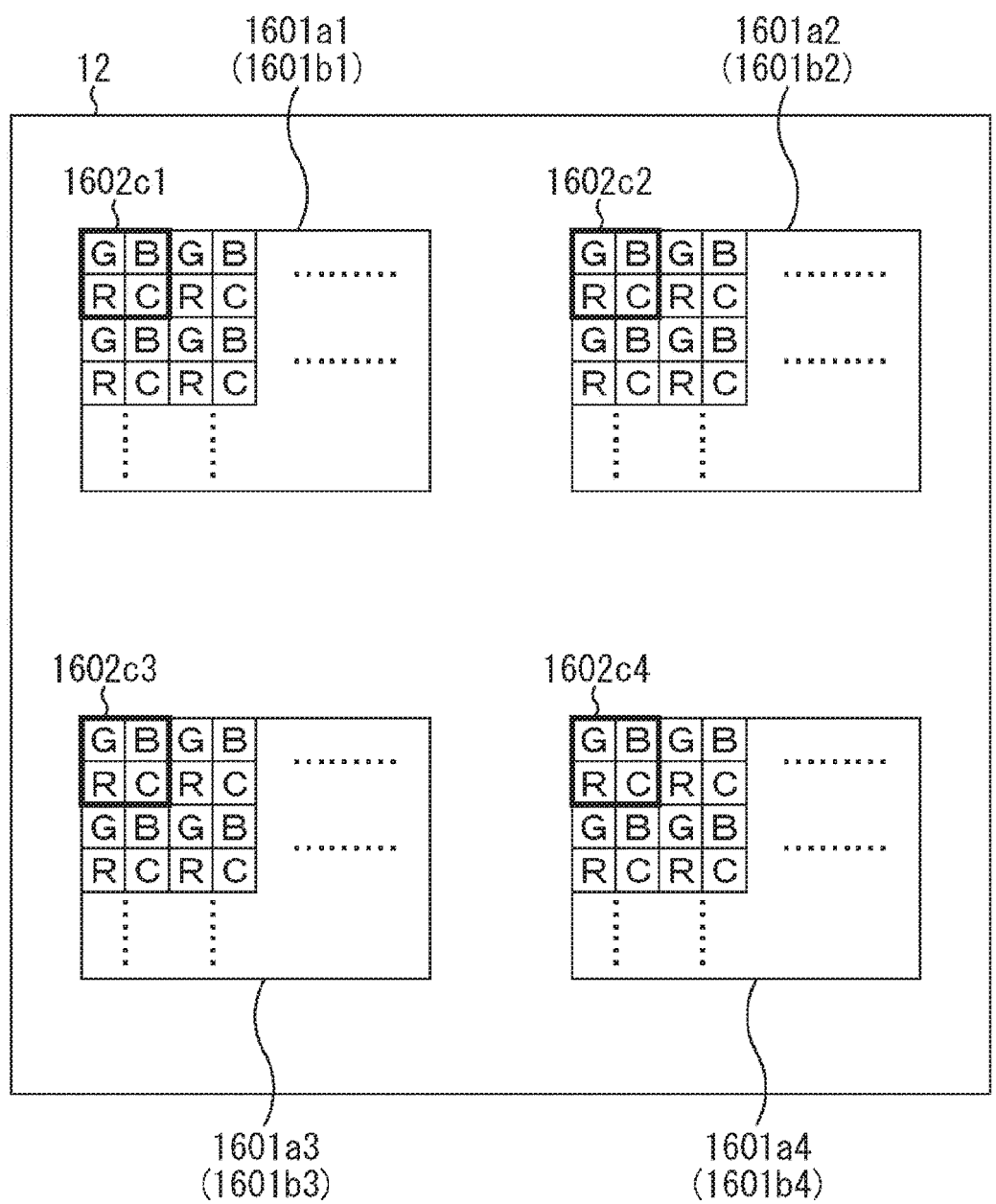
FIG. 67 is a figure depicting a second example of pixel layout in the light receiving region of the camera module.

FIG. 67 depicts a second example of pixel array of the four pixel arrays 1601b1 to 1601b4 possessed by the light receiving element 12 of the camera module 1.

The pixel array of FIG. 67 differs from the pixel array of FIG. 66 in the combination of wavelengths (colors) of light received by the pixels constituting the repeating units 1602c1 to 1602c4. In FIG. 67, each of the repeating units 1602c1 to 1602c4 includes R, G, B, and C pixels.

The pixel array of FIG. 67 includes a pixel of C that receives light in the whole wavelength region of visible light without spectrally dispersing light into R, G, and B as aforementioned. The C pixel is larger in light reception amount than the R, G, and B pixels that receive partial light of spectrally dispersed light. Therefore, this configuration produce an action such that even in the case where, for example, the illuminance of the subject is low, an image higher in lightness or an image with more gradations concerning luminance can be obtained, by use of information obtained by the C pixel which is large in light reception amount, for example, luminance information concerning the subject.

Figure 68:
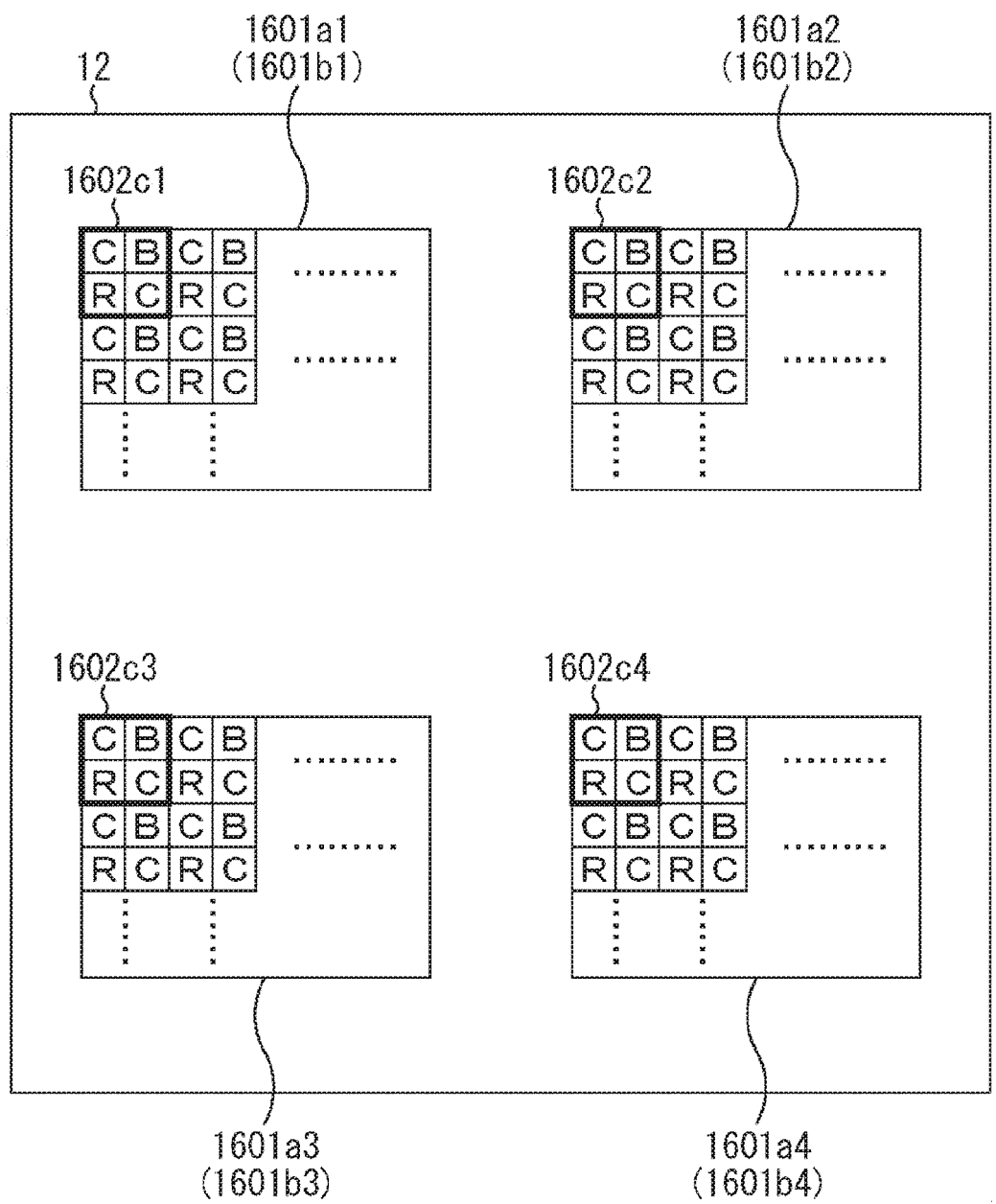
FIG. 68 is a figure depicting a third example of pixel layout in the light receiving region of the camera module.

FIG. 68 depicts a third example of pixel array of the four pixel arrays 1601b1 to 1601b4 possessed by the light receiving element 12 of the camera module 1.

In FIG. 68, each of the repeating units 1602c1 to 1602c4 includes R, C, B, and C pixels.

The repeating units 1602c1 to 1602c4 of pixels depicted in FIG. 68 do not include the pixel of G. Information corresponding to the pixel of G is obtained by arithmetic processing of information from the C, R, and B pixels. For example, it is obtained by subtracting output values of the R and B pixels from an output value of the C pixel.

The repeating units 1602c1 to 1602c4 of pixels depicted in FIG. 68 include the C pixels that receive light in the whole wavelength region, in the number of two, which is twice as compared to the repeating units 1602c1 to 1602c4 depicted in FIG. 67. In addition, the repeating units 1602c1 to 1602c4 depicted in FIG. 68 has two C pixels in a diagonal direction of the outer shape line of the repeating unit 1602c, such that the pitch of the C pixels in the pixel array 1601b provided in FIG. 68 is twice the pitch of the C pixels in the pixel array 1601b provided in FIG. 67, in both the column direction and the row direction of the pixel array 1601b.

Therefore, the configuration described in FIG. 68 produces an action such that in the case where, for example, the illuminance of the subject is low, the information obtained from the C pixel which is large in light reception amount, for example, luminance information, is compared to the configuration describe in FIG. 67, whereby the information can be obtained in twice resolution, whereby a clear image in twice resolution can be obtained.

Figure 69:
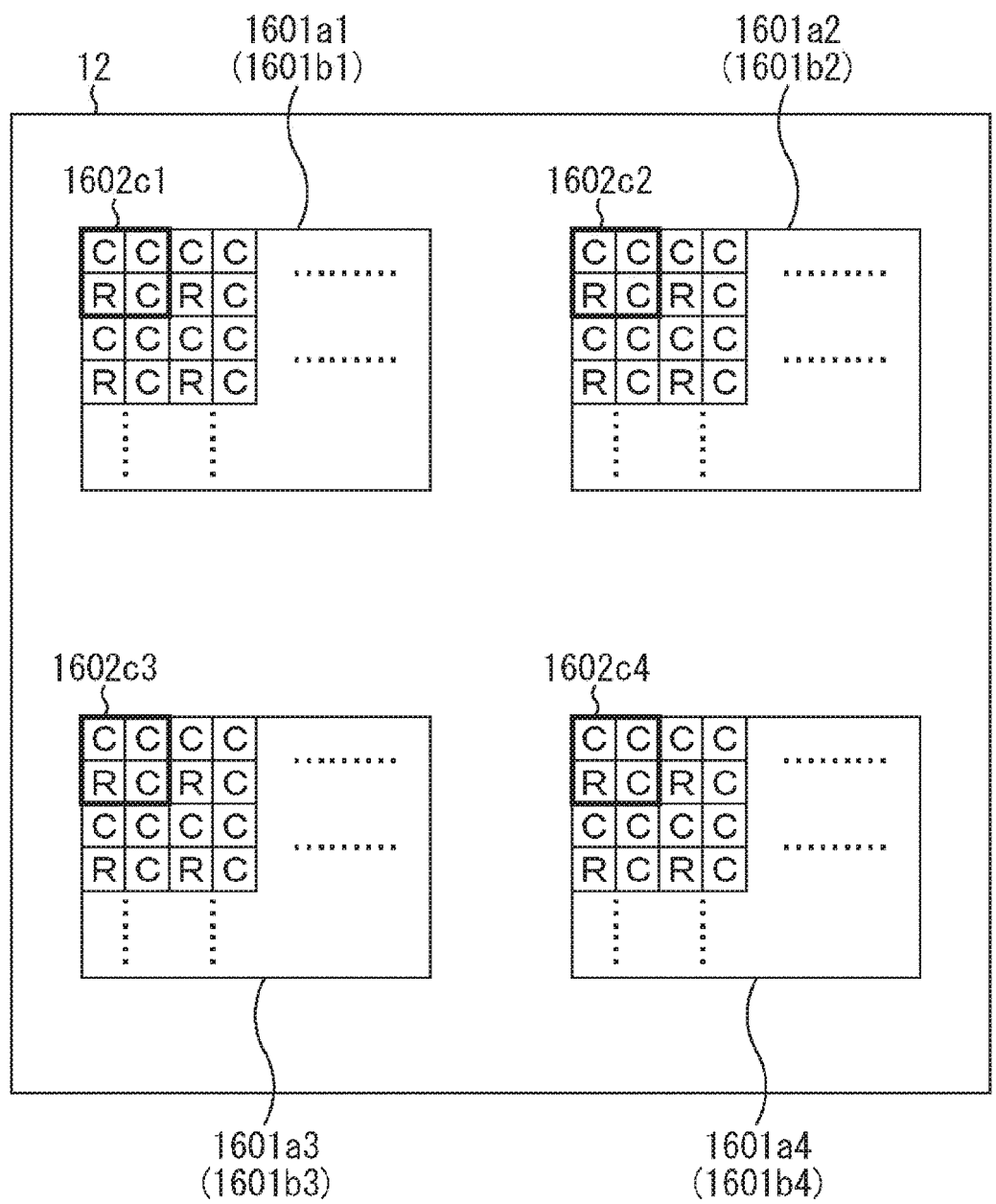
FIG. 69 is a figure depicting a fourth example of pixel layout in the light receiving region of the camera module.

FIG. 69 depicts a fourth example of pixel array of the four pixel arrays 1601b1 to 1601b4 possessed by the light receiving element 12 of the camera module 1.

In FIG. 69, each of the repeating units 1602c1 to 1602c4 includes R, C, C, and C pixels.

For example, in the case of a camera use for imaging the front side of an automobile by mounting the camera on the automobile, color images are often unnecessary. It is often required to recognize red brake lamps of preceding automobiles, and red signals of traffic signals installed on the road, and to recognize the shapes of other subjects.

For this reason, the configuration described in FIG. 69, by including the R pixels, can recognize the red brake lamps of automobiles and red signals of the traffic signals installed on the road, and by including the C pixels with larger light reception amount in the number of more than in the repeating unit 1602c of pixels described in FIG. 68, produces an action such that even in the case where, for example, the illuminance of a subject is low, a clearer image in higher resolution can be obtained.

Note that all the camera modules 1 including the light receiving elements 12 depicted in FIGS. 66 to 69 may use, as the shape of the diaphragm plate 51, any one of those described in FIGS. 64A, 64B, 64C, and 64D.

In the camera modules 1 described in FIGS. 10A, 10B, 10C, 10D, 10E, 10F, 11A, 11B, 11C, and 11D that include any one of the light receiving elements 12 depicted in FIGS. 66 to 69 and any one of the diaphragm plates 51 of A to D in FIGS. 64A, 64B, 64C, and 64D, the optical axes possessed by the optical units 13 disposed in twos in both the column direction and the row direction of the surface of the camera module 1 serving as a light incidence surface extend in the same direction.

The camera module 1 of such a configuration produces an action such that an image in higher resolution can be obtained by adaptation of a super-resolution technique to the plural original images obtained.

Figure 70:
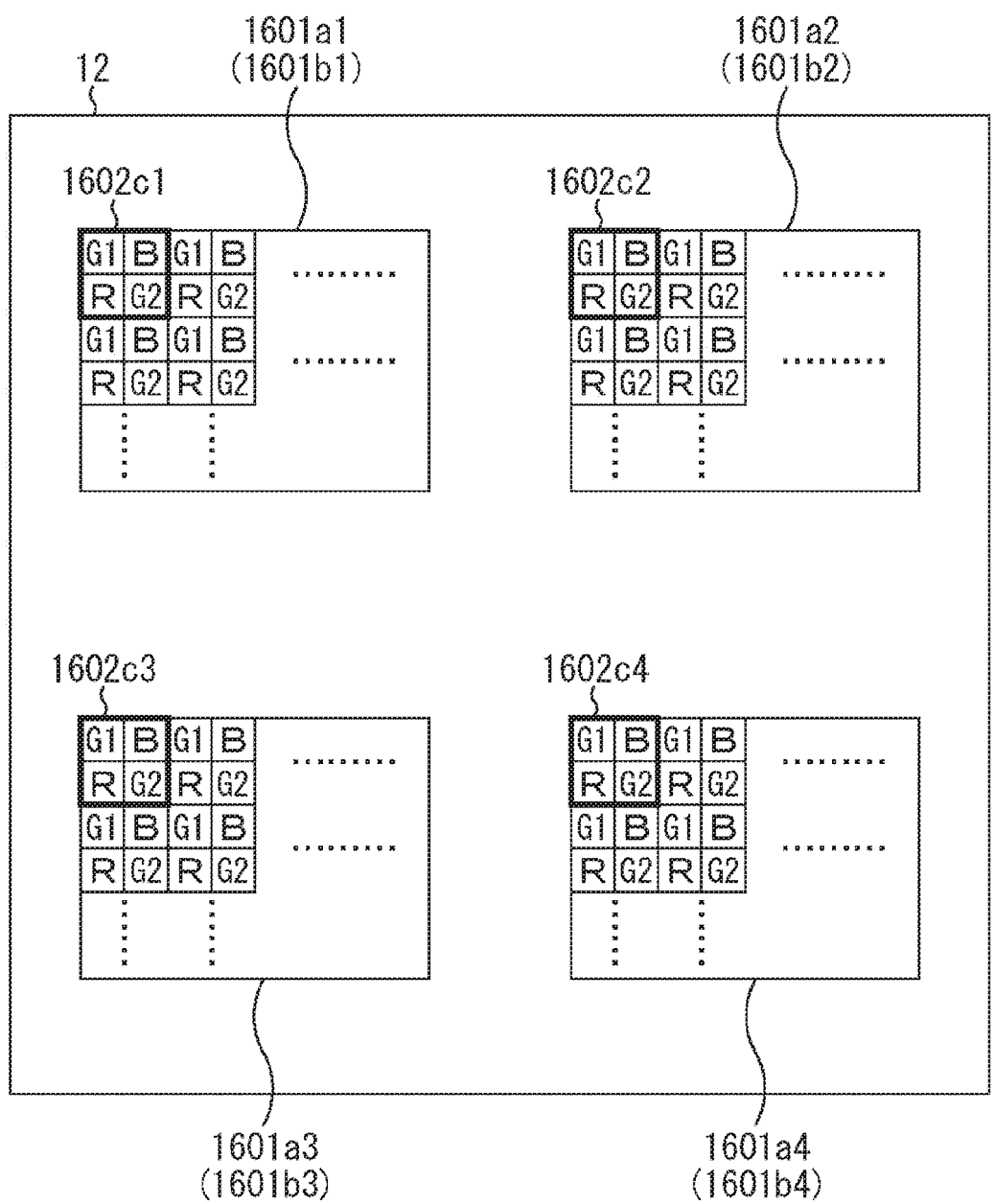
FIG. 70 is a figure depicting a modification of the pixel layout depicted in FIG. 66.

FIG. 70 depicts a modification of pixel array depicted in FIG. 66.

The repeating units 1602c1 to 1602c4 of FIG. 66 includes R, G, B, and G pixels, and the two G pixels of the same color have the same structure. On the other hand, in FIG. 70, repeating units 1602c1 to 1602c4 include R, G1, B, and G2 pixels, and the two G pixels of the same color, i.e., the G1 pixel and the G2 pixel are different in pixel structure.

The G1 pixel and the G2 pixel include signal generating means (for example, photodiodes) therein, in which the signal generating means of the G2 pixel is higher than the signal generating means in an appropriate operation limit (for example, higher in saturation charge amount). In addition, the G2 pixel is greater than the G1 pixel, in generated signal conversion means (for example, charge-voltage conversion capacity) possessed by the pixels.

As a result of these configurations, an output signal from the G2 pixel in the case where a predetermined amount of a signal (for example, an electric charge) is generated per unit time is suppressed to be smaller than that from the G1 pixel. In addition, since the saturation charge amount is large, an action is produced such that even in the case where, for example, the illuminance of a subject is high, the pixel does not reach the operation limit, and an image with higher gradation property can be obtained.

On the other hand, since the G1 pixel is capable of obtaining a larger output signal than that of the G2 pixel in the case where a predetermined amount of a signal (for example, an electric charge) is generated per unit time, the G1 pixel produces an action such that even in the case where, for example, the illuminance of a subject is low, an image with higher gradation property can be obtained.

Since the light receiving element 12 described in FIG. 70 thus has the G1 pixels and the G2 pixels, an action is produced such that an image with higher gradation property can be obtained in a wide illuminance range, or an image wide in what is generally called dynamic range can be obtained.

Figure 71:
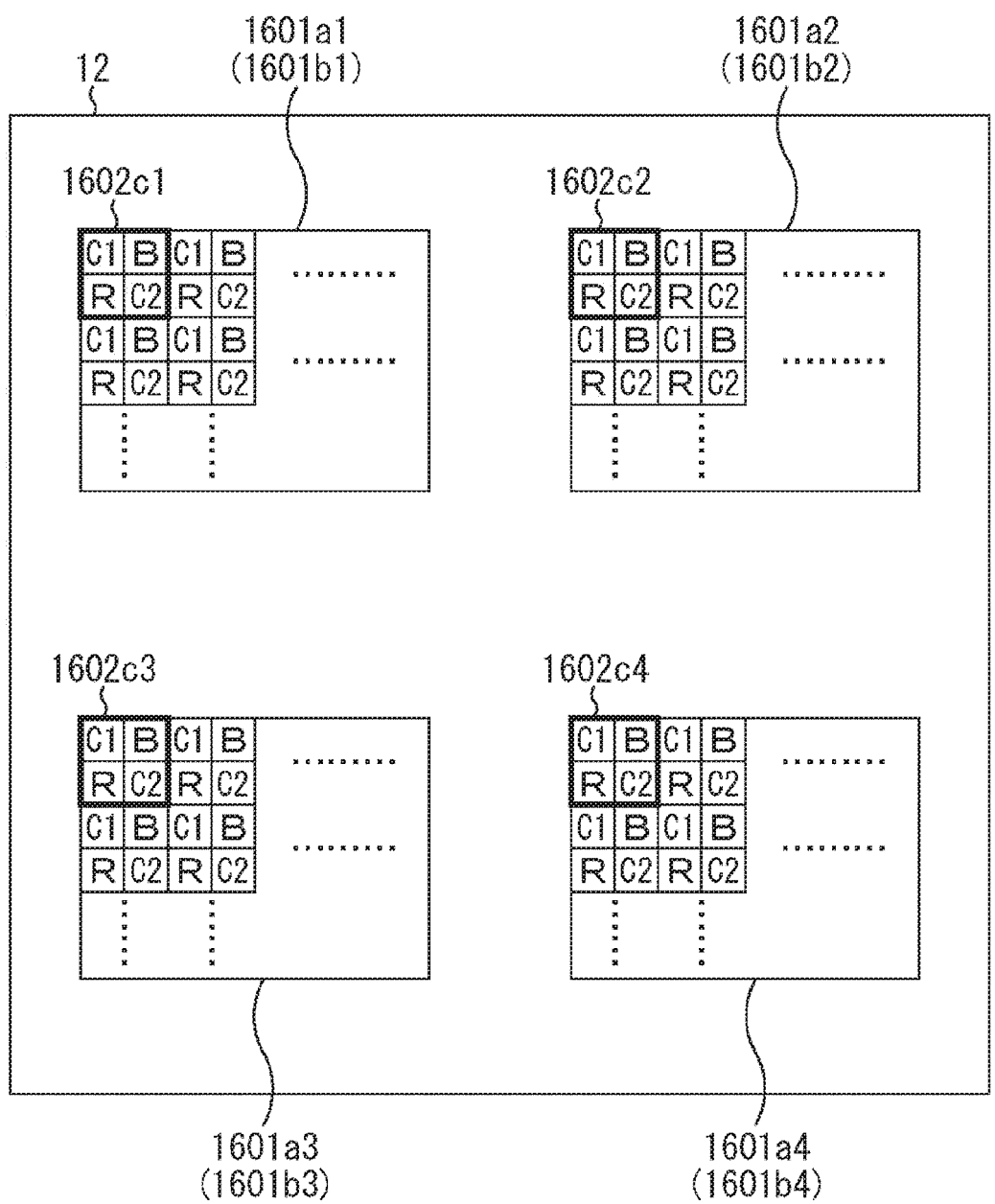
FIG. 71 is a figure depicting a modification of the pixel layout of FIG. 68.

FIG. 71 depicts a modification of the pixel array of FIG. 68.

The repeating units 1602c1 to 1602c4 of FIG. 68 include R, C, B, and C pixels, and the two C pixels of the same color have the same pixel structure. On the other hand, in FIG. 71, repeating units 1602c1 to 1602c4 include R, C1, B, and C2 pixels, and the two C pixels of the same color, i.e., the C1 pixel and the C2 pixel have different pixel structures.

The C1 pixel and the C2 pixel have signal generating means (for example, photodiodes) therein, in which the signal generating means of the C2 pixel is higher than the signal generating means of the C1 pixel in operation limit (for example, higher in saturation charge amount). In addition, the C2 pixel is greater than the C1 pixel, in generated signal conversion means (for example, charge-voltage conversion capacity).

Figure 72:
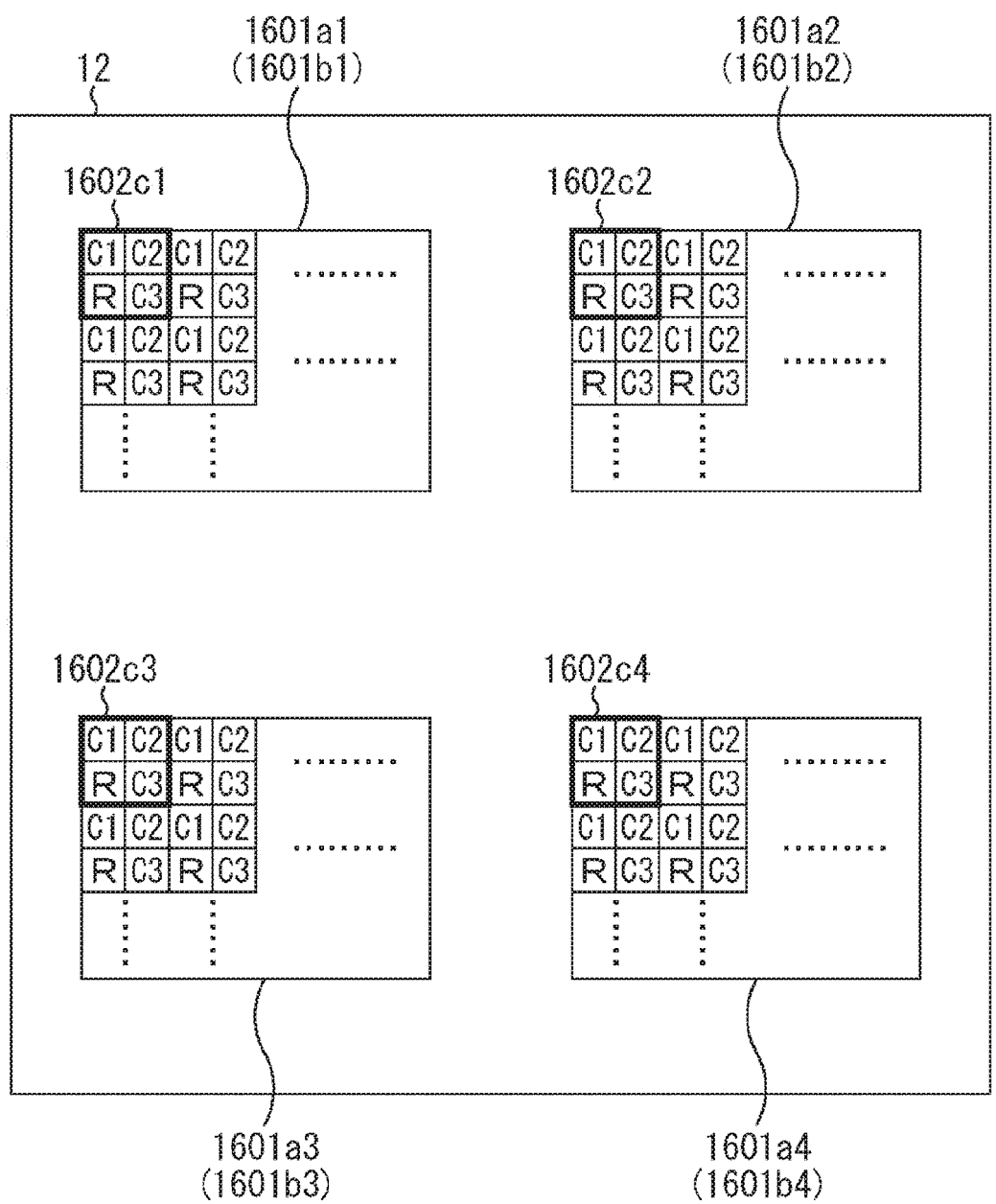
FIG. 72 is a figure depicting a modification of the pixel layout of FIG. 69.

FIG. 72 depicts a modification of the pixel array of FIG. 69.

The repeating units 1602c1 to 1602c4 of FIG. 69 include R, C, C, and C pixels, and the three C pixels of the same color have the same pixel structure. On the other hand, in FIG. 72, repeating units 1602c1 to 1602c4 include R, C1, C2, and C3 pixels, and the three C pixels of the same color, i.e., the C1 to C3 pixels have different pixel structures.

For example, the C1 to C3 pixels include signal generating means (for example, photodiodes) therein, in which the C2 pixel is higher than the C1 pixel, and the C3 pixel is higher than the C2 pixel, in operation limit of the signal generation means (for example, higher in saturation charge amount). In addition, the C2 pixel is greater than the C1 pixel, and the C3 pixel is greater than C2 pixel, in generated signal conversion means (for example, charge-voltage conversion capacity) possessed by the pixels.

Since the light receiving elements 12 described in FIGS. 71 and 72 have the above-mentioned configuration, as in the light receiving element 12 illustrated in FIG. 70, they produce an action such that an image with high gradation properties can be obtained in a wider illumination range, or an image wide in what is generally called dynamic range can be obtained.

As the configuration of the diaphragm plate 51 of the camera modules including the light receiving elements 12 described in FIGS. 70 to 72, the configurations of the various diaphragm plates 51 depicted in FIGS. 64A, 64B, 64C, and 64D and their modifications may be adopted.

In the camera modules 1 described in FIGS. 10A, 10B, 10C, 10D, 10E, 10F, 11A, 11B, 11C, and 11D including any one of the light receiving elements 12 depicted in FIGS. 70 to 72 and any one of the diaphragm plates 51 in FIGS. 64A, 64B, 64C, and 64D, the optical axes of the optical units 13 disposed in twos in both the column direction and the row direction of the surface of the camera module 1 serving as a light incidence surface extend in the same direction.

The camera module 1 having such a configuration produces an action such that an image in a higher resolution can be obtained by adaptation of a super-resolution technique to the plural original images obtained.

FIG. 73A depicts a fifth example of pixel array of the four pixel arrays 1601b1 to 1601b4 possessed by the light receiving element 12 of the camera module 1.

The four pixel arrays 1601b1 to 1601b4 possessed by the light receiving element 12 may not necessarily have the same structure as aforementioned, but may have different structures as depicted in FIG. 73A.

In the light receiving element 12 depicted in FIG. 73A, the pixel array 1601b1 and the pixel array 1601b4 are the same in structure, and the repeating units 1602c1 and 1602c4 constituting the pixel arrays 1601b1 and 1601b4 are also the same in structure.

On the other hand, the structure of the pixel array 1601b2 and the pixel array 1601b3 is different from the structure of the pixel array 1601b1 and the pixel array 1601b4. Specifically, the size of pixels included in the repeating units 1602c2 and 1602c3 of the pixel array 1601b2 and the pixel array 1601b3 is greater than the size of pixels included in the repeating units 1602c1 and 1602c4 of the pixel array 1601b1 and the pixel array 1601b4. Furthermore, the size of a photoelectric conversion section included in the pixel is greater. Since the pixel size is greater, the region size of the repeating units 1602c2 and 1602c3 is also greater than the region size of the repeating units 1602c1 and 1602c4. Therefore, the pixel array 1601b2 and the pixel array 1601b3 are the same in area but are small in the number of pixels, as compared to the pixel array 1601b1 and the pixel array 1601b4.

As the configuration of the diaphragm plate 51 of the camera module 1 including the light receiving element 12 of FIG. 73A, the configurations of the diaphragm plates 51 depicted in FIGS. 64A, 64B, and 64C or the configurations of the diaphragm plates 51 depicted in FIGS. 73B, 73C, and 73D or their modifications may be adopted.

In general, a light receiving element using large pixels produces an action such that an image with good signal-to-noise ratio (S/N ratio) can be obtained, as compared to a light receiving element using small pixels.

For example, the magnitude of noise in a signal reading-out circuit or a circuit for amplifying the read-out signal is substantially the same for both a light receiving element using large pixels and a light receiving element using small pixels, but, on the other hand, the magnitude of a signal generated by a signal generating section possessed by a pixel is greater as the pixel is larger.

Therefore, a light receiving element using large pixels produces an action such that an image with good signal-to-noise ratio (S/N ratio), as compared to a light receiving element using small pixels.

On the other hand, if the size of the pixel array is the same, a light receiving element using small pixels is higher in resolution than a light receiving element using large pixels.

For this reason, a light receiving element using small pixels produces an action such that an image in a higher resolution can be obtained, as compared to a light receiving element using large pixels.

The above-mentioned configuration possessed by the light receiving element 12 described in FIG. 73A produces an action such that in the case where, for example, the illuminance of a subject is high and a great signal can therefore be obtained in the light receiving element 12, it is possible, by using light receiving regions 1601a1 and 1601a4 which are small in pixel size and high in resolution, to obtain an image high in resolution, and, by adaptation of a super-resolution technique to these two images obtained, there is produced action such that an image higher in resolution is also obtained.

In addition, in the case where the illuminance of a subject is low, a large signal cannot therefore be obtained in the light receiving element 12, and therefore there is the fear of a lowering in S/N ratio of an image, it is possible, by using the light receiving regions 1601a2 and 1601a3 by which an image with a high S/N ratio can be obtained, to obtain an image with a high S/N ratio, and, by adaptation of a super-resolution technique to these two images obtained, there is produced an action such that an image higher in resolution is also obtained.

In this case, the camera module 1 including the light receiving element 12 depicted in FIG. 73A may use, as the shape of the diaphragm plate 51, the shape of, for example, the diaphragm plate 51 described in FIG. 73B, of the three pieces concerning the shapes of the diaphragm plates 51 described in FIGS. 73B, 73C, and 73D.

For example, the diaphragm plate 51 of FIG. 73C, of the three pieces concerning the shapes of the diaphragm plates 51 described in FIGS. 73B, 73C, and 73D, is larger, in the opening region 51b of the diaphragm plate 51 used in combination with the light receiving regions 1601a2 and 1601a3 using the large pixels, than the opening regions 51b of diaphragm plates 51 used in combination with the other light receiving regions.

Therefore, the camera module 1 using the diaphragm plate 51 of FIG. 73C, of the three pieces concerning the shapes of the diaphragm plates 51 described in FIGS. 73B, 73C, and 73D in combination with the light receiving element 12 depicted in FIG. 73A, produces an action such that in the case where the illuminance of a subject is low and therefore a large signal cannot be obtained in the light receiving element 12, an image higher in S/N ratio can be obtained in the light receiving regions 1601a2 and 1601a3, as compared to the camera module 1 using the diaphragm plate 51 of FIG. 73B in combination with the light receiving element 12 depicted in FIG. 73A.

For example, the diaphragm plate 51 of FIG. 73D, of the three pieces concerning the shapes of the diaphragm plates 51 described in FIGS. 73B, 73C, and 73D is smaller, in the opening region 51b of the diaphragm plate 51 used in combination with the light receiving regions 1601a2 and 1601a3 using the large pixels, than the opening regions 51b of the diaphragm plates 51 used in combination with the other light receiving regions.

Therefore, the camera module 1 using the diaphragm plate 51 of FIG. 73D, of the three pieces concerning the shapes of the diaphragm plate 51 described in FIGS. 73B, 73C, and 73D, in combination with the light receiving element 12 depicted in FIG. 73A, produces an action such that in the case where, for example, the illuminance of a subject is high and therefore a large signal can be obtained in the light receiving element 12, it is possible to suppress the amount of light incident on the light receiving regions 1601a2 and 1601a3, as compared to the camera module 1 using the diaphragm plate 51 of FIG. 73B, of the three pieces concerning the shapes of the diaphragm plate 51 described in FIGS. 73B, 73C, and 73D in combination with the light receiving element 12 depicted in FIG. 73A.

As a result, there is produced an action to restrain the generation of a situation in which excessive light would be incident on the pixels possessed by the light receiving regions 1601a2 and 1601a3 and an appropriate operation limit of pixels possessed by the light receiving regions 1601a2 and 1601a3 would thereby be exceeded (for example, a saturation charge amount would be exceeded).

FIG. 74A depicts a sixth example of pixel array of the four pixel arrays 1601b1 to 1601b4 possessed by the light receiving element 12 of the camera module 1.

In the light receiving element 12 depicted in FIG. 74A, the region size of a repeating unit 1602c1 of the pixel array 1601b1 is smaller than the region sizes of repeating units 1602c1 and 1602c2 of the pixel arrays 1601b2 and 1601b3. The region size of a repeating unit 1602c4 of the pixel array 1601b4 is larger than the region sizes of the repeating units 1602c1 and 1602c2 of the pixel arrays 1601b2 and 1601b3.

In other words, in regard of the region sizes of the repeating units 1602c1 to 1602c4, there is a relation of (the repeating unit 1602c1)<((the repeating unit 1602c2)=(the repeating unit 1602c3))<(the repeating unit 1602c4).

In regard of the repeating units 1602c1 to 1602c4, as the region size is larger, the pixel size is larger and the size of a photoelectric conversion section is larger.

As the configuration of the diaphragm plate 51 of the camera module 1 including the light receiving element 12 of FIG. 74A, the configurations of the various diaphragm plates 51 depicted in FIGS. 64A, 64B, and C, or the configurations of the diaphragm plates 51 depicted in FIGS. 74B, 74C, and 74D, or their modifications may be adopted.

The above-mentioned configuration possessed by the light receiving element 12 described in FIG. 74A produces an action such that in the case where, for example, the illuminance of a subject is high and therefore a large signal can be obtained in the light receiving element 12, it is possible, by using the light receiving region 1601a1 which is small in pixel size and high in resolution, to obtain an image high in resolution.

In addition, in the case where the illuminance of a subject is low and therefore a large signal cannot be obtained in the light receiving element 12, there is the fear of a lowering in S/N ratio of an image, it is possible, by using the light receiving regions 1601a2 and 1601a3 by which an image high in S/N ratio can be obtained, to obtain an image high in S/N ratio, and, by adaptation of a super-resolution technique to these two images obtained, there is obtained an action such that an image higher in resolution is also obtained.

In the case where the illuminance of a subject is lower and there is the fear of a further lowering in the S/N ratio of an image in the light receiving element 12, it is possible, by using the light receiving region 1601a4 by which an image higher in S/N ratio can be obtained, to produce an action such that an image higher in S/N ratio can be obtained.

In this case, as the shape of the diaphragm plate 51 of the camera module 1 including the light receiving element 12 depicted in FIG. 74A, the shape of, for example, the diaphragm plate 51 described in FIG. 74B, of the three pieces concerning the shapes of the diaphragm plates 51 described in FIGS. 74B 74C, and 74D, may be adopted.

For example, the diaphragm plate 51 of FIG. 74C, of the three pieces concerning the shapes of the diaphragm plate 51 described in FIGS. 74B, 74C, and 74D, is larger, in the opening region 51b of the diaphragm plate 51 used in combination with the light receiving regions 1601a2 and 1601a3 using large pixels, than the opening region 51b of the diaphragm plate 51 used in combination with the light receiving region 1601a1 using the small images. In addition, the opening region 51b of the diaphragm plate 51 used in combination with the light receiving region 1601a4 using further larger pixels is further larger.

For this reason, the camera module 1 using the diaphragm plate 51 of FIG. 74C, of the three pieces concerning the shapes of the diaphragm plates 51 described in FIGS. 74B, 74C, and 74D, in combination with the light receiving element 12 depicted in FIG. 74A, produces an action such that in the case where, for example, the illuminance of a subject is low and therefore a large signal cannot be obtained in the light receiving element 12, an image higher in S/N ratio can be obtained in the light receiving regions 1601a2 and 1601a3, and, in the case where the illuminance of the subject is further lower, an image further higher in S/N ratio can be obtained in the light receiving region 1601a4, as compared to the camera module 1 using the diaphragm plate 51 of FIG. 74B, of the three pieces concerning the shapes of the diaphragm plate 51 described in FIGS. 74B, 74C, and 74D, in combination with the light receiving element 12 depicted in FIG. 74A.

For example, the diaphragm plate 51 of FIG. 74D, of the three pieces concerning the shapes of the diaphragm plates 51 described in FIGS. 74B, 74C, and 74D is smaller, in the opening region 51b of the diaphragm plate 51 used in combination with the light receiving regions 1601a2 and 1601a3 using large pixels, than the opening region 51b of the diaphragm plate 51 used in combination with the light receiving region 1601a1 using small images. In addition, the opening region 51b of the diaphragm plate 51 used in combination with the light receiving region 1601a4 using further larger pixels is further smaller.

For this reason, the camera module 1 using the diaphragm plate 51 of FIG. 74D, of the three pieces concerning the shapes of the diaphragm plates 51 described in FIGS. 74B, 74C, and 74D, in combination with the light receiving element 12 depicted in FIG. 74A produces an action such that in the case where, for example, the illuminance of a subject is high and therefore a large signal can be obtained in the light receiving element 12, the amounts of light incident on the light receiving regions 1601a2 and 1601a3 are suppressed, as compared to the camera module 1 using the diaphragm plate 51 of FIG. 74B, of the three pieces concerning the shapes of the diaphragm plate 51 described in FIGS. 74B, 74C, and 74D, in combination with the light receiving element 12 depicted in FIG. 74A.

As a result, there is produced an action such as to restrain the generation of a situation in which excessive light would be incident on the pixels possessed by the light receiving regions 1601a2 and 1601a3 with the result that an appropriate operation limit of the pixels possessed by the light receiving regions 1601a2 and 1601a3 would be exceeded (for example, a saturation charge amount would be exceeded).

In addition, there is produced an action such as to further suppress the amount of light incident on the light receiving region 1601a4, and thereby to suppress also the generation of a situation in which excessive light would be incident on the pixels possessed by the light receiving region 1601a4 with the result that an appropriate operation limit of the pixels possessed by the light receiving region 1601a4 would be exceeded (for example, a saturation charge amount would be exceeded).

Note that as another embodiment, as is used for example in a general camera, by use of a structure similar to a diaphragm in which plural plates are combined and the positional relation thereof is changed to change the size of an opening, the camera module may include a diaphragm plate 51 with an opening region 51b variable, and the size of the opening of the diaphragm may be changed according to the illuminance of a subject.

For example, in the case where the light receiving elements 12 described in FIG. 73A and FIG. 74A are used, a structure may be adopted in which in the case where the illuminance of a subject is low, the shapes of FIG. 73C and FIG. 74C, of the three pieces concerning the shapes of the diaphragm plates 51 described in FIGS. 73B, 73C, and 73D and FIGS. 74B, 74C, and 74D, are used, whereas in the case where the illuminance of the subject is higher than this, the shapes of FIG. 73B and FIG. 74B are used, and in the case where the illuminance of the subject is further higher, the shapes of FIG. 73D and FIG. 74D are used.

Figure 75:
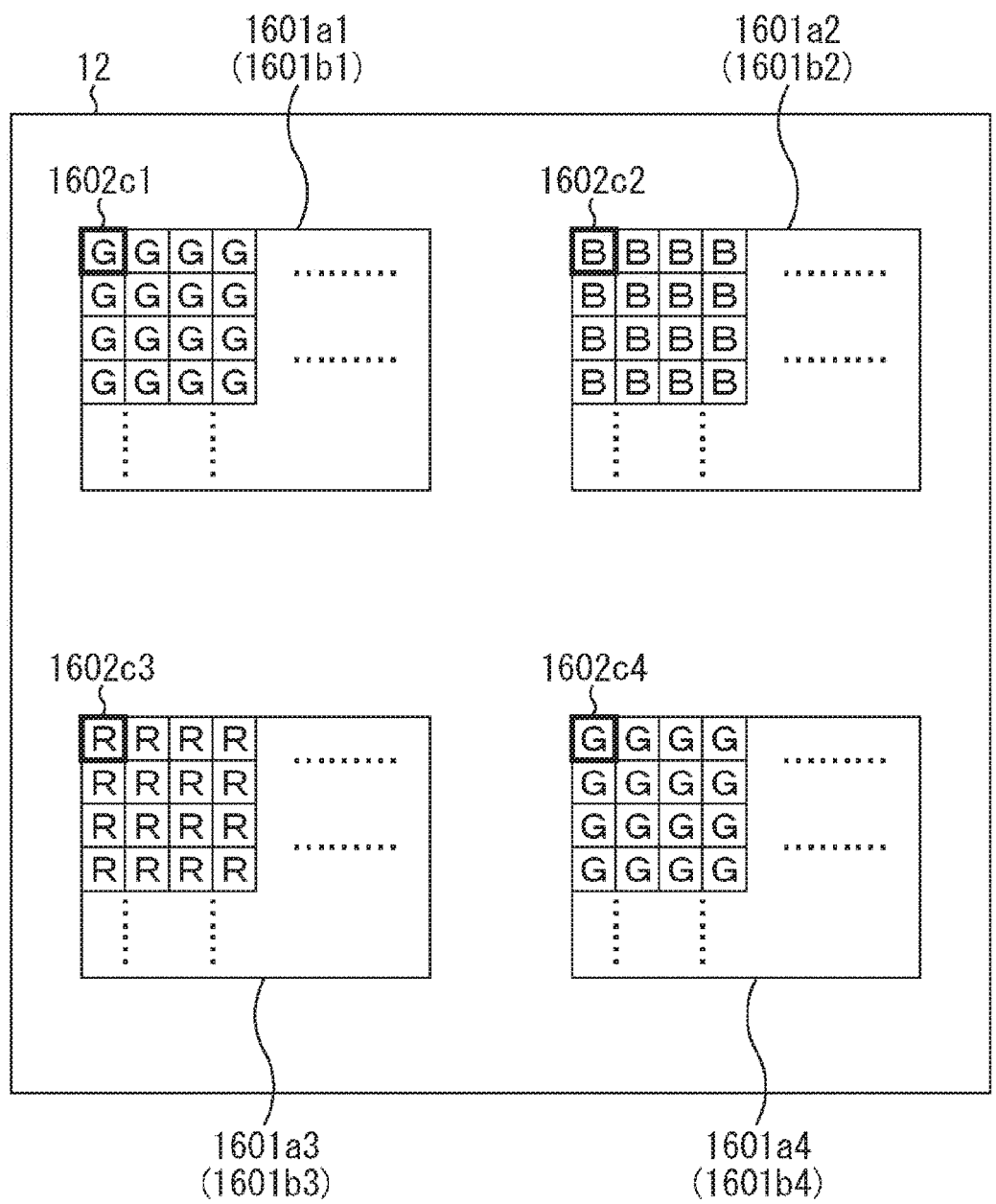
FIG. 75 is a figure depicting a seventh example of pixel layout in the light receiving region of the camera module.

FIG. 75 depicts a seventh example of pixel array of the four pixel arrays 1601b1 to 1601b4 possessed by the light receiving element 12 of the camera module 1.

In the light receiving element 12 depicted in FIG. 75, all pixels of the pixel array 1601b1 include pixels that receive light of a green wavelength. All pixels of the pixel array 1601b2 include pixels that receive light of a blue wavelength. All pixels of the pixel array 1601b3 include pixels that receive light of a red wavelength. All pixels of the pixel array 1601b4 include pixels that receive light of a green wavelength.

Figure 76:
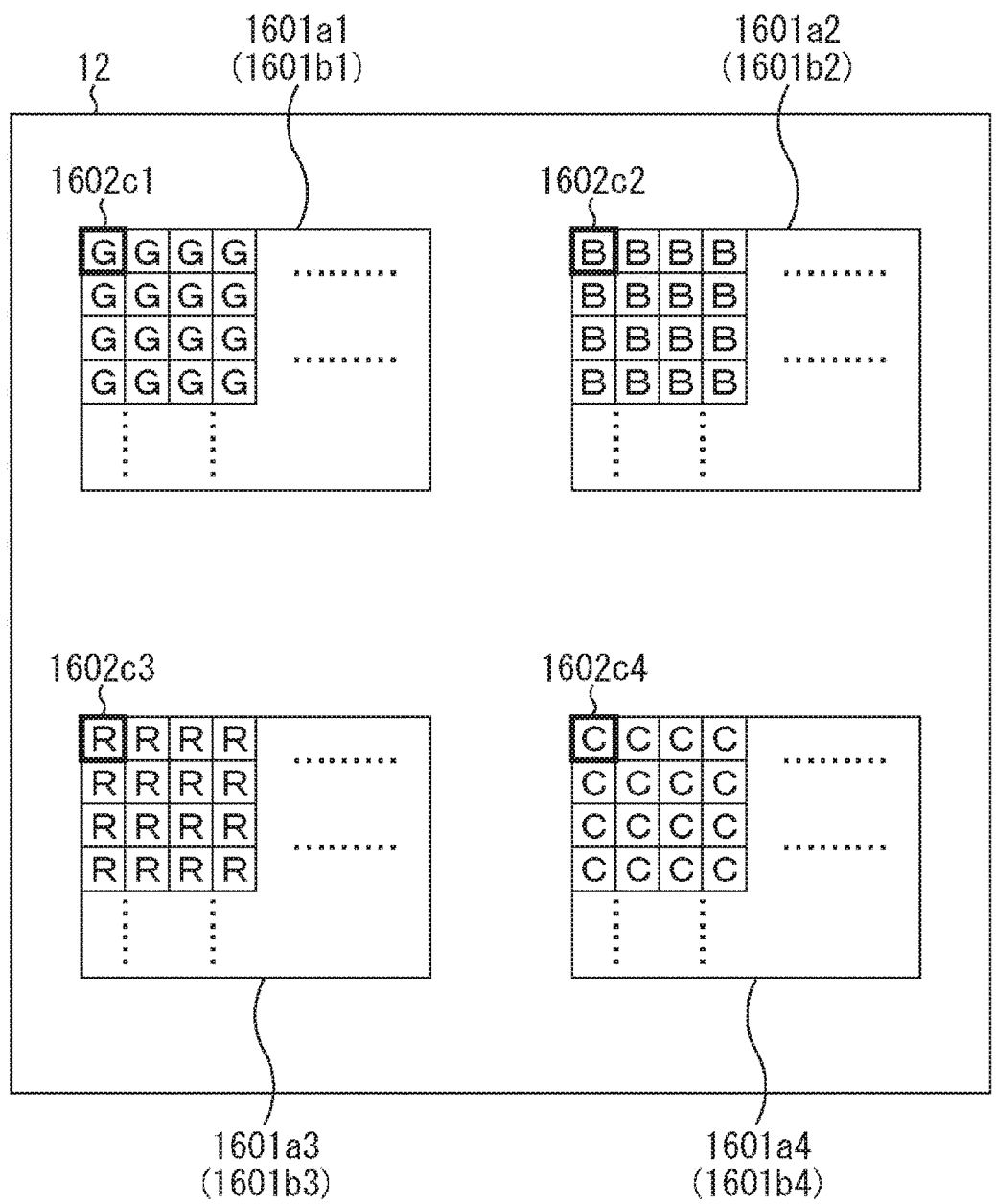
FIG. 76 is a figure depicting an eighth example of pixel layout in the light receiving region of the camera module.

FIG. 76 depicts an eighth example of pixel array of the four pixel arrays 1601b1 to 1601b4 possessed by the light receiving element 12 of the camera module 1.

In the light receiving element 12 depicted in FIG. 76, all pixels of the pixel array 1601b1 include pixels that receive light of a green wavelength. All pixels of the pixel array 1601b2 include pixels that receive light of a blue wavelength. All pixels of the pixel array 1601b3 include pixels that receive light of a red wavelength. All the pixels of the pixel array 1601b4 include pixels that receive light of wavelengths in the whole visible light region.

Figure 77:
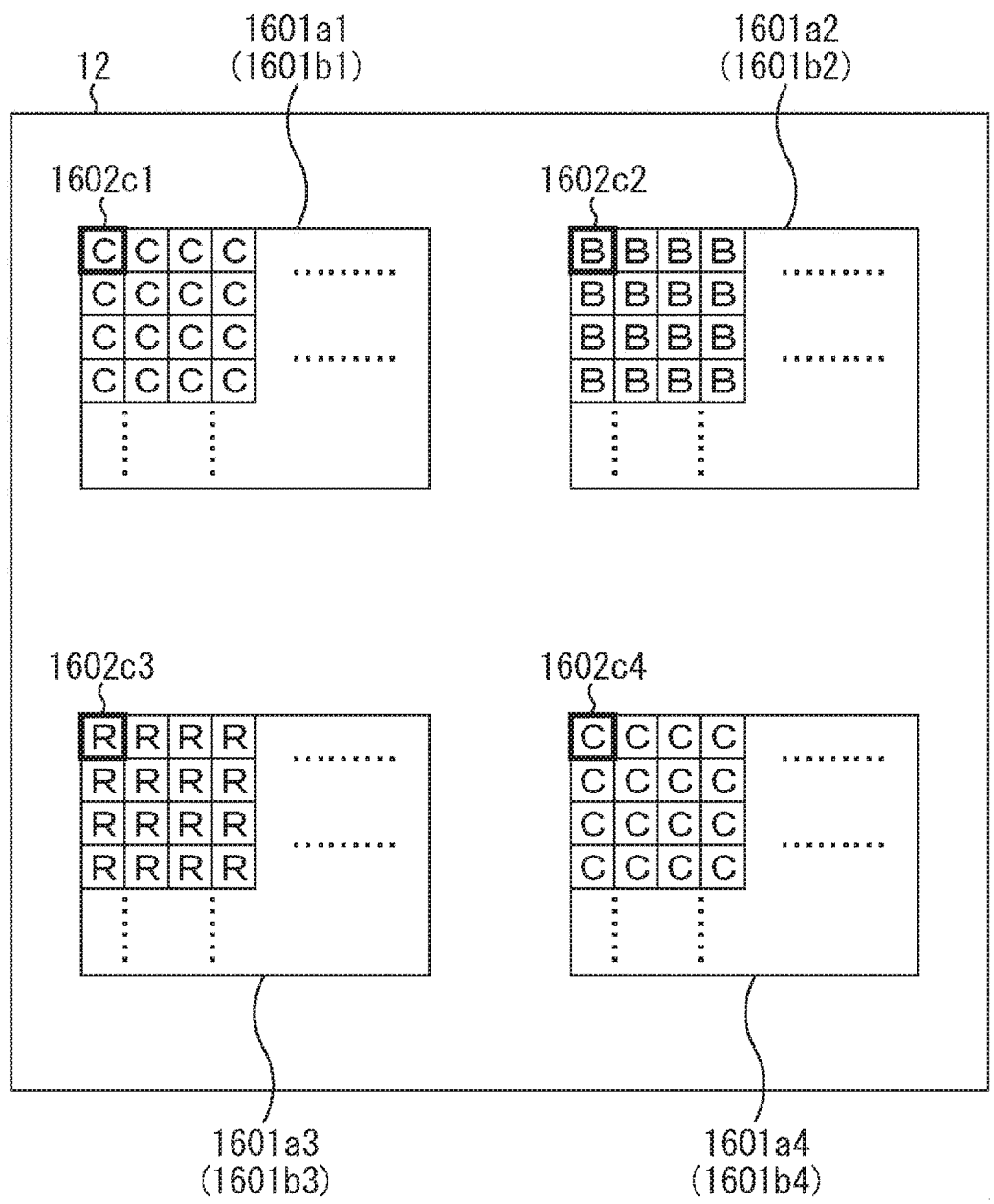
FIG. 77 is a figure depicting a ninth example of pixel layout in the light receiving region of the camera module.

FIG. 77 depicts a ninth example of pixel array of the four pixel arrays 1601b1 to 1601b4 possessed by the light receiving element 12 of the camera module 1.

In the light receiving element 12 depicted in FIG. 77, all pixels of the pixel array 1601b1 include pixels that receive light of wavelengths in the whole visible light region. All pixels of the pixel array 1601b2 include pixels that receive light of a blue wavelength. All pixels of the pixel array 1601b3 include pixels that receive light of a red wavelength. All pixels of the pixel array 1601b4 include pixels that receive light of wavelengths in the whole visible light region.

Figure 78:
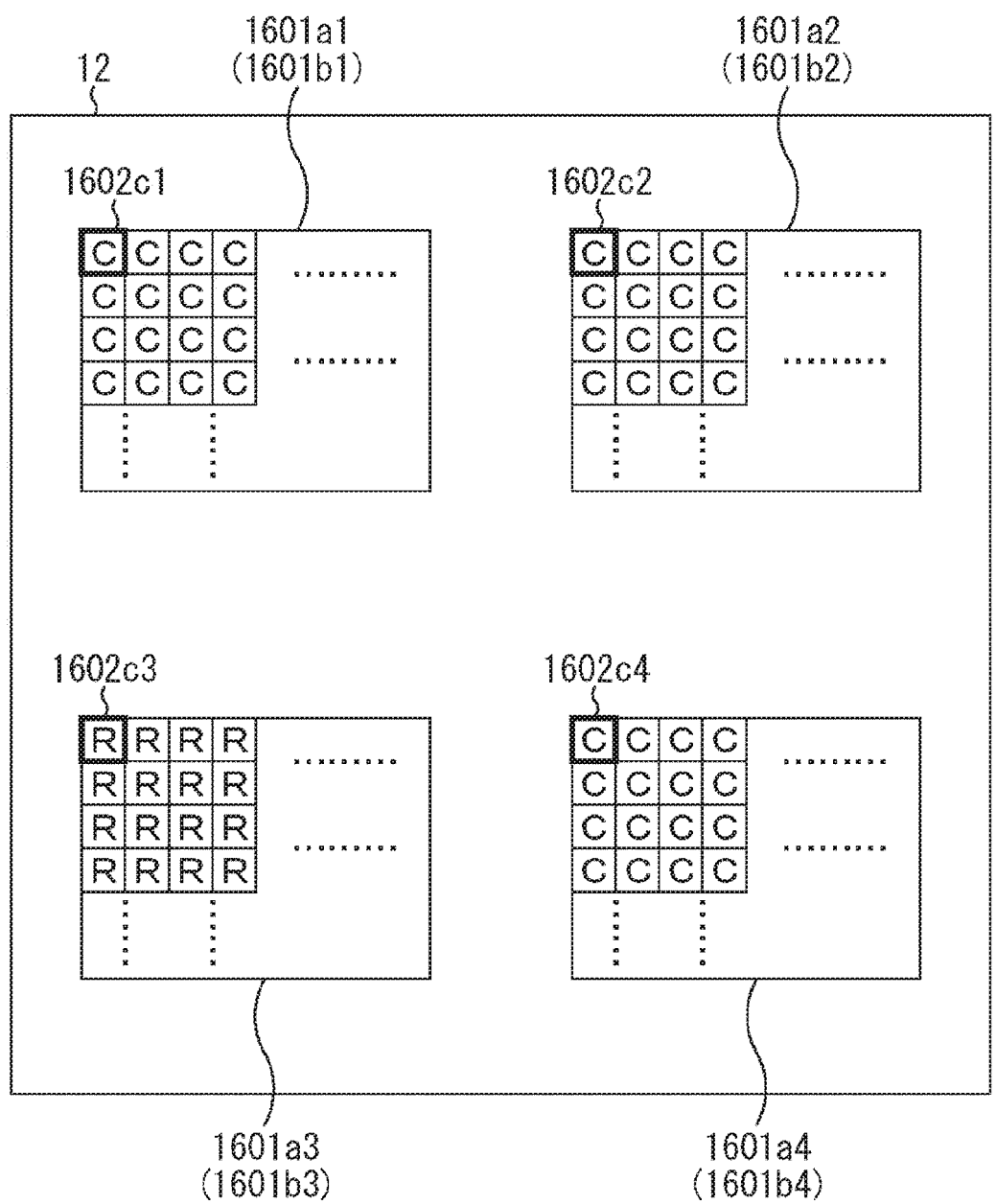
FIG. 78 is a figure depicting a tenth example of pixel layout in the light receiving region of the camera module.

FIG. 78 depicts a tenth example of pixel array of the four pixel arrays 1601b1 to 1601b4 possessed by the light receiving element 12 of the camera module 1.

In the light receiving element 12 depicted in FIG. 78, all pixels of the pixel array 1601b1 include pixels that receive light of wavelengths in the whole visible light region. All pixels of the pixel array 1601b2 include pixels that receive light of wavelengths in the whole visible light region. All pixels of the pixel array 1601b3 include pixels that receive light of a red wavelength. All pixels of the pixel array 1601b4 include pixels that receive light of wavelengths in the whole visible light region.

As depicted in FIGS. 75 to 78, the pixel arrays 1601b1 to 1601b4 of the light receiving element 12 may be configured such as to receive light of wavelength in the same band on the pixel array basis.

A solid-state imaging device of the RGB three plate system hitherto known includes three light receiving elements, and the three light receiving elements pick up only an R image, only a G image, and only a B image, individually. In the solid-state imaging device of the RGB three plate system hitherto known, light incident on one optical unit is spectrally dispersed in three directions by a prism, and is received by three light receiving elements. Therefore, the position of the subject image incident on the three light receiving elements is the same among the three light receiving elements. For this reason, it is difficult to obtain an image with high sensitivity, by applying a super-resolution technique to these three images.

On the other hand, the camera modules 1 described in FIGS. 10A 10B, 10C, 10D, 10E, and 10F, 11A, 11B, 11C, and 11D using any one of the light receiving elements 12 described in FIGS. 75 to 78 include optical units 13 disposed in twos in both the column direction and the row direction in the plane of the surface of the camera module 1 serving as a light incidence surface, and the optical axes possessed by these four optical units 13 are parallel and extend in the same direction. As a result, by use of the four different light receiving regions 1601a1 to 1601a4 possessed by the light receiving element 12, notwithstanding the optical axes being directed in the same direction, plural images which are not necessarily the same can be obtained.

The camera module 1 having such a structure, based on plural images obtained from the four optical units 13 disposed as mentioned above and by utilizing a super-resolution technique therewith, produces an action such that an image higher in resolution than one image obtained from one optical unit 13 can be obtained.

Note that the configuration of obtaining four G, R, G, and B images by the light receiving element 12 described in FIG. 75 produces an action similar to an action produced by the configuration in which four G, R, G, and B pixels constitute the repeating unit in the light receiving element 12 described in FIG. 66.

The configuration of obtaining four R, G, B, and C images in the light receiving element 12 described in FIG. 76 produces an action similar to an action produced by the configuration in which four R, G, B, and C pixels constitute the repeating unit in the light receiving element 12 described in FIG. 67.

The configuration of obtaining four R, C, B, and C images in the light receiving element 12 described in FIG. 77 produces an action similar to an action produced by the configuration in which four R, C, B, and C pixels constitute the repeating unit in the light receiving element 12 described in FIG. 68.

The configuration of obtaining four R, C, C, and C images in the light receiving element 12 described in FIG. 78 produces an action similar to an action produced by the configuration in which four R, C, C, and C pixels constitute the repeating unit in the light receiving element 12 described in FIG. 69.

As the configuration of the diaphragm plate 51 of the camera module 1 including any one of the light receiving elements 12 depicted in FIGS. 75 to 78, the configurations of various diaphragm plates 51 depicted in FIGS. 64A, 64B, 64C, and 64D and their modifications may be adopted.

Figure 79:
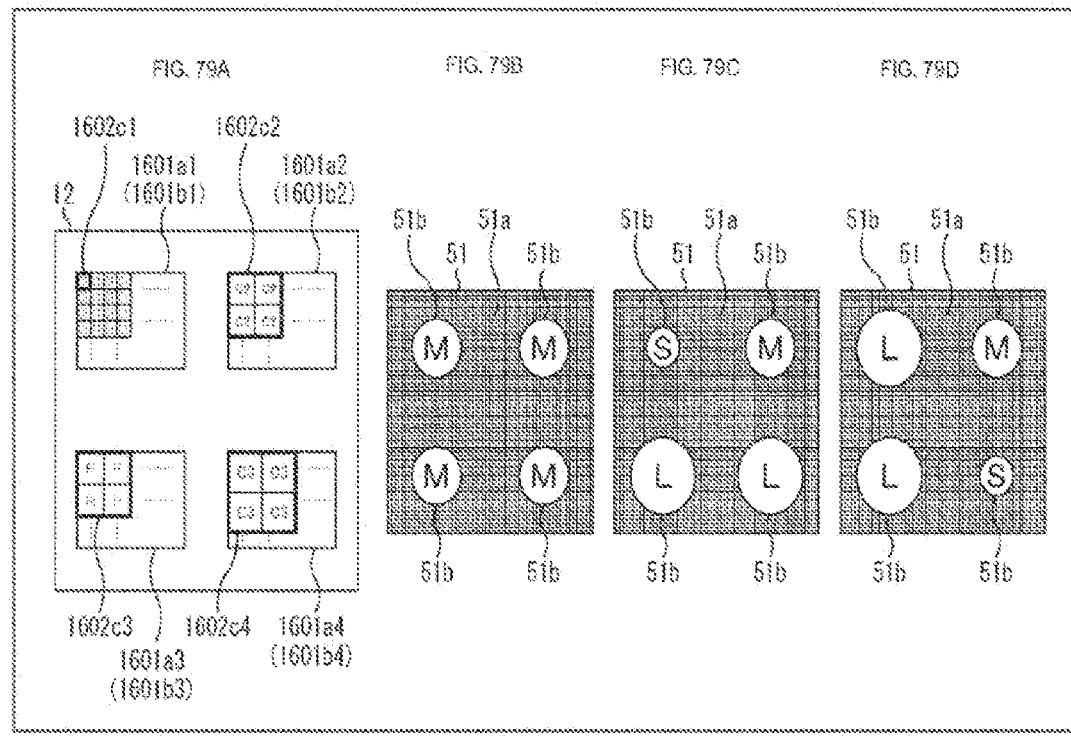
FIGS. 79A, 79B, 79C, and 79D illustrate figures depicting an eleventh example of pixel layout in the light receiving region of the camera module.

FIG. 79A depicts an eleventh example of pixel array of the four pixel arrays 1601b1 to 1601b4 possessed by the light receiving element 12 of the camera module 1.

In the light receiving element 12 depicted in FIG. 79A, the pixel size of one pixel or the wavelength of light received by each pixel is different among the pixel arrays 1601b1 to 1601b4.

In regard of the pixel size, the pixel array 1601b1 is the smallest, the pixel arrays 1601b2 and 1601b3 are the same size and are larger than the pixel array 1601b1, and the pixel array 1601b4 is further larger than the pixel arrays 1601b2 and 1601b3. The size of the pixel size is proportional to the size of the photoelectric conversion section possessed by each pixel.

In regard of the wavelength of light received by each pixel, the pixel arrays 1601b1, 1601b2, and 1601b4 include pixels that receive light of wavelengths in the whole visible light region, whereas the pixel array 1601b3 includes a pixel that receives light of a red wavelength.

The above-mentioned configuration possessed by the light receiving element 12 escribed in FIG. 79A produces an action such that in the case where, for example, the illuminance of a subject is high and a large signal can be obtained in the light receiving element 12, it is possible, by using the light receiving region 1601a1 which is small in pixel size and high in resolution, to obtain an image high in resolution.

In addition, in the case where the illuminance of a subject is low and therefore a large signal cannot be obtained in the light receiving element 12 and there is the fear of a lowering in S/N ratio of an image, an action is produced such that, by using the light receiving region 1601a2 by which an image high in S/N ratio can be obtained, it is possible to obtain an image high in S/N ratio.

In the case where the illuminance of a subject is further lower and therefore there is the fear of a further lowering in S/N ratio of an image in the light receiving element 12, the use of the light receiving region 1601a4 by which an image further higher in S/N ratio can be obtained produces an action such that an image further higher in S/N ratio can be obtained.

Note that the configuration of using the diaphragm plate 51 of FIG. 79B, of the three pieces concerning the shapes of the diaphragm plates 51 described in FIGS. 79B, 79C, and 79D, in combination with the light receiving element 12 described in FIG. 79A, produces an action similar to an action produced by the configuration of using the diaphragm plate 51 of FIG. 74B, of the three pieces concerning the shapes of the diaphragm plates described in FIGS. 74B 74C, and 74D, in combination with the light receiving element 12 described in FIG. 74A.

In addition, the configuration of using the diaphragm plate 51 of FIG. 79C, of the three pieces concerning the shapes of the diaphragm plates 51 described in FIGS. 79B, 79C, and 79D, in combination with the light receiving element 12 described in FIG. 79A, produces an action similar to an action produced by the configuration of using the diaphragm plate 51 of FIG. 74C, of the three pieces concerning the shapes of the diaphragm plates 51 described in FIGS. 74B, 74C, and 74D, in combination with the light receiving element 12 described in FIG. 74A.

Besides, the configuration of using the diaphragm plate 51 of FIG. 79D, of the three pieces concerning the shapes of the diaphragm plates 51 described in FIGS. 79B, 79C, and 79D, in combination with the light receiving element 12 described in FIG. 79A, produces an action similar to an action produced by using the diaphragm plate 51 of FIG. 74D, of the three pieces concerning the shapes of the diaphragm plates 51 described in FIGS. 74B, 74C, and 74D, in combination with the light receiving element 12 described in FIG. 74A.

For the camera module 1 including the light receiving element 12 of FIG. 79A, the configurations of the diaphragm plates 51 depicted in FIGS. 64A, 64B, 64C, and 64D, or the configurations of the diaphragm plate 51 depicted in FIGS. 79B, 79C, and 79D, or their modifications may be adopted.

<18. Manufacture Example of Existing Stacked Lens Structure>

Next, in describing a manufacture example of the stacked lens structure as a lens module to which the technology of the present disclosure is applied, first, a manufacture example of an existing stacked lens structure will be described.

As a typical production method of a stacked lens structure, a hybrid method and a casting method have been widely known.

Figure 80:
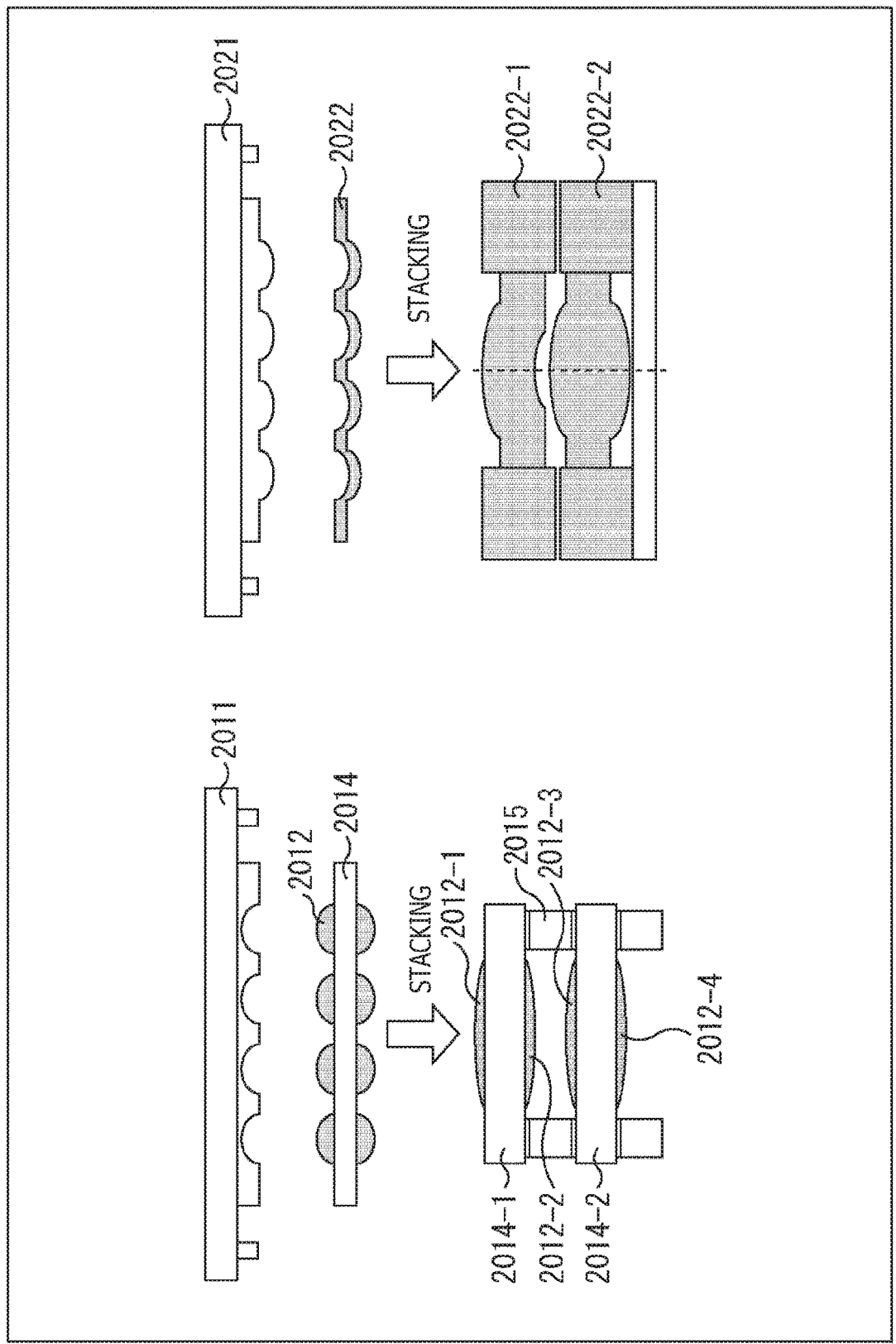
FIG. 80 is a figure for explaining a method of manufacturing a wafer level lens according to the related art.

The hybrid method is a method in which as, for example, depicted by a left part of FIG. 80, a lens resin is molded as a lens shape part 2012 by a mold 2011, the lens resin formed as the lens shape part 2012 is imprinted on the upper and lower sides of a glass substrate 2014, and, further, and the glass substrates are stacked, with ribs 2015 interposed therebetween, to produce a stacked lens structure.

Specifically, as depicted in a left lower part of FIG. 80, lens shape parts 2012-1 and 2012-2 are imprinted on the upper and lower sides of a glass substrate 2014-1, and lens shape parts 2012-3 and 2012-4 are imprinted on the upper and lower sides of a glass substrate 2014-2. Then, the glass substrate 2014-1 imprinted with the lens shape parts 2012-1 and 2012-2 and the glass substrate 2014-2 imprinted with the lens shape parts 2012-3 and 2012-4 are stacked, with the ribs 2015 interposed therebetween.

However, in the hybrid method, since the glass substrate 2014 is interposed between the lens shape parts 2012 including the lens resin, the lens thickness is large, and the degree of freedom in shape is low.

In view of this, as a method of producing a stacked lens structure from only a lens resin, without using the glass substrate 2014, the casting method has been proposed.

Specifically, as depicted in a right upper part of FIG. 80, a lens resin 2022 is molded in a lens shape by a mold 2021. Then, as depicted in a right lower part of FIG. 80, the lens resins 2022-1 and 2022-2 formed in the lens shape are stacked.

In the casting method, however, variability would be generated in the accuracy in the wafer plane due to contraction of the lens material.

In view of this, a manufacture method of forming holes in the substrate and forming lenses in the holes has been proposed.

Here, details of a method of manufacturing a stacked lens structure including wafer level lenses in which holes are formed in a substrate and lenses are formed in the holes will be described referring to FIG. 81.

Figure 81:
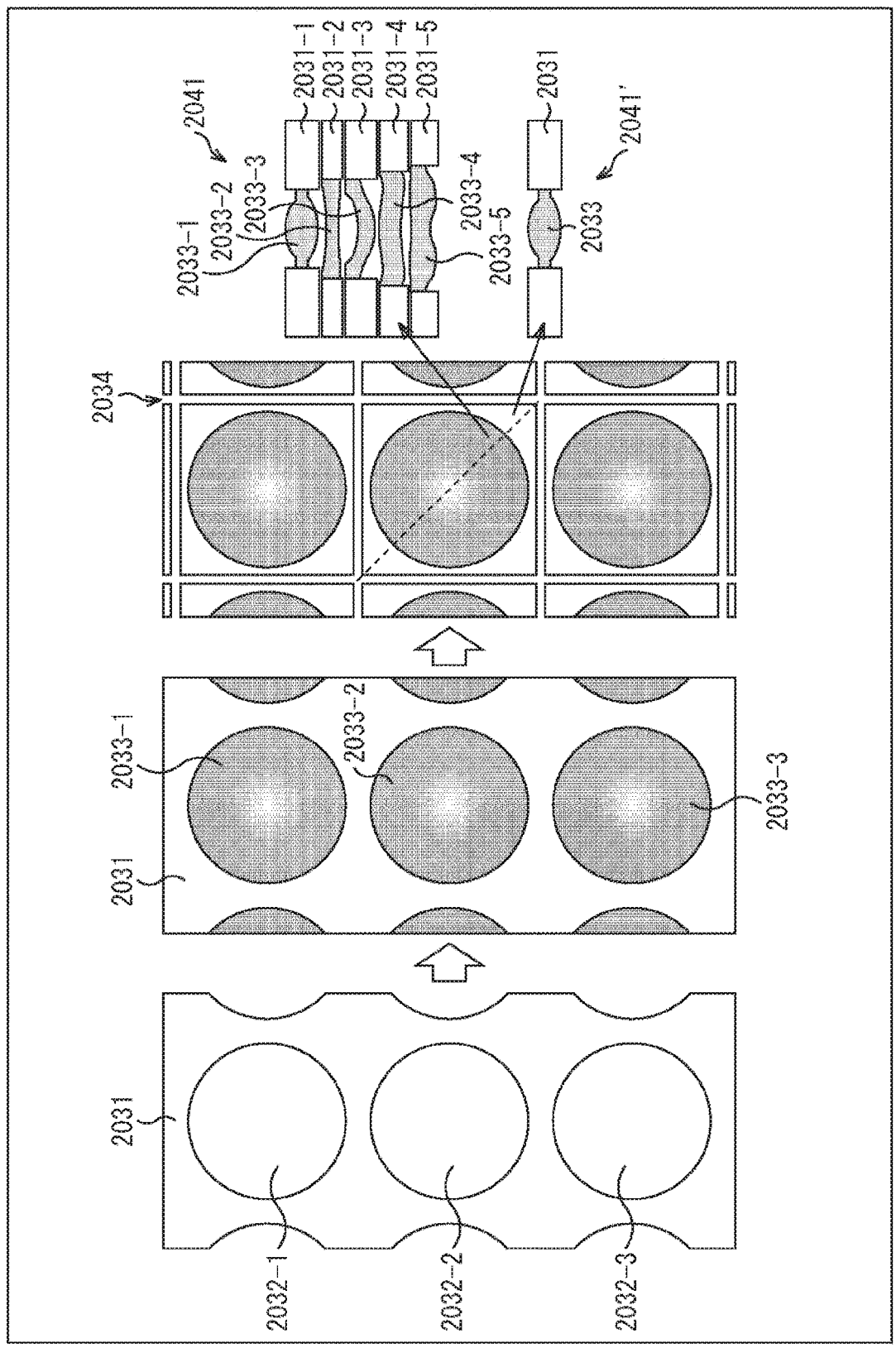
FIG. 81 is a figure for explaining a method of manufacturing a wafer level lens according to the related art.

First, in a first step, as depicted in a leftmost part of FIG. 81, a substrate 2031 is formed with lens holes (through-holes) 2032-1, 2032-2, . . . in which to fit lenses.

In a second step, as depicted in the second part from the left of FIG. 81, lenses 2033-1, 2033-2, are formed in the lens holes 2032-1, 2032-2, by use of an energy-curing resin. The lenses 2033-1, 2033-2, can be formed by pressure molding (imprinting) using an upper mold and a lower mold, as has been described referring to FIGS. 23A, 23B, 23C, 23D, 23E, 23F, and 23G.

In a third step, as depicted in the second part from the right of FIG. 81, the lenses 2033-1, 2033-2, . . . are individualized by dicing along dicing lines 2034.

In a fourth step, as depicted at the top of the rightmost part of FIG. 81, the first to third steps are conducted on the basis of each of plural substrates to be stacked, and the plural individualized substrates 2031-1 to 2031-5 are stacked, whereby a stacked lens structure 2041 is manufactured.

In the case where the individualized substrate 2031 is used as a monolayer lens, one piece of substrate 2031 individualized by the treatment from the first to third steps as depicted at the bottom of the rightmost part of FIG. 81, is directly used as a monolayer substrate with lens 2041'.

Figure 82:
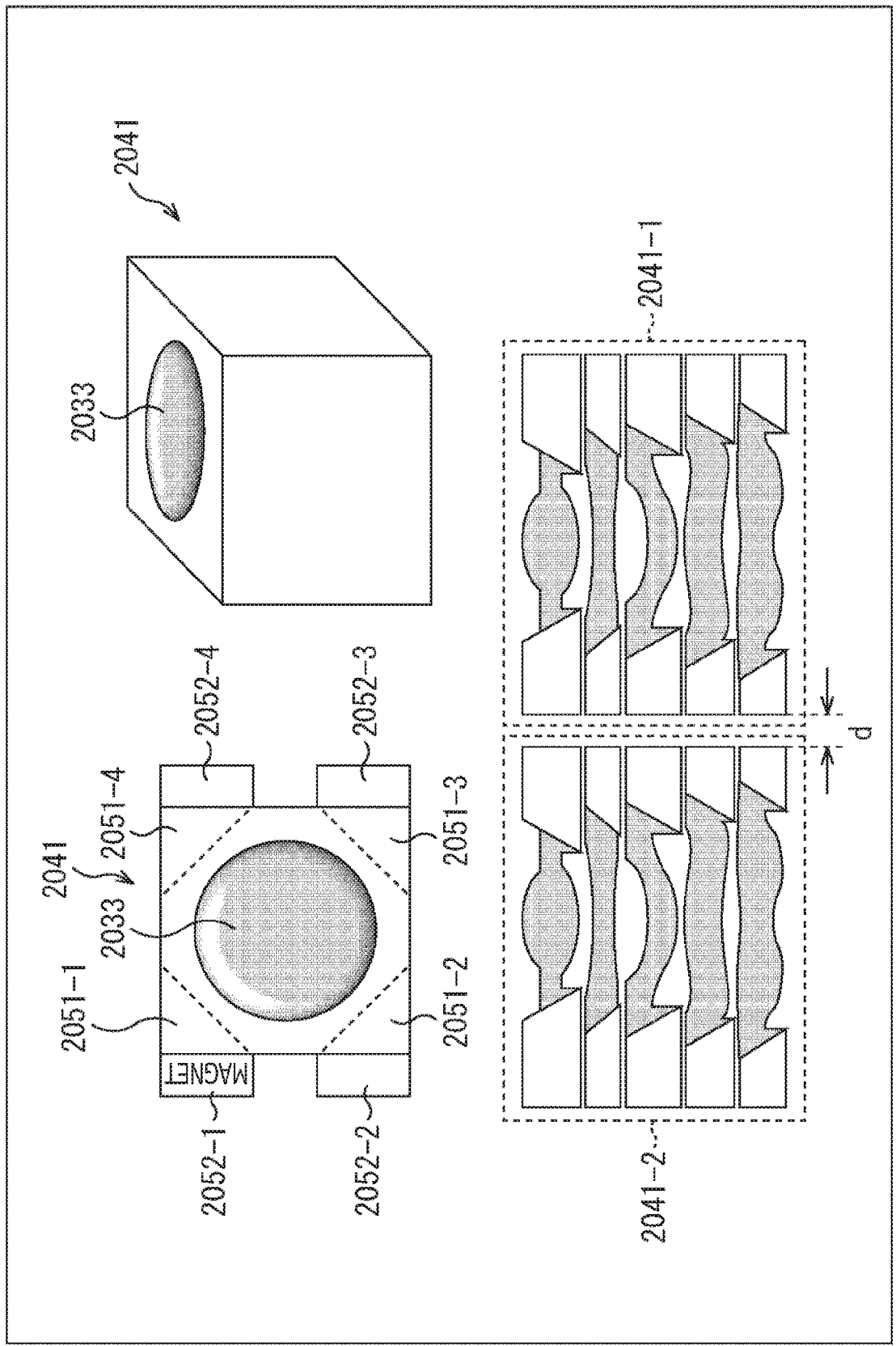
FIG. 82 is a figure for explaining a configuration example of a wafer level lens according to the related art.

However, in the case of forming the lenses 2033 after providing the lens holes 2032, the shape as viewed from above upon dicing is rectangular, and, as depicted in a right upper part of FIG. 82, the stacked lens structure 2041 as a whole is a configuration resembling a cube and is large in size.

In addition, since the stacked lens structure 2041 is a rectangular configuration when viewed from above, for example, as depicted in a left upper part of FIG. 82, it has a configuration in which corners 2051-1 to 2051-4 and the like are sharp. Therefore, particularly in the case of a silicon substrate, it is susceptible to chipping, and there is the fear of causing generation of dust. Further, with the corners 2051-1 to 2051-4 formed such as to surround the lens 2033, a VCM (Voice Coil Motor) for AF (Auto Focus) and the like should be provided at positions 2052-1 to 2052-4 remote from the lens 2033, and, when the VCM is provided for control of the lens 2033 for realizing the AF, the device configuration as a whole might be larger in size.

Furthermore, due to the influence of dicing, the dimensional accuracy of the stacked lens structure 2041 is lowered. Therefore, as depicted at a lower part of FIG. 82, when a distance d between the stacked lens structures 2041-1 and 2041-2 is made as small as possible to assemble in a high density, the assembly accuracy may be influenced.

<19. Method of Manufacturing Stacked Lens Structure of Present Disclosure>

In view of this, in a method of manufacturing a stacked lens structure of the present disclosure, in forming the lens holes, holes are opened also at parts where the dicing lines intersect, whereby sharp parts are reduced, generation of dust can be suppressed, a space can be provided in the periphery of the stacked lens structure, the VCM and the like can be disposed there, and, as a result, the lens module itself can be reduced in size.

Here, referring to FIG. 83, the method of manufacturing the stacked lens structure of the present disclosure will be described.

First, in a first step, as depicted in a leftmost part of FIG. 83, a substrate 2071 is formed with lens holes (through-holes) 2072-1, 2072-2, . . . in which to fit lenses, and, simultaneously, substantially rhombic intersection holes 2073-1, 2073-2, . . . are formed at positions of intersections of dicing lines 2075 depicted in the second part from the right of FIG. 83 which will be described later. The lens holes 2072 and the intersection holes 2073 are desirably formed simultaneously by use of the same method, but may be formed separately. The lens holes 2072 and the intersection holes 2073 can be formed, for example, dry etching, wet etching, a drill and the like. Note that the minimum distance between the lens hole 2072 and the intersection hole 2073 is equal to or more than a scribe line.

Figure 83:
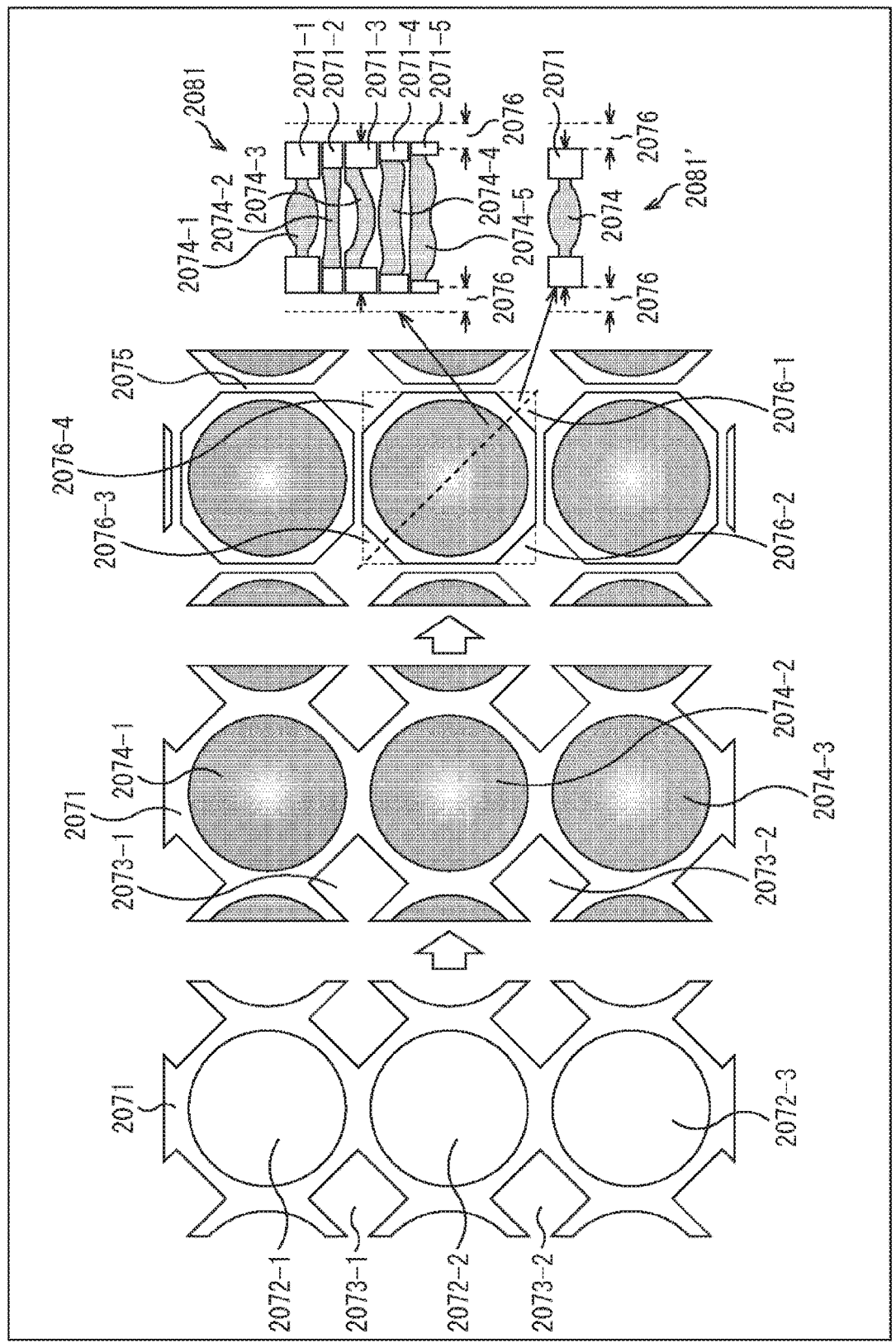
FIG. 83 is a figure for explaining a method of manufacturing a wafer level lens of the present disclosure.

In a second step, as depicted in the second part from the left of FIG. 83, lenses 2074-1, 2074-2, are formed in the lens holes 2072-1, 2072-2, of the substrate 2071 by use of an energy-curing resin. The lenses 2074-1, 2074-2, can be formed by pressure molding (imprinting) using an upper mold and a lower mold, as has been described referring to FIGS. 23A, 23B, 23C, 23D, 23E, 23F, and 23G.

In a third step, as depicted in the second part from the right of FIG. 83, the lenses 2074-1, 2074-2, . . . are respectively individualized by dicing along the dicing lines 2075.

In a fourth step, in the case where the number of stacked lens structures to be stacked is five, for example, the plural substrates 2071-1 to 2071-5 individualized are stacked to manufacture a stacked lens structure 2081, as depicted in the top of the rightmost part of FIG. 83. The number of the substrates 2071 to be stacked may be other than five.

Note that in the case where the substrate 2031 is used as a monolayer lens, one individualized substrate 2071 becomes a monolayer substrate with lens 2081' as it is, as depicted at the bottom of a rightmost part of FIG. 83.

Note that the stacked lens structure 2081 and the monolayer substrate with lens 2081' in the rightmost part of FIG. 83 are both sectional views in a diagonal direction indicated by broken line of the individualized substrates 2071 in the second part from the right of FIG. 83.

By the above-mentioned treatments, the intersection holes 2073 are formed also at the intersections of the dicing lines 2075 when the lens holes 2072 are formed, and, therefore, the lens holes 2072 and the intersection holes 2073 can be simultaneously formed without increasing the number of steps.

Figure 84:
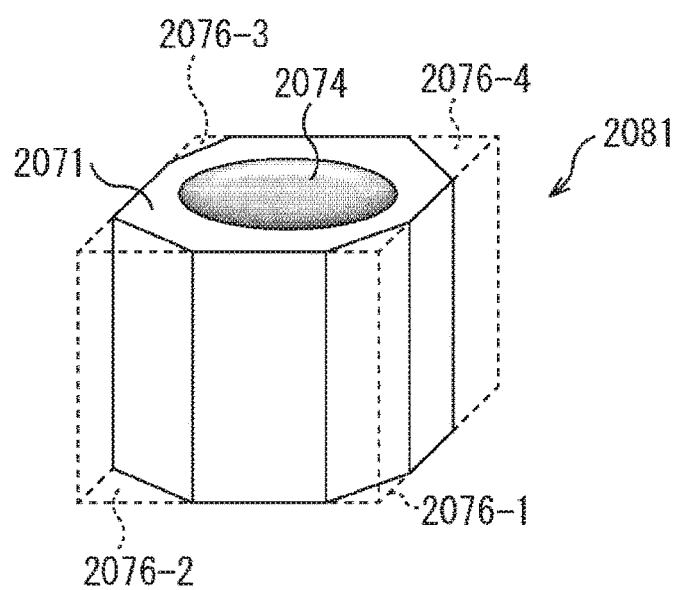
FIG. 84 is a figure for explaining an outer shape of a wafer level lens of the present disclosure.

In addition, with the intersection holes 2073 provided, the stacked lens structure 2081 comes to have an outer shape as depicted in FIG. 84, and spaces 2076-1 to 2076-4 corresponding to the corners 2051-1 to 2051-4 and the like depicted in FIG. 82 are formed in the periphery of the cylindrical lens 2074. As a result, generation of dust due to chipping of the sharp parts such as the corners 2051-1 to 2051-4 and the like can be restrained. Besides, since the corners 2051-1 to 2051-4 and the like are absent, the device configuration of the stacked lens structure 2081 can be reduced in size. Actuators such as VCMs may be provided in the spaces 2076-1 to 2076-4. Further, since the corners 2051-1 to 2051-4 and the like are absent, the stacked lens structure 2081 can be assembled with high accuracy.

By thus forming the intersection holes 2073 at the positions of the intersections of the dicing lines 2075 and dicing, reductions in the size and weight of lens module can be realized both in the monolayer substrate with lens 2081' and in the stacked lens structure 2081. Also in the configuration of the camera module in which the actuator is added to the stacked lens structure 2081, reductions in size and weight and an attendant reduction in power consumption can be realized.

<20. First Modification>

Figure 85:
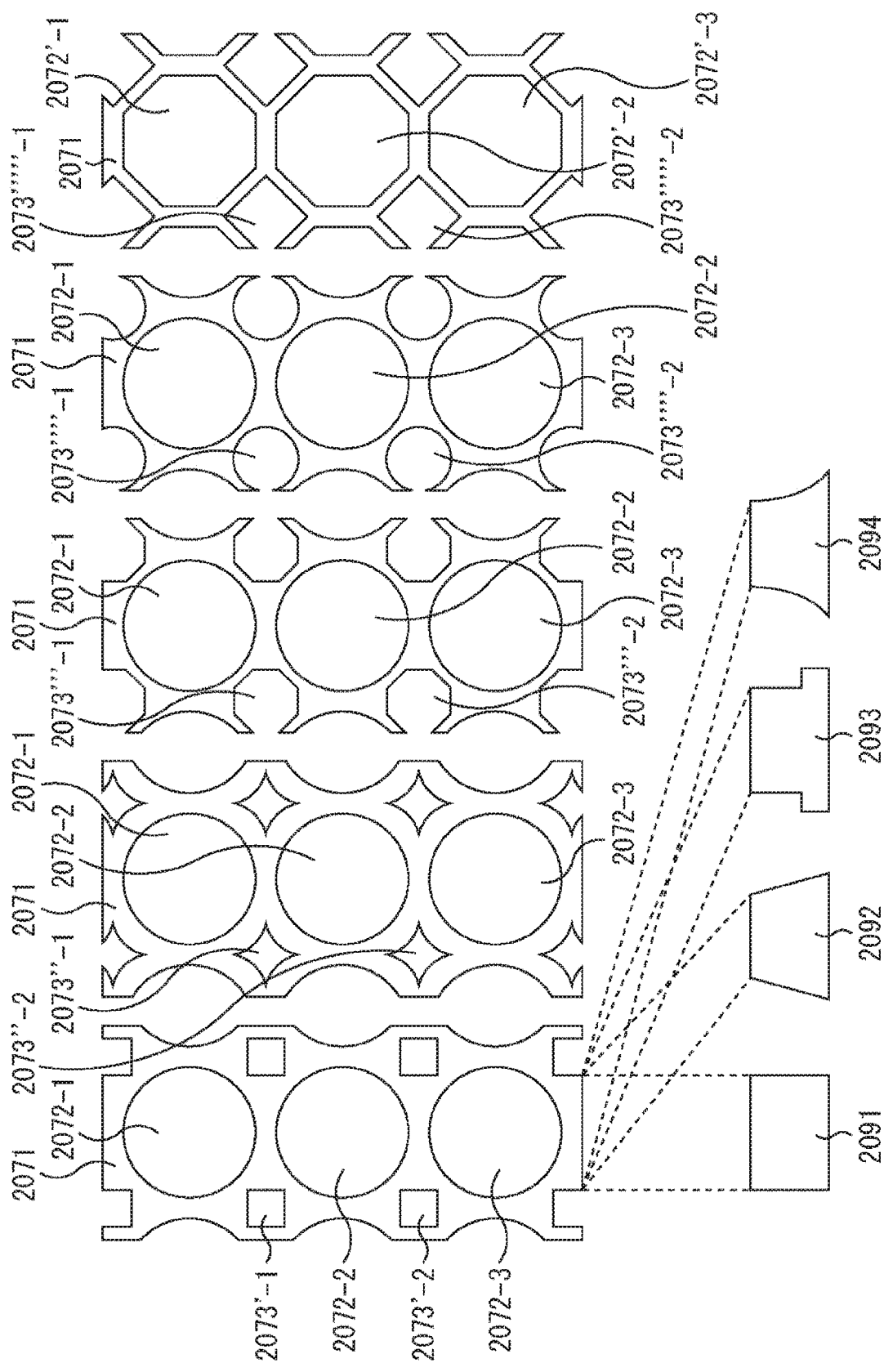
FIG. 85 is a figure for explaining a first modification.

While an example in which the plan-view shape of the intersection holes 2073 is rhombic has been described above, the plan-view shape may be other shape than a rhombus, insofar as the intersection holes 2073 are opened such that spaces are formed at the intersections of the dicing lines, for example, rectangular intersection holes 2073' may be adopted, as depicted in the leftmost part of FIG. 85. In addition, R-shaped intersection holes 2073" may also be adopted, as depicted in the second part from the left of FIG. 85. Further, octagonal intersection holes 2073'" may also be adopted, as depicted in the third part from the left of FIG. 85. Note that other polygon than the octagon may be adopted. In addition, circular intersection holes 2073"" may also be adopted, as depicted in the second part from the right of FIG. 85.

Further, while an example in which the plan-view shape of the lens holes 2072 is circular has been described above, other shapes may be adopted, for example, polygonal lens holes 2072' such as octagonal lens holes may be adopted, as depicted in the rightmost part of FIG. 85. In this case, also, the intersection holes 2073 may be rhombic holes, as depicted in the rightmost part of FIG. 85, and other various shapes may be adopted.

In addition, when the lens holes 2072 and the intersection holes 2073 are formed, the processed section of the substrate may be any of various shapes, for example, a vertical shape 2091, a tapered shape 2092, a stepped shape 2093, and an R shape 2094 may be adopted, as depicted at a lower part of FIG. 85.

Further, while an example in which the lens holes 2072 and the intersection holes 2073 have the same shapes in the same substrate 2071 has been described above, all of them may not necessarily have the same shapes in the same substrate 2071.

Besides, the minimum distance between the lens hole 2072 and the intersection hole 2073 is equal to or more than the scribe line.

<21. Second Modification>

Figure 86:
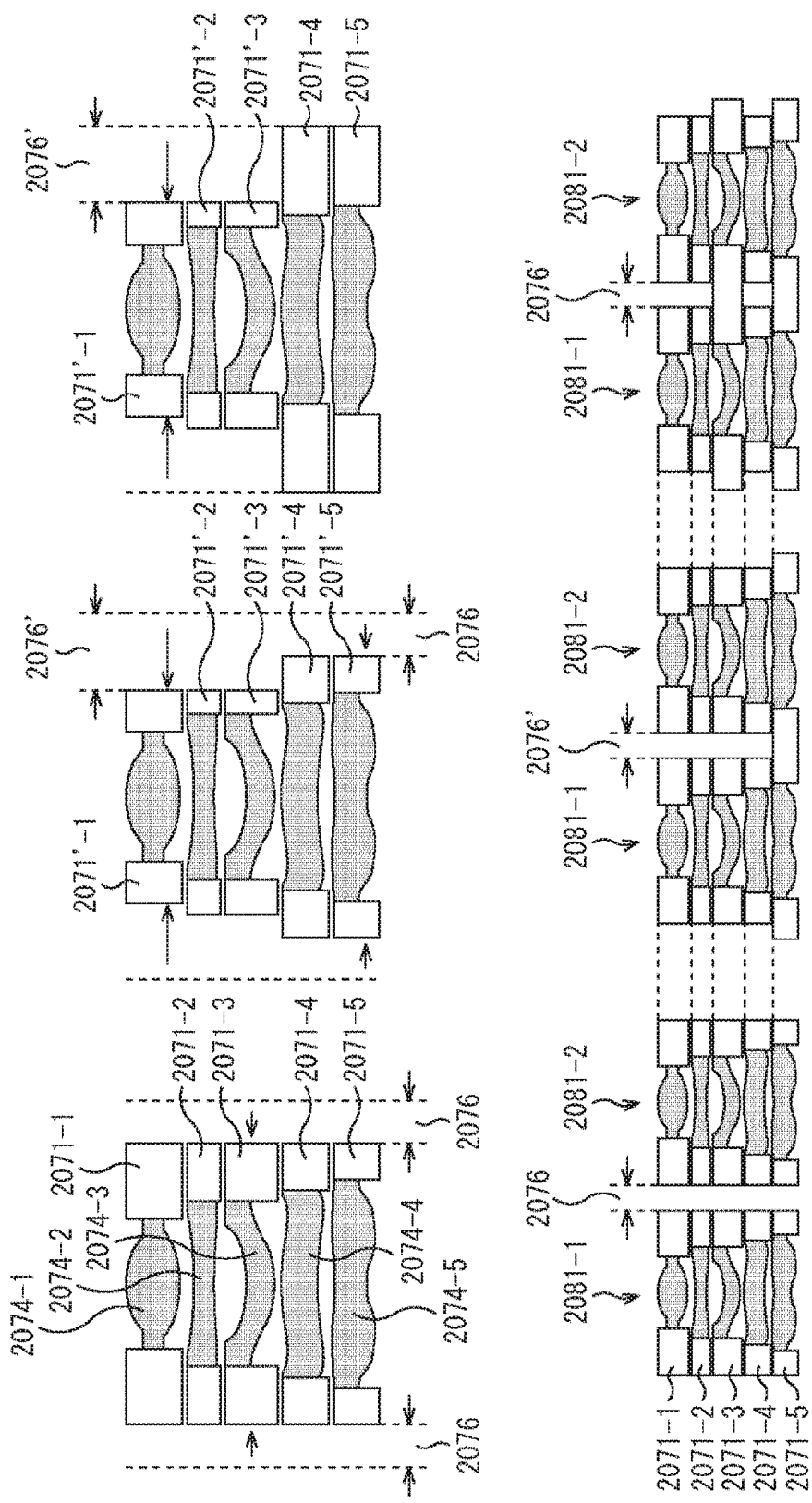
FIG. 86 is a figure for explaining a second modification.

In the above, an example has been described in which in the stacked lens structure 2081, the substrates 2071 individualized in the same shape and the same size are stacked, as depicted in the left top of FIG. 86, for example, and are disposed at the same interval in the height direction in the figure of the stacked lens structures 2081, as depicted in the left bottom of FIG. 86. However, the shapes and sizes of the substrates 2071 stacked in the stacked lens structure 2081 may not be the same, and the substrates 2071 may not be formed by the intersection holes 2073 of the same shape.

Specifically, for example, as depicted in the central top of FIG. 86, the size of the individualized substrates 2071'-4 and 2071'-5 may be larger than the substrates 2071'-1 to 2071'-3, and the size of the substrate 2071'-1 may be smaller than the substrates 2071'-2 and 2071'-3. In other words, in this case, the size of the intersection holes 2073 in the substrates 2071'-4 and 2071'-5 is smaller than the intersection holes 2073 in the substrates 2071'-1 to 2071'-3, and the size of the intersection holes 2073 in the substrate 2071'-1 is larger than the intersection holes 2073 in the substrates 2071'-2 and 2071'-3.

Note that the minimum distance between the lens hole 2072 and the intersection hole 2073 is equal to or more than the scribe line.

As a result, when the stacked lens structures 2081-1 and 2081-2 are disposed side by side, as depicted in the center bottom of FIG. 86, spaces can be secured at different intervals in the height direction, while maintaining the distance between the stacked lens structures 2081-1 and 2081-2.

In addition, as depicted in the right top of FIG. 86, a structure may be adopted in which the intersection holes 73 of the dicing lines are provided in the substrates 2071'-1 to 1071'-3, but the intersection holes 2073 of the dicing lines are not provided in the substrates 2071'-4 and 2071'-5.

With such a configuration, as depicted in the right bottom of FIG. 86, for example, a stable state in which the distance between the stacked lens structures 2081-1 and 2081-2 is constant can be obtained while keeping constant the spacing between the optical axes of the lenses 2074. Particularly, in the configuration in which plural cameras are provided, in a stereo camera or the like, a space between the stacked lens structures 2081-1 and 2081-2 can be secured while keeping constant the spacing between the stacked lens structures 2081-1 and 2081-2.

While an example in which the lens holes 2072 and the intersection holes 2073 are simultaneously formed by the same step has been described above, other holes needed for other configurations may be simultaneously formed by the same step. By such a treatment, other holes than the lens holes 2072 and the intersection holes 2073 can be formed, without increasing the number of steps.

In addition, both in wafer level lenses casting formed by a casting method, which is an existing manufacturing method, and in wafer level lenses hybrid formed by a hybrid method, preliminary provision of the intersection holes at the intersections of the dicing lines enables omission of corners in the dicing. Consequently, generation of dust can be restrained, it is possible to provide a space, and it is possible to reduce the device in size.

In this instance, in the case of the casting method, the intersection holes are formed at any timing of during lens formation, after lens formation, and before individualization on a lens basis. Besides, in the case of the hybrid method, the intersection holes are formed at any timing of before imprinting the lenses, after imprinting the lenses, and before individualization.

<22. Various Shape Examples>

FIGS. 87A, 87B, 87C, 87D, 87E, and 87F depict various shape examples of a monolayer substrate with lens 2301 produced with the intersection holes 2073 in various shapes.

Substrates with lens 2301A to 2301F of FIGS. 87A, 87B, 87C, 87D, 87E, and 87F are monolayer lens modules in each of which a lens (lens resin) 2313 is disposed inside a lens hole 2312 formed by a through-hole in a substrate 2311. The substrates with lens 2301A to 2301F of FIGS. 87A, 87B, 87C, 87D, 87E, and 87F are different in plan-view shape of intersection holes 2073 at the time of forming the substrate with lens 2301.

In FIGS. 87A, 87B, 87C, 87D, 87E, and 87F, the rectangle of the broken line surrounding the substrates with lens 2301A to 2301F correspond to the dicing lines 2075 described referring to FIG. 83.

As has been described referring to FIG. 83, the substrate with lens 2301A depicted in FIG. 87A represents a plan-view shape of the substrate with lens 2301 in the case where the plan-view shape of the intersection holes 2073 formed at the intersections of the dicing lines 2075 is rhombic.

As has been described referring to FIG. 85, the substrate with lens 2301B depicted in FIG. 87B represents a plan-view shape of the substrate with lens 2301 in the case where the plan-view shape of the intersection holes 2073 formed at the intersections of the dicing lines 2075 is R-shaped.

As has been described referring to FIG. 85, the substrate with lens 2301C depicted in FIG. 87C represents a plan-view shape of the substrate with lens 2301 in the case where the plan-view shape of the intersection holes 2073 formed at the intersections of the dicing lines 2075 is circular.

As has been described referring to FIG. 85, the substrate with lens 2301D depicted in FIG. 87D represents a plan-view shape of the substrate with lens 2301 in the case where the plan-view shape of the intersection holes 2073 formed at the intersections of the dicing lines 2075 is rectangular.

The substrate with lens 2301E depicted in FIG. 87E represents a plan-view shape of the substrate with lens 2301 in the case where the plan-view shape of the intersection holes 2073 formed at the intersections of the dicing lines 2075 is cross-shaped.

The substrates with lens 2301A to 2301E depicted in FIGS. 87A, 87B, 87C, 87D, and 87E are all examples in which the rectangle of the broken line corresponding to the dicing lines 2075 is a square.

On the other hand, the substrate with lens 2301F depicted in FIG. 87F is an example in which the rectangle of the broken line corresponding to the dicing lines 2075 is a non-square rectangle, and side surfaces at central portions of opposite sides of the rectangle of the broken line are recessed to the lens 2313 side (inner side) relative to the sides of the broken line. Such a shape recessed at central portions of the sides can be formed by forming the intersection holes 2073 not only at the intersections of the dicing lines 2075 but also at other parts than the intersection (for example, at intermediate parts between the intersection and the intersection).

The plan-view shape of the light receiving element 12 is generally a non-square rectangle. Therefore, with the outer shape surrounding the substrate with lens 2301 set to be a non-square rectangle, as the substrate with lens 2301F of FIG. 87F, the outer shape can be conformed to the outer shape of the light receiving element 12.

Next, referring to FIGS. 88A, 88B, 88C, 88D, 89A, 89B, 89C, 89D, 89E, 89F, and 89G, the shape of the stacked lens structure configured by stacking plural substrates with lens 2301 will be described.

FIGS. 88B, 88C, and 88D, depict sectional views of stacked lens structures 2351 in which five substrates with lens 2301-1 to 2301-5 are stacked. In the case where it is unnecessary to particularly distinguish the respective ones of the five substrates with lens 2301-1 to 2301-5, they will be referred to as the substrates with lens 2301.

FIGS. 88B, 88C, and 88D, depict first to third configuration examples of the stacked lens structure 2351.

FIG. 88A depicts a plan-view shape of the substrates with lens 2301 (2301-1 to 2301-5) constituting the stacked lens structure 2351. In this example, an example in which the plan-view shape of the substrates with lens 2301 is an octagon as depicted in FIG. 87A will be described.

Here, of side surfaces of the octagonal substrate with lens 2301 depicted in FIG. 88A, the side surfaces coinciding the sides of the rectangle of the broken line surrounding the outer shape of the substrate with lens 2301, depicted in the left figure, will be referred to as side parts 2341, whereas the side surfaces corresponding to opposite angle portions of the rectangle of the broken line, depicted in the right figure, will be referred to as opposite angle parts 2342. The opposite angle parts 2342 are side surfaces which are formed by etching of the intersection holes 2073, whereas the side parts 2341 are side surfaces which are formed by dicing.

The sectional views of the substrates with lens 2301 of the left figures in FIGS. 88B, 88C, and 88D are sectional views taken along the alternate long and short dash line of the left figure in FIG. 88A, and are sectional views depicting the side surface of the side part 2341 of the substrate with lens 2301.

On the other hand, the sectional vies of the substrates with lens 2301 of the right figures in FIGS. 88B, 88C, and 88D are sectional views taken alone the alternate long and short dash line of the right figure in FIG. 88A, and are sectional views depicting the side surface of the opposite angle part 2342 of the substrate with lens 2301.

In the stacked lens structure 2351 of a first configuration example of FIG. 88B, the end face shape in the side direction, of the rectangle of the broken line surrounding the outer shape of the substrate with lens 2301, and the sectional shape in the diagonal direction of the rectangle are the same shape.

More specifically, as depicted in the left figure of FIG. 88B, the width of the opposed side parts 2341 of the substrate with lens 2301 is coincident among all the substrates with lens 2301-1 to 2301-5, and the side parts 2341 of all the substrates with lens 2301-1 to 2301-5 form the same surface. In addition, in regard of the opposed opposite angle parts 2342 of the substrate with lens 2301, as depicted in the right figure of FIG. 88B, the width of the opposed opposite angle parts 2342 is coincident among all the substrates with lens 2301-1 to 2301-5, and the opposite angle parts 2342 of all the substrates with lens 2301-1 to 2301-5 form the same surface. The width of the opposed side parts 2341 of the substrate with lens 2301 and the width of the opposed opposite angle parts 2342 of the substrate with lens 2301 are the same.

In the stacked lens structure 2351 of a second configuration example of FIG. 88C, the end face shape in the side direction, of the rectangle of the broken line surrounding the outer shape of the substrate with lens 2301, and the sectional shape in the diagonal direction of the rectangle are different shapes.

More specifically, as depicted in the left figure of FIG. 88C, the width of the opposed side parts 2341 of the substrate with lens 2301 is coincide among all the substrates with lens 2301-1 to 2301-5, and the side parts of all the substrates with lens 2301-1 to 2301-5 form the same surface. On the other hand, as depicted in the right figure of FIG. 88C, the width of the opposed opposite angle parts 2342 of the substrate with lens 2301 is coincident among all the substrates with lens 2301-1 to 2301-5, but the opposite angle parts 2342 are in tapered shapes (inclined shapes), and the side parts 2341 of all the substrates with lens 2301-1 to 2301-5 do not form the same surface. The width of the opposed side parts 2341 of the substrate with lens 2301 is the same as the maximum width of the opposed opposite angle parts 2342 of the substrate with lens 2301.

In the stacked lens structure 2351 of a third configuration example of FIG. 88D, the end face shape in the side direction, of the rectangle of the broken line surrounding the outer shape of the substrate with lens 2301, and the sectional shape in the diagonal direction of the rectangle are different shapes.

More specifically, as depicted in the left figure of FIG. 88D, the width of the opposed side parts 2341 of the substrate with lens 2301 is coincident among all the substrates with lens 2301-1 to 2301-5, and the side parts 2341 of all the substrates with lens 2301-1 to 2301-5 form the same surface. On the other hand, as depicted in the right figure of FIG. 88D, the width of the opposed opposite angle parts 2342 of the substrate with lens 2301 is coincident among all the substrates with lens 2301-1 to 2301-5, but, in regard of the shape of the opposite angle parts 2342, only the substrate with lens 2301-5 in the lowermost layer has a tapered shape (inclined shape), so that the opposite angle parts 2342 of all the substrates with lens 2301-1 to 2301-5 do not form the same surface. The width of the opposed side parts 2341 of the substrate with lens 2301 is the same as the maximum width of the opposed opposite angle parts 2342 of the substrate with lens 2301.

As depicted in FIGS. 88C and 88D, the substrates with lens 2301 constituting the stacked lens structure 2351 form the same surface in regard of the side parts 2341. However, in regard of the opposite angle parts 2342, at least one substrate with lens 2301 may have a side surface different from those of the other substrates with lens 2301, and the same surface may not be formed.

FIGS. 89A, 89B, 89C, 89D, 89E, 89F, and 89G, are sectional views depicting fourth to tenth configuration examples of the stacked lens structure 2351.

Note that in the fourth to tenth configuration examples of in FIGS. 89A, 89B, 89C, 89D, 89E, 89F, and 89G, sectional views depicting side surfaces of the side parts 2341, corresponding to the sectional views of the left figures of FIGS. 88B, 88C, and 88D, are omitted since they are similar to the first to third configuration examples, and only sectional views depicting side surfaces of the opposite angle parts 2342, corresponding to the sectional views of the right figures of FIGS. 88B, 88C, and 88D, will be described.

Figure 89A:
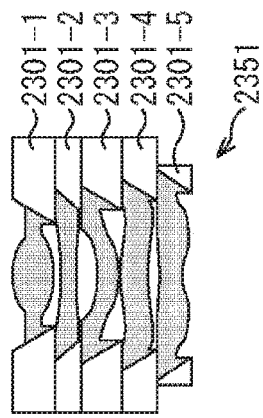
FIGS. 89A, 89B, 89C, 89D, 89E, 89F, and 89G illustrate figures depicting various shape examples of the stacked lens structure.

In the stacked lens structure 2351 of the fourth configuration example of FIG. 89A, the sectional shapes of opposite angle parts 2342 of the substrates with lens 2301 are vertical in common, but the width of the opposed opposite angle parts 2342 of the substrates with lens 2301 is not the same among the five substrates with lens 2301. Specifically, the width of the opposed opposite angle parts 2342 of the substrate with lens 2301-1 in the uppermost layer is narrower than that of the other four substrates with lens 2301-2 to 2301-5, and the opposite angle parts 2342 of all the substrates with lens 2301-1 to 2301-5 do not form the same surface.

Figure 89B:
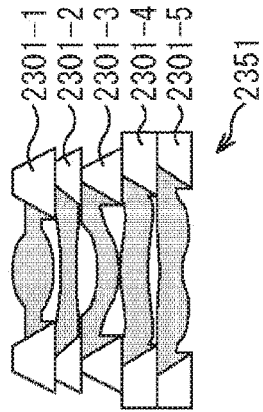

In the stacked lens structure 2351 of the fifth configuration example of FIG. 89B, the sectional shapes of the opposite angle parts 2342 of the substrates with lens 2301 are vertical in common, but the width of the opposed opposite angle parts 2342 of the substrates with lens 2301 is not the same among the five substrates with lens 2301. Specifically, the width of the opposed opposite angle parts 2342 of the substrates with lens 2301-1 to 2301-3 in the upper-side three layers is narrower than that of the substrates with lens 2301-4 and 2301-5 in the lower-side two layers, and the opposite angle parts 2342 of all the substrates with lens 2301-1 to 2301-5 do not form the same surface.

Figure 89C:
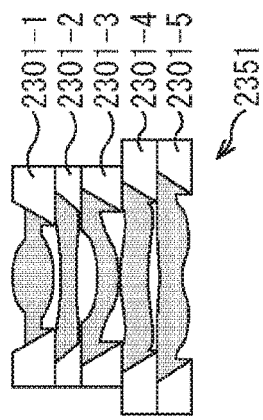

In the stacked lens structure 2351 of the sixth configuration example of FIG. 89C, the sectional shapes and widths of the opposite angle parts 2342 of the substrates with lens 2301 are not the same among the five substrates with lens 2301. Specifically, the sectional shapes of the substrates with lens 2301-1 to 2301-3 in the upper-side three layers are tapered, whereas the sectional shape of the substrates with lens 2301-4 and 2301-5 in the lower-side two layers is vertical. In addition, the widths of the opposed opposite angle parts 2342 of the substrates with lens 2301-1 to 2301-3 in the upper-side three layers are narrower than that of the substrates with lens 2301-4 and 2301-5 in the lower-side two layers, and the opposite angle parts 2342 of all the substrates with lens 2301-1 to 2301-5 do not form the same surface.

Figure 89D:
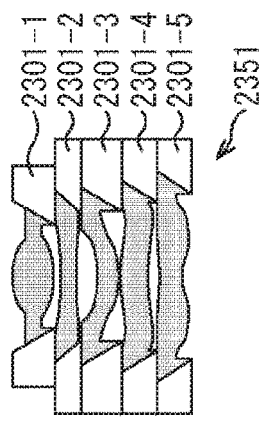

In the stacked lens structure 2351 of the seventh configuration example of FIG. 89D, the sectional shapes of the opposite angle parts 2342 of the substrates with lens 2301 are vertical in common, but the width of the opposed opposite angle parts 2342 of the substrate with lens 2301 is not the same among the five substrates with lens 2301. Specifically, the width of the opposed opposite angle parts 2342 of the substrates with lens 2301-1 to 2301-4 in the upper-side four layers is wider than that of the substrate with lens 2301-5 in the lowermost layer, and the opposite angle parts 2342 of all the substrates with lens 2301-1 to 2301-5 do not form the same surface.

Figure 89E:
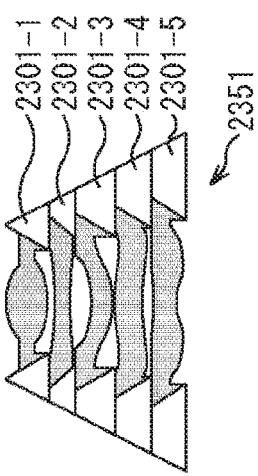

In the stacked lens structure 2351 of the eighth configuration example of FIG. 89E, the sectional shapes of the opposite angle parts 2342 of the substrates with lens 2301 are vertical in common, but the width of the opposed opposite angle parts 2342 of the substrates with lens 2301 is different among all the five substrates with lens 2301. More specifically, the width of the opposed opposite angle parts 2342 of the substrates with lens 2301-1 to 2301-5 sequentially widens in going from the uppermost layer as the light incidence side toward the lowermost layer as the emission side, and the opposite angle parts 2342 of all the substrates with lens 2301-1 to 2301-5 do not form the same surface.

Figure 89F:
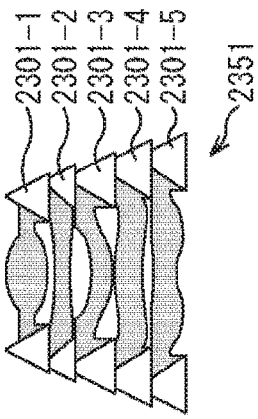

In the stacked lens structure 2351 of the ninth configuration example of FIG. 89F, the sectional shapes of the opposite angle parts 2342 of the substrates with lens 2301 are tapered in common, but the width of the opposed opposite angle parts 2342 of the substrates with lens 2301 is different among all the five substrates with lens 2301-1 to 2301-5. More specifically, the width of the opposed opposite angle parts 2342 of the substrates with lens 2301-1 to 2301-5 sequentially widens in going from the uppermost layer as the light incidence side toward the lowermost layer as the emission side. The opposite angle parts 2342 of all the substrates with lens 2301-1 to 2301-5 do not form the same surface.

Figure 89G:
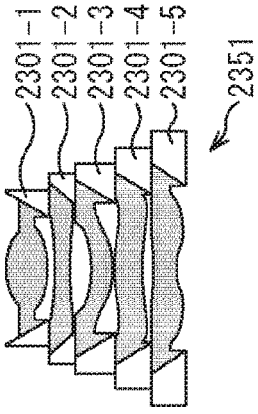

In the stacked lens structure 2351 of the tenth configuration example of FIG. 89G, the sectional shapes of the opposite angle parts 2342 of the substrates with lens 2301 are tapered in common, but the width of the opposed opposite angle parts 2342 of the substrates with lens 2301 is different among the five substrates with lens 2301-1 to 2301-5. More specifically, the width of the opposed opposite angle parts of the substrates with lens 2301-1 to 2301-5 sequentially widens in going from the uppermost layer as the light incidence side toward the lowermost layer as the emission side. The opposite angle parts 2342 of all the substrates with lens 2301-1 to 2301-5 form the same surface.

In this way, in the stacked lens structure 2351 formed by stacking plural substrates with lens 2301, while the width and the shape (sectional shape) of the side parts 2341 of the substrates with lens 2301 are the same among all the substrates with lens 2301, at least one of the width or the shape (sectional shape) of the opposite angle parts 2342 may be different between at least two substrates with lens 2301.

Note that the configuration examples depicted in C and D in FIGS. 88C and 88D and FIGS. 89A, 89B, 89C, 89D, 89E, 89F, and 89G are merely examples, and other stacked lens structures 2351 can be realized by appropriately combining the various substrates with lens 2301 differing in the width or the shape of the opposed opposite angle parts 2342.

By dicing after forming the lens holes 2312 and the intersection holes 2073 for forming lenses, in a substrate state (wafer state), the plan-view size of each of the individualized substrates with lens 2301 can be reduced. As depicted in FIGS. 90A and 90B, therefore, the number of the individualized substrates with lens 2301 which can be produced from one substrate 2371 in the wafer state can be increased, and theoretical yield can be enhanced. For example, in the case where the intersection holes 2073 are not formed, the four corners of the 16 pieces, namely, 4×4 pieces, cannot be used as depicted in FIG. 90A, so that the number of the substrates with lens 2301 obtained after individualization is 12. On the other hand, according to the present technology, the four corners of 4×4 pieces can be used as depicted in FIG. 90B, so that 16 substrates with lens 2301 can be produced. The bottoms of FIGS. 90A and 90B denote sectional views taken along the alternate long and two short dashes lines of the tops.

FIGS. 91A, 91B, 91C, and 91D depict the configuration examples of a compound eye substrate with lens 2301, in the case of individualization in the unit of two or more lenses 2313, instead of individualization in the unit of one lens 2313.

FIG. 91A is a plan view depicting the configuration example of a two-eye substrate with lens 2301 obtained by dicing in the unit of 1×2, i.e., two, lenses 2313.

FIG. 91B is a plan view depicting the configuration example of a three-eye substrate with lens 2301 obtained by dicing in the unit of 1×3, i.e., three, lenses 2313.

FIG. 91C is a plan view depicting the configuration example of a four-eye substrate with lens 2301 obtained by dicing in the unit of 2×2, i.e., four, lenses 2313.

In the case of forming the four-eye substrate with lens 2301, as depicted in FIG. 91D, a configuration may be adopted in which the intersection hole 2073 is not formed in a central part of 2×2.

While an example in which the plan-view shape of the substrate with lens 2301 in the unit of one lens is an octagon depicted in FIG. 87A has been described in the aforementioned examples, the shapes depicted in FIGS. 87B 87C, 87D, 87E, and 87F and other shapes are also similarly applicable.

In addition, an example in which the sectional shape of the opposite angle parts 2342 of the substrate with lens 2301 is a vertical shape and an example in which the sectional shape is a divergent widening tapered shape wider at the lower surface than the upper surface have been described in the aforementioned examples, the sectional shape may be a downwardly narrowing tapered shape wider at the upper surface than the lower surface.

<23. Application Example to Electronic Apparatus>

The aforementioned imaging element is applicable to various electronic apparatuses such as an imaging device, for example, digital still cameras and digital video cameras, mobile phone having an imaging function, or other apparatuses having an imaging function.

Figure 92:
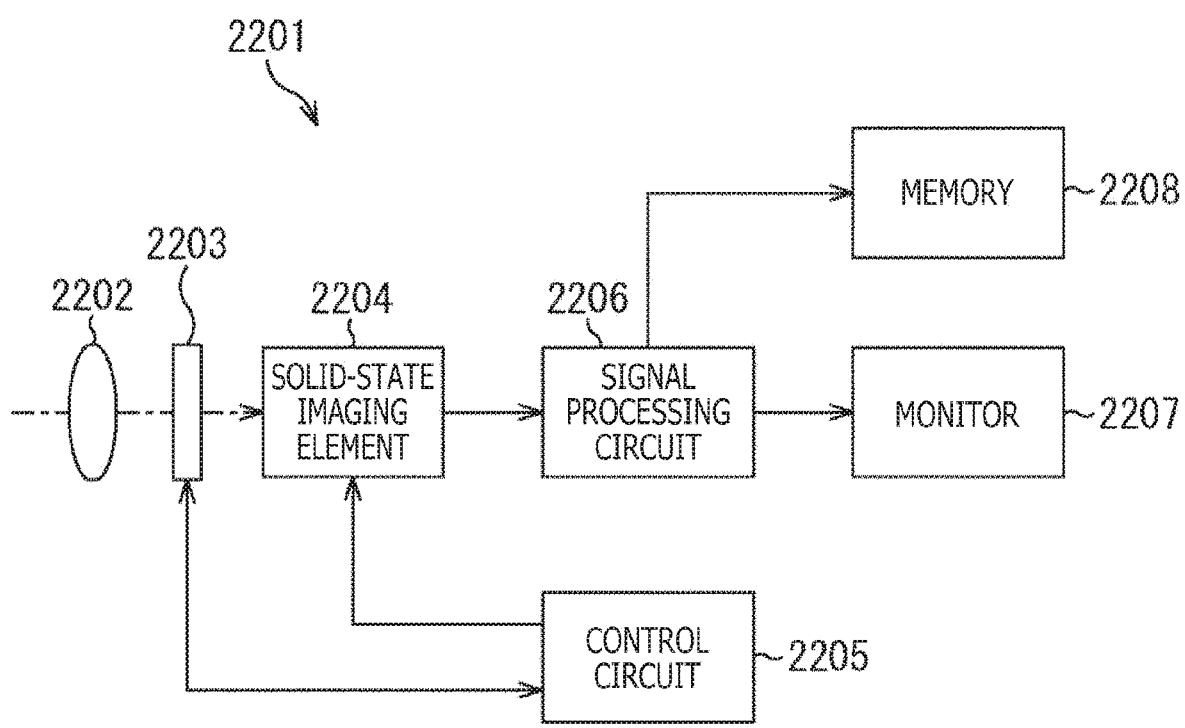
FIG. 92 is a block diagram depicting a configuration example of an imaging device as an electronic apparatus to which an imaging element of the present disclosure is applied.

FIG. 92 is a block diagram depicting a configuration example of an imaging device as an electronic apparatus to which the present technology is applied.

An imaging device 2201 depicted in FIG. 92 includes an optical system 2202, a shutter device 2203, a solid-state imaging element 2204, a control circuit 2205, a signal processing circuit 2206, a monitor 2207, and a memory 2208, and is capable of picking up a still image and a moving image.

The optical system 2202 includes one or plural lenses, guides light (incident light) from a subject to the solid-state imaging element 2204, and causes an image to be captured on a light receiving surface of the solid-state imaging element 2204.

The shutter device 2203 is disposed between the optical system 2202 and the solid-state imaging element 2204, and, according to the control of the control circuit 2205, controls a light illumination period and a light shielding period for the solid-state imaging element 2204.

The solid-state imaging element 2204 includes a package including the aforementioned solid-state imaging element. The solid-state imaging element 2204 stores a signal charge for a predetermined period, according to light capturing an image on the light receiving surface through the optical system 2202 and the shutter device 2203. The signal charge stored in the solid-state imaging element 2204 is transferred according to a driving signal (timing signal) supplied from the control circuit 2205.

The control circuit 2205 outputs driving signals for controlling a transfer operation of the solid-state imaging element 2204 and a shutter operation of the shutter device 2203, to drive the solid-state imaging element 2204 and the shutter device 2203.

The signal processing circuit 2206 applies various signal processes to the signal charge outputted from the solid-state imaging element 2204. An image (image data) obtained by the signal processes conducted by the signal processing circuit 2206 is supplied to the monitor 2207 to be displayed thereon, or is supplied to the memory 2208 to be stored (recorded) therein.

In the imaging device 2201 configured as above, also, the stacked lens structure 2081 or the substrates with lens 2081' depicted in FIGS. 83 and 84 and the stacked lens structures 2351 depicted in FIGS. 88A, 88B, 88C, 88D, 89A, 89B, 89C, 89D, 89E, 89F, and 89G may be applied in place of the aforementioned optical system 2202, whereby the configuration of the device as a whole can be reduced in size.

<24. Use Examples of Imaging Element>

Figure 93:
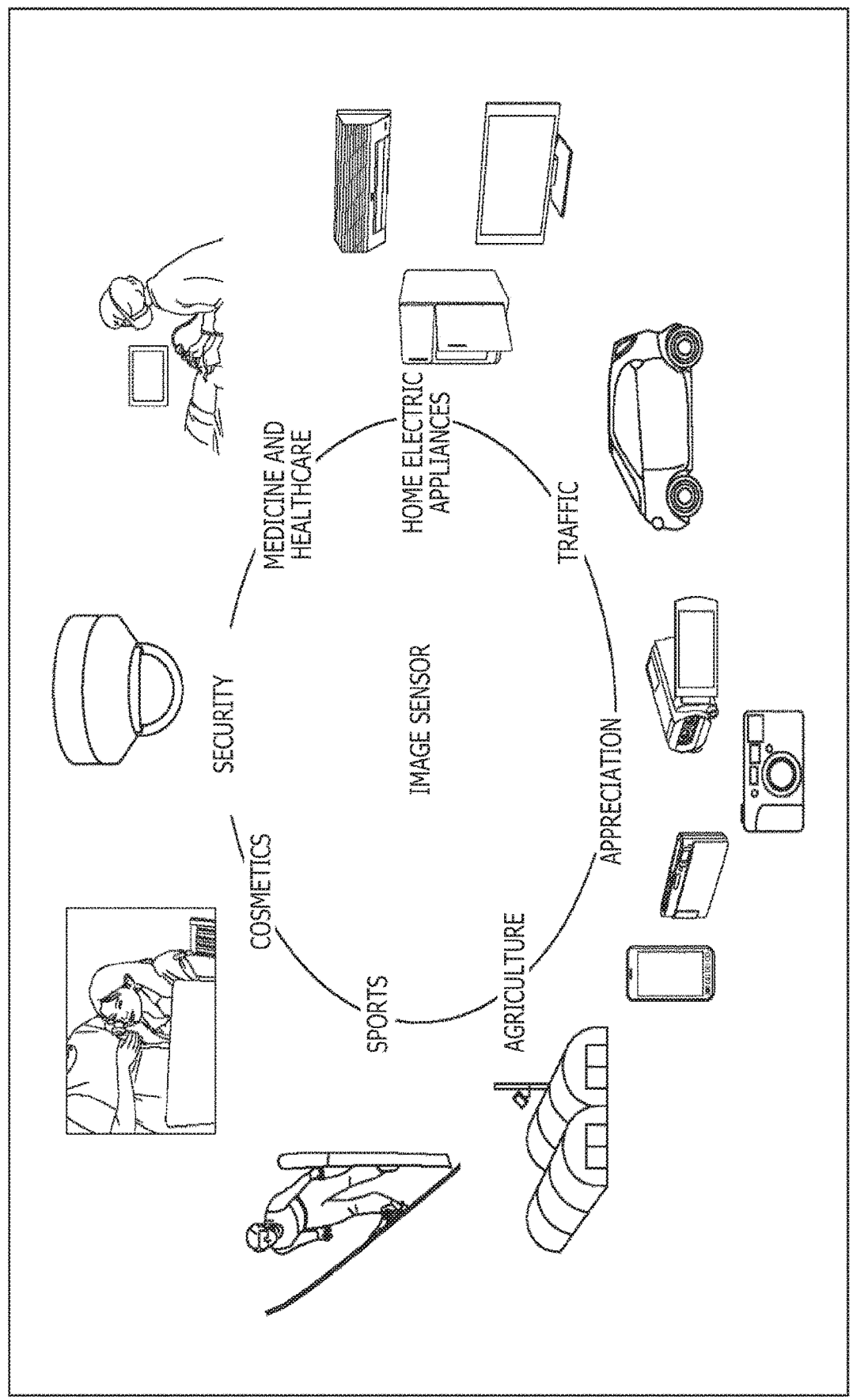
FIG. 93 is a diagram for explaining use examples of the imaging element to which the technology of the present disclosure is applied.

FIG. 93 is a figure depicting use examples for which the imaging device 2201 of FIG. 92 mentioned above is used.

The aforementioned imaging element can be used, for example, in various cases of sensing light such as visible light, infrared light, ultraviolet light, and X-rays as mentioned below.

- Apparatuses that pick up an image for appreciation (viewing) use, such as digital cameras, portable apparatuses equipped with a camera function, etc.
- Apparatuses for use in traffic use, such as in-vehicle sensors for imaging the front side, the rear side, the surroundings, the interior, etc. of an automobile for the purpose of safe driving, such as automatic vehicle stop, recognition of the driver's condition, etc., monitor cameras for monitoring the running vehicles and/or the road, distance measuring sensors for measuring distances such as inter-vehicle distance, etc.
- Apparatuses for use in home electric appliances such as TVs, refrigerators, and air conditioners for the purpose of imaging a user's gesture and performing an apparatus operation according to the gesture.
- Apparatuses for use in medical or healthcare use, such as endoscopes and devices for imaging blood vessels by receiving infrared light.
- Apparatuses for security use, such as surveillance camera for crime prevention and cameras for person authentication use.
- Apparatuses for cosmetic use, such as skin measuring instrument for imaging a skin and a microscope for imaging the scalp.
- Apparatuses for sports use, such as action cameras and wearable cameras for sports use or the like.
- Apparatuses for agricultural use, such as cameras for monitoring conditions of fields and/or farm products.

<25. Application Example to In-Vivo Information Acquisition System>

The technology according to the present disclosure (the present technology) is applicable to various products. For example, the technology according to the present disclosure may be applied to an endoscopic surgery system.

Figure 94:
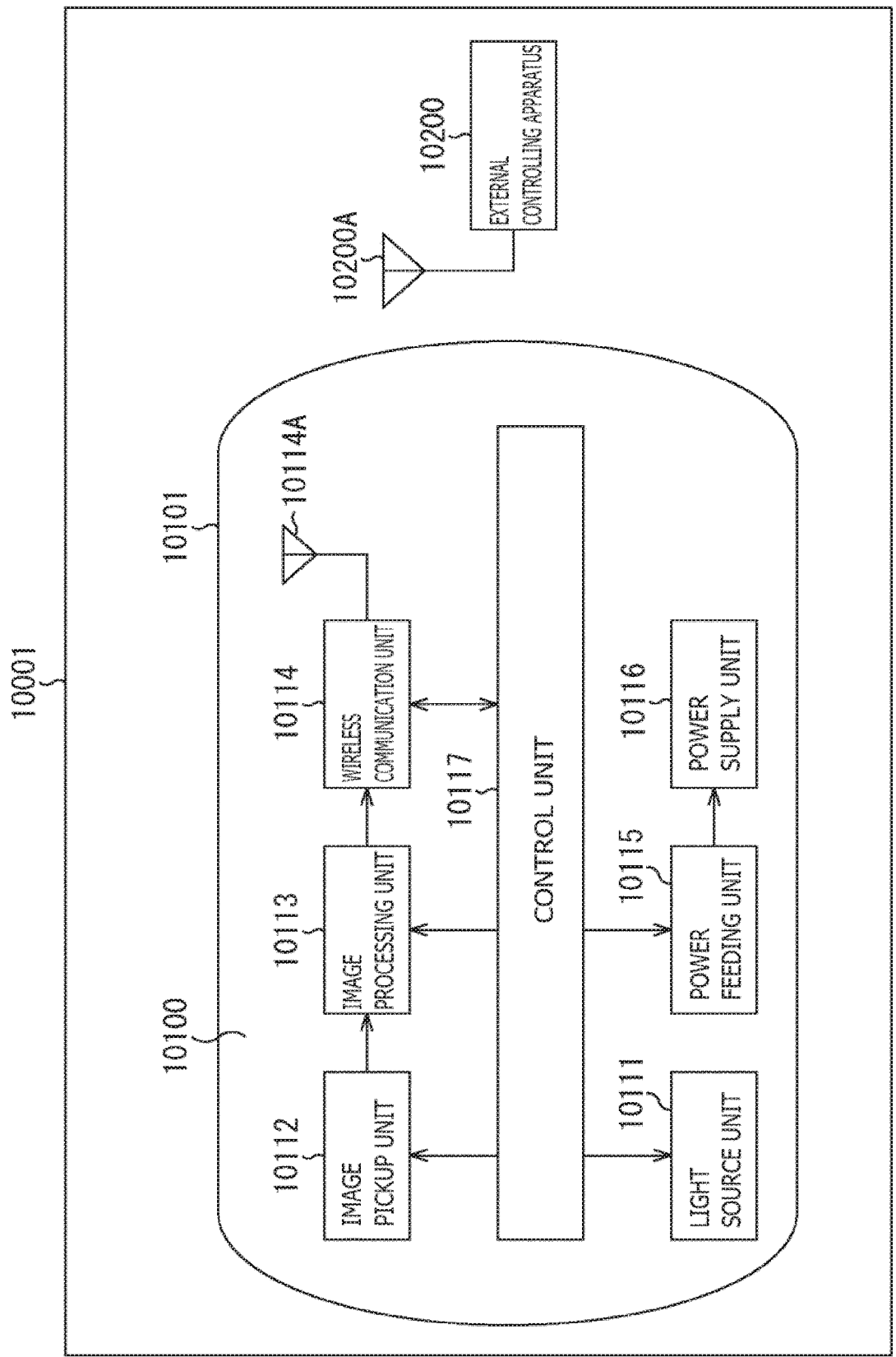
FIG. 94 is a block diagram depicting an example of a schematic configuration of an in-vivo information acquisition system.

FIG. 94 is a block diagram depicting an example of a schematic configuration of an in-vivo information acquisition system of a patient using a capsule type endoscope, to which the technology according to an embodiment of the present disclosure (present technology) can be applied.

The in-vivo information acquisition system 10001 includes a capsule type endoscope 10100 and an external controlling apparatus 10200.

The capsule type endoscope 10100 is swallowed by a patient at the time of inspection. The capsule type endoscope 10100 has an image pickup function and a wireless communication function and successively picks up an image of the inside of an organ such as the stomach or an intestine (hereinafter referred to as in-vivo image) at predetermined intervals while it moves inside of the organ by peristaltic motion for a period of time until it is naturally discharged from the patient. Then, the capsule type endoscope 10100 successively transmits information of the in-vivo image to the external controlling apparatus 10200 outside the body by wireless transmission.

The external controlling apparatus 10200 integrally controls operation of the in-vivo information acquisition system 10001. Further, the external controlling apparatus 10200 receives information of an in-vivo image transmitted thereto from the capsule type endoscope 10100 and generates image data for displaying the in-vivo image on a display apparatus (not depicted) on the basis of the received information of the in-vivo image.

In the in-vivo information acquisition system 10001, an in-vivo image imaged a state of the inside of the body of a patient can be acquired at any time in this manner for a period of time until the capsule type endoscope 10100 is discharged after it is swallowed.

A configuration and functions of the capsule type endoscope 10100 and the external controlling apparatus 10200 are described in more detail below.

The capsule type endoscope 10100 includes a housing 10101 of the capsule type, in which a light source unit 10111, an image pickup unit 10112, an image processing unit 10113, a wireless communication unit 10114, a power feeding unit 10115, a power supply unit 10116 and a control unit 10117 are accommodated.

The light source unit 10111 includes a light source such as, for example, a light emitting diode (LED) and irradiates light on an image pickup field-of-view of the image pickup unit 10112.

The image pickup unit 10112 includes an image pickup element and an optical system including a plurality of lenses provided at a preceding stage to the image pickup element. Reflected light (hereinafter referred to as observation light) of light irradiated on a body tissue which is an observation target is condensed by the optical system and introduced into the image pickup element. In the image pickup unit 10112, the incident observation light is photoelectrically converted by the image pickup element, by which an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU) and performs various signal processes for an image signal generated by the image pickup unit 10112. The image processing unit 10113 provides the image signal for which the signal processes have been performed thereby as RAW data to the wireless communication unit 10114.

The wireless communication unit 10114 performs a predetermined process such as a modulation process for the image signal for which the signal processes have been performed by the image processing unit 10113 and transmits the resulting image signal to the external controlling apparatus 10200 through an antenna 10114A. Further, the wireless communication unit 10114 receives a control signal relating to driving control of the capsule type endoscope 10100 from the external controlling apparatus 10200 through the antenna 10114A. The wireless communication unit 10114 provides the control signal received from the external controlling apparatus 10200 to the control unit 10117.

The power feeding unit 10115 includes an antenna coil for power reception, a power regeneration circuit for regenerating electric power from current generated in the antenna coil, a voltage booster circuit and so forth. The power feeding unit 10115 generates electric power using the principle of non-contact charging.

The power supply unit 10116 includes a secondary battery and stores electric power generated by the power feeding unit 10115. In FIG. 94, in order to avoid complicated illustration, an arrow mark indicative of a supply destination of electric power from the power supply unit 10116 and so forth are omitted. However, electric power stored in the power supply unit 10116 is supplied to and can be used to drive the light source unit 10111, the image pickup unit 10112, the image processing unit 10113, the wireless communication unit 10114 and the control unit 10117.

The control unit 10117 includes a processor such as a CPU and suitably controls driving of the light source unit 10111, the image pickup unit 10112, the image processing unit 10113, the wireless communication unit 10114 and the power feeding unit 10115 in accordance with a control signal transmitted thereto from the external controlling apparatus 10200.

The external controlling apparatus 10200 includes a processor such as a CPU or a GPU, a microcomputer, a control board or the like in which a processor and a storage element such as a memory are mixedly incorporated. The external controlling apparatus 10200 transmits a control signal to the control unit 10117 of the capsule type endoscope 10100 through an antenna 10200A to control operation of the capsule type endoscope 10100. In the capsule type endoscope 10100, an irradiation condition of light upon an observation target of the light source unit 10111 can be changed, for example, in accordance with a control signal from the external controlling apparatus 10200. Further, an image pickup condition (for example, a frame rate, an exposure value or the like of the image pickup unit 10112) can be changed in accordance with a control signal from the external controlling apparatus 10200. Further, the substance of processing by the image processing unit 10113 or a condition for transmitting an image signal from the wireless communication unit 10114 (for example, a transmission interval, a transmission image number or the like) may be changed in accordance with a control signal from the external controlling apparatus 10200.

Further, the external controlling apparatus 10200 performs various image processes for an image signal transmitted thereto from the capsule type endoscope 10100 to generate image data for displaying a picked up in-vivo image on the display apparatus. As the image processes, various signal processes can be performed such as, for example, a development process (demosaic process), an image quality improving process (bandwidth enhancement process, a super-resolution process, a noise reduction (NR) process and/or image stabilization process) and/or an enlargement process (electronic zooming process). The external controlling apparatus 10200 controls driving of the display apparatus to cause the display apparatus to display a picked up in-vivo image on the basis of generated image data. Alternatively, the external controlling apparatus 10200 may also control a recording apparatus (not depicted) to record generated image data or control a printing apparatus (not depicted) to output generated image data by printing.

Thus, an example of the in-vivo information acquisition system to which the technology according to the present disclosure is applied has been described above. The technology according to the present disclosure is applicable to the image pickup unit 10112, of the above-described configuration. Specifically, the camera module 1 including the stacked lens structure 2081 or the substrate with lens 2081' depicted in FIGS. 83 and 84 or the stacked lens structure 2351 depicted in FIGS. 88A, 88B, 88C, 88D, 89A, 89B, 89C, 89D, 89E, 89F, and 89G may be applied to the image pickup unit 10112. By applying the technology according to the present disclosure to the image pickup unit 10112, it is possible to reduce the device configuration in size, to restrain generation of dust, and to enhance assembly accuracy.

<26. Application Example to Endoscopic Surgery System>

The technology according to the present disclosure (the present technology) is applicable to various products. For example, the technology according to the present disclosure may be applied to an endoscopic surgery system.

Figure 95:
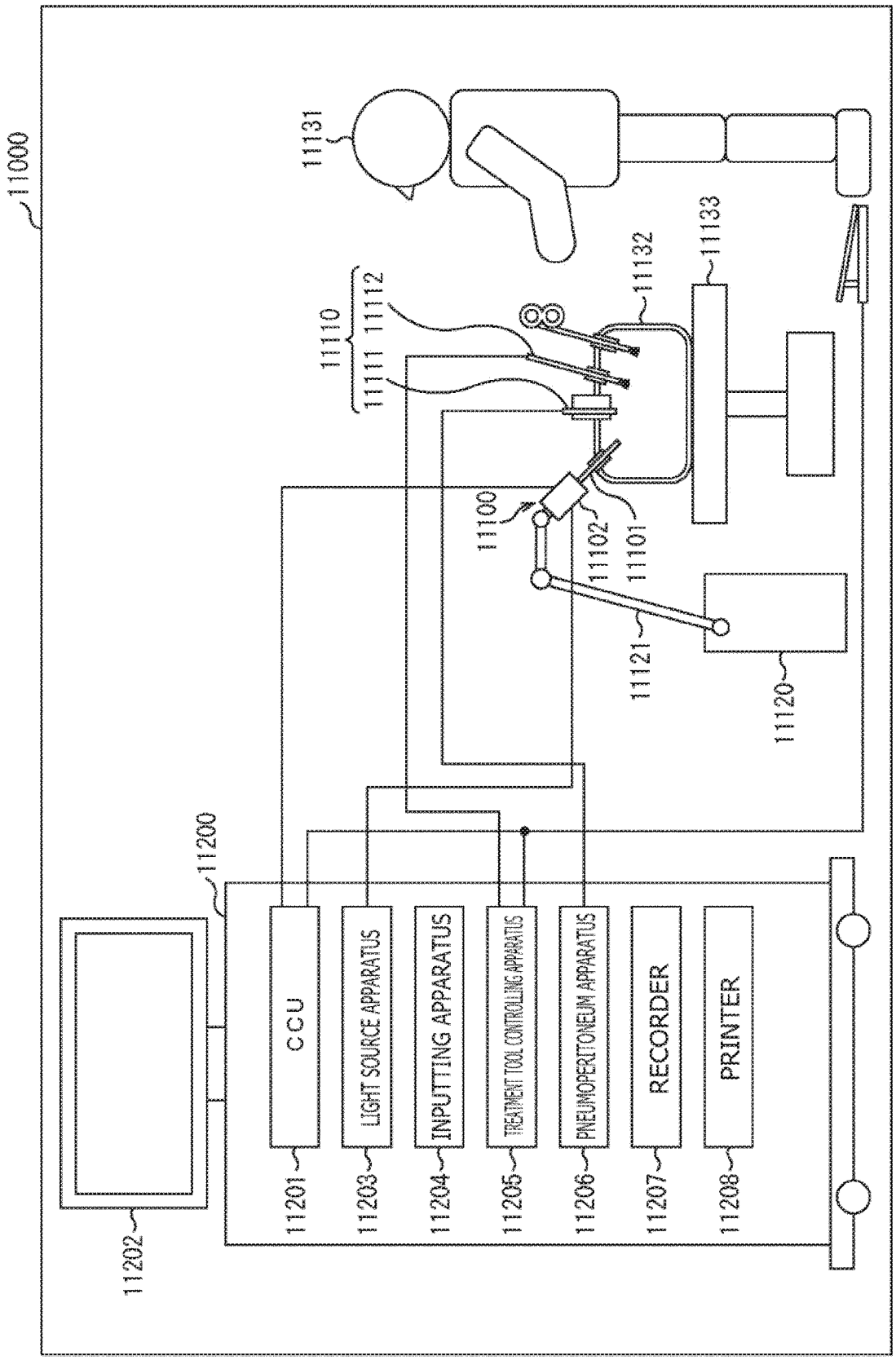
FIG. 95 is a view depicting an example of a schematic configuration of an endoscopic surgery system.

FIG. 95 is a view depicting an example of a schematic configuration of an endoscopic surgery system to which the technology according to an embodiment of the present disclosure (present technology) can be applied.

In FIG. 95, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 96:
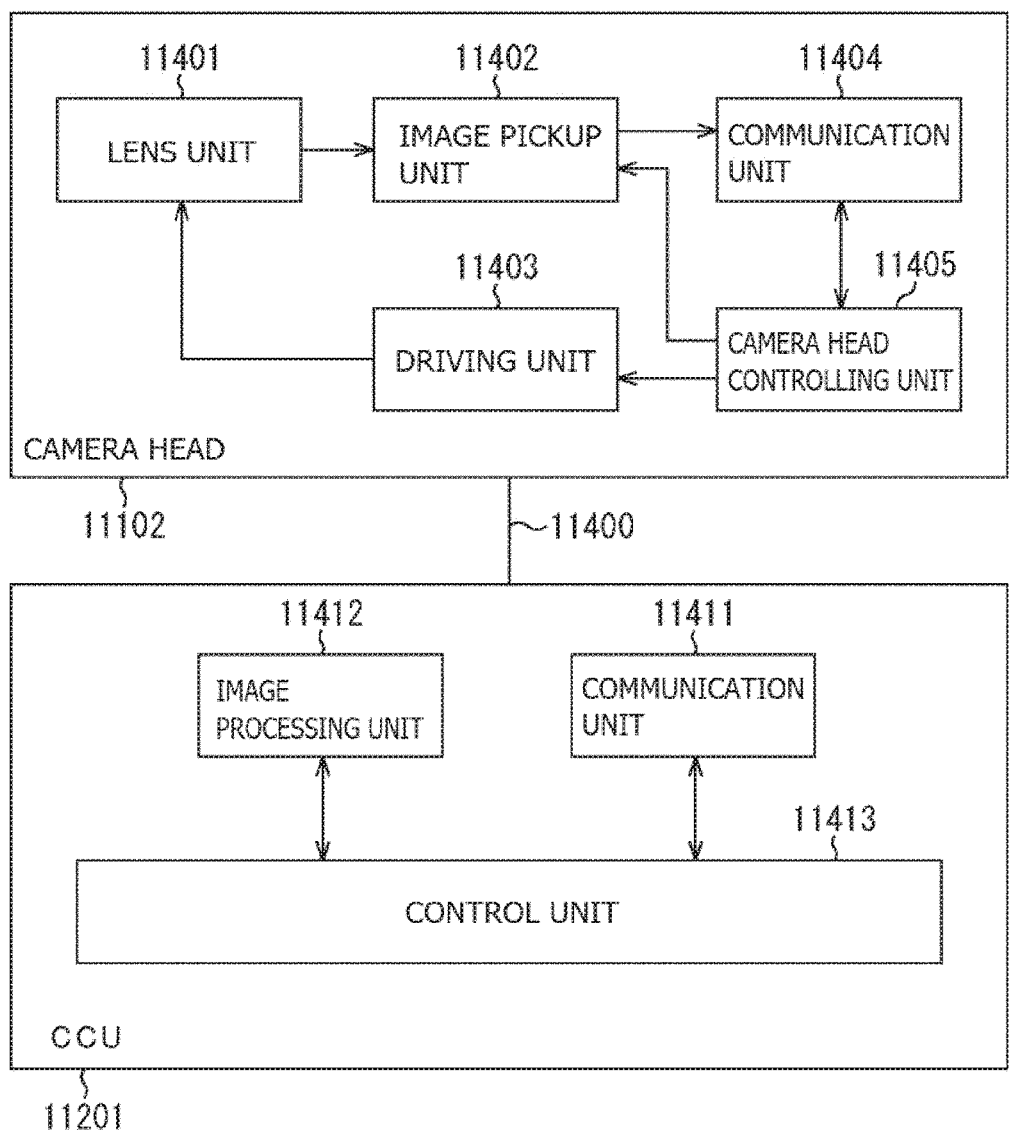
FIG. 96 is a block diagram depicting an example of a functional configuration of a camera head and a camera control unit (CCU).

FIG. 96 is a block diagram depicting an example of a functional configuration of the camera head 11102 and the CCU 11201 depicted in FIG. 95.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

Thus, an example of the endoscopic surgery system to which the technology according to the present disclosure is applicable has been described above. The technology according to the present disclosure is applicable to the lens unit 11401 and the image pickup unit 11402 and the like, of the abode-described configuration. Specifically, the camera module 1 including the stacked lens structure 2081 or the substrate with lens 2081' depicted in FIGS. 83 and 84 or the stacked lens structure 2351 depicted in FIGS. 88A, 88B, 88C, 88D, 89A, 89B, 89C, 89D, 89E, 89F, and 89G is applicable to the lens unit 11401 and the image pickup unit 11402. By applying the technology according to the present disclosure to the lens unit 11401 and the image pickup unit 11402, it is possible to reduce the device configuration in size, to restrain generation of dust, and to enhance assembly accuracy.

Note that, while the in-vivo surgery system has been described as an example here, the technology according to the present disclosure may be applied to other systems such as, for example, a microscopic surgery system.

<27. Application Example to Moving Body>

The technology according to the present disclosure (the present technology) is applicable to various products. For example, the technology according to the present disclosure may be realized as an apparatus mounted on any type of moving body such as an automobile, an electric vehicle, a hybrid electric vehicle, a motorcycle, a bicycle, a personal mobility, an airplane, a drone, a ship, or a robot.

Figure 97:
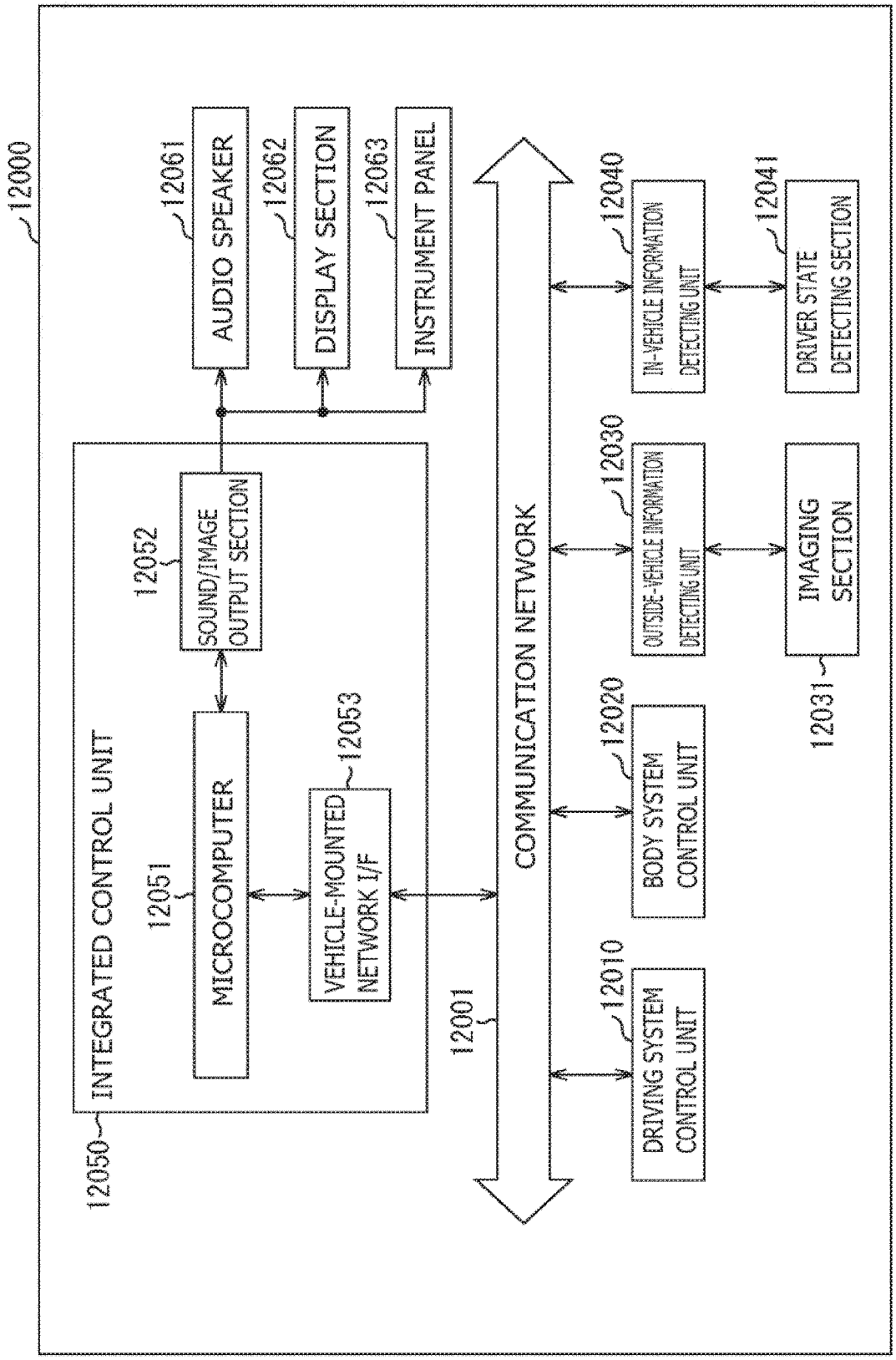
FIG. 97 is a block diagram depicting an example of schematic configuration of a vehicle control system.

FIG. 97 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 97, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 97, an audio speaker 12061, a display section 12062, and an instrument panel 12063 are illustrated as the output device. The display section 12062 may, for example, include at least one of an on-board display and a head-up display.

Figure 98:
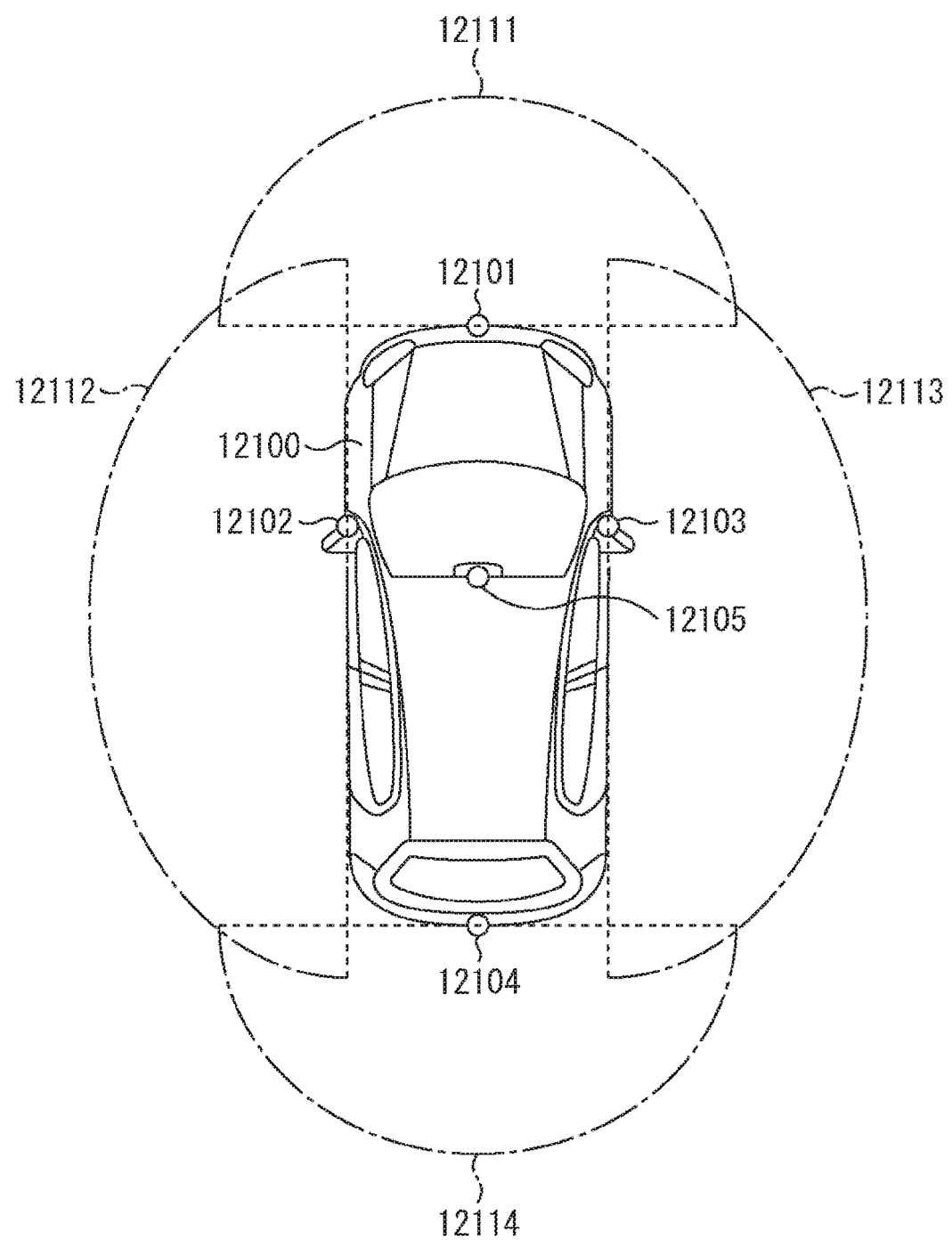
FIG. 98 is a diagram of assistance in explaining an example of installation positions of an outside-vehicle information detecting section and an imaging section.

FIG. 98 is a diagram depicting an example of the installation position of the imaging section 12031.

In FIG. 98, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 98 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Thus, an example of the vehicle control system to which the technology according to the present disclosure is applicable has been described above. The technology according to the present disclosure is applicable to the imaging section 12031, of the above-described configuration. Specifically, the camera module 1 including the stacked lens structure 2081 or the substrate with lens 2081' depicted in FIGS. 83 and 84 or the stacked lens structure 2351 depicted in FIGS. 88A, 88B, 88C, 88D, 89A, 89B, 89C, 89D, 89E, 89F, and 89G is applicable to the imaging section 12031. By applying the technology according to the present disclosure to the imaging section 12031, it is possible to reduce the device configuration in size, to restrain generation of dust, and to enhance assembly accuracy.

Note that the effects described herein are merely illustrative and are not limitative, and other effects than those described herein may be present.

Note that the present technology may take the following configurations.

(1)

A stacked lens structure including:

plural substrates with lens stacked on one another, the substrate with lens each having a lens disposed on inside of a through-hole formed in the substrate, in which in regard of side surfaces at side parts corresponding to sides of a rectangle surrounding the substrate with lens in plan view as viewed in an optical axis direction, a width and a shape are the same among all the substrates with lens, whereas in regard of side surfaces at opposite angle parts corresponding to opposite angles of the rectangle, the width or shape differs between at least two substrates with lens.

(2)

The stacked lens structure according to (1) above, in which the rectangle is a square.

(3)

The stacked lens structure according to (1) above, in which the rectangle is a non-square rectangle.

(4)

The stacked lens structure according to any one of (1) to (3) above, in which side surfaces of each substrate with lens at the side parts are recessed to the lens side relative to the sides of the rectangle.

(5)

The stacked lens structure according to any one of (1) to (4) above, in which a width of the side surfaces at the opposite angle parts differs among all the substrates with lens.

(6)

The stacked lens structure according to (5) above, in which the width of the side surfaces at the opposite angle parts of the substrate with lens is smallest for the substrate with lens on a light incidence side and is largest for the substrate with lens on a light emission side.

(7)

The stacked lens structure according to any one of (1) to (6) above, in which a sectional shape of the side surfaces at the opposite angle parts of the substrate with lens is a tapered shape.

(8)

The stacked lens structure according to any one of (1) to (6) above, in which the side surfaces at the opposite angle parts of two or more substrates with lens constitute the same surface.

(9)

The stacked lens structure according to any one of (1) to (6) above, in which the sectional shape of the side surface at the opposite angle parts of the substrate with lens is a tapered shape, and the side surfaces at the opposite angle parts of two or more substrates with lens constitute the same surface.

(10)

A method of manufacturing a stacked lens structure, including:

a step of stacking plural substrates with lens on one another, the substrate with lens each having a lens disposed on inside of a through-hole formed in the substrate, in which at the time of stacking the substrates with lens, in regard of side surfaces at side parts corresponding to sides of a rectangle surrounding the substrate with lens in plan view as viewed in an optical axis direction, a width and a shape are formed to be the same among all the substrates with lens, whereas in regard of side surfaces at opposite angle parts corresponding to opposite angles of the rectangle, the width or shape is formed to be different between at least two substrates with lens.

(11)

An electronic apparatus including:
a stacked lens structure that includes
plural substrates with lens stacked on one another, the substrate with lens each having a lens disposed on inside of a through-hole formed in the substrate,
in which in regard of side surfaces at side parts corresponding to sides of a rectangle surrounding the substrate with lens in plan view as viewed in an optical axis direction, a width and a shape are the same among all the substrates with lens, whereas in regard of side surfaces at opposite angle parts corresponding to opposite angles of the rectangle, the width or shape differs between at least two substrates with lens.

REFERENCE SIGNS LIST 2012, 2012-1, 2012-2 Lens shape part, 2014, 2014-1, 2014-2 Glass substrate, 2015 Rib, 2022, 2022-1, 2022-3 Lens resin, 2031, 2031-1 to 2031-5 Substrate, 2032, 2032-1 to 2032-3 Lens hole, 2033, 2033-1 to 2033-5 Lens, 2041, 2041-1, 2041-2 Stacked lens structure, 2041' Lens module, 2051-1 to 2051-4 Corner, 2052-1 to 2052-4 Position, 2071, 2071-1 to 2071-5 Substrate, 2072, 2072-1 to 2072-3, 2072' Lens hole, 2073, 2073-1 to 2773-3, 2073', 2073", 2073''', 2073'''' Intersection hole, 2074, 2074-1 to 2074-5 Lens, 2075 Dicing line, 2076-1 to 2076-4 Space, 2081, 2081-1, 2081-2 Stacked lens structure, 2081' Lens module, 2201 Imaging device, 2202 Optical system, 2301, 2301-1 to 2301-5 Substrate with lens, 2312 Lens hole, 2313 Lens, 2341 Side part, 2342 Opposite angle part, 2351 Stacked lens structure

The invention claimed is:

1. A stacked lens structure, comprising:
a plurality of substrates with lens stacked on each other, wherein
each substrate of the plurality of substrates with lens has a through-hole,
each substrate of the plurality of substrates with lens has a lens on inside of the through-hole,
with respect to side surfaces at side parts corresponding to sides of a rectangle surrounding a corresponding substrate with lens in plan view as viewable in an optical axis direction, a width and a shape are same among all the plurality of substrates with lens,
with respect to side surfaces at opposite angle parts corresponding to opposite angles of the rectangle, the width or the shape differs between at least two substrates of the plurality of substrates with lens, and
the side surfaces at the side parts of each of the plurality of substrates with lens are recessed to a lens side relative to the sides of the rectangle.

2. The stacked lens structure according to claim 1, wherein the rectangle is a square.

3. The stacked lens structure according to claim 1, wherein the rectangle is a non-square rectangle.

4. The stacked lens structure according to claim 1, wherein the width of the side surfaces at the opposite angle parts differs among the plurality of substrates with lens.

5. The stacked lens structure according to claim 4, wherein the width of the side surfaces at the opposite angle parts is smallest for a first substrate of the plurality of substrates with lens on a light incidence side and is largest for a second substrate of the plurality of substrates with lens on a light emission side.

6. The stacked lens structure according to claim 1, wherein a sectional shape of the side surfaces at the opposite angle parts of each of the plurality of substrates with lens is a tapered shape.

7. The stacked lens structure according to claim 1, wherein the side surfaces at the opposite angle parts of the plurality of substrates with lens constitute same surface.

8. A method of manufacturing a stacked lens structure, the method comprising:
stacking a plurality of substrates with lens on each other, wherein
each substrate of the plurality of substrates with lens has a through-hole,
each substrate of the plurality of substrates with lens has a lens on inside of the through-hole,
with respect to side surfaces at side parts corresponding to sides of a rectangle surrounding a corresponding substrate with lens in plan view as viewable in an optical axis direction, a width and a shape are same among all the plurality of substrates with lens,
with respect to side surfaces at opposite angle parts corresponding to opposite angles of the rectangle, the width or the shape is different between at least two substrates of the plurality of substrates with lens, and
the side surfaces at the side parts of each of the plurality of substrates with lens are recessed to a lens side relative to the sides of the rectangle.

9. An electronic apparatus, comprising:
a stacked lens structure that includes a plurality of substrates with lens stacked on each other, wherein
each substrate of the plurality of substrates with lens has a through-hole,
each substrate of the plurality of substrates with lens has a lens on inside of the through-hole,
with respect to side surfaces at side parts corresponding to sides of a rectangle surrounding a corresponding substrate with lens in plan view as viewable in an optical axis direction, a width and a shape are same among all the plurality of substrates with lens,
with respect to side surfaces at opposite angle parts corresponding to opposite angles of the rectangle, the width or the shape differs between at least two substrates of the plurality of substrates with lens, and
the side surfaces at the side parts of each of the plurality of substrates with lens are recessed to a lens side relative to the sides of the rectangle.

* * * * *